(12) United States Patent
Cohen

(10) Patent No.: US 12,475,254 B2
(45) Date of Patent: Nov. 18, 2025

(54) SYSTEMS AND METHODS FOR TAINT ANALYSIS USING PATTERN RECOGNITION

(71) Applicant: Seraphic Algorithms Ltd., Tel-Aviv (IL)

(72) Inventor: Avihay Cohen, Tel-Aviv (IL)

(73) Assignee: SERAPHIC ALGORITHMS LTD., Tel Aviv (IL)

( * ) Notice: Subject to any disclaimer, the term of this patent is extended or adjusted under 35 U.S.C. 154(b) by 62 days.

(21) Appl. No.: 18/611,799

(22) Filed: Mar. 21, 2024

(65) Prior Publication Data
US 2024/0311476 A1  Sep. 19, 2024

Related U.S. Application Data

(63) Continuation of application No. PCT/IB2022/059418, filed on Oct. 3, 2022.
(Continued)

(51) Int. Cl.
G06F 21/62 (2013.01)
G06F 16/958 (2019.01)
(Continued)

(52) U.S. Cl.
CPC ........ G06F 21/6245 (2013.01); G06F 16/986 (2019.01); G06F 21/54 (2013.01);
(Continued)

(58) Field of Classification Search
CPC .... G06F 21/6245; G06F 16/986; G06F 21/54; G06F 21/554; G06F 2221/033;
(Continued)

(56) References Cited

U.S. PATENT DOCUMENTS

| 10,789,360 B2 * | 9/2020 | Johns ................. G06F 21/54 |
| 2013/0346302 A1 * | 12/2013 | Purves .............. G06Q 20/102 705/40 |

(Continued)

OTHER PUBLICATIONS

International Search Report and Written Opinion for International Application No. PCT/IB2022/59418 dated Feb. 8, 2023 (19 pages).

*Primary Examiner* — Frantz B Jean
(74) *Attorney, Agent, or Firm* — FINNEGAN, HENDERSON, FARABOW, GARRETT & DUNNER L.L.P.

(57) ABSTRACT

Systems, methods, and non-transitory computer readable media including instructions for implementing a runtime virtual barrier for fine grained execution control are disclose. Implementing the runtime virtual barrier for fine grained execution control includes receiving, by an application capable of JavaScript execution, an executable code including an API invocation; intercepting, by a virtual barrier, the API invocation; determining that the API invocation is an invocation for a native API configured for subsequent execution in response to a trigger event; based on the determination that the API invocation is an invocation for a native API configured for subsequent execution, recording an invocation source identifier; and upon occurrence of the trigger event: retrieving the invocation source identifier; and influencing execution of the native API based on the invocation source identifier.

20 Claims, 33 Drawing Sheets

Related U.S. Application Data

(60) Provisional application No. 63/251,651, filed on Oct. 3, 2021.

(51) Int. Cl.
*G06F 21/54* (2013.01)
*G06F 21/55* (2013.01)
*H04L 9/40* (2022.01)

(52) U.S. Cl.
CPC ........ *G06F 21/554* (2013.01); *H04L 63/1425* (2013.01); *H04L 63/1483* (2013.01); *H04L 63/1491* (2013.01); *G06F 2221/033* (2013.01); *G06F 2221/034* (2013.01)

(58) Field of Classification Search
CPC ........... G06F 2221/034; H04L 63/1425; H04L 63/1483; H04L 63/1491
See application file for complete search history.

(56) References Cited

U.S. PATENT DOCUMENTS

| | | | |
|---|---|---|---|
| 2014/0188976 A1* | 7/2014 | Plamondon | G06F 12/0862 709/202 |
| 2014/0282464 A1* | 9/2014 | El-Gillani | G06F 16/00 713/189 |
| 2019/0347414 A1* | 11/2019 | El-Moussa | G06F 21/53 |
| 2020/0210592 A1* | 7/2020 | Karas | G06F 21/552 |
| 2022/0400123 A1* | 12/2022 | Ayoub | G06F 3/067 |

* cited by examiner 4-700

Receiving, by an application capable of JavaScript execution, an executable code including an API invocation — 4-702

Intercepting, by a virtual barrier, the API invocation — 4-704

Determining that the API invocation is an invocation for a native API configured for subsequent execution in response to a trigger event — 4-706

Based on the determination that the API invocation is an invocation for a native API configured for subsequent execution, recording an invocation source identifier — 4-708

Upon detecting the trigger event: retrieving the invocation source identifier — 4-710

Influencing execution of the native API based on the invocation source identifier — 4-712

Modifying the execution when the invocation source identifier is determined to be suspicious — 4-714

*FIG. 4-7*

```
1  <!DOCTYPE html>
2  <html lang="en">
3  <head>
4    <meta charset="UTF-8">
5    <meta http-equiv="X-UA-Compatible" content="IE=edge">
6    <meta name="viewport" content="width=device-width,
       initial-scale=1.0">
7    <title>Document</title>
8  </head>
9  <body>
10
11   <script type="text/javascript" >
12
13     alert("javascript inside script tag");
14
15   </script>
16
17 </body>
18 </html>
``` javascript inside script tag

```
<head>
<style>
    #Vulnerable_Page {
        position:relative;
        width:100px;
        height:100px;
        opacity:0.0;
        z-index:2;
    }
    #Decoy_Page {
        position:absolute;
        width:200px;
        height:200px;
        z-index:1;
    }
</style>
</head>
<body>
<div id="Decoy_Page">
...manipulated page content...
<iframe id="Vulnerable_Page">
    <input type="button" class="Button" value="Button" onclick="click()" />
    src = "https://vulnerable-website.com"
</iframe>
</div>
</body>
```

FIG. 6-1

```
<head>
    code for JavaScript agent      6-200
    <style>
        #Vulnerable_Page {
            position:relative;
            width:100px;
            height:100px;
            opacity:0.0;
            z-index:2;
        }
        #Decoy_Page {
            position:absolute;
            width:200px;
            height:200px;
            z-index:1;
        }
    </style>
</head>
<body>
    <div id="Decoy_Page">
        ...manipulated page content...
        <iframe
            code for JavaScript agent     6-200
            <input type="button" id="HiddenButton" class="Button" value="Button"
            onclick="click()" />
            id="Vulnerable_Page" src="https://vulnerable-website.com"
        </iframe>
    </div>
</body>
```

FIG. 6-2

```
6-400            CODE SNIPPET FOR DISABLING AN INPUT EVENT

//javascript code to disable an input event event.stopPropagation();
event.stopImmediatePropagation();
event.preventDefault();
```

CreditSecure

For all you credit needs

Welcome back Jane Doe

Points earned for credit card No. 4534 9128 9647 3231 — 9-302

SYSTEMS AND METHODS FOR TAINT ANALYSIS USING PATTERN RECOGNITION

CROSS-REFERENCE TO RELATED APPLICATIONS

This application is a continuation of International Patent Application No. PCT/IB2022/059418, filed on Oct. 3, 2022, which claims priority from U.S. Provisional Patent Application No. 63/251,651, filed on Oct. 3, 2021. The contents of the above-noted applications are incorporated by reference herein in their entireties.

TECHNICAL FIELD

Disclosed embodiments relate to the field of cyber defense, and more specifically to exploit prevention and malicious code neutralization for browser and JavaScript-based applications.

BACKGROUND

Cyber defense techniques often follow basic rule sets to identify and prevent potential cyber threats. These techniques, however, often fail to perform proactive actions to prevent cyber threats or thoroughly analyze behavior of code during a runtime environment. Other limitations of the related art will become apparent to those of skill in the art upon a reading of the specification and a study of the figures. To manage these challenges, cybersecurity agents may be used. Such agents may allow for the suppression, detection, and prevention of cyberattacks, which is useful for protecting digital information and computing resources from use by an unauthorized party, a nuanced and technical problem rooted in computer technology. The accomplishment of these benefits is discussed with respect to the embodiments below.

SUMMARY

The following embodiments and aspects thereof are described and illustrated in conjunction with systems, computer readable media and methods which are meant to be exemplary and illustrative, not limiting in scope.

One aspect of the present disclosure is directed to systems, methods, and computer readable media for implementing a runtime virtual barrier for fine grained execution control. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media for sanitizing data within a native environment. Systems, methods, devices, and non-transitory computer readable media may involve at least one processor configured to: receive, by an application capable of JavaScript execution, an executable code including an API invocation; intercept, by a virtual barrier, the API invocation; determine that the API invocation is an invocation for a native API configured for subsequent execution in response to a trigger event; based on the determination that the API invocation is an invocation for a native API configured for subsequent execution, record an invocation source identifier; and upon occurrence of the trigger event: retrieve the invocation source identifier; and influencing execution of the native API based on the invocation source identifier.

One aspect of the present disclosure is directed to systems, methods, and computer readable media for sanitizing data within a native environment. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media for sanitizing data within a native environment. Systems, methods, devices, and non-transitory computer readable media may involve at least one processor configured to: obtain at least one runtime parameter associated with an execution environment; determine if input data associated with the at least one runtime parameter includes at least one character associated with a risk indicator; split the at least one runtime parameter into at least two parts based on the at least one character; obtain a first string representation of an origin of an API invocation; compare the at least two parts with the first string representation; identify at least one first portion of the first string representation that matches at least one second portion of the at least two parts by comparing the at least two parts with the first string representation; upon the identifying, parse the first string representation into a first Document Object Model (DOM) tree; replace the identified portion of the first string representation with a benign set of characters to form a second string representation; parse the second string representation into a second DOM tree; determine an existence of a difference between the first DOM tree and the second DOM tree; and in response to the determined existence of a difference between the first DOM tree and the second DOM tree, generate a notification for display in a user interface indicating a potential untrusted code injection.

One aspect of the present disclosure is directed to systems, methods, and computer readable media for protecting against user interface manipulations. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media are provided for performing cybersecurity operations. The operations may include receiving code for execution within a JavaScript runtime environment, the code including at least one portion relating to a nested web element; and injecting a JavaScript agent into the at least one portion of the code, wherein the JavaScript agent is configured to: identify at least one parameter value associated with the nested web element, determine, based on the at least one parameter value, that the nested web element is configured to cause a hidden presentation of a display element within a user interface, determine that the at least one code portion relating to the nested web element is associated with at least one input event, and in response to the determination that the at least one code portion relating to the nested web element is associated with the at least one input event, prevent an occurrence of the at least one input event.

One aspect of the present disclosure is directed to systems, methods, and computer readable media for detecting a communication discrepancy in a computing environment. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media for detecting a communication discrepancy. Systems, methods, devices, and non-transitory computer readable media may involve at least one processor configured to: transmitting at least one first request to an endpoint device; determining a first response time based on the transmitted at least one first request; transmitting at least one second request to the endpoint device; determining a second response time based on the transmitted at least one second request; determining a difference between the first response time and the second response time; and based on the determination of the difference between the first response time and the second response time, determining whether to implement a remedial action.

One aspect of the present disclosure is directed to systems, methods, and computer readable media for detecting a phishing attempt. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media are provided for detecting a phishing attempt. Systems, methods, devices, and non-transitory computer readable media may involve at least one processor configured to receive a code for execution; and inject, into an execution environment associated with the code, at least one agent configured to: collect execution data associated with rendering content based on the code; analyze the execution data to detect at least one anomaly; determine, based on runtime events resulting from executing the code in at least one execution context associated with the execution environment, whether functionality associated with the content is valid; and implement a remedial action upon determining that the functionality associated with the content is not valid.

One aspect of the present disclosure is directed to systems, methods, and computer readable media for masking sensitive data. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media for masking sensitive data. Systems, methods, devices, and non-transitory computer readable media may involve at least one processor configured to receive for execution, code associated with displaying sensitive data; and inject, into an execution environment associated with the code, an agent configured to: identify the sensitive data based on an indicator, access a Document Object Model (DOM) associated with the code, identify, in the DOM, an unmasked version of the sensitive data, replace in the DOM at least a portion of the unmasked version of the sensitive data with a mask, thereby generating a masked version of the sensitive data and concealing the at least a portion of the unmasked version of the sensitive data when content is displayed based on the code, and if a request for the sensitive data is detected, return the unmasked version of the sensitive data while maintaining the mask in the DOM.

BRIEF DESCRIPTION OF THE DRAWINGS

FIG. 4-1 is a block diagram illustrating an exemplary virtual barrier intercepting an API invocation, consistent with some embodiments of the present disclosure.

FIG. 4-2 is a block diagram illustrating an exemplary DOM representing a code, consistent with some embodiments of the present disclosure.

FIG. 4-3 is a block diagram illustrating a callback function included in an API invocation indicating the API invocation is configured for subsequent execution in response to a trigger event, consistent with some embodiments of the present disclosure.

FIG. 4-4 is a block diagram illustrating an input interface, consistent with some embodiments of the present disclosure.

FIG. 4-5 is a block diagram illustrating a software agent recording an invocation source identifier for a native API configured for subsequent execution, consistent with some embodiments of the present disclosure.

FIG. 4-6 is a block diagram illustrating a wrapped API replacing the invocation for the native API, consistent with some embodiments of the present disclosure.

FIG. 4-7 is a flow diagram of example process for performing cybersecurity operations for tracing an execution of an asynchronous API, consistent with embodiments of the present disclosure.

FIGS. 5-1A and 5-1B are block diagrams illustrating an example of runtime parameters in a runtime environment and API invocation code, consistent with some embodiments of the present disclosure.

FIG. 5-2 is a tree diagram illustrating a single DOM tree, consistent with some embodiments of the present disclosure.

FIG. 5-3 is a tree diagram illustrating an example of two document object models (DOMs), consistent with some embodiments of the present disclosure.

FIG. 5-4 is block diagram visualization illustrating an execution environment with API code and a graphical element, consistent with some embodiments of the present disclosure.

FIG. 5-5 is a flow diagram of an example process for sanitizing data within a native environment, consistent with some embodiments of the present disclosure.

FIG. 6-1 illustrates an exemplary code executable within a JavaScript runtime environment, consistent with some embodiments of the present disclosure.

FIG. 6-2 is a visual diagram illustrating an exemplary code for implementing a JavaScript agent to protect against a manipulated user interface, consistent with some embodiments of the present disclosure.

FIG. 6-3 is a visual diagram illustrating an exemplary webpage including a hidden presentation of a display element, consistent with some embodiments of the present disclosure.

FIG. 6-4 is a visual diagram illustrating an exemplary code snippet for disabling an input web element, consistent with embodiments of the present disclosure.

FIG. 6-5 illustrates a block diagram of an example process for protecting against a manipulated user interface, consistent with embodiments of the present disclosure.

FIG. 7-1 is a block diagram illustrating an exemplary implementation of a system for performing cybersecurity operations, consistent with disclosed embodiments.

FIG. 7-2 is a flow diagram illustrating an exchange of multiple electronic communications between a client device and an endpoint device along a time axis, consistent with some embodiments of the present disclosure.

FIG. 7-3 is a flow diagram of an example process for detecting a communication discrepancy, consistent with some embodiments of the present disclosure.

FIG. 8-1 is a block diagram illustrating an exemplary implementation of a system for detecting a phishing attempt, consistent with some embodiments of the present disclosure.

FIG. 8-2 is an interface view diagram illustrating an exemplary webpage associated with rendering a code, consistent with some embodiments of the present disclosure.

FIG. 8-3 is a block diagram illustrating an iframe-based exemplary implementation of a system for detecting a phishing attempt, consistent with some embodiments of the present disclosure.

FIG. 8-4 is a block diagram of an example process for detecting a phishing attempt, consistent with some embodiments of the present disclosure.

FIG. 9-1 is a block diagram illustrating an execution environment including an unmasked version of sensitive data in a DOM for an executable code, consistent with some embodiments of the present disclosure.

FIG. 9-2 is a block diagram illustrating an execution environment including a masked version of sensitive data in a DOM for an executable code, consistent with some embodiments of the present disclosure.

FIG. 9-3 is a depiction of an exemplary web page configured to display sensitive data content, consistent with some embodiments of the present disclosure.

FIG. 9-4 is a depiction of an exemplary web page configured to replace a display of sensitive data with a masked version, consistent with some embodiments of the present disclosure.

FIG. 9-5 is a block diagram illustrating an agent intercept one or more requests, consistent with some embodiments of the present disclosure.

FIG. 9-6 is a block diagram of an example process for masking sensitive data, consistent with some embodiments of the present disclosure.

DETAILED DESCRIPTION

Figure 1:
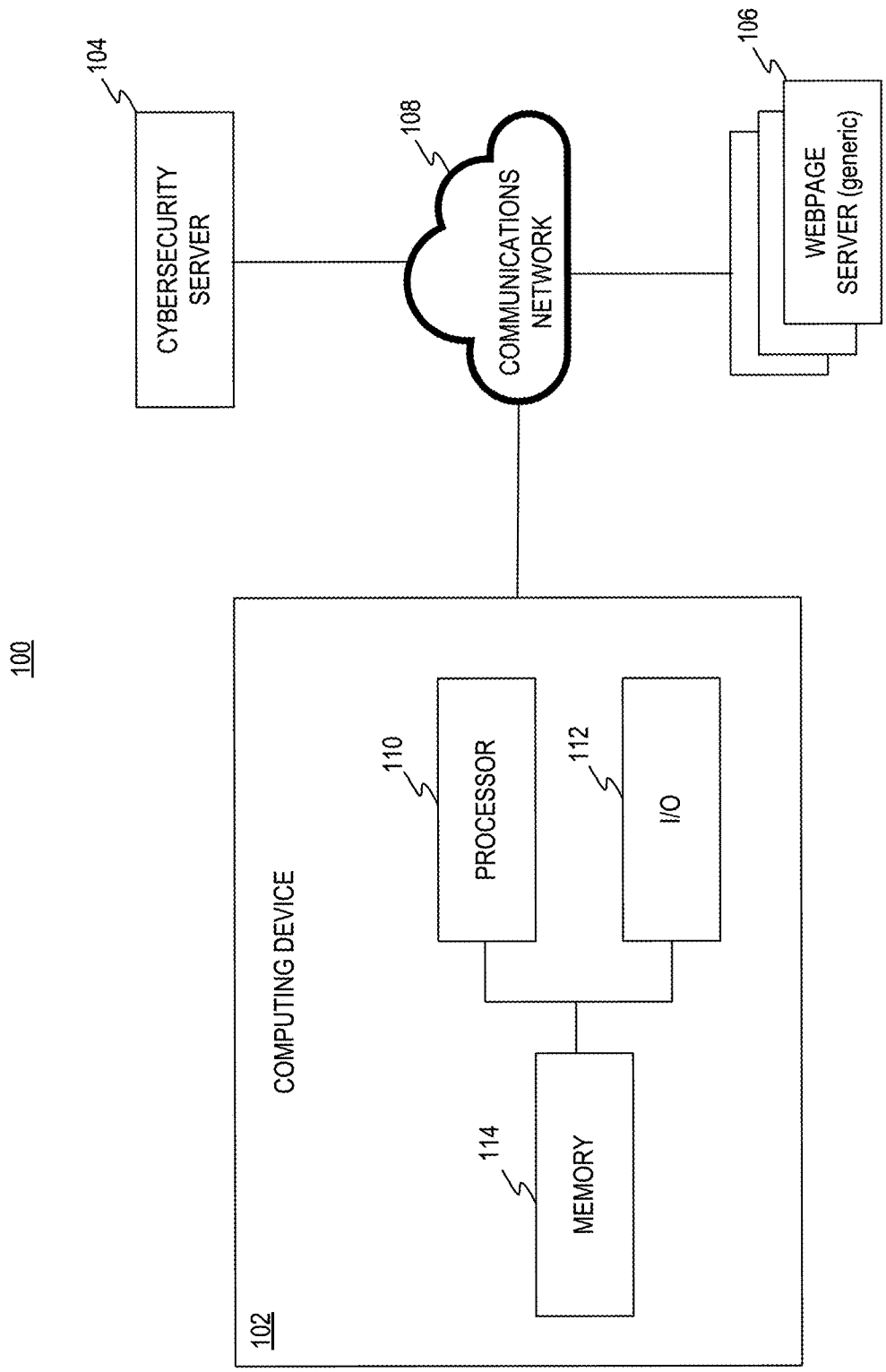
FIG. 1 is a block diagram illustrating an exemplary implementation of a system for performing cybersecurity operations, consistent with disclosed embodiments.

Disclosed herein are embodiments for automated neutralizing of malicious code. Embodiments are disclosed for various approaches to prevent exploits and neutralize malicious code within an execution environment (e.g., including one or more execution contexts). Such approaches may involve software that enables thwarting of malicious code or other cyber threats. It is intended that one or more aspects of any mechanism may be combined with one or more aspect of any other mechanisms, and such combinations are within the scope of this disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, non-transitory computer readable media, and methods for addressing cyber threats. To avoid repetition, the functionality of some embodiments is described herein solely in connection with a processor or at least one processor. It is to be understood that such exemplary descriptions of functionality apply equally to methods and computer readable media and constitutes a written description of systems, methods, and computer readable media. The underlying platform may allow a user to structure a system, method, or computer readable medium in many ways using building blocks, thereby permitting flexibility in constructing a product that suits desired needs.

Embodiments described herein may involve a non-transitory computer readable medium. A non-transitory computer readable medium may refer to any type of physical memory on which information or data readable by at least one processor can be stored. Examples include Random Access Memory (RAM), Read-Only Memory (ROM), volatile memory, nonvolatile memory, hard drives, Compact Disc Read-Only Memories (CD ROMs), Digital Video Discs or Digital Versatile Discs (DVDs), flash drives, disks, any other optical data storage medium, any physical medium with patterns of holes, markers, or other readable elements, a programmable read-only memory (PROM), an erasable programmable read-only memory (EPROM), a Flash EPROM or any other flash memory, non-volatile random-access memory (NVRAM), a cache, a register, any other memory chip or cartridge, and networked versions of the same. The terms "memory" and "computer readable storage medium" may refer to multiple structures, such as a plurality of memories or computer readable storage mediums located within an input unit or at a remote location. Additionally, one or more computer readable storage mediums can be utilized in implementing a computer-implemented method. Accordingly, the term computer readable storage medium should be understood to include tangible items and exclude carrier waves and transient signals. Thus, non-transitory computer readable media may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine having any suitable architecture. Preferably, the machine may be implemented on a computer platform having hardware such as processing units, such as one or more processors or central processing units ("CPUs"), a memory, and one or more input/output interfaces. The computer platform may also include an operating system and instruction code. The various processes and functions described in this disclosure may be either part of the instruction code or part of the application program, or any combination thereof, which may be executed by a processor/CPU, whether or not such a computer or processor is explicitly shown. In addition, various other peripheral units may be connected to the computer platform such as an additional data storage unit.

The term "instructions" may refer to program code executable by one or more computer processors. The instructions may be written in any type of computer programming language, such as an interpretive language (e.g., scripting languages such as HyperText Markup Language, or HTML, and JavaScript), a procedural or functional language (e.g., C or Pascal that may be compiled for converting to executable code), object-oriented programming language (e.g., Java or Python), logical programming language (e.g., Prolog or Answer Set Programming), or any other programming language readable by a computer. The instructions may be stored on a memory device (e.g., non-transitory computer readable medium), such that they are retrievable and executable by at least one processor to perform operations associated with the instructions. In some embodiments, the instructions may implement methods associated with computer security, machine learning, deep learning, artificial intelligence, digital image processing, optimization algorithms, and any other computer processing technique.

The term "performing operations" may involve calculating, executing, or otherwise implementing one or more arithmetic, mathematic, logic, reasoning, or inference steps (e.g., computerized instructions), for example by a computing processor. For example, performing operations may include carrying out one or more of the actions described below, to implement cybersecurity improvements.

Consistent with disclosed embodiments, a "processor" or "at least one processor" may include any physical device or group of devices having electric circuitry that performs a logic operation on an input or inputs. For example, a processor or at least one processor may include one or more integrated circuits (IC), including an application-specific integrated circuit (ASIC), a microchip, a microcontroller, a microprocessor, all or part of a central processing unit (CPU), a graphics processing unit (GPU), a digital signal processor (DSP), a field-programmable gate array (FPGA), a server, a virtual server, a virtual computing instance (e.g., a virtual machine or a container), or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact. Some disclosed embodiments may be software-based and may not require any specified hardware support.

The term "receiving" may refer to accepting delivery of, acquiring, retrieving, obtaining or otherwise gaining access to, for example information or data in a way that is detectable by or understandable to a processor. The data may be received via a communications channel, such as a wired channel (e.g., cable, fiber) and/or wireless channel (e.g., radio, cellular, optical, infrared). A communications channel may operate as part of a network, described further below. The data may be received as individual packets or as a continuous stream of data. The data may be received synchronously, e.g., by periodically polling a memory buffer, queue or stack, or asynchronously, e.g., via an interrupt event.

Some disclosed embodiments may involve an operating system. The term "operating system" (i.e., "OS") may include system software running on a computer that provides a platform for running other computer software programs (e.g., on the computer). Common OSs may include Microsoft Windows®, Apple macOS®, Linux®, Android® and Apple's iOS®. An OS may provide a platform for running additional computer software programs, such as application software for text editing, image editing, mathematical calculations, database management, or other software packages configured to operate on the computer. An OS may include a kernel for interfacing between the hardware and software components of a computer system. A kernel may control access to critical resources, such as a CPU, cache memory, input/output (I/O) devices, and/or other resources crucial for executing software. As part of initiating a computing process, an OS may load an executable file for the computing process into memory (e.g., RAM) in preparation for execution by a processor. The executable file may contain machine code instructions that are readable by the processor.

Some disclosed embodiments may involve an application capable of interpreter-based execution. An application capable of interpreter-based execution may include a computer program or portion thereof configured to directly execute, parse, analyze, change, and/or simulate instructions written in an interpretive language without requiring advance compilation into machine code. Examples of interpretive languages may include scripting languages, such as JavaScript, Perl, Python, Ruby, Smalltalk, and Matlab, and other languages that do not require compilation before execution. The application capable of interpreter-based execution may parse an interpreted language instruction and perform its behavior directly, translate an interpreted language instruction into an intermediate language for immediate execution, and/or match the interpreted language instruction to one or more pre-stored machine code instructions for immediate execution. An application capable of interpreter-based execution may implement one or more of the operations discussed below.

Some embodiments may involve intercepting. Intercepting may include accessing, receiving, changing, analyzing, preventing, or suspending executable code prior to executing the executable code, or allowing it to execute. In some embodiments, intercepting may be accomplished using (e.g., by executing) an intercepting code. Before executing the code, the system may execute an intercepting code. As discussed below, an intercepting code may include at least one of an algorithm, a wrapper, an agent, a pointer, a call, a memory location, a function, a command, a module, a frame, an argument, at least one line of code, an object, a reference, or any other computing language configured to influence input code (e.g., by causing the input code to exhibit non-native functionality, as discussed herein). The intercepting code may be configured to intercept at least one application programming interface (API) invocation by other code. The system may intercept, via the intercepting code, an API invocation by the executed code.

Some disclosed embodiments may involve executable code. The term "executable code" may refer to a 'program' or 'application' (or a portion thereof) including instructions (e.g., program code) as well as associated data that is stored in a file, that is configured for execution by at least one processor. When the at least one processor executes the code, one or more predefined functions or tasks may be performed. A 'process' or 'execution' may refer to executing the program or code on a computer, and a process may comprise the program plus its execution context.

An "execution environment" may refer to any combination of a process, a program, an application, a frame, a file, a function, a container, a module, a call (e.g., an API call), one or more lines of code, a parameter, an argument, a script, a browser, a browsing session, a uniform resource locator (URL) parameter, an Internet Protocol (IP) address, a Media Access Control (MAC) address, an encryption type, an agent (such as an agent discussed herein), a connection, HTML code, an OS. a version of code, or any computerized information defining or influencing the computing context in which a process runs. In some embodiments, an execution environment may store information about the environment of code currently being executed (or code to be executed), such as a scope defining which variables, objects, parameters, and/or functions are accessible, regions of memory that have been allocated in the heap, or any other computerized parameter that may influence code execution. In some embodiments, an execution environment where code is currently being executed may be referred to as a "runtime environment." An execution environment may include among other things, a state of the processor (processor context), e.g., a value of its program counter, and registers; as well as a memory map for the process, e.g., identified regions of memory that have been allocated for the process. The memory map may include memory space allocated to text (e.g., machine instructions); initialized static and global data, uninitialized static data, dynamically allocated "heap" memory obtained dynamically through memory allocation requests, and/or a stack for holding values (e.g., return addresses, local variables, temporary data, and/or saved registers). In some implementations, an execution environment may host (e.g., include) one or more execution contexts (e.g., each associated with a different function call). In some embodiments, at least some of the multiple execution contexts may be nested execution contexts.

When a process is running, the system may be understood to be in a context of that process. When a kernel (e.g., a kernel associated with the process) decides to execute another process, the kernel may switch the context, causing the system to execute in a different process context. When performing a context switch, the kernel may save information needed to switch back to the earlier process and continue executing the earlier process where execution was left off.

The term "computing process" may include at least one of an instance of a computer software program (e.g., application software) that is currently being executed on the computer, such as via the platform provided by the operating system (OS), a function, an instruction set, or any other code configured for execution. In some embodiments, an OS may schedule execution of a computing process concurrently with the execution of other computing process or "instances", e.g., as multiple execution threads for the same application software or for a different application software. An OS typically includes a kernel for interfacing between the hardware and software components of a computer system. A kernel may control access to critical resources, such as the CPU, cache memory, input/output (I/O) devices, and/or other resources crucial for executing software. As part of initiating a computing process, an OS may load an executable file for the computing process into memory (e.g., RAM) in preparation for execution by a processor. The executable file may contain machine code instructions that are readable by the processor.

Disclosed embodiments may involve computer software instructions (e.g., part of a software agent) to perform cybersecurity operations, described further in the embodiments below. 'A "software agent" (which may also be referred to as a "cybersecurity agent" or any type of agent, including simply "agent") may include or refer to code, that when executed within a runtime environment, performs one or more actions to protect a computer system, including any combination of the actions (e.g., cybersecurity operations) discussed below. In some embodiments, a software agent may be implemented by an application or program. The software agent may be designed to impede, thwart, or at least partially avoid unauthorized activities in a computer system or network. Unauthorized activities may involve attempts to exploit a computer system or network, to gain unauthorized access, and/or to conduct malicious activities. The software agent may defend a computer system against a cybersecurity threat. The cybersecurity threat may relate to any action that may potentially compromise the integrity, operation, safety, access, usability, anonymity, and/or security of a computer system and/or data stored therein. Consistent with disclosed embodiments, the agent may impede, thwart or at least partially avoid unauthorized activities through the practice of methods, or operations implemented through at least one processor and/or through a computer readable medium, which may include software code. Such operations may be carried out in a computer system and/or via a network. Merely because certain operations are described as being executed by an agent does not mean an agent is required, as any such operations can be executed using a program, application, script, module, add-on, or any other software, executing on at least one hardware component, such as at least one processor, consistent with disclosed embodiments.

Some embodiments involve injecting an agent within a runtime environment, mentioned above. Injecting the agent (e.g., the software agent) within a runtime environment may include inserting, adding, removing, installing, or otherwise introducing within computer code (e.g., an application) one or more program code instructions or a reference thereto, that when executed by at least one processor in the context of a specific runtime environment, perform the actions of the agent. In some embodiments, the agent may be configured to cause at least one processor to perform one or more actions relevant to a specific operating system, browser application, and/or programming language. For example, the actions may relate to the storing and subsequent retrieval of data (e.g., associated with an execution environment) in a specific area of memory, the scheduling of a computer process, an emulation of a computer process (e.g., in a protected environment), the performance of a remedial action (e.g., halting a computer process, issuing an alert), and any other action related to performing cybersecurity operations. Non-limiting examples of a software agent may include an HTML agent, Cascading Style Sheets (CSS) agent, JavaScript agent, PHP agent, Python agent, Perl agent, Ruby agent, Structured Query Language (SQL) agent, Matlab agent, Lisp agent, SmallTalk agent, and/or a Scala agent. For example, an agent may be injected within a web browsing runtime environment. One or more agents can be executed, either alone or in combination, within a runtime environment to perform actions to protect a computer system from a cybersecurity threat.

Disclosed embodiments may involve a "browser application." A browser application (e.g., web browser or Internet browser) may be or include application software for accessing digital content of a webpage of a website, stored, for example, on the World Wide Web. In some embodiments the browser application may fetch webpage code in response to a user request associated with a Uniform Resource Locator (URL). When the webpage code is stored at a local device (e.g., the user device), a browser engine configured with the browser application may execute the code to render the digital content and display the webpage on the local device.

Disclosed embodiments may involve an Application Programming Interface (API). An API may be a software intermediary, which may allow two computing devices and/or software applications to communicate (e.g., interface) with each other. APIs may be available for specific programming languages, software libraries, computer operating systems, and computer hardware. For example, an API may provide a messenger service delivering requests for data from user devices to a remote server (e.g., hosting a database), and returning requested data from the remote server to the user devices. APIs may conform to communication standards such as HyperText Transfer Protocol (HTTP) and/or Representational State Transfer (REST) facilitating software development and accessibility. An API may be customized for a specific interacting pair of systems or may be a shared standard allowing interoperability among many systems. In some embodiments, an API may be associated (e.g., through a published library) with one or more predetermined defined calls (e.g., having a particular syntax, structure, or format), knowledge of which can be utilized in the disclosed embodiments. One or more APIs may be incorporated into a software application, such as webpage code, allowing the software application to interact with other software applications via the API. For example, an API may allow a webpage rendered a local device to retrieve data from a database stored at a remote server. APIs may conceal inner details of a system, exposing only aspects relevant to utilizing the services or tools provided by the API and defining which types of interactions are allowed. This may prevent unauthorized exposure between systems while allowing updates and modifications to be made to software applications without affecting interactions with other applications and devices. However, the abstraction layer provided by an API may also expose a system to risk in situations where an update or modifications to one system introduces potential harms to the interacting system.

Disclosed embodiments may involve original input code, which may refer to at least one of unmodified source code to be executed by an application, code as it is received from a source (e.g., computing device or software application), or any code to which at least one manipulation may be applied. The original input code may be associated with a native functionality. For example, an API preconfigured with a web browser may be original input code. When invoked by the web browser, the API may cause the web browser to exhibit native functionality.

Disclosed embodiments may involve one or more characters. A character may include an alphanumeric character, an American Standard Code for Information Interchange (ASCII) character, a JavaScript string character (which may be referred to as a "char"), a Unicode character, or any other symbol or distinct informational unit within a computer language lexicon (e.g., a computer language grapheme). In some embodiments, a character may adhere to (e.g., be formatted according to) an extension, such as 16-bit Unicode Transformation Format (UTF-16).

Disclosed embodiments may involve intercepting execution of a software application. Intercepting execution of a software application may include interrupting or halting the execution of a computing process, for example by removing the computing process from the runtime environment and/or replacing the computing process with a different computing process. In some embodiments, runtime data associated with the intercepted software application may be stored for subsequent rescheduling. The interception may be implemented by executing program code instructions, e.g., included with a software agent injected into the runtime environment. For example, the software agent may intercept an invocation of an API call include in a webpage code to check that the service provided by the API is legitimate and does not pose a threat to the application or device initiating the invocation.

Disclosed embodiments may involve a content element, or web element. A content element may be or include an itemized portion of webpage content. In some embodiments, a content element may be delineated in the code for a webpage with opening and closing tags. Non-limiting examples of elements may include headers, titles, buttons, forms, text fields, images, paragraphs, audio information, video information, animations, icons, and any other itemized substance of a webpage.

Disclosed embodiments may involve a Document Object Model (DOM). A DOM may refer to an interface that represents a document including Extensible Markup Language (XML), HTML, and/or JavaScript instructions as a logical structure (e.g., "a DOM structure"). In some embodiments, the logical structure may include a tree of nodes interconnected by branches representing a node relationship or hierarchy (e.g., nested and/or related elements). A node of the tree may include an object representing a part of the document, such as an element (e.g., web element), allowing cross-platform and language-independent access to document elements. The DOM may allow a software application (or other computerized instrumentality) to change the structure, style, and/or content of a document using functions (e.g., event handlers or event listeners) associated with the nodes (e.g., corresponding to the elements) of the webpage. To render an HTML webpage within a browser application running on a computing device, the browser application may load the HTML source code into memory and parse the HTML code to extract the elements for displaying to a user in a manner conforming with the logical structure. To render dynamic content, which may be defined using JavaScript, after the webpage code is loaded, the browser application may create a DOM as an object-oriented representation of the HTML portion of the webpage code. The DOM may interface between the JavaScript engine of the browser application and the webpage document allowing to dynamically add, change, and remove HTML elements and attributes, change CSS style definitions, react to event, and create new events.

Disclosed embodiments may involve an event. An event may refer to or include an action or occurrence, indicated or represented by data, that may cause a change of state in a runtime environment. The change of state may trigger a notification to be sent to initiate a corresponding response to the event. Events occurring within a browser application may be associated with one or more elements (e.g., web elements) of a webpage. A node in a DOM for a webpage representing a specific element of the webpage may include one or more events associated with the specific element and one or more corresponding responses. Examples of events may include user interface actions (e.g., a mouse click or keyboard entry), network actions (e.g., sending or receiving data), system actions (e.g., scheduling or intercepting a computing process, reading to memory, or writing to memory), and any other occurrence indicating a change of state in a runtime environment.

Disclosed embodiments may involve an event listener (which may also be called an event handler). An event listener may refer to program code instructions to be executed in response to an event. An event listener may be registered with a specific event, which may be associated with a specific webpage element in the corresponding node for the specific element in the DOM for the webpage such that when the event occurs, a notification triggering execution of the event listener may be sent. For example, a node in the DOM for a webpage may associate a click event with a button element and a corresponding event listener (e.g., event handler) to invoke an API. Upon detecting a mouse click event for the button element, a notification triggering execution of the event listener may be sent, causing the browser application to execute the code of the event listener and invoke the API.

Disclosed embodiments may involve a user interface. A user interface may refer to a portion of a computing device configured for interacting with a human user. A user interface may include one or more physical mediums, such as visual, audio, haptic, or any other type of physical medium to present and receive information. In some embodiments, a user interface may be displayable. For example, a user interface may include a graphical user interface (GUI), which may be displayable or displayed on a screen, consistent with disclosed embodiments. Examples of physical media for interfacing with a user visually may include technologies based on electroluminescence, liquid crystals, light emitting diodes, plasma, quantum dots, and any other technology for interfacing with a user visually. Examples of audible media for interfacing with a user may include a microphone, speaker, and any other type of audio interface. Examples of haptic media for interfacing with a user may include a joystick, an electronic pen or stylus, a touch sensitive screen, a wearable device, a vibration motor, and any other technology for interfacing with a user via touch.

Some disclosed embodiments may involve a user interface including technology implemented in hardware and/or software to enable interacting with a user. A hardware-implemented user interface device may include an electronic mouse, an electronic screen (e.g., a touch-sensitive screen), a keyboard device, a joystick, a stylus, a microphone, a speaker, a camera, or any other device configured to receive an input from and/or present an output to a user. A software-implemented user interface may include executable code for receiving an input from a user via one or more hardware-implemented user interface devices and processing the input in a way that is detectable by or understandable to a processor. The software-implemented user interface may additionally include executable code for receiving an output (e.g., from a processor) and processing the output in a way to present the output to the user via one or more hardware-implemented user interface devices. In some embodiments, a user interface may be integrated with a browser application for presenting web page content. Web page content may include any type of digitally encoded information accessible to a user through a web page. Types of webpage content may include any combination of text, images, video, audio, and any other type of medium for conveying information to a user. Web content may include one or more web elements (e.g., software-implemented user interface elements) for interacting with a user, such as a button, a checkbox, a form, a scrollbar, a field, a textbox, a search bar, a module, a portion of a webpage, or any other interactable portion of a web browsing environment configured for interfacing with a user. The browser application may include an event listener for integrating one or more hardware-implemented user interface devices with one or more software implemented user interface elements. For example, the event listener may detect one or more inputs (e.g., input events) received via a hardware-implemented user interface device registered with a web element, e.g., via a DOM presentation for a webpage, and send a notification of the input event to a processor.

Disclosed embodiments may involve a server. A server may refer to a computing device providing functionality to other computing devices and/or software applications in a client-server architectural framework. A server may host one or more services and data, which may be provided to a client device communicatively coupled thereto, e.g., over a communications network such as a private network or the Internet. For example, a server may host one or more websites and/or webpages. Upon receiving a request for webpage content from a client device, the server may deliver the requested webpage content as a document including program code instructions. Executing the program code instructions at the client device (e.g., via a browser application) may render the requested webpage content. The program code instructions may include one or more invocations to APIs associated with the hosting server, or a different computing device, references to digital content (e.g., images, video, audio recordings) stored at the hosting server or a different computing device, and any other type of digital content. As another example, a server may host cybersecurity services (e.g., a cybersecurity server). Upon receiving a request from a client device for cybersecurity operations, the cybersecurity server may deliver a software agent configured for installation with a browser application to govern the rendering of subsequently retrieved webpage content. Additionally, or alternatively, the cybersecurity server may perform operations to verify or analyze code, such as by emulating, simulating, or performing static and/or dynamic analysis of one or more instructions (e.g., included in webpage content) stored on a client device to test for cybersecurity threats.

Disclosed embodiments may involve a connection (e.g., communications link). A connection may refer to a physical channel (e.g., wired and/or wireless) through which information may be conveyed between two or more computing devices (e.g., between a client device and a server), such as after certain parameters are established (e.g., according to Transmission Control Protocol/Internet Protocol, or TCP/IP, or other communication protocol). Non-limiting examples of wired physical connections include copper transmission cables (e.g., twisted pair, coaxial, Ethernet), and optical transmission fibers. Non-limiting examples of wireless physical connections include radio (e.g., short, medium, long wave, microwave, Wi-Fi, BlueTooth, Zigbee, 3G, 4G, 5G), optic (e.g., infrared), ultrasound, and any other physical medium for conveying information wirelessly. A connection may communicatively couple two or more computing devices via one or more routers, firewalls, switches, gateway computers and/or edge servers.

Some embodiments disclosed herein may involve a network. A network may include any type of physical or wireless computer networking arrangement used to exchange data, e.g., including one or more connections or communications links. For example, a network may be the Internet, a private data network, a virtual private network using a public network, a Wi-Fi network, a Local Area Network (LAN) or a Wide Area Network (WAN), a combination of one or more of the forgoing, and/or other suitable connection configuration that may enable information exchange among various components of the system. In some embodiments, a network may include one or more physical links (e.g., connections, as discussed above) used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Reference is now made to FIG. 1, which is a block diagram of an exemplary implementation of a system 100 for performing cybersecurity operations, consistent with disclosed embodiments. FIG. 1 includes a computing device 102 communicatively coupled to a cybersecurity server 104 and one or more host servers 106 over a communications network 108. Computing device 102 may include at least one processor 110, input/output (I/O) 112 and a memory 114 (e.g., a non-persistent memory), e.g., corresponding to the processor, user interface and memory described earlier. Cybersecurity server 104, host servers 106 and communications network 108 may correspond to the server and communications network described earlier. For example, computing device 102 may run a client application for communicating with one or more of host servers 106 via communications network 108, e.g., as a public channel, private channel, virtual private network, or any other type of communications channel. Cybersecurity server 104 may be configured to provide one or more cybersecurity services to computing device 102, including cybersecurity operations for implementation by computing device 102 (e.g., to perform local cybersecurity operations) and cybersecurity operations for implementation by cybersecurity server 104 (e.g., to perform backend cybersecurity operations), as described in greater detail herein below. I/O 112 may include one or more components or devices for interfacing a computing device with another computing device or user, such as a pointing device, a mouse, keyboard, buttons, switches, a touchscreen panel or display, a speaker, a haptic device, a networking card, a communications module, a screen, or a display, such as a light-emitting diode (LED) display, a liquid-crystal display (LCD) or an organic light-emitting diode (OLED) display. In some embodiments, I/O may project, display, or otherwise present a user interface, described above. In some embodiments, an I/O device may be distinct from a computing device 102, such as a distinct (e.g., separate) monitor.

It should be noted that while some of these computing elements are shown singularly in FIG. 1, multiple instances may be present in different embodiments. For example, embodiments may include multiple computing devices, which may be connected to one or more communications networks 108, as well as one or more cybersecurity servers 104. Moreover, while not depicted, a cybersecurity server and/or webpage server may include one or more of its own processors, memories, and/or I/Os, or any other hardware component.

Figure 2:
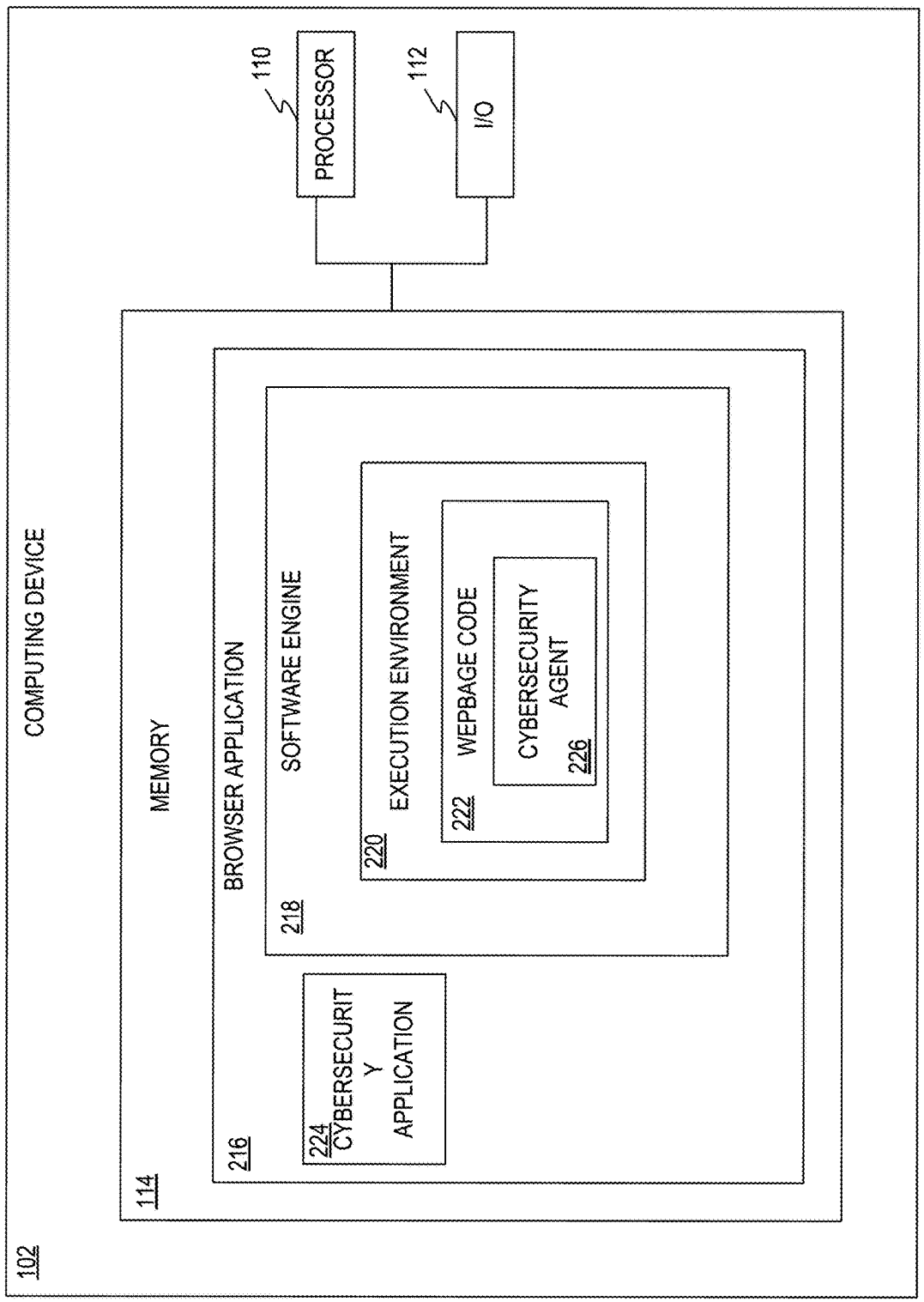
FIG. 2 is a block diagram of an exemplary implementation of a computing device, consistent with disclosed embodiments.

Reference is now made to FIG. 2, is a block diagram of an exemplary implementation of a computing device (e.g., computing device 102 of FIG. 1), consistent with disclosed embodiments. Memory 114 may include a portion including (e.g., storing) a browser application 216 configured with a software engine 218. Software engine 218 may be configured to contain (e.g., maintain and/or run) an execution environment 220 to render a webpage code 222 for displaying a webpage on a user interface (e.g., displayed using I/O 112). For example, computing device 102 may retrieve webpage code 222 from one of host servers 106 via communications network 108. In some embodiments, browser application 216, software engine 218, execution environment 220, and webpage code 222 correspond to the browser, software engine, execution environment, and webpage code, respectively, described earlier. Cybersecurity server 104 and host servers 106 may include components corresponding to those of computing device 102. For example, cybersecurity server 104 and host servers 106 may have their own respective processors (e.g., processor 110), and memories (e.g., memory 114). In some embodiments cybersecurity server 104 and host servers 106 may host one or more applications for communicating with a computing device 102 (e.g., a client device). For example, cybersecurity server 104 may include a server-version of cybersecurity application 224, which may interface with a client-version of the application and/or permit access to administrative actions (e.g., modifying cybersecurity application 224 and/or cybersecurity agent 226 on a client device). As another example, host servers 106 may include one or more applications for permitting remote access of web content (e.g., using an API).

Browser application 216 may additionally be configured with a cybersecurity application 224. For example, computing device 102 may retrieve cybersecurity application 224 from cybersecurity server 104 over communications network 108. Cybersecurity application 224 may be configured to inject a cybersecurity agent 226 into execution environment 220 to perform one or more cybersecurity operations within execution environment 220, such as the operations described herein. For example, cybersecurity application 224 may intercept an execution of webpage code 222 to insert into webpage code 222 one or more program code instructions for implementing cybersecurity agent 226, such that executing webpage code 222 implements cybersecurity agent 226. In some embodiments, cybersecurity agent 226 may be injected into a top portion of webpage code 222 (e.g., immediately after a <head> tag, or within a predetermined position relative to one or more tags), to implement cybersecurity agent 226 prior to executing any instructions of webpage code 222.

Figure 3:
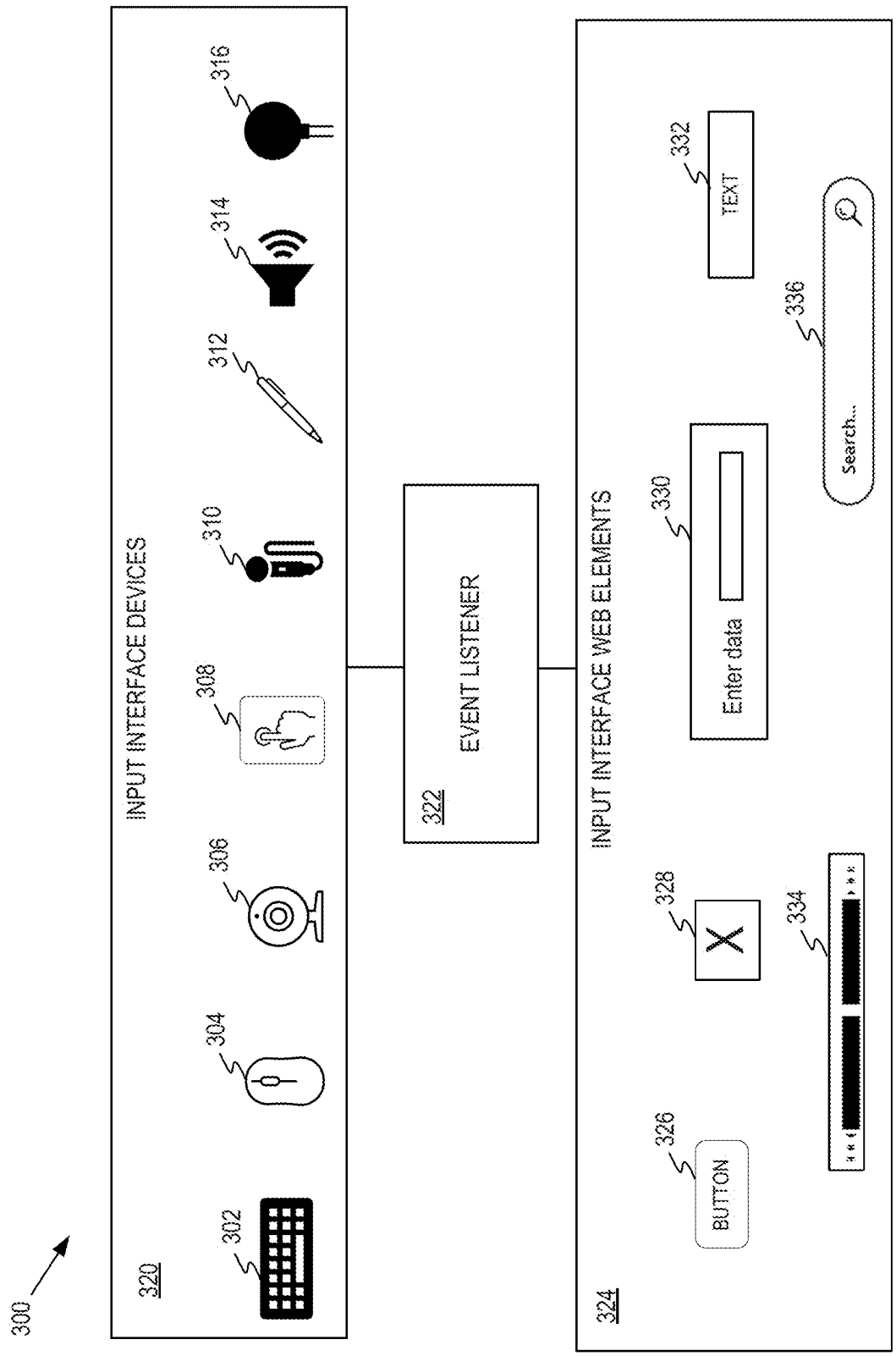
FIG. 3 is a block diagram of an input interface consistent with disclosed embodiments.

By way of a non-limiting example, FIG. 3 is a block diagram of an input interface 300 consistent with disclosed embodiments. Input interface 300 may be integrated with I/O 112 of FIG. 1. Input interface 300 may include one or more input devices 320 (e.g., hardware-implemented user interface elements), such as a keyboard device 302 (e.g., for receiving keystroke inputs and/or cursor movements), an electronic mouse 304 (e.g., for receiving computer mouse gesture inputs and/or cursor movement inputs), a camera 306 (e.g., for receiving bodily and/or eye gesture inputs, for receiving motion inputs), an electronic display 308 (e.g., including a touch sensitive screen configured for receiving touch gesture inputs and presenting information visually to a user), a microphone 310 (e.g., for receiving audio input), and an electronic stylus 312 (e.g., for receiving stylus gesture or touch inputs), a speaker 314 (e.g., for presenting information audibly to a user), and a vibration motor 316 (e.g., for presenting information haptically to a user). Input interface 300 may additionally include one or more web elements 324 (e.g., displayed via electronic display 308, such as within a user interface), such as a button 326, a checkbox 328, a form 330 (e.g., including an input field), a textbox 332, a scrollbar 334, and a search bar 336. In some embodiments, web elements 324 may be stored in memory (e.g., memory 114) and/or transmitted or received between devices (e.g., using communications network 108). Input interface 300 may include an event listener 322 (e.g., configured with browser application 216 of FIG. 2) for interfacing one or more of input devices 320 with one or more of web elements 324. For example, upon detecting an input event via one of input devices 320 in association with one of web elements 324, event listener 322 may notify browser application 216 to schedule a corresponding action for execution by the at least one processor 110.

Asynchronous API invocations may include API invocations that occur in response to non-scheduled events, such as user inputs or network events. In some embodiments, JavaScript may be executed synchronously and may be executed in a single thread, such that when a piece of code may be executing, other code may not execute until the execution of the piece of code may be completed. However, some JavaScript APIs (or other APIs) may include asynchronous operations, such as network requests, or Document Object Model (DOM) events. An invocation to an asynchronous API may receive a callback function that may be called once the asynchronous operation is completed and/or when there is a change of state. Some callbacks may be stored in a JavaScript engine event loop, which may be responsible for executing the code, collecting and processing events, and executing queued sub-tasks. In a synchronous execution, a script tag may be parsed and executed, such that an invocation may be easily be associated with a script tag. For example, the script var arr-new Array( ); may create a new array instance in an "arr" variable, which may be intercepted at runtime to ascertain an origin for an invocation. However, an asynchronous API invocation may be difficult to trace due to the time lapse from when a software engine originally encounters the API invocation and allocates runtime resources (e.g., during a code interpretation stage) until the API completes execution (e.g., after occurrence of the trigger event, during the code execution stage) or implements the invocation. The time lapse may allow the introduction of vulnerabilities by a source, which may be non-traceable during the code execution stage.

For example, the following script:
var_callback=function( ){DoSomething};
window.addEventListener("load",_callback);
may create a new function, stored in a "callback" variable. An event listener for the "load" event may be registered with the "_callback" function as a callback to be called when the event executes. At least one processor may intercept a "window.addEventListener" invocation to ascertain an invocation origin to the relevant script tag. However, at a later stage (e.g., after a DOM may be constructed for the code and runtime resources may be fully loaded into memory), the "load" event may be executed, invoking the "callback" function which may invoke different native APIs. These native APIs may be intercepted by the at least one processor. However, the at least one processor may not be able to determine the origin script tag because the "synchronous" phase of the script parsing and executing operations has already completed.

Accordingly, there is a need for unconventional solutions to provide enhanced security in these and other contexts, to protect devices, systems, networks, and/or users (e.g., personal user data). Such unconventional approaches may allow tracing and/or recording a source of an API invocation (e.g., including an asynchronous invocation) during the code execution stage, e.g., to allow validating the source before the API is executed. If the source is determined to be suspect, the execution may be suspended or modified before damage occurs.

Thus, the various embodiments the present disclosure describe a technological solution, based on improvement to operations of computer systems and platforms, to the technical challenge of protecting against vulnerabilities and/or cybersecurity threats introduced via asynchronous invocations.

Disclosed embodiments may involve systems, methods, and computer-readable media for performing cybersecurity operations for tracing an execution of an asynchronous Application Programming Interface (API). The systems and methods described herein may be implemented with the aid of at least one processor or non-transitory computer readable medium, such as a CPU, FPGA, ASIC, and/or any other processing structure(s) or storage medium, as described herein. For case of discussion, when a method is described below, it is to be understood that aspects of the method apply equally to systems, devices, and computer-readable media. For example, some aspects of such a method may occur electronically on a device and/or over a network that is wired, wireless, or both. The method is not limited to a particular physical and/or electronic instrumentality, but rather may be accomplished using one or more differing instrumentalities. In some instances, the description that follows may refer to FIGS. 4-1 to 4-7 which illustrate an exemplary implementation of a virtual runtime barrier, consistent with some disclosed embodiments. FIGS. 4-1 to 4-7 are intended merely to facilitate the conceptualizing of one exemplary implementation for a virtual runtime barrier and does not limit the disclosure to any particular implementation.

Some embodiments involve a non-transitory computer readable medium containing instructions that when executed by at least one processor cause the at least one processor to perform operations. A non-transitory computer readable medium, may refer to physical memory for storing information or data readable by at least one processor, as described earlier. Instructions may refer to program code instructions executable by a computer processor, as described earlier. A processor may refer to a physical device or group of devices having electric circuitry that performs a logic operation on an input or inputs, as described earlier. Performing operations may involve executing one or more arithmetic, logical, or inference steps, for example by a computing processor, as described earlier. Some embodiments may include receiving, by an application capable of JavaScript execution, an executable code including an API invocation. Application capable of JavaScript execution may refer to an application capable of interpreter-based execution, as described earlier, where the application is configured for an interpretive language of JavaScript. For example, an application capable of JavaScript execution may include a JavaScript engine configured with (e.g., to run in conjunction with) a browser application. An executable code may refer to at least one instruction, script, module, program, command, function, or any other computing language information that may be readable by at least one processor (e.g., after conversion to object code, machine code, or other readable code) when loaded into a memory of a computing device and used by the at least one processor to perform an operation. Receiving an executable code may include obtaining, detecting, or otherwise gaining access to executable code. For example, a computing device may access information or data in a way that is detectable by or understandable to a processor, as described earlier. Receiving an executable code may also include establishing a connection with another device, querying another device or memory, and/or requesting the executable code (e.g., for use by the application capable of JavaScript execution. The term "API invocation" may refer to a call, a command, a prompt, request, a trigger, or any other code associated with an API. For example, an API invocation may include a call (e.g., an invocation) to a function using a predefined or standardized interface (API), whereby, for instance, changing and/or updating the function does not require corresponding changes to be made to applications calling the function.

In some embodiments, a computing device including a memory and at least one processor may be configured with a browser application. The browser application may include a JavaScript engine capable of executing JavaScript instructions. The computing device may receive executable code (e.g., HTML, CSS, and/or JavaScript instructions) including at least one API invocation. In some embodiments, the executable code may be received from a remote server via a communications network. Additionally, or alternatively, executable code may be received from a local device and/or local memory. In some embodiments, executing the code by a software engine (e.g., a JavaScript engine) may cause webpage content associated with the JavaScript code to be presented via a user interface of the computing device. For example, the code may include an API invocation for querying a database to receive an updated weather forecast in response to a user submitting a time and location, e.g., in response to a trigger event.

By way of a non-limiting example, turning to FIGS. 1-2, computing device 102 may receive webpage code 222 from a webpage server (e.g., host server 106) via communications network 108, and store webpage code 222 in memory 114. Webpage code 222 may include one or more HTML, CSS, and/or JavaScript instructions executable by software engine 218 of browser application 216 (e.g., by performing one or more interpretation, compilation, and/or linking operations). Webpage code 222 may include one or more API invocations, for example to retrieve data stored in a database associated with a webpage server (e.g., host server 106).

Some embodiments involve intercepting, by a virtual barrier, the API invocation. A virtual barrier may include a boundary or wall implemented via software (e.g., computer code) to prevent or control access to one or more computing resources. Nonlimiting examples of computer resources may include data (e.g., stored on disk and/or dynamic memory such as RAM), such as sensitive data, an area of memory (e.g., partition, memory device), a peripheral device, CPU capacity, and any other hardware or software element usable in a computing environment. For example, a virtual barrier may be associated with one or more conditions that, when satisfied, cause a device or component (e.g., a processor) to permit access (e.g., complete or partial access) to a computer resource. The one or more conditions may be associated with authorization, data integrity, trust, and any other condition for protecting a computer resource. For example, the virtual barrier may restrict access to read only for some sensitive files, deny access to other sensitive files, and permit read and write access to additional files. Intercepting the API invocation may include interrupting, blocking, transferring, changing, or otherwise interfering with an expected execution flow of a software application. For example, the API invocation may be intercepted using a patch (e.g., a piece of code) to override the original functionality of the API invocation. The patch may, for example, change the scheduling of one or more tasks associated with the API invocation, e.g., to delay or postpone performing certain tasks until the API may be examined, or the source of the API may be validated. As another example, the patch may modify one or more arguments associated with the API invocation, e.g., by adding or removing an arguments, or by changing a value of an argument, e.g., to facilitate in testing the validity of the API invocation. In some embodiments, at least one processor may execute one or more instructions to block execution of code associated with the API invocation. In some embodiments, the one or more instructions blocking the API invocation may be associated with a cybersecurity agent. A cyber security agent may be a module, program, or other portion of software associated with carrying out operations to enhance security of a computing environment, such as a web browsing environment. In some embodiments, the cybersecurity agent may be implemented by injecting into code (e.g., into the executable code including the API invocation) instructions to instantiate the cybersecurity agent. For example, the instructions may be inserted into a top portion of the executable code such that the cybersecurity agent is instantiated (e.g., thereby implementing the virtual barrier) before other instructions are executed. The cybersecurity agent may scan the executable code to identify and intercept the API invocation. In some embodiments, a cybersecurity application configured with the browser application running on the computing device and/or with a cybersecurity server in communication with the computing device may inject the cybersecurity agent into the executable code including the API invocation.

Figures 1, 4:
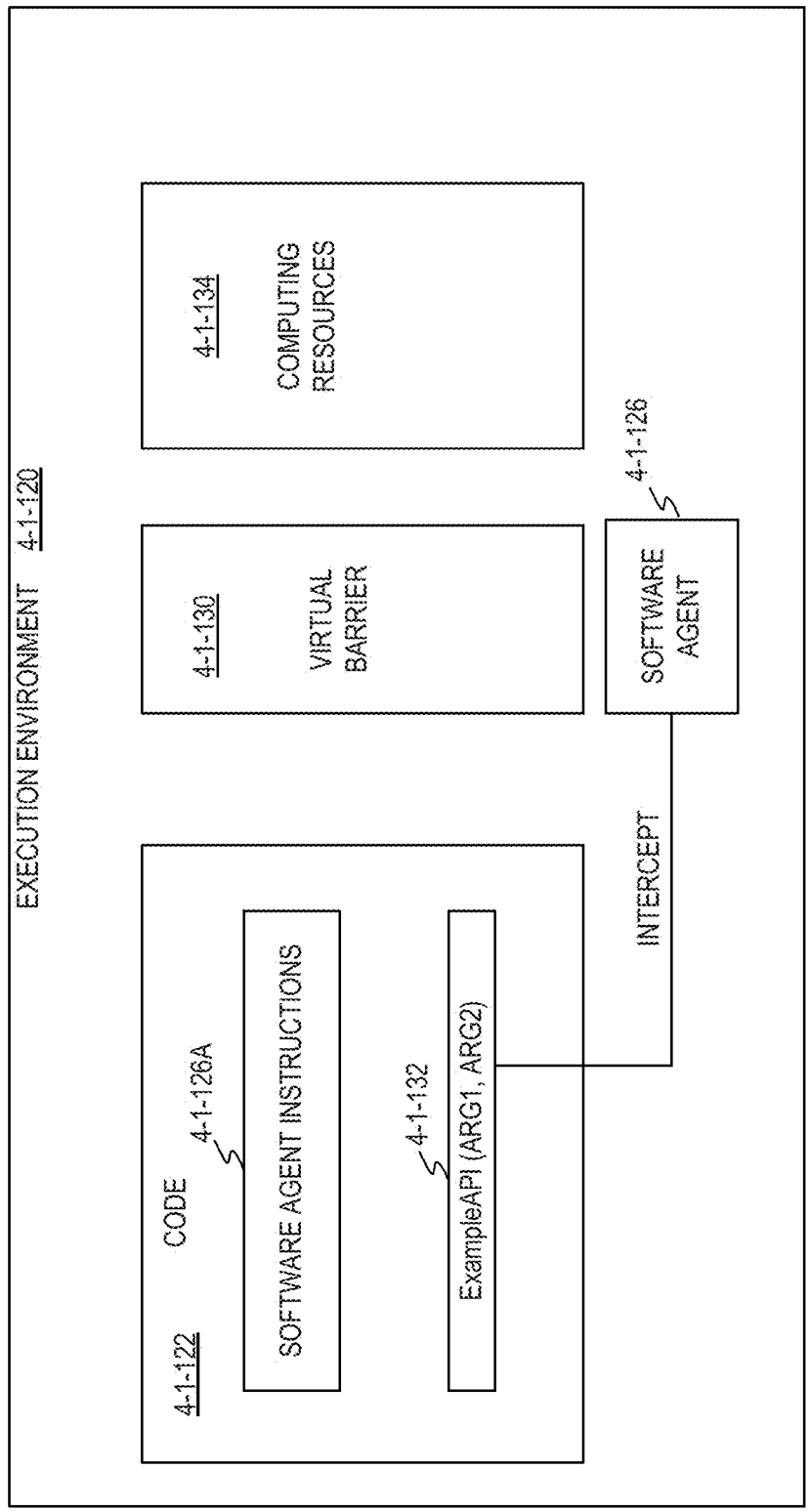
Figures 2, 4:
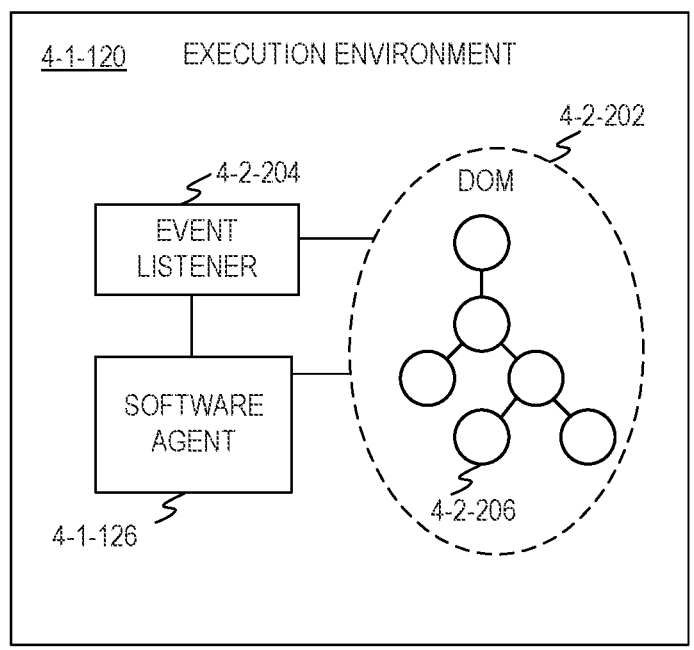
Figures 3, 4:
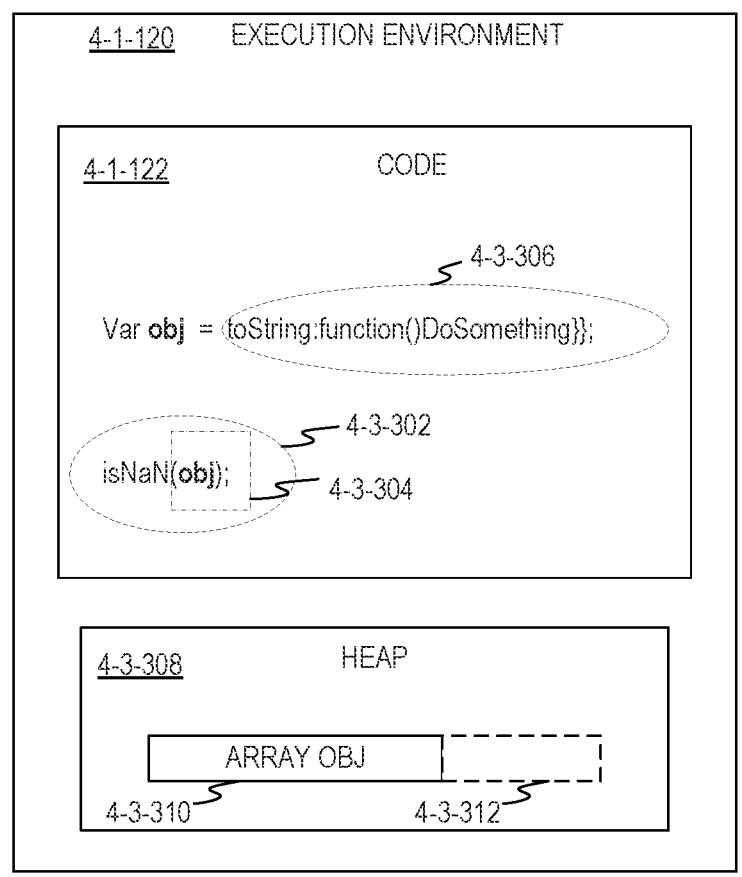
Figure 4:
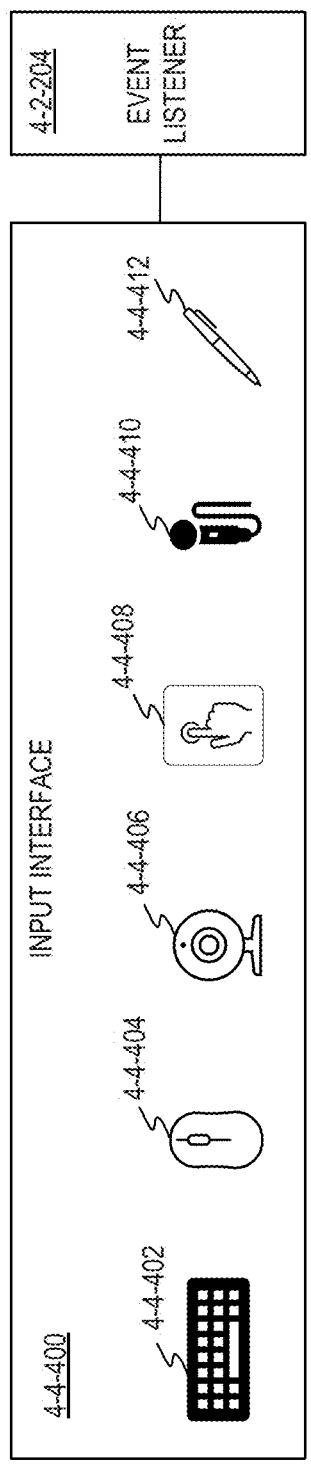

By way of a non-limiting example, reference is now made to FIG. 4-1, which illustrates an exemplary execution environment 4-1-120 having virtual barrier 4-1-130 for intercepting an API invocation 4-1-132 (e.g., for a native API) in an executable code 4-1-122, consistent with some embodiments of the present disclosure. Execution environment 4-1-120 may correspond to execution environment 220 of FIG. 2, e.g., and may be allocated inside memory 114 of computing device 102. For example, computing device 102 may retrieve executable code 4-1-122 from a webpage server (e.g., host server 106) via communications network 108. A software agent 4-1-126, (e.g., corresponding to software agent 226 of FIG. 1), may be activated by injecting instructions 4-1-126A into executable code 4-1-122, e.g., inserted into a top portion of executable code 4-1-122 such that executing executable code 4-1-122 instantiated software agent 4-1-126. Software agent 4-1-126 may intercept API invocation 4-1-132 included in executable code 4-1-122 to thereby implement virtual barrier 4-1-130. For example, the interception of API invocation API 4-1-132 by software agent 4-1-126 may prevent access to computing resources 4-1-134 until software agent 4-1-126 is able to verify a valid source for API invocation 4-1-132.

Some embodiments involve determining that the API invocation is an invocation for a native API configured for subsequent execution in response to a trigger event. A native API may include software (e.g., an API) that has a predefined or expected functionality, which may be accessible via a predefined interface (e.g., using an established API call for the native API). For example, a native weather API may be configured to submit a specific location and time (e.g., for a weather database query) and return a weather forecast in response. As another example, a native map API may allow displaying a map showing a current location inside a message application. The native API may be configured to query a device for a current location, use the current location to query a map database for a map in the vicinity of the current location, and retrieve and display the map inside the messaging application. In some embodiments, a native API may be configured to access (e.g., use) personal user data, such as a password. Subsequent execution may refer to implementing or running program code instructions at a later time, e.g., deferred to the future, such as in response to a stimulus to be received at a later stage. For example, executable code may be received at a first time and other or associated code (e.g., an API invocation) may be configured to execute later, at a second time. By way of further example, the code associated with the native API may be executed after parsing, interpreting, and/or compiling the received code (e.g., webpage code for the native weather API) to machine-readable code, and after allocating resources (e.g., memory, scheduling processor time) to execute the machine-readable code. The code may include one or more portions for immediate execution, such as to render a webpage for interfacing with a user, and one or more additional portions for subsequent execution, such as to handle user inputs via the webpage and interact with the user dynamically. The one or more additional portions for subsequent execution may include an asynchronous API invocation. A trigger event may include one or more of transmission or reception of a communication, a change to code or data, an elapse of a predetermined amount of time, performance of a particular operation or potion of code, or any other detectable stimulus, which may prompt or cause one or more actions to be implemented. A trigger event may be an asynchronous or unscheduled event that may be handled by interrupting other scheduled tasks, e.g., as described earlier. For example, a trigger event may include an asynchronous API call or other asynchronous API code.

In some embodiments, the trigger event may include a network request. A network request may include one or more of a fetch event requesting information from a server (e.g., associated with a current website, a cross-origin request directed to a server associated with a different website), an abort request (e.g., for cancelling fetch requests), a request associated with web socket connections (e.g., open, message, error, and close), a request associated with at least one URL object, a request associated with uploading data entered to forms, or any other communication associated with obtaining access to a resource over a network.

In some embodiments, the trigger event may include a Document Object Model (DOM) event. A Document Object Model may include an interface, diagram, web, tree, chart, or any type of data structure that represents a document including XML, HTML, and/or JavaScript instructions as a logical structure, as described earlier. A DOM event may include one or more of an action associated with user input, a change made to one or more objects (e.g., web elements), a loading and/or aborted loading of a document, an action associated with peripheral devices (e.g., a printer, a camera, user interface device, and any other device external to a computing device providing additional functionality) and any other action associated with (e.g., influencing, represented by, associated with a same execution environment as) the DOM representation of an executable code. In some embodiments, a DOM event may be associated with an event listener for an object defined in the DOM representation for a code. Upon detecting an occurrence of a DOM event associated with the element the event listener may invoke a corresponding action. Examples of DOM events may include a mouse click on a video web element (e.g., to play the associated video), a selection of a link (e.g., to navigate to a different section of a webpage or to a different webpage), a submission of a data via a form, a notification indicating content has completed downloading, a notification indicating a user input has been received via a peripheral device, or any other event associated with an object defined in the DOM representation for a code.

In some embodiments, the trigger event may include a user input. A user input may include an action taken by a user (e.g., via a user interface device) and/or data received or generated thereby. A user interface device may include one or more of an electronic mouse, a touch-sensitive screen, a keyboard, a joystick, a stylus, a microphone, a camera, or any other device configured to receive an input from a user. In some embodiments, a user input may be performed in association with a web element (e.g., within a web browsing environment). A web element may include a button and/or checkbox (e.g., associated with a mouse click event or touch start event), a form (e.g., associated with a submit or change event), a scrollbar, a field, a textbox, a search bar, a module, a portion of a webpage, or any other interactable portion of a web browsing environment configured for interfacing with a user. In some embodiments, the user input event may be defined in a DOM for a webpage. In some embodiments, the user input may include at least one of: a computer mouse gesture, a gesture on a touch screen, a cursor movement, or a key press.

Subsequent execution in response to a trigger event may include performance of any action (e.g., running computer code) based on the occurrence of (e.g., after detecting and/or receiving an indication of) the trigger event, e.g., by an event listener registered for the trigger event. Determining that the API invocation is an invocation for the native API may include making a measurement, comparison, estimation, or calculation, which may establish a connection between the API invocation and the native API. For example, a string representation of the API invocation may be compared to a store of native API invocations, e.g., stored locally and/or remotely in a list, table, library, or database. The comparison may be based on one or more rules, e.g., to determine a similarity based on a tolerance threshold value or Hamming distance. Additionally, or alternatively, one or more machine learning algorithms and/or artificial intelligence techniques (e.g., neural networks, genetic algorithms) may be used to determine that the API invocation is an invocation for the native API. Additionally, or alternatively, the API invocation may be emulated, (e.g., in an isolated sandbox environment) and an observed behavior of the emulation may facilitate in determining that the API invocation is a native API invocation. Thus, the API invocation may be identified as a predefined (e.g., native) API to be executed at a future time, e.g., in response to receiving a stimulus indicating an occurrence of an event. For example, the API may be invoked in response to a subsequent user input, and fully executed only at a later stage, after the webpage code has been parsed and interpreted, and after memory for executing the webpage code has been allocated.

In some embodiments, determining that the API invocation is an invocation for a native API configured for subsequent execution in response to a trigger event may include inspecting at least one argument of the API invocation. Inspecting may include examining, checking, or making a comparison associated with one or more predefined values, patterns of values, combinations or values, or performing any operation to determine information from code. For example, inspecting at least one argument of the API invocation may include parsing one or more arguments from a string representation of the API invocation, checking a data type for an argument (e.g., to correspond to a predefined data type), checking a size for an argument (e.g., to correspond to an allotted size), checking a value for an argument (e.g., to correspond to a legal or valid value by checking one or more rules), checking a number of arguments included in the API invocation (e.g., to correspond to a definition for the API), and performing additional checks and validations (e.g., checksum, hash, and other data validation tests). An argument of the API invocation may include a value, a character, a line of code, a variable, a data container, a label, a parameter for a setting, a data structure, data content associated with a particular structure, or a portion of code capable of influencing an execution environment or any other computing resource. An argument of the API invocation may define an option submitted with the API invocation and may affect the response of the API invocation (e.g., the result). For example, a weather API may define one or more arguments, e.g., as placeholders, to define a specific location and time for a particular API invocation. A map API, for example, may define a location as an argument to use for querying a maps database. An API parameter (e.g., argument) may relate to authorization (e.g., as a header parameter), to formulate a query (e.g., as a query parameter), to serve as a placeholder (e.g., as a path parameter), to send and receive values (e.g., as a request body parameter via a REST API), to reference data sent previously (e.g., as a cookie parameter), and any other type of value or variable that may be set to affect the response of the API. In some embodiments, determining that the API invocation is an invocation for a native API configured for subsequent execution in response to a trigger event may include identifying at least one argument as a callback function. Identifying may include recognizing, or otherwise establishing an association with a known entity, for example by performing one or more comparisons, inferences, correlations, or any other operation facilitating derivation of information. A callback function may include a reference to executable code to be invoked at a later stage, e.g., in response to the occurrence of one or more specific events. A callback function (e.g., a first function) may be passed as an argument inside another (e.g., second) function invocation, such that invoking the second function causes the invocation of the first function. The second function may only complete execution after the callback function (e.g., the first function) terminates. For example, a variable may be defined in JavaScript as:

var obj={toString:function( ){DoSomething}};

This script may create a new object, obj, using the object literal ({ }) having a property "toString" that calls a function. A native API invocation isNaN may include obj as an argument: e.g., to determine if the argument passed via the obj variable is not a number:

isNaN(obj);

Subsequently invoking "isNaN(obj)" with obj as an argument may cause an invocation of the "toString" function defined as a property for "obj." In this context, the toString function may be a callback function because it is not invoked directly, but instead may be invoked via the native API invocation. For example, if the software engine performs dynamic compilation (e.g., just in time compilation) and security checks have been removed, a malicious code may use the toString function to modify (e.g., lengthen) the array length and corrupt the backing store Array object. To address this, prior to executing the received code, native API invocations included therein may be identified (e.g., by a software agent). The software agent may examine arguments passed inside one or more of the identified native API invocations to determine if any of the passed arguments reference other functions, and therefore reference callback functions, e.g., for subsequent or asynchronous invocation by the native API when the trigger event occurs. In some embodiments, the software agent may detect possible side-effects of asynchronous API invocations, and effectively control and trace the execution accordingly.

By way of a non-limiting example, reference is now made to FIG. 4-2, showing a DOM 4-2-202, which may represent code 4-1-122, consistent with some embodiments of the present disclosure. In some embodiments, DOM 4-2-202 may be stored in execution environment 4-1-120. In some embodiments, software agent 4-1-126 may access DOM 4-2-202 and identify an event listener 4-2-204 registered for DOM 4-2-202. In some embodiments, software agent 4-1-126 may determine that event listener 4-2-204 is associated with API invocation 4-1-132, e.g., by inspecting one or more arguments (e.g., ARG1 and ARG2) passed with API invocation 4-1-132 and determining an association between one of the arguments (e.g., ARG1) and event listener 4-2-204, thereby determining that API invocation API 4-1-132 is configured for subsequent execution in response to a trigger event.

By way of a non-limiting example, turning to FIG. 4-1, software agent 4-1-126 may inspect API invocation API 4-1-132 to determine a trigger event, which may be, for example, associated with communications network 108 (shown in FIG. 1). API invocation API 4-1-132 may include a fetch (e.g., a network request) request associated with one of host servers 106.

By way of a non-limiting example, turning to FIG. 4-2, upon receiving code 4-1-122 (FIG. 4-1), software engine 218 (FIG. 2) may parse code 4-1-122 to construct DOM 4-2-202 representing a hierarchical structure of objects defined in code 4-1-122 (e.g., as a tree). Software engine 218 may register event listener 4-2-204 to DOM 4-2-202 to handle trigger events associated with objects included in DOM 4-2-202. Software agent 4-1-126 may examine DOM 4-2-202 to determine one or more trigger events defined for objects in DOM 4-2-202. For example, DOM 4-2-202 may include a node 4-2-206 for a button associated with a click event for displaying an image, e.g., invoked via event listener 4-2-204. When examining DOM 4-2-202, software agent 4-1-126 may identify the click event associated with node 4-2-206 for the button as a DOM event.

By way of a non-limiting example, reference is made to FIG. 4-4 showing an input interface 4-4-400 consistent with some embodiments of the present disclosure. Input interface 4-4-400 may be integrated with a user interface (e.g., I/O 112 of FIG. 1). Input interface 4-4-400 may include one or more input device, such as a keyboard device 4-4-402 (e.g., for receiving keystroke inputs and/or cursor movements), an electronic mouse 4-4-404 (e.g., for receiving computer mouse gesture inputs and/or cursor movement inputs), a camera 4-4-406 (e.g., for receiving bodily and/or eye gesture inputs), a touch sensitive screen 4-4-408 (e.g., for receiving touch gesture inputs), a microphone 4-4-410 (e.g., for receiving audio input), and an electronic stylus 4-4-412 (e.g., for receiving stylus gesture inputs). Event listener 4-2-204 may be communicatively coupled with input interface 4-4-400 to detect one or more user input events (e.g., trigger events) for triggering one or more associated actions for elements defined in DOM 4-202 (FIG. 4-2).

By way of a non-limiting example, reference is made to FIG. 4-3, which illustrates a callback function included in an API invocation indicating the API invocation is configured for subsequent execution in response to a trigger event, consistent with some embodiments of the present disclosure. Software agent 4-1-126 may examine code 4-1-122 to identify a native API invocation 4-3-302 (e.g., isNaN(obj)). Software agent 4-1-126 may inspect one or more arguments, e.g., "obj" 4-3-304 passed with API invocation 4-3-302 and may determine that argument obj 4-3-304 is associated with a callback function toString( ) 4-3-306. For example, software agent 4-1-126 may determine that native API 4-3-302 may be invoked in response to a non-scheduled user input detected by event listener 4-2-204, e.g., an asynchronous invocation, which may trigger an invocation of the function toString( ) 4-3-306. Since the execution of native API 4-3-302 may not be completed until the execution of toString( ) 4-3-306 is completed, software agent 4-1-126 may determine that toString( ) 4-3-306 is a callback function.

Some embodiments involve, based on the determination that the API invocation is an invocation for a native API configured for subsequent execution, recording an invocation source identifier. An invocation source identifier may include one or more of a unique value, tag, or label, which may allow for establishing or determining (e.g., identifying) an origin (e.g., source) of the API invocation. For example, the source identifier may identify a particular server, institution, software application, or any other entity associated with an API invocation (e.g., associated with generating and/or transmitting the API invocation). In some embodiments, the source identifier may include a Uniform Resource Locator (URL). A URL may include an address allowing for location the origin of the API invocation on the World Wide Web. In some embodiments, a computing device may store a tag or label to identify a source for the API invocation, e.g., for future reference, such as upon concluding that the API invocation is for a native API to be executed subsequently, e.g., in response to an asynchronous trigger event, consistent with disclosed embodiments. Recording the invocation source identifier may include one or more of annotating, associating with other data, storing, or saving data, which may be associated with and/or include the invocation source identifier. For example, an invocation source identifier may be stored to maintain a log in memory preserving the information for future reference.

Figures 4, 5:
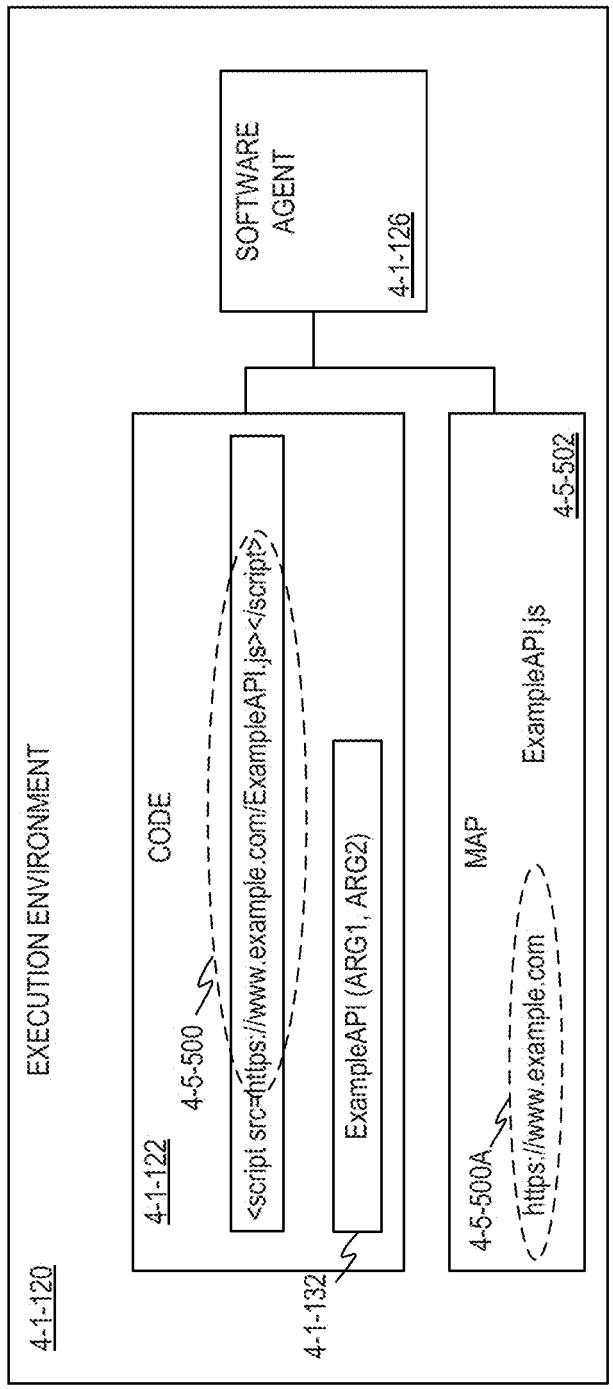

By way of a non-limiting example, reference is made to FIG. 4-5, illustrating software agent 4-1-126 recording an invocation source identifier for a native API configured for subsequent execution, consistent with some embodiments of the present disclosure. Upon identifying API invocation 4-1-132 in code 4-1-122, e.g., configured for subsequent execution in response to a trigger event, software agent 4-1-126 may identify a source identifier 4-5-500 (e.g., appearing as a tag or label in code 4-1-122) uniquely identifying the source for API invocation 4-1-132. Software agent 4-1-126 may record a copy of source identifier, source identifier copy 4-5-500A, e.g., in association with API invocation 4-5-502, in a map 4-5-502 maintained inside execution environment 4-1-120 (e.g., within memory 114 of FIG. 1), allowing to subsequently trace the source for API invocation 4-1-132, e.g., at a later stage when API invocation 4-1-132 is invoked in response to a trigger event.

Some embodiments may involve, upon occurrence of the trigger event, retrieving the invocation source identifier. Retrieving the invocation source identifier may include obtaining, recovering, or otherwise gaining access, e.g., to stored information or data in a way that is detectable by or understandable to a processor. Data may be retrieved, for example, by searching a table or index, querying a database (e.g., locally and/or remotely), or any other technique for gaining access to data. By way of further example, retrieving the invocation source identifier may include finding the invocation source identifier in memory and providing the invocation source identifier for an operation (e.g., an operation performed by a computing device, agent, program). Upon occurrence of a trigger event may include a materializing, detection, and/or confirmation of the trigger event, such that the invocation source identifier may be retrieved after and in response to the trigger event. For example, a mouse-click trigger event may materialize (e.g., occur) when a user clicks a button on an electronic mouse and a form trigger event may materialize when a user submits a form (e.g., by pressing the "Enter" key of a keyboard). When the trigger event materializes (e.g., after the initial parsing, interpreting, and resource allocation phase), the previously recorded source identifier may be accessed. For example, the software agent may govern the execution of the native API invocation and pause the invocation until the origin of the native API invocation is retrieved.

By way of a non-limiting example, turning to FIG. 4-5, upon determining an occurrence of a trigger event for invoking a native API, such as API invocation 4-1-132 (e.g., via event listener 4-2-204 of FIG. 2) software agent 4-1-126 may retrieve source identifier copy 4-5-500A for API invocation 4-1-132 from map 4-5-502.

Some embodiments involve influencing execution of the native API based on the invocation source identifier. Influencing execution of the native API may include manipulating, changing, pausing, slowing, preventing, or affecting code, which may be associated with an API (e.g., a native API implicated by web browsing code). Based on the retrieved source identifier, one or more actions may be taken (e.g., by a software agent) that affect the execution of the native API. For example, if the source identifier indicates a suspicious or altered source for the native API invocation, the software agent may halt or suspend the execution of the native API to thwart one or more malicious or harmful actions from occurring. In some embodiments, source identifiers may be associated with a degree and/or indication of security risk.

In some embodiments, influencing execution of the native API based on the invocation source identifier includes modifying the execution when the invocation source identifier is determined to violate a security rule. Modifying execution may include changing or manipulating code to alter the behavior of the execution. For example, modifying execution may include altering a sequence for performing certain tasks, suspending certain tasks from being executed, scheduling additional tasks for execution, changing one or more data values for writing to memory, changing a memory location to be accessed (e.g., for reading and/or writing), invoking a procedure that was not scheduled for invocation prior to making the modification, performing one or more checks (e.g., relating to security, validation, authentication, data integrity), or performing any other alteration related to handling the API invocation. A security rule may include one or more conditions associated with one or more parameters, whereby when the one or more parameters violate the one or more conditions, an action is triggered to, for example, protect computing resources from malicious actors. A parameter may include an identifier, a source, an instruction, a timing, a memory location, a data type, a signature (e.g., cryptographic hash), a certificate (e.g., an encryption key), a context, an address (e.g., on the World Wide Web and/or in memory), an association (e.g., with a trusted entity), or any other parameter for validating a security rule. The parameter may be associated with a hardware and/or software-based resource, a local and/or remote resource. A condition may include a comparison value, a threshold, a constraint, a range (e.g., tolerance), a one-way function or reversible encryption (e.g., for an electronic signature). The condition may be associated with a list of trusted resources, a list of untrusted resources, and/or a list of unknown resources. For example, a security rule may only permit executing APIs originating from a predefined list of trusted sources. Another security rule may prohibit executing an API attempting to access sensitive data. Another security rule may prohibit executing an API attempting to change a login credential. In some embodiments, modifying the execution may include suspending the execution. Violating the security rule may include determining that one or more parameters do not satisfy (or do satisfy, depending on how the security rule is structured) one or more conditions of the security rule. Suspending execution may include preventing, discontinuing, pausing, transferring, or interrupting an execution flow (e.g., an execution flow of code associated with an agent and/or web browser). In some embodiments, a software agent may interrupt the execution of the native API to discontinue the execution flow, such as upon determining that the source for the native API lacks compliance with a security rule. For example, a source (e.g., parameter) may be determined to refer to an unknown server or may be located in a region outside legal jurisdiction of cybersecurity protection policies (e.g., conditions).

By way of a non-limiting example, turning to FIG. 4-5, upon retrieving source identifier copy 4-5-500A for API invocation 4-1-132 from map 4-5-502 (e.g., in response to the trigger event invoking the execution of API invocation 4-1-132), software agent 4-1-126 may influence the execution of API invocation 4-1-132. For example, software agent 4-1-126 may determine a security risk associated with source identifier copy 4-5-500A and may modify (e.g., by preventing or suspending) the execution of API invocation 4-1-132 based on the security risk. In some embodiments the security risk may be determined by accessing one or more security rules, e.g., stored in memory 114 (FIG. 1).

Some embodiments may further include generating a wrapped API. A wrapped API may include a framework for encapsulating an API, e.g., to provide additional functionality. In some embodiments, a wrapped API may change the interface to the API, e.g., by simplifying the interface, adding parameters, removing parameters, converting data from one format to another, and/or combining multiple API invocations. For example, an API wrapper may add a layer of code to a native API invocation including instructions for intercepting the execution of the native API until one or more checks are performed, e.g., to validate arguments passed to and/or returned by the API, to validate the source of the API, validate memory locations and/or resources accessed by the API, validate settings decided by the API, or perform any other tests or validation checks. Generating a wrapped API may include one or more of creating, constructing, evaluating, or accessing data (e.g., API-related data such as arguments passed to the API, values produced by the API, parameter settings decided by the API, functions invoked by the API, libraries accessed by the API), which may result in an API having different and/or additional functionality from the native API. In some embodiments, generating a wrapped API may include accessing native API code and altering that code to perform different and/or additional functionality. For example, a software agent may automatically generate code and/or access prewritten code (e.g., from a local and/or remote library) and add the code to the API invocation to affect the execution. The added code may, for example, invoke a different native API in place of, or in addition to the native API received with the executable code, access additional resources such as libraries not previously accessed by the native API, receive additional input arguments, produce different and/or additional output values, intercept and/or modify an execution flow, access different locations in memory than the native API, and implement any other modification to the execution of the native API.

Some embodiments may further involve replacing the invocation for the native API with the wrapped API. Replacing an invocation may include substituting invocation code for other code (e.g., the wrapped API), e.g., by removing an original code and inserting a different code in its place or modifying an original code to incorporate the functionality of the wrapped API. The inserted code may include an invocation for the wrapped API to replace the invocation for the native API, where the invocation for the wrapped API may modify one or more execution aspects of the native API, such as by including a different set of input parameters, returning a different set of output values, calling different libraries and/or other APIs, requesting data from different sources (e.g., a different remote server), referencing different locations in memory (e.g., local and/or remote memory), scheduling tasks for execution differently (e.g., in a different order, and/or to perform different actions), deciding parameter settings differently (e.g., setting different parameters and/or apply a different setting to the same parameter), or implementing any other change to the execution of the native API. In some embodiments, generating the wrapped API and/or replacing an invocation may be performed prior to detecting the trigger event. Prior to detecting the trigger event may refer to a stage before the trigger event is sensed, e.g., earlier than a stage prompted for detecting the trigger event (e.g., by an event listener). For example, the received code may be examined for implication of one or more native APIs and the wrapped API may be generated before a webpage has completed loading, before the allocation of resources needed to execute the received code is complete, before an event listener configured to detect the trigger event is prompted and/or registered, before a task related to responding to the trigger event is scheduled for execution, and at any other stage before the trigger event is detected. Generating the wrapped API and replacing the native API with the wrapped API before the trigger event is detected may cause the wrapped API to be invoked instead of the native API once the trigger event occurs to implement changes to the execution introduced by the wrapped API.

In some embodiments, influencing execution of the native API may include executing the wrapped API in place of the native API. Executing the wrapped API in place of the native API may include one or more of preventing execution of the native API, removing code associated with the native API, deallocating resources allocated for executing the native API, allocating resources for executing the wrapped API, changing settings for one or more parameters, accessing different resources (e.g., local and/or remote resources), invoking different functions, or inserting, into an execution sequence, the wrapped API.

Upon intercepting the native API invocation, e.g., prior when the trigger event is detected, a software agent may generate a layer of code as a wrapper for the API invocation, e.g., to encapsulate the API. The software agent may replace the native API invocation in the code with the wrapped API. Consequently, when the trigger event is subsequently detected, the wrapped API may be invoked in place of the native API, causing the layer of code inserted as the wrapper, e.g., encapsulating the native API invocation, to be executed. Executing the layer of code may influence the execution of the native API. For example, the layer of code, when executed, may perform one or more validation tests on the native API invocation, and halt or suspend the execution of the native API if a validation test fails.

Figures 4, 5, 6:
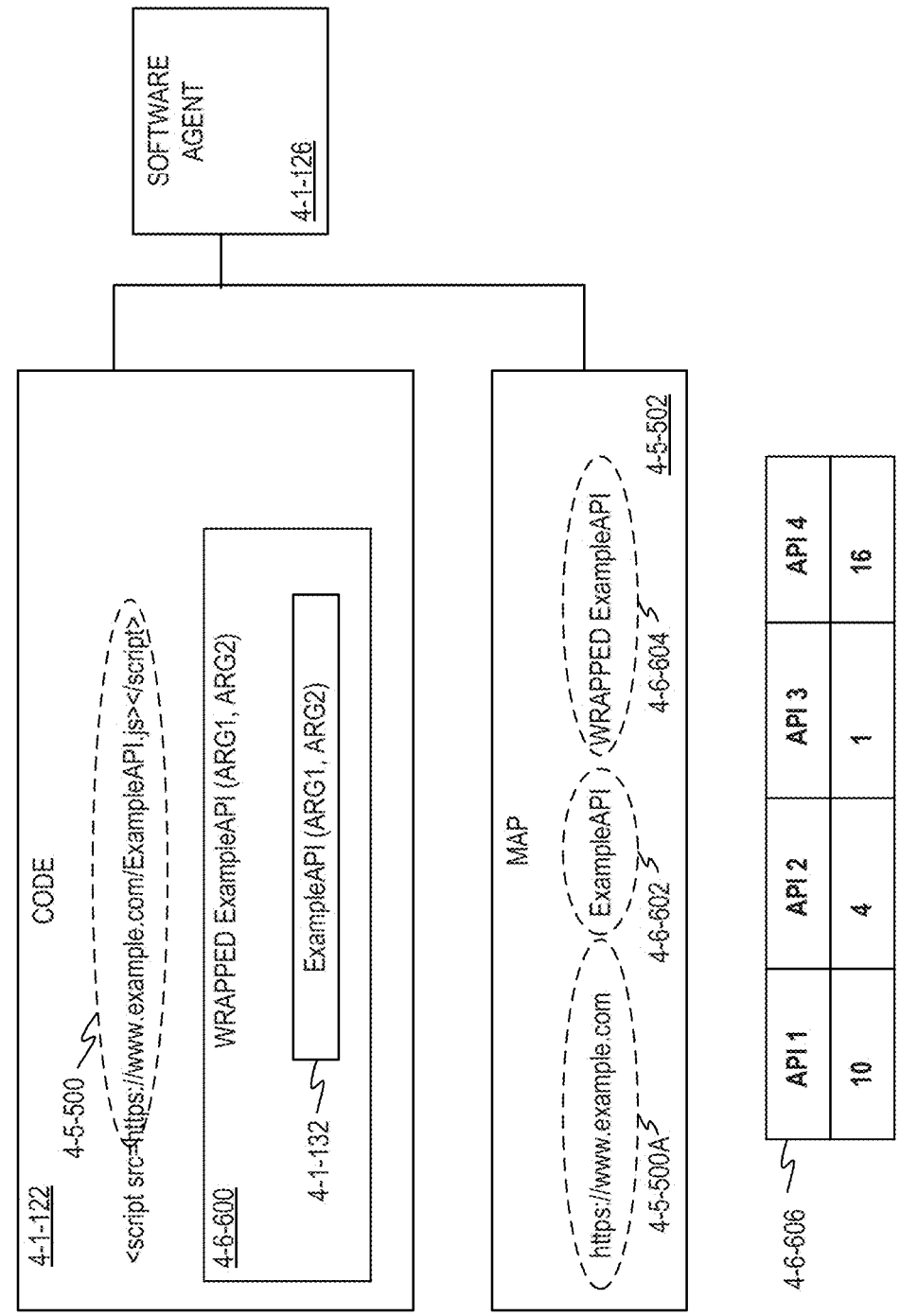

By way of a non-limiting example, reference is made to FIG. 4-6, illustrating a wrapper 4-6-600 (e.g., a wrapped API) replacing the invocation for the API invocation 4-1-132 (e.g., an API invocation for a native API), consistent with some embodiments of the present disclosure. Prior to detecting the trigger event, software agent 4-1-126 may generate a wrapper 4-6-600 for API invocation 4-1-132, e.g., by inserting one or more program code instructions into code 4-1-122, thereby replacing the invocation for API invocation 4-1-132 with wrapper 4-6-600. The instruction of wrapper 4-6-600 may influence the execution of API invocation 4-1-132, for example by performing one or more validation checks before allowing the execution of API invocation 4-1-132 to proceed and preventing the execution of API invocation 4-1-132 if a validation check fails.

In some embodiments, replacing the invocation for the native API with the wrapped API imposes the virtual barrier between the executable code and the native API. Imposing the virtual barrier may refer to enforcing or establishing the virtual barrier (e.g., a software-imposed boundary or wall) separating the API invocation from other portions of the executable code, e.g., not associated with the API invocation. The imposition of the virtual barrier may affect access (e.g., direct, or indirect, such as via a proxy) of the native API to computing resources, such as memory (e.g., buffers, queues, stacks, and registers in RAM, as well as disk space), processor time, communications channel (e.g., internal buses and/or external links), and any other computing resource benefiting from protection. Thus, in some embodiments, the virtual barrier may be established due to the replacement of the native API invocation with the wrapped API. For example, the wrapped API may include instructions, that when executed (e.g., in place of the native API code), may intercept the execution of the native API invocation. The interception may prevent the native API from accessing system resources (e.g., thereby implementing a virtual barrier between the native API and the system resources). In some embodiments, the wrapped API may include instruction to invoke one or more procedures to thwart a cybersecurity threat, such as to perform validation checks, data integrity tests, authentication and authorization checks, and any other test to prevent a cybersecurity threat.

By way of a non-limiting example, turning to FIG. 4-6, replacing API invocation 4-1-132 in code 4-1-122 with wrapper 4-6-600 may effectively impose virtual barrier 4-1-130 (FIG. 4-1). For example, when the trigger event is detected, wrapper 4-6-600 may be invoked in place of API invocation 4-1-132. Wrapper 4-6-600 may include instructions to intercept the execution of API invocation 4-1-132 and prevent access to computing resources 4-1-134 until one or more validation checks are completed.

In some embodiments, recording the invocation source identifier includes storing an association between the wrapped API, the native API, and the invocation source identifier. Storing may include writing, saving, recording or archiving (e.g., in short and/or long-term memory) in a manner to allow subsequent retrieval and/or use. The data may be stored in a database, a library, in a table, a list (e.g., a linked list), or any other data structure. The data may be stored for subsequent access via query, e.g., using an in index linked to the stored data. In some embodiments, multiple copies of data may be stored in different regions of memory, different types of memory (e.g., persistent and non-persistent), and/or in different devices as backup. An association may refer to an affiliation, relationship, correspondence, link or any other type of connection or correlation between two or more items, e.g., to indicate that two or more data items belong together or are otherwise related to one another. Storing an association between multiple data items may include storing a relationship or affiliation between multiple data items. For example, the association may be stored as a pointer or link connecting data items (or copies thereof) stored in memory (e.g., in a linked list or graph allowing to traverse between associated data items), as a table (e.g., with associated items stored in different cells within the same row or column), in an object or array (e.g., including multiple placeholders for storing associated data items), in an index (e.g., allowing to query for one data item using an associated data item), or using any other data structure configured to reflect a relationship between different data items. In some embodiments, the associated data items may be stored in separate areas of memory (e.g., on the same or different device), and the association may be stored as one or more addresses or pointers allowing to access the data items stored in the different memory locations. In some embodiments, the stored association may allow querying for and/or retrieving a data item using an associated data item. In some embodiments, the association may be a two-way association, e.g., allowing each data item to be retrieved based on the other data time. In some embodiments, the association may be a one-way association, only allowing retrieval of one data item based on the other data item, but not the reverse.

For example, the software agent may store a reference for the wrapped API (e.g., replacing the native API), a reference for the native API, and a reference to the source identifier in the same row or column of table, linked together in a list or graph, inside an array, in an index, or any other type of data structure to allow accessing (e.g., via graph traversal, query, lookup table, and any other technique for accessing data) the wrapped API, the native API, the source identifier, and the association there between. In some embodiments, upon detecting an invocation of the wrapped API (e.g., in place of the native API and in response to a trigger event), the software agent may use a reference for the wrapped API and the stored association to query for and retrieve the native API and the source identifier, thereby accessing the native API and the source identifier for the native API after the trigger event occurs (e.g., for the purpose of performing a cybersecurity related task).

In some embodiments, the association is stored in a map accessible by the wrapped API and the native API. A map may be a representation (e.g., an abstract representation implemented in software and/or hardware) of multiple data items or points and relationships there between. A map may include one or more of a graph or network of connected nodes, a chart, a table, a list, an array, a matrix, an index, or any other structure capturing one or more relationships between data points. A map may store directional relationships between data items (e.g., to reflect a hierarchy or inheritance, dependency, or interdependency), and/or non-directional relationships. A map may be sorted (e.g., according to one or more keys defined for the map), or unsorted. A map may express a defined structure relating multiple data items (e.g., a structured hierarchy), or may express an unstructured relationship (e.g., as an ontology). A map may be stored in local and/or remote memory. The map may be used to retrieve associated data items by querying an index or lookup, traversing the map (e.g., implemented as a directional graph), sorting the map, or performing any other action to access data and/or associations there between stored in the map. Accessible may refer to attainable, or available (e.g., for reading and/or writing). The software agent may store the map in area of memory available (e.g., accessible) to the wrapped API and/or the native API, such that the wrapped API and/or the native API may subsequently retrieve information from the map. In some embodiments, the accessibility (e.g., availability) of the map may be subject to one or more validation, authentication, and/or authorization tests. For example, the wrapped API may be authorized to access the map but other portions of the received code may lack authorization to access the map. In some embodiments, the wrapped API may include one or more instructions to retrieve the source identifier for the native API from the map and validate the native API before allowing an execution of the native API to proceed.

By way of a non-limiting example, turning to FIG. 4-6, software agent 4-1-126 may record in map 4-5-502, an identifier 4-6-602 for API invocation 4-1-132 (and/or an API associated with API invocation 4-1-132), an identifier 4-6-604 for wrapper 4-6-600, invocation source identifier copy 4-5-500A, and an association there between. For example, software agent 4-1-126 may store identifiers 4-6-602, 4-6-604, and 4-5-500A in the same row of a searchable table (e.g., using one or more of identifiers 4-6-602, 4-6-604, and 4-5-500A as a search key). Alternatively, software agent may store identifiers 4-6-602, 4-6-604, and 4-5-500A as nodes connected via links (e.g., as a connected list, graph, or network) allowing to access one or more of identifiers 4-6-602, 4-6-604, and 4-5-500A by traversing between the nodes.

Some embodiments may involve detecting an object having a size exceeding a predetermined threshold. Detecting may refer to identifying or recognizing (e.g., an event, an occurrence, a signal, an indication, a notification, or a response). Detecting may include performing one or more actions, such as examining or inspecting data, making comparisons (e.g., based on one or more rules), or performing one or more tests, simulations or emulations (e.g., by invoking one or more predefined procedures). An object may refer to a container or receptable (e.g., defined in code) for storing data. An object may be implemented using one or more software instructions (e.g., declarations) for allocating memory according to a specific structure configured to store multiple data values in a manner to reflect one or more associations there between. In some embodiments, an object may additionally define one or more methods for performing am action on one or more data values stored in the object. For example, an object for a button may include multiple data values to define how the button may be displayed (e.g., button size, shape, type, position within a webpage, color, accompanying text), and one or more methods affecting the display (e.g., visual effects to indicate the button is or was clicked). As another example, an object for a table may include settings defining the number of cells in the table (rows and/or columns), allowable data types, allocated size, display properties (e.g., cell size, background color, font), a position for displaying within a webpage, as well as one or more methods (e.g., for sorting, summing, or performing additional computations on values stored in the table). A size (e.g., for an object) may refer to an amount of memory (e.g., measured in bytes) needed to store an object, e.g., to allow using the object without interfering with the functionality of other objects, functions or procedures stored in adjacent memory locations. The size of an object may account for data currently stored in an object as well as subsequently received data (e.g., as a placeholder). Memory may be allocated for an object as a contiguous block (e.g., using one or more consecutive regions of memory), or as non-contiguous blocks (e.g., residing in different regions of memory accessible via one or more pointers or references). A threshold may refer to a limit or boundary, e.g., a value that if passed may result in a negative consequence, such as unauthorized access, a security breach, or data corruption. In some embodiments, a threshold may refer to a value that, if not satisfied (e.g., met, exceeded), may trigger a responsive action (e.g., decreasing the size of an object, discussed above). A memory threshold may impose a boundary or limitation on the physical memory space available for an object (e.g., for storing data). For example, imposing the boundary may ensure that read and/or write operations performed on the object (e.g., by a method defined for the object or by another procedure) only reference memory locations properly allocated for the object (e.g., by a browser application preparing a code for execution), and prevent access to memory locations external to the object (e.g., not properly allocated), e.g., to prevent data corruption or a security breach. A predetermined threshold may refer to a boundary on physical memory space established in advance, e.g., by a memory management unit of a browser application. The threshold may be predetermined based on an estimated or predicted need to store data in the object, hardware and/or software considerations, such as the amount of available RAM, available disk space, bus size, buffer size, queue size, access time considerations, and/or memory needs of other applications currently running on a computing device. The threshold may include memory for storing data (e.g., static data) as well as memory for performing computations on the data (e.g., using a method defined for the object). For example, when preparing a code for execution, a software engine of a browser application may allocate memory for an object including an array (e.g., to store ten integers), and a method to sum the values stored in the array. The memory allocation unit of the software engine may allocate 40 contiguous bytes of memory to store the integer values in the array (e.g., 4 bytes for each integer), and additionally bytes of memory to store the sum, e.g., calculated subsequently by invoking the method. Since the amount of memory needed for the object (e.g., 44 bytes) may be known in advance, before the code is executed, the threshold may be predetermined by the browser application. Exceeding a predetermined threshold may refer to extending beyond the threshold, e.g., memory regions that are outside the limit or boundary defined for an object (e.g., allocated during the parsing, interpreting, or compiling stage, and before executing the code). For example, using an object to reference a memory location (e.g., for reading and/or writing) outside the memory allocated for the object may exceed the predetermined threshold for the object. The software agent may detect when the size of an object exceeds a predetermined threshold for the object. The software agent may record the memory (e.g., memory addresses) properly allocated for the object, (e.g., by the software browser when preparing the code for execution). Subsequently, during code execution, the software agent may monitor memory access requests (e.g., read, write, allocate) associated with the object to detect when a request exceeds the allocated space for the object, and therefore exceeds the predetermined threshold. Turning to the example above, attempting to access byte 45 from the start of the object may exceed the predetermined threshold of 44 bytes allocated for the object, and may cause the software agent to flag the access request as a potential cyber threat, such as an attempt by a malicious actor to write a malicious code to areas of memory exceeding the predetermined threshold.

Some embodiments may involve, in response to detecting an object having a size exceeding a predetermined threshold, decreasing the size of the object. Decreasing the size of the object may include reducing or shrinking the object, e.g., by, truncating or removing memory allocated for the object, thereby making the object smaller. For example, an object exceeding the predetermined threshold may be truncated such that memory locations outside the predetermine threshold may be returned to the memory heap or otherwise deallocated, e.g., for use by other applications. Data stored in the truncated areas of memory may be lost, or alternatively analyzed by the software agent to detect a cyber threat. In response to detecting an object having a size exceeding a predetermined threshold, decreasing the size of the object may include consequent to, triggered by, or as a result of determining that the object is larger than the predetermined threshold, reducing or shrinking the object (e.g., such that the size of object is within the predetermined threshold). For example, the software agent may detect a request via an object to write to an area of memory exceeding a predetermined threshold for the object (e.g., by a malicious agent attempting to use the object as an entry point to insert a malicious code). The write request may indicate that size of the object is larger than the size of the predetermined threshold. In response, the software agent may truncate the object to reduce the size, thereby removing access to the malicious code and thwarting the malicious agent.

In some embodiments, decreasing the size includes restoring an original size of the object. The term "restoring an original size of the object" may include changing the amount of memory allocated for the object to correspond to the amount of memory originally allocated for the object, e.g., by the software engine when preparing the code for execution. In some embodiments, the object restored to the original size may reside in the same memory location (e.g., virtual or physical) originally allocated for the object by the browser application. In some embodiments, the object restored to the original size may reside in a different area of memory, and the originally allocated memory may be returned to the heap. Any data stored in the object within the predetermined threshold may continue to be accessible, thereby avoiding memory access conflicts and/or data corruption.

For example, when preparing a code for execution, a browser application may allocate 100 bytes to a string object. Upon intercepting the execution of the native API, the software agent may detect an attempt to use the object to access an additional 50 bytes (e.g., beyond the 100 allocated bytes), thereby exposing the extra 50 bytes of memory to data corruption. In response, the software agent may truncate the string object to occupy no more than 100 bytes (e.g., a predetermined threshold), as originally allocated by the browser application. The software agent may discard any data stored in the truncated 50 bytes or may analyze the data for cyber threats. After restoring the size of the string object to the original size, the software agent may allow the execution of the native API to resume.

By way of a non-limiting example, turning to FIG. 4-3, when preparing code 4-1-122 for execution, software engine 218 (FIG. 2) may allocate memory 4-3-310 in a memory heap 4-3-308 of execution environment 4-120 for a string object (e.g., obj 4-3-304) defined in code 4-1-122. However, the function toString 4-3-306 may be used by a malicious agent to manipulate the array length, e.g., by increasing the size of the string object to additionally include memory locations 4-3-312 of heap (e.g., exceeding the memory allocated by software engine 218). This may allow a malicious code (e.g., added to obj 4-3-304 or an API) to access memory locations 4-3-312 (e.g., outside properly allocated memory 4-3-310), using obj 4-3-304 as an entry point. For example, the malicious code may read and/or overwrite data stored in memory locations 4-3-312, thereby corrupting backing store Array object in memory 4-3-310. To prevent such an occurrence, software agent 4-1-126 may restore the size for obj 4-3-304 to the amount of memory 4-3-310, as originally allocated by software engine 218. Consequently, attempts to access memory locations 4-3-312 via obj 4-3-304 (e.g., for reading and/or writing) may be denied.

Some embodiments may further involve inspecting at least one return value of the influenced execution of the native API. A return value may refer to an answer or answers produced by a function or procedure upon completing a computation or task, e.g., as an output. For example, the return value for a function determining if an input is a number (e.g., isNaN( )) may be a binary type, e.g., True if the input is a number and False if the input is not a number. As another example, the return value for a function converting an integer input to a string type (e.g., toString( )) may be a string representation of the input (e.g., if the input is 1, the return value may be "one"). A return value of a function may be required to conform to a specific format (e.g., data type, size, number of arguments, range of allowed values) expected by the code invoking the function. However, the influencing of the execution of the native API may affect the one or more aspects of the return value. For example, one or more of the data type, size, number of arguments, data value or values may be affected by the influenced execution of the native API. Therefore, the software agent may inspect the return value, e.g., to ensure compatibility with the code invoking the native API. For example, if the software agent determines that the return value of the influenced execution of the native API fails to conform with an expected format for the return value, the software agent may convert the return value to the expected format, e.g., to ensure proper execution of the code.

For example, the virtual barrier may maintain a separation between the executing code and the native API, e.g., by replacing the native API with the wrapped API. However, the executing code may be incompatible with the wrapped API. For example, the wrapped API may be configured to receive additional arguments as inputs (e.g., test values), and may return additional return values, such a result of a validation test conducted by the wrapped API. The software agent (e.g., implementing the virtual barrier) may inspect one or more invocation arguments and return values for the native API and may modify the return value for the influenced execution of the native API where necessary, e.g., to ensure compatibility. In some embodiments, the software agent may replace a return value including a reference for the wrapped API with a reference to the native API and may return the reference to the native API to the invoking code, e.g., to allow the invoking code to resume execution.

By way of a non-limiting example, turning to FIG. 4-6, software agent 4-1-126 may inspect the return value of wrapper 4-6-600 (e.g., the influenced execution of the native API) and determine that wrapper 4-6-600 is incompatible with code 4-1-122 (shown in FIG. 4-1) including the original API invocation 4-1-132. For example, software agent 4-1-126 may determine that wrapper 4-6-600 is configured with three arguments (e.g., ARG1, ARG2, and ARG3) whereas API invocation 4-1-132 is configured with only two arguments (e.g., ARG1 and ARG2). For example, ARG3 may be a result of a validation test performed by wrapper 4-6-600. However, returning wrapper 4-6-600 instead of API invocation 4-1-132 may be incompatible with code 4-1-122. Therefore, upon determining that API invocation 4-1-132 is valid (e.g., based on ARG3), software agent 4-1-126 may remove ARG3 and return only ARG1 and ARG2 to invoking code 4-1-122. In some embodiments, software agent 4-1-126 may replace a reference for wrapper 4-6-600 with a reference for API invocation 4-1-132 to invoking code 4-1-122.

Some embodiments may further involve recording an invocation sequence of invocations of the native API in the executable code. An invocation sequence of invocations may include a series of multiple invocations, e.g., exhibiting a pattern. For example, the software agent may monitor any invocations for the native API and any events triggering the invocations. The software agent may store (e.g., record) the invocations for the native API and any corresponding trigger events in memory, e.g., in a table or matrix. After multiple invocations for the native API (e.g., a predefined number) have been stored, the software agent may analyze the invocations and corresponding trigger events to determine if a pattern (e.g., sequence of invocations) exists. In some embodiments, the analysis may involve invoking a pattern recognition or machine learning algorithm to discern similarities and/or differences in the recorded invocations of the native API. For example, the software agent may determine that after each mouse click event, the native API is invoked four times, but after a form submit event, the native API is invoked only once. The software agent may conclude that an invocation sequence exists for the native API for the mouse click event, but not for the form submit event.

Some embodiments may further involve determining an asynchronous loop when the invocation sequence satisfies at least one invocation sequence pattern parameter. An asynchronous loop may refer to a sequence of invocations (e.g., a pattern of multiple invocations) following an asynchronous trigger event. An asynchronous loop may be finite or infinite (e.g., an unlimited number of invocations causing a computer system to hang). An asynchronous loop may indicate a cyber threat such as information leakage, e.g., by allowing to discern differences in timing and/or memory access for each invocation. Thus, the ability of the software agent to monitor native API invocations from inside the execution environment may allow the software agent to detect cyberthreats, such as asynchronous loops. Returning to the invocation sequence example above, the four invocations of the native API following each mouse click event (e.g., an asynchronous user event) may be an asynchronous loop, whereas the single API invocation following each form submit event may not be an asynchronous loop. An invocation sequence pattern parameter may include any criteria indicating a specific arrangement or order, e.g., to facilitate making a prediction based on the invocation sequence pattern. Examples of an invocation sequence pattern parameter may include a number of invocations, a location or range of locations in memory accessed by one or more invocations, a type of resource accessed by each invocation (e.g., a query to a library or database, an attempt to access a buffer, queue, stack, or sensitive data), an amount of memory accessed by each invocation, a timing or scheduling for each invocation, a correlation between each invocation and other events or invocations, or any other criteria indicating a pattern of invocations. In some embodiments, different invocation sequence pattern parameters may correspond to different cyber threats. When the invocation sequence satisfies at least one invocation sequence pattern parameter may refer to a set of circumstances when the invocation sequence (e.g., determined by the software agent) complies with, or corresponds to one or more of the criteria described earlier, e.g., indicating an asynchronous loop. In some embodiments, the software agent may analyze the invocation sequence based on multiple parameters. For example, the software agent may check the number of native API invocations following a trigger event, coincidence of each native API invocation with one or more invocations of other APIs, and/or memory access attempts for each native API invocation to determine which, if any, of the invocation sequence parameters are satisfied. The software agent may determine an asynchronous loop based on the invocation sequence satisfying one or more particular invocation sequence pattern parameters. For example, the software agent may determine that five sequential invocations of the same native API following a single mouse click event may indicate an asynchronous loop. As another example, the software agent may determine that five sequential invocations of different native APIs following a keystroke event may indicate a different asynchronous loop.

By way of a non-limiting example, turning to FIG. 4-6, software agent 4-1-126 may record the number of API invocations for each native API invocation in code 4-1-122 (FIG. 4-1) in a table 4-6-606. Software agent 4-1-126 may detect that a sequence of invocations for a specific native API (e.g., API 4) exhibits a pattern. For example, for each asynchronous input four invocations for API 4 may be detected, such that after four asynchronous inputs, 16 invocations for API 4 are detected, indicating a repeated pattern. Based on the pattern, software agent 4-1-126 may determine the existence of an asynchronous loop, and may take a remedial action.

Some embodiments may provide a system for performing cybersecurity operations for tracing an execution of an asynchronous Application Programming Interface (API), such as those discussed above. In some embodiments, the system may include at least one processor programmed to: receive, by an application capable of JavaScript execution, an executable code including an API invocation; intercept, by a virtual barrier, the API invocation; determine that the API invocation is an invocation for a native API configured for subsequent execution in response to a trigger event; based on the determination that the API invocation is an invocation for a native API configured for subsequent execution record an identifier for a source of the native API; upon detecting the trigger event: retrieve the invocation source identifier; and influence execution of the native API based on the invocation source identifier.

By way of a non-limiting example, turning to FIG. 4-1, at least one processor 110 (FIG. 1) may be provided to perform cybersecurity operations for tracing an execution of an asynchronous API. At least one processor 110 may be programmed to receive, such as by browser application 216 (shown in FIG. 2), executable code 4-1-112 including API invocation 4-1-132. At least one processor 110 may implement virtual barrier 4-1-130 to intercept API invocation 4-1-132 and determine that API invocation 4-1-132 is an invocation for a native API configured for subsequent execution in response to a trigger event (e.g., via one or more of input devices included in input interface 4-4-400 of FIG. 4). Turning to FIG. 4-5, based on the determination that API invocation 4-1-132 is an invocation for a native API configured for subsequent execution, at least one processor 110 may record an identifier, source identifier copy 4-5-500A for a source identifier 4-5-500 of native API 4-1-132, e.g., by implementing software agent 4-1-126. Upon detecting the trigger event, software agent 4-1-126 may retrieve invocation source identifier copy 4-5-500A and influence execution of native API 4-1-132 based on the invocation source.

FIG. 4-7 illustrates a block diagram of example process 4-700 for performing cybersecurity operations for tracing an execution of an asynchronous API, consistent with embodiments of the present disclosure. In some embodiments, process 4-700 may be performed by at least one processor (e.g., at least one processor 110 of computing device 102 shown in FIG. 1) to perform operations or functions described herein. In some embodiments, some aspects of process 4-700 may be implemented as software (e.g., program codes or instructions) that are stored in a memory (e.g., memory 114 of computing device 102) or a non-transitory computer readable medium. In some embodiments, some aspects of process 4-700 may be implemented as hardware (e.g., a specific-purpose circuit). In some embodiments, process 4-700 may be implemented as a combination of software and hardware.

Referring to FIG. 4-7, process 4-700 may include a step 4-702 of receiving, by an application capable of JavaScript execution, an executable code including an API invocation. For example, as described earlier computing device 102 (FIG. 1) may receive webpage code 222 (FIG. 2) from a webpage server (e.g., host server 106) via communications network 108, and store webpage code 222 in memory 114.

Process 4-700 may include a step 4-704 of intercepting, by a virtual barrier, the API invocation. For example, as described earlier, software agent 4-1-126 (FIG. 4-1) may intercept an invocation for a native API 4-1-132 included in executable code 4-1-122 to implement virtual barrier 4-1-130.

Process 4-700 may include a step 4-706 of determining that the API invocation is an invocation for a native API configured for subsequent execution in response to a trigger event. For example, as described earlier, software agent 4-1-126 (FIG. 4-1) may determine that API invocation 4-1-132 is associated with (e.g., is written for) a native API configured for subsequent execution in response to a trigger event, e.g., based on event listener 4-2-204 (FIG. 4-2) registered with DOM 4-2-202 for code 4-1-122.

Process 4-700 may include a step 4-708 of, based on the determination that the API invocation is an invocation for a native API configured for subsequent execution, recording an invocation source identifier. For example, as described earlier, software agent 4-1-126 may identify source identifier 4-5-500 (FIG. 4-5) uniquely identifying the source for native API invocation 4-1-132 and record a copy of source identifier copy 4-5-500A in map 4-5-502.

Process 4-700 may include a step 4-710 of, upon detecting the trigger event: retrieving the invocation source identifier. For example, as described earlier, software agent 4-1-126 (FIG. 4-1) may retrieve source identifier copy 4-5-500A (FIG. 4-5) for API invocation 4-1-132 from map 4-5-502.

Process 4-700 may include a step 4-712 of influencing execution of the native API based on the invocation source identifier. For example, as described earlier, software agent 4-1-126 (FIG. 4-1) may influence the execution of API invocation 4-1-132.

In some embodiments, process 4-700 may include a step 4-714 where influencing execution of the native API based on the invocation source identifier includes modifying the execution when the invocation source identifier is determined to be suspicious. For example, as described earlier, if software agent 4-1-126 (FIG. 4-1) determines source identifier copy 4-5-500A (FIG. 4-5) is suspicious, software agent 4-1-126 may modify the execution of API invocation 4-1-132. e.g., by suspending the execution.

In execution environments, including web browsing environments, it may be beneficial to protect users, systems, devices, and information from malicious electronic actions from cyber attackers. In many instances, cyber attackers may have sophisticated ways of manipulating user data, such as data related to a browsing session, while taking steps to obfuscate the malicious source. With high amounts of user data flowing in and out of many devices frequently, and without any technical means acting to sanitize such maliciously manipulated information, this can lead to a user unknowingly facilitate a cyber attack by permitting tainted data to affect a device. Even where current techniques for taint analysis exist, they frequently require extensive modification to an engine itself, such as a JavaScript engine, complicating the process for functionality and security. Therefore, there is a need for unconventional innovations for helping to sanitize data in a thorough and less cumbersome manner, to shield users, systems, devices, and information from cyber attacks.

Such unconventional approaches may enable identification of sources of user data within a networked environment, such as when a user's device uses a web-based connection. These approaches, expressed in the disclosed embodiments, may evaluate input values as primitives instead of object access, leading to enhanced perceptiveness and thoroughness of data analysis and sanitization. Moreover, the disclosed embodiments may involve evaluating and/or sanitizing large amounts of input data within an execution environment and/or portions of input data not normally evaluated or sanitized. By sanitizing large amounts of user data within an execution environment in an agnostic manner, users, systems, devices, and information can be protected regardless of a source or destination of data. Aspects of disclosed embodiments may include applying multiple checks to input data and sanitizing the input data based on the results of the checks, which can help to conserve computational resources and reduce burdens on a user's web browsing experience by targeting sanitizing operations. Disclosed embodiments also further enhance security by monitoring potential risks and updating known risks associated with specific characters, to provide cyber protection for constantly evolving threats.

Thus, the various embodiments the present disclosure describe at least a technological solution, based on improvement to operations of computer systems and platforms, to the technical challenge of protecting electronic devices from malicious actions.

Disclosed embodiments may involve systems, methods, and computer-readable media for sanitizing data within a native environment. The systems and methods described herein may be implemented with the aid of at least one processor or non-transitory computer readable medium, such as a CPU, FPGA, ASIC, and/or any other processing structure(s) or storage medium, as described herein. For case of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities. While many actions may be described with respect to a particular element as discussed below (e.g., a runtime parameter, input data, a character, a risk indicator, a string representation, an API invocation, and/or a DOM tree), it should be noted that any and all actions described may be performed with respect to a copy of a particular element, which may be generated by an agent. For example, an original runtime parameter (discussed further below) may exist and/or be suspended within an execution environment while a copy of the runtime parameter is split into parts for further operations and analysis (as discussed below). In this manner, executable code may still be analyzed and threats may be addressed, without irreversibly disrupting the code, which could disrupt a browsing experience or corrupt data, for example.

Disclosed embodiments may include at least one processor configured to obtain at least one runtime parameter associated with an execution environment. An execution environment may include one or more of an operating system, an application, a version of code, a program, a script, a browser, a browsing session, a URL parameter, an IP address, an encryption standard, an agent (such as one of the agents discussed herein), a connection, HTML code, any contextual attribute capable of affecting code execution on a device, or any other aspect of an execution environment discussed above. In some embodiments, an execution environment may be associated with a particular programming language, such as JavaScript, Python, Java, C, C++, or C#. A runtime parameter may include one or more of a value, a character (e.g., JavaScript character, Unicode character, ASCII character), a line of code, an argument, a variable, a data container, a label, a data structure, data content associated with a particular structure, or any portion of code capable of influencing an execution environment. For example, a runtime parameter may include at least one of: a Uniform Resource Locator (URL), a URL parameter (e.g., a parameter name, a parameter value, or other character or string combination in a URL), an Application Programming Interface (API) invocation, a referral link, a local storage value, a network storage value, a cookie, or a hash value. Additionally or alternatively, the at least one runtime parameter may include a Hypertext Markup Language (HTML) string. In some embodiments, a runtime parameter may be associated with a particular field, data container, web browser, browsing session, device, network, user, system, or a particular programming language, such as JavaScript, Python, Java, C, C++, or C#. Additionally or alternatively, a runtime parameter may be associated with (e.g., may have been received from) an untrusted source. A runtime parameter may be associated with an execution environment by being present within an execution environment, being connected (e.g., by a data annotation) to an execution environment (e.g., a past, present, and/or future execution environment), and/or by having a contextual attribute in common with an execution environment.

Obtaining at least one runtime parameter may include requesting a runtime parameter, retrieving a runtime parameter (e.g., from a storage medium), parsing code (e.g., HTML code, browser code, and/or application code), identifying a runtime parameter (e.g., related to HTML code, related to browser code, and/or related to application code), or in any way gaining access to a runtime parameter or information associated with a runtime parameter. For example, at least one processor may identify a runtime parameter from within HTML code executable by, received by, and/or maintained by a browser. In some embodiments, obtaining a runtime parameter may include providing a runtime parameter to an agent, program, application, or other executable code, to perform operations associated with the runtime parameter. For example, at least one processor may provide a runtime parameter to an agent embedded or injected into executable code, consistent with disclosed embodiments.

In some embodiments, at least one runtime parameter may be obtained based on determination of certain information. For example, at least one process may determine that a runtime parameter satisfies a collection rule and may obtain the runtime parameter in response to that determination. A collection rule may be set by an agent (discussed herein) and/or may be influenced by a user through setting tool (e.g., provided by an agent through an interface). As another example, at least one processor may determine that the at least one runtime parameter is associated with cross-site scripting. Cross-site scripting (XSS), as used herein, may refer to presence of an unexpected script, presence of an unidentified script, presence of an unknown or unverified script, a type of code manipulation (e.g., a cyberattack) whereby a script (e.g., a malicious script) is injected into client-side code (e.g., web browser code), and/or any malicious or suspicious script behavior. In some embodiments, cross-site scripting may be associated with different varieties of manipulation (e.g., malicious behavior). For example, cross-site scripting may be associated with a reflected exploit type (e.g., where an injected script is reflected off of a web server, such that the attack is delivered to the user through a different route than the channel to be exploited), a stored exploit type (e.g., where an injected script is permanently stored on a target server, sometimes called a persistent or Type-I XSS attack), or a DOM exploit type (e.g., where an attack payload is executed due to a modification made to an execution or DOM environment, such that client-side code runs in an unexpected manner). Determining that the at least one runtime parameter is associated with cross-site scripting may include identifying a potential for cross-site scripting (e.g., a risk of cross-site scripting), identifying a source of code, identifying a website, comparing previous or current execution environment information with recently received or requested information, identifying an attempt to change a DOM, identifying a selection of a link or other interface element by a user (e.g., clicking a link outside of a website in a current execution environment), and/or detecting any change to code indicative of an anomalous, unexpected, or malicious behavior. In some embodiments, determining that that the at least one runtime parameter is associated with cross-site scripting may include determining that the at least one runtime parameter is associated with a reflected cross-site scripting attack. Determining that the at least one runtime parameter is associated with a reflected cross-site scripting attack may include identifying a script (e.g., a potentially injected script), accessing a script, analyzing a script, identifying an origin of a script, determining a timing of a script, determining a placement of a script (e.g., within an execution sequence), comparing data associated with a script to a parameter of an execution environment, and/or identifying any indicator that a script has the potential to cause an anomalous, unexpected, or malicious behavior. For example, at least one processor may analyze a script associated with a web browsing session and may determine that the script was recently added and is associated with an origin that is new to the web browsing session (e.g., based on a history of the session). In some embodiments, determining that that the at least one runtime parameter is associated with cross-site scripting may include determining that the at least one runtime parameter is associated with a Document Object Module (DOM)-based cross-site scripting attack. Determining that the at least one runtime parameter is associated with a Document Object Module (DOM)-based cross-site scripting attack may include, for example, one or more of identifying DOM code, accessing DOM code, analyzing DOM code, identifying an origin of DOM code, determining a timing of DOM code, determining a placement of node within a DOM, determining a relationship between nodes in a DOM, comparing DOM code to a parameter of an execution environment, identifying an attempted change to a DOM, or identifying any indicator that a DOM has the potential to cause an anomalous, unexpected, or malicious behavior.

In some embodiments, the at least one runtime parameter is obtained based on the determination that the at least one runtime parameter is associated with cross-site scripting, which may include one or more of verifying the determination that the at least one runtime parameter is associated with cross-site scripting, obtaining the at least one runtime parameter after determining that the at least one runtime parameter is associated with cross-site scripting, or obtaining the at least one runtime parameter in response to determining that the at least one runtime parameter is associated with cross-site scripting.

Consistent with disclosed embodiments, at least one processor may determine if input data associated with the at least one runtime parameter includes at least one character associated with a risk indicator. Input data may include one or more of a value, a character, a string, a line of code, an argument, a variable, an object, HTML code, or any portion of code capable of influencing an execution environment. For example, input data may include one or more of a URL parameter, a header, an HTTP referrer, or any other data that can affect the execution of HTML code. In some embodiments, input data may be associated with at least one runtime parameter, which may include the input data being content data held by the at least one runtime parameter, the input data being related to the at least one runtime parameter through a data relationship, or the input data being having a contextual attribute in common with the at least one runtime parameter. A character may include one or more of a letter, a digit, a value, a symbol, a punctuation, a word, a phrase, a string, any other machine-readable data element, or any combination thereof. As mentioned above, a character may include, for example, an alphanumeric character, an ASCII character, a JavaScript string character (which may be referred to as a "char"), a Unicode character, or any other symbol or distinct informational unit within a computer language lexicon (e.g., a computer language grapheme). For example, a character may include at least one of: a tag opening, a tag closing, a double comma, a single quotation mark (inverted or non-inverted), a double quotation mark (inverted or non-inverted), an opening bracket, or a closing bracket. Additionally, or alternatively, a character may also include at least one of a question mark, a slash, a double slash, or an ampersand ("&"). In some embodiments, a character may be part of HTML code and/or browser code. A risk indicator may include one or more of a source identifier, a label, a history (e.g., a log of suspicious and/or malicious actions), a value, a threshold, a table, a rule, or any data relating one or more characters to potential malicious activity.

Determining if input data associated with the at least one runtime parameter includes at least one character associated with a risk indicator may include one or more of comparing the at least one character, input data, and/or runtime parameter to a reference parameter (e.g., a stored character, a value, and/or a threshold), comparing one or more conditions of a rule to input data to establish if the input data satisfies the rule, performing static analysis of code, simulating code execution, or performing an operation to establish a likelihood of malicious behavior associated with the at least one character, the input data, and/or the at least one runtime parameter. For example, determining if input data associated with the at least one runtime parameter includes at least one character associated with a risk indicator may include comparing the at least one character to one or more known characters and determining that the at least one character matches, or comes within a similarity threshold of, at least one of the known characters. In some embodiments, a reference parameter may be associated with a potential for malicious behavior. Additionally or alternatively, at least one processor may, based on a comparison, determine that at least one character of a runtime parameter matches or is similar to a reference parameter, and in response may associated the at least one character or the runtime parameter with a potential for malicious behavior. In some embodiments, determining if input data associated with the at least one runtime parameter includes at least one character associated with a risk indicator may include converting input data to a format that may be compared with a format of the at least one character associated with a risk indicator (e.g. converting a JavaScript character to an ASCII character, converting an ASCII character to a Unicode character, converting, or encoding or decoding a character).

In some embodiments, determining if the input data associated with the at least one runtime parameter may include at least one character associated with the risk indicator may include performing at least one of: accessing a set of predefined characters and determining that the at least one character is included in the set of predefined characters, determining if an input value associated with the at least one runtime parameter is encoded, or determining if input data associated with the at least one runtime parameter has a length exceeding a length threshold. A set of predefined characters may include one or more strings, phrases, letters, lines of code, digits, values, punctuations, spaces, indentations, or any combination thereof. For example, a set of predefined characters may include a sequence of more than one character. As mentioned above, at least one processor may access a set of predefined characters and determine that the at least one character is included in the set of predefined characters. Accessing a set of predefined characters may include identifying, requesting, and/or retrieving one or more of the predefined characters (e.g., from a storage device). Determining that the at least one character is included in the set of predefined characters may include one or more of selecting one or more of the predefined characters, comparing one or more of the predefined characters to the at least one character, identifying a match (e.g., exact match or a match within a threshold) between one or more of the predefined characters and the at least one character, or identifying a lack of a match between one or more of the predefined characters and the at least one character. For example, at least one processor may perform a check to determine if the at least one character is part of a set of characters with known risk (e.g., established to be associated with potential malicious behavior). As mentioned above, at least one processor may determine if an input value associated with the at least one runtime parameter is encoded. A runtime parameter may be encoded if or when at least a portion of the runtime parameter has been modified from an initial form, has been formatted to a particular standard (e.g., URL encoding and/or Base64), has been translated from an initial form to a translated formed, or has been modified without changing the substantive information conveyable by the runtime parameter. For example, a function, such as encodeURIComponent( ) or encodeURI( ) may have been applied to an initial runtime parameter. Determining that the at least one runtime parameter is encoded may include identifying a syntax or character sequence within a runtime parameter, verifying that a runtime parameter satisfies a standard or format, accessing an identifier of an encoding technique (e.g., an identifier associated with the at least one runtime parameter), or performing any operation to establish that a runtime parameter has been modified from an initial version. As mentioned above, in some embodiments, at least one processor may determine if input data associated with the at least one runtime parameter has a length exceeding a length threshold. Input data may include one or more of a value, a character, a string, a line of code, an argument, a variable, an object, HTML code, any portion of code capable of influencing an execution environment, or any other characteristic of input data, as discussed herein. Input data may be associated with the at least one runtime parameter by having a relationship with the at least one runtime parameter, by influencing the at least one runtime parameter, by being influenced by the at least one runtime parameter, by being linked (e.g., through data) with the at least one runtime parameter, by sharing an execution environment with the at least one runtime parameter, or by sharing any contextual attribute with the at least one runtime parameter. A length threshold may include, for example, a particular number of characters, letters, symbols, values, digits, lines, HTML elements, or other quantification of computer-readable data. Determining if input data has a length exceeding a length threshold may include one or more of determining a length threshold, parsing the input data, serializing the input data, comparing a length of the length threshold to a length of the input data, or establishing that the length of the input data exceed the length of the length threshold (e.g., based on the comparison). For example, a length threshold hold may be 100 ASCII characters within a single JavaScript (e.g., UTF-16) character, and a JavaScript character having 101 ASCII characters may be determined to exceed the length threshold.

In some embodiments, certain operations (such as those discussed herein) may be performed in response to making one or more determinations in the affirmative (or negative). For example, if at least one processor determines that the at least one runtime parameter includes at least one character associated with the risk indicator, further operations, such as any or all of those discussed below, may be performed.

In some embodiments, at least one processor may perform an operation to at least one runtime parameter. For example, at least one processor may determine that the at least one runtime parameter is encoded. A runtime parameter may be considered to be encoded, and may be determined to be encoded, as described above. In some embodiments, at least one processor may decode the at least one encoded runtime parameter. Decoding the at least one encoded runtime parameter may include modifying at least a portion of an encoded runtime parameter, re-formatting at least a portion of an encoded runtime parameter, translating at least a portion of an encoded runtime parameter, applying a particular function to an encoded runtime parameter (e.g., decodeURIComponent( ) and/or decodeURI( )), removing encoding, or causing at least a portion of an encoded runtime parameter to revert to an earlier state. For example, a function, program, module, or other code may be applied to the at least one encoded runtime parameter to remove URL encoding or Base64 encoding. In some embodiments, an encoded runtime parameter may be decoded in response to a determination that the runtime parameter is encoded (as discussed above). In some embodiments, at least one processor may replace the at least one encoded runtime parameter with the decoded at least one runtime parameter. Replacing the at least one encoded runtime parameter with the decoded at least one runtime parameter may include accessing an encoded runtime parameter, identifying an encoded runtime parameter, removing an encoded runtime parameter (e.g., from an execution environment, from a workspace, and/or from temporary memory), deleting an encoded runtime parameter, accessing a decoded runtime parameter, identifying a decoded runtime parameter, storing a decoded runtime parameter, or placing a decoded runtime parameter into a place from which an encoded runtime parameter was removed. In some embodiments, the at least one encoded runtime parameter may be replaced with the decoded at least one runtime parameter after and/or in response to determining that the at least one encoded runtime parameter is encoded. In some embodiments, at least one processor may determine if one or more runtime parameters are encoded, and may decode and perform replacement for any encoded runtime parameters (as discussed above), prior to performing other operations, such as splitting a runtime parameter (discussed below), or any other operation discussed herein.

Consistent with disclosed embodiments, at least one processor may split the at least one runtime parameter into at least two parts based on the at least one character. A part of at least one runtime parameter may include one or more of a character, a value, a string, a label, a line of code (e.g., HTML code, browser code, and/or application code), or a semantic HTML element. In some embodiments, a part of at least one runtime parameter may be a text representation of the at least one runtime parameter or a contextual attribute of the at least one runtime parameter (e.g., a source). In some embodiments, a part of at least one runtime parameter may share a characteristic of the at least one runtime parameter. For example, a part of at least one runtime parameter may be associated with a same execution environment as the at least one runtime parameter. Splitting the at least one runtime parameter may include identifying one or more parts of the runtime parameter, identifying one or more characters of the runtime parameter, storing one or more parts of the runtime parameter, generating a data element representing one or more parts of the runtime parameter, or generating data associated with (e.g., overlapping with a portion of, influenced by, and/or having a common characteristic with) at least a portion of the at least one runtime parameter. In some embodiments, splitting the at least one runtime parameter may include using certain characters as points at which to split the at least one runtime parameter into separate parts. For example, at least one process may split the at least one runtime parameter into at least two parts based on the at least one character, which may include using the at least one character as a point at which to split (e.g., a "split point") the runtime parameter into multiple parts, which may not include the at least one character. In some embodiments, at least one runtime parameter may be split at a single point, or at multiple points, which may depend on a number of particular characters included in the at least one runtime parameter. In some embodiments, a runtime parameter may be split based on some types of characters (e.g., a tag opening, a tag closing, a double comma, a quotation mark, and/or a bracket), but not other types of characters (e.g., a slash and/or a period). In some embodiments, the at least one runtime parameter may be converted prior to the splitting. For example, the at least one runtime parameter may be converted (e.g., changed, translated, encoded, decoded) from one format (JavaScript, Unicode, ASCII, 16-bit encoding, 64-bit encoding, unencoded) to another format.

Figures 1A, 5:
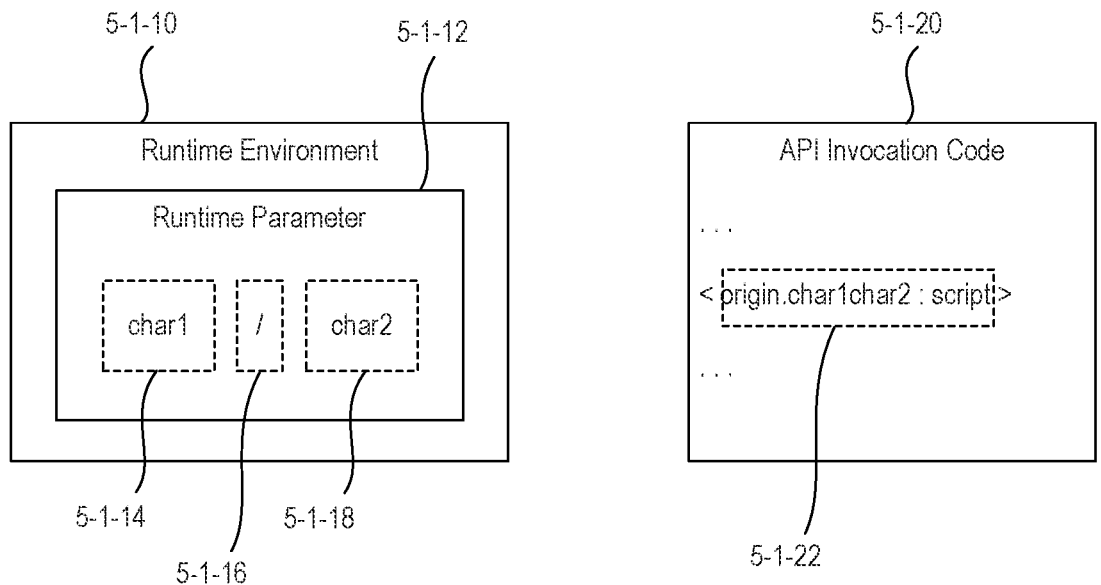

By way of non-limiting example, FIG. 5-1A illustrates an exemplary runtime environment 5-1-10 that includes an exemplary runtime parameter 5-1-12 (of course, any number of runtime environments may include any number of runtime parameters). Runtime parameter 5-1-12 may include one or more characters, such as exemplary character 5-1-14, exemplary character 5-1-16, and exemplary character 5-1-18. In some embodiments, some characters may be used as a split point at which to split a runtime parameter into multiple parts, as discussed above. For example, character 5-1-16, shown as a slash ("/"), may be used as a split point for splitting runtime parameter 5-1-12 into multiple parts. For instance, character 5-1-14, shown adjacent to character 5-1-16, and character 5-1-18, also shown adjacent to character 5-1-16, may constitute parts into which runtime parameter 5-1-12 is split. In some embodiments, a split point may be included within one or more parts into which a runtime parameter is split. For example, runtime parameter 5-1-12 may be split into a first part including exemplary character 5-1-14 and exemplary character 5-1-16, and a second part including exemplary character 5-1-18. Of course, a runtime parameter may be split into any number of parts, which may depend on characters appearing in the runtime parameter, consistent with disclosed embodiments.

Figures 1B, 5:
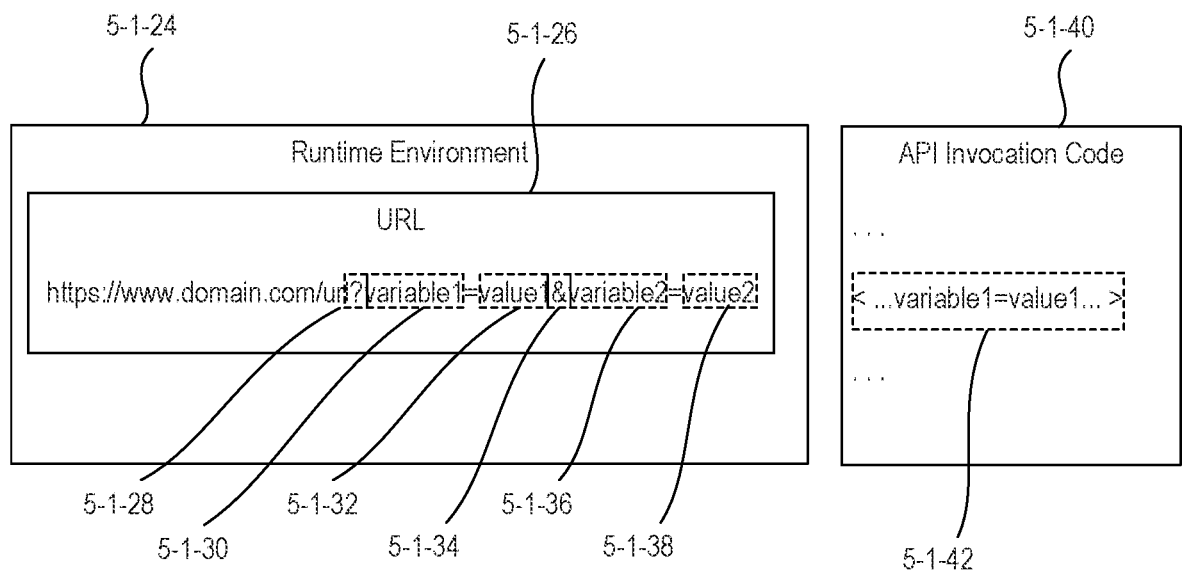
Figures 2, 5:
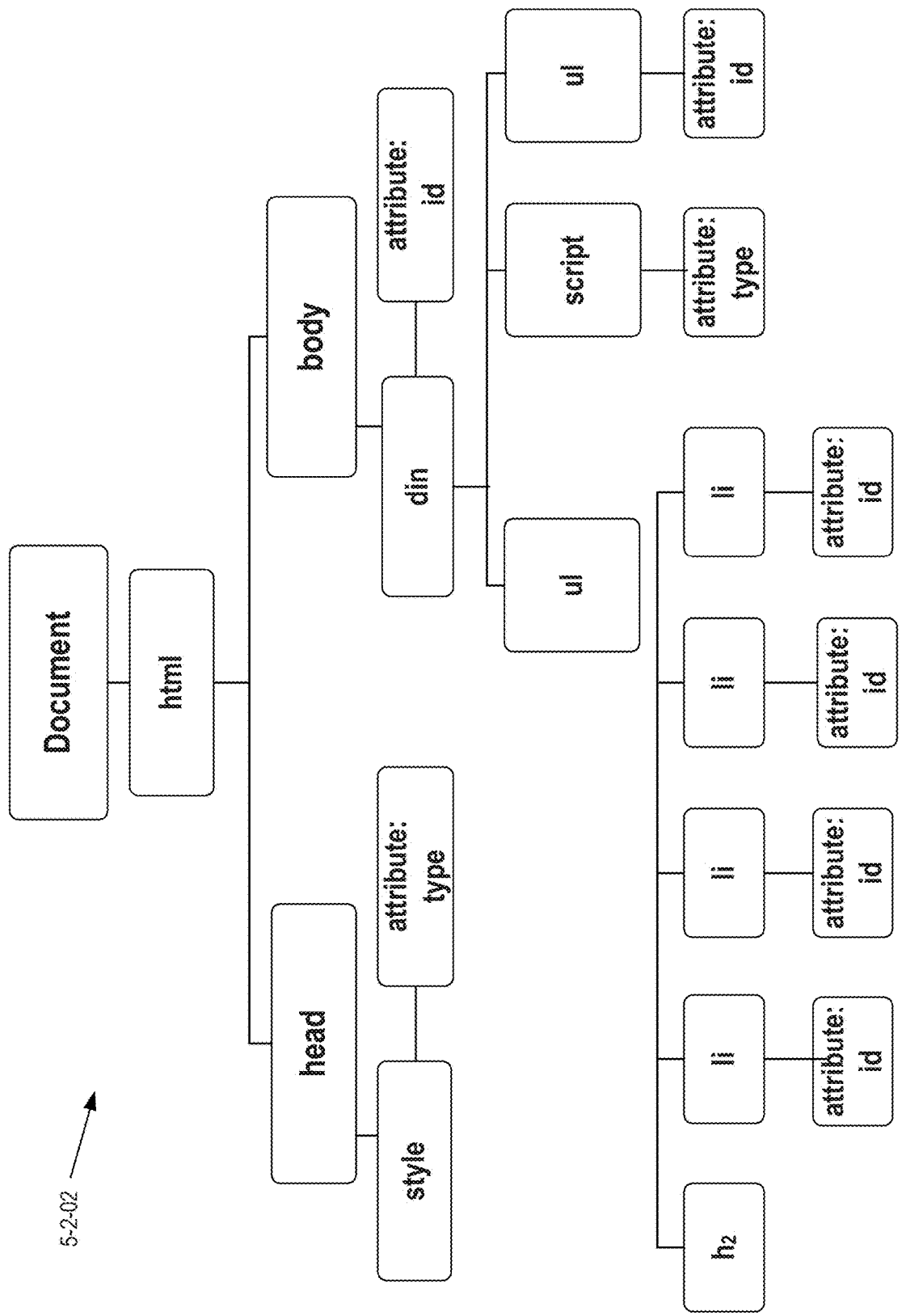
Figures 3, 5:
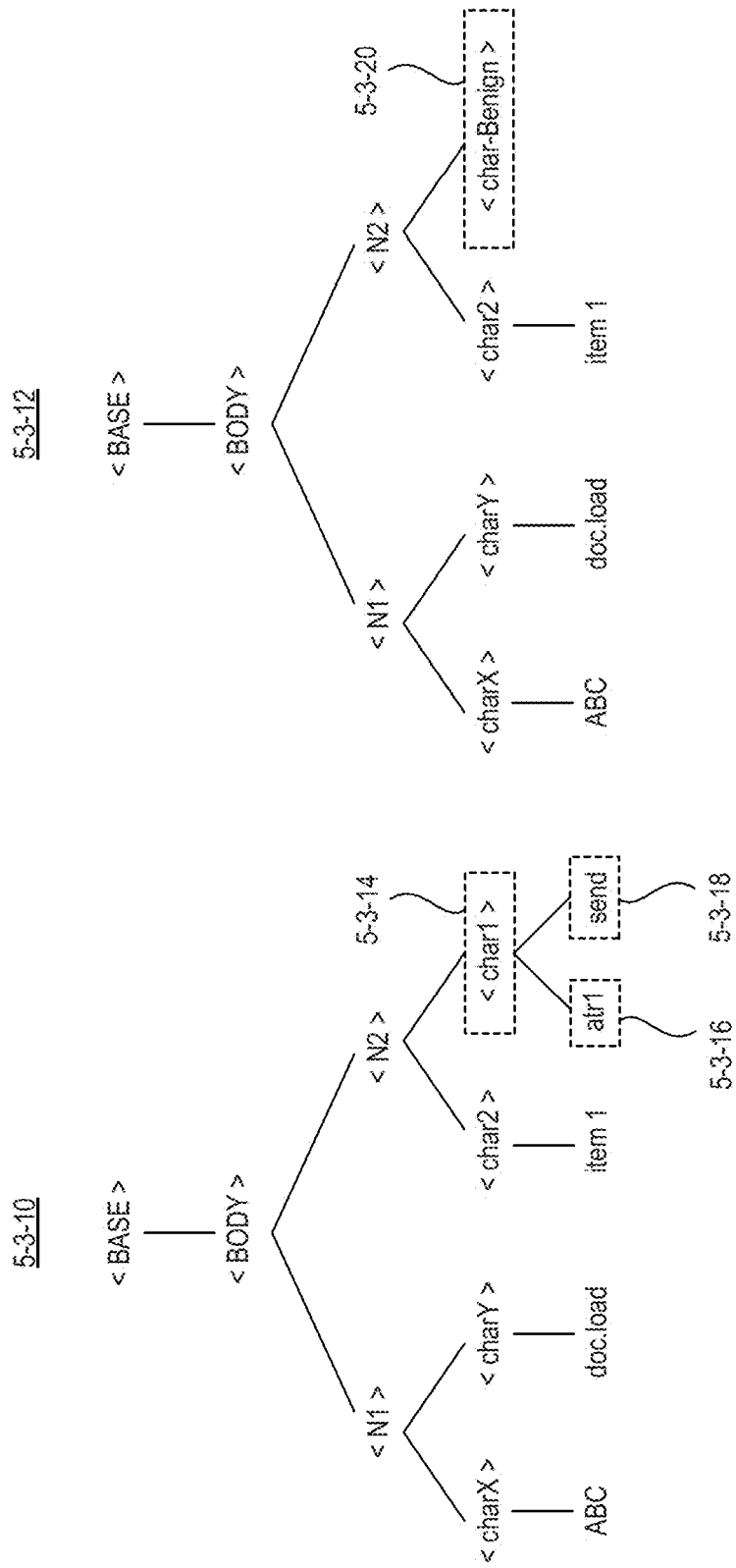
Figure 5:
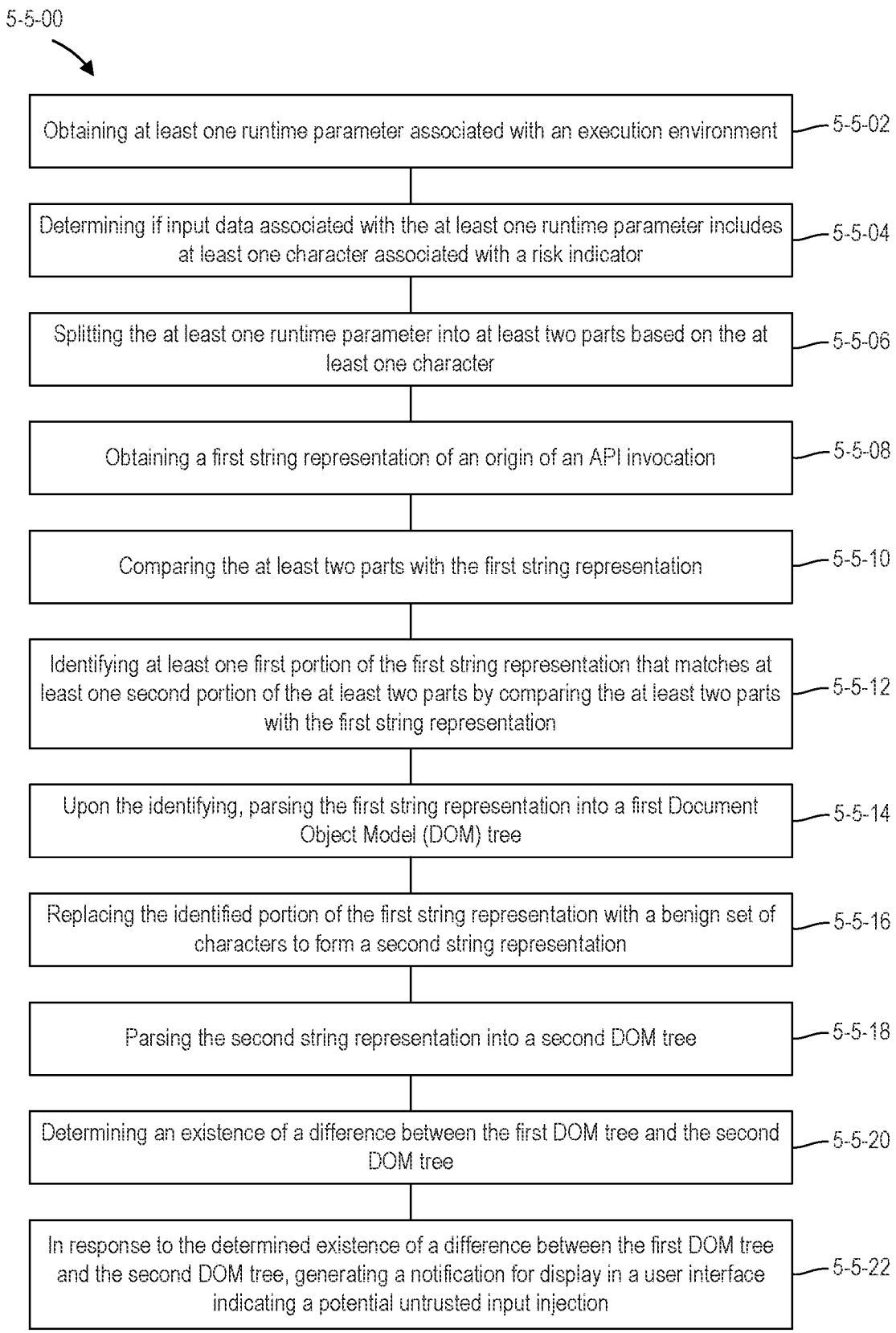
Figures 3, 6:
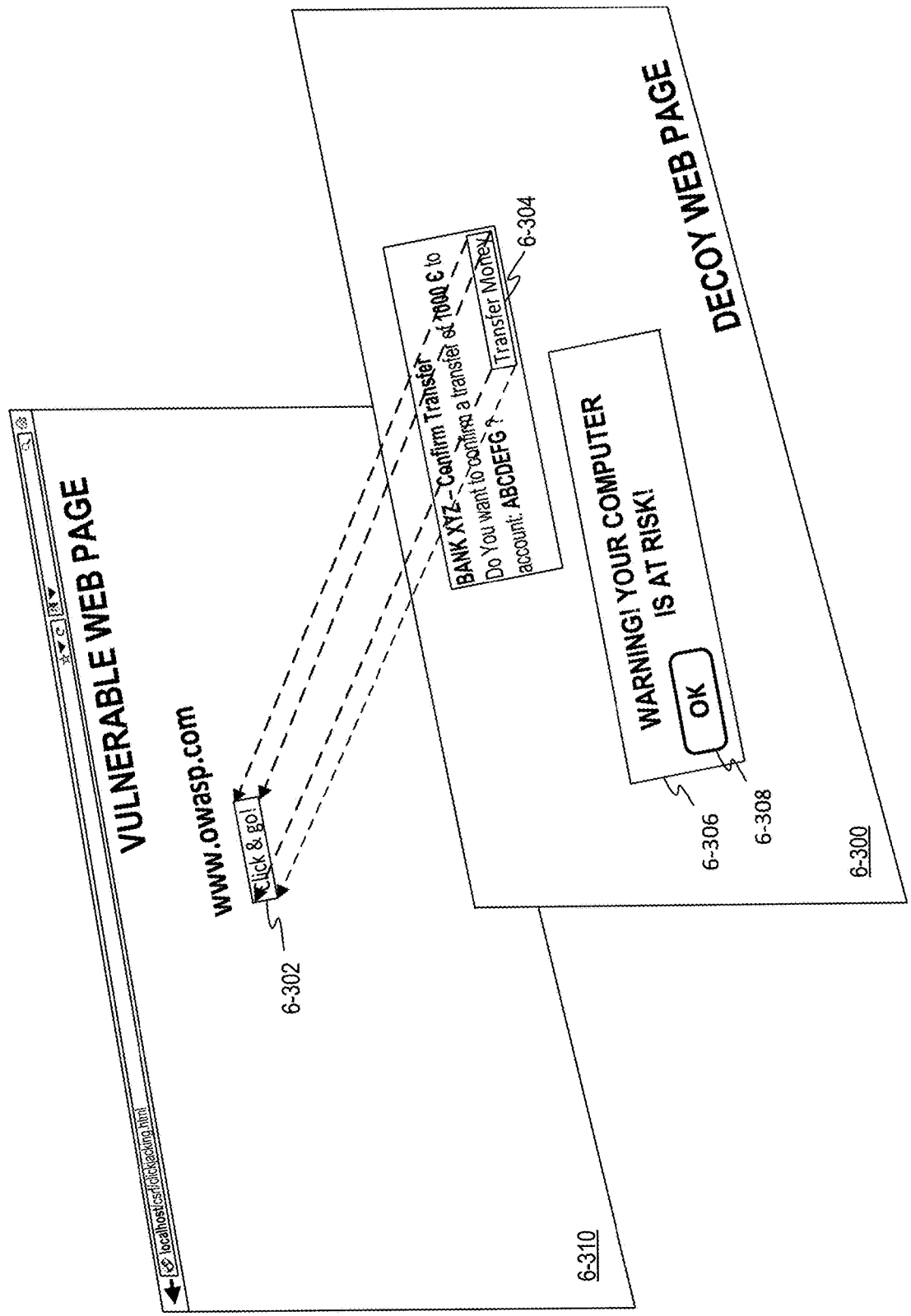
Figures 5, 6:
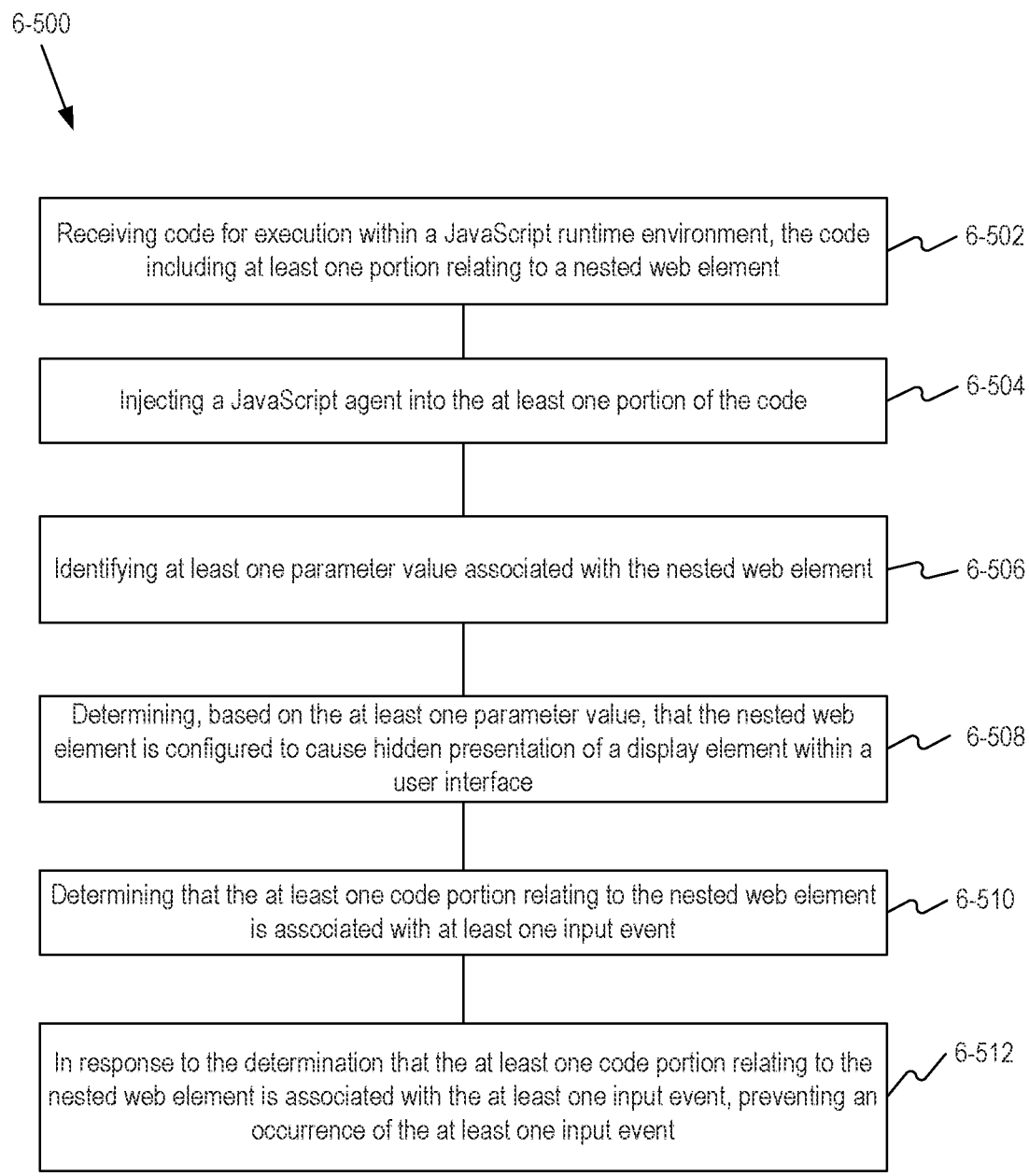

By way of non-limiting example, FIG. 5-1B illustrates an exemplary URL-related runtime environment 5-1-24 that includes an exemplary URL 5-1-26, which may be considered a runtime parameter having a plurality of parts (of course, any number of runtime environments may include any number of runtime parameters). URL 5-1-26 may include one or more characters. For example, URL 5-1-26 includes character 5-1-28 (shown as a question mark, "?"), which may be a start of a query string, and may be used as a split point (as discussed above). URL 5-1-26 also includes a character 5-1-30, which in this example is a parameter name ("variable1"), and a character 5-1-32, which in this example is a parameter value ("value1"). URL 5-1-26 also includes a character 5-1-34, which in this example is a separator ("&"), which may be used as a split point (e.g., between different parts of a runtime parameter). As shown in FIG. 5-1B, may also include a character 5-1-36, which in this example is another parameter name ("variable2"), and a character 5-1-38, which in this example is another parameter value ("value2").

Consistent with disclosed embodiments, at least one processor may obtain a first string representation of an origin of an API invocation. An API invocation may include one or more of a call, an initialization, a request, a command, a prompt, a function, a line of code, or any executable code for using data associated with an API. An origin of an API invocation may include one or more of a tag (e.g., a script tag), a source identifier, a label, an address (e.g., a URL address), a domain name, a webpage identifier, an IP address, or any indicator of an entity associated with (e.g., responsible for) generating, transmitting, receiving, or altering an API invocation. A string representation may include one or more characters (e.g., JavaScript characters, Unicode characters, ASCII characters), words, phrases, symbols, or any amount of text. For example, a string representation of an origin of an API invocation may include a line of text associated with the origin of the API invocation. For instance, a string representation of an origin of an API invocation may include text from a portion of the API invocation itself.

Obtaining a first string representation of an origin of an API invocation may include retrieving code (e.g., HTML code, browser code, and/or application code, any of which may be associated with a browsing session), intercepting the API invocation, suspending execution of code, identifying a portion of the API invocation identifying the origin of the API invocation, and/or serializing a portion of the API invocation. For example, an invocation to a particular API may be identified and suspended from execution and the invocation may be parsed to identify a script tag. The script tag may be serialized into a string (e.g., using the .serialize( ) method), which may be a string representation of an origin of the API invocation from which the script tag was parsed. In some embodiments, obtaining a first string representation of an origin of an API invocation may include converting an API invocation to a particular format (e.g. converting a JavaScript character to an ASCII character, converting an ASCII character to a Unicode character, converting, encoding or decoding a character).

By way of non-limiting example, FIG. 5-1A illustrates API invocation code 5-1-20, which includes an amount of code, including a string 5-1-22, which may indicate an origin of an API invocation and/or may include an API invocation itself. In the illustrated example, string 5-1-22 is shown as a string of several characters of text within a line of code, but it is understood that string 5-1-22 may include any amount of text and/or data, which may indicate an origin of an API invocation. Although API invocation code 5-1-20 is shown separate from runtime environment 5-1-10, it should be noted that, in some embodiments, API invocation code 5-1-20 may be part of runtime environment 5-1-10. In the example of FIG. 5-1A, exemplary character 5-1-14 and exemplary character 5-1-16 may appear within a string 5-1-22 (or separately, in different strings), which may be present in API invocation code 5 1 20.

By of non-limiting example, FIG. 5-1B illustrates API invocation code 5-1-40, which includes an amount of code, including a string 5-1-42, which may indicate an origin of an API invocation and/or may include an API invocation itself. In the illustrated example, string 5-1-42 is shown as a string of several characters of text within a line of code, but it is understood that string 5-1-42 may include any amount of text and/or data, which may indicate an origin of an API invocation. Although API invocation code 5-1-40 is shown separate from runtime environment 5-1-10 it should be noted that, in some embodiments, API invocation code 5-1-40 may be part of runtime environment 5-1-10. As shown in FIG. 5-1B, exemplary character 5-1-30 and exemplary character 5-1-32 (or any combination of characters) may appear within a string 5-1-42 (or separately, in different strings), which may be present in an API invocation code 5-1-40.

Consistent with disclosed embodiments, at least one processor may compare the at least two parts with the first string representation. Comparing the at least two parts with the first string representation may include one or more of accessing textual representations of the at least two parts, generating textual representations of the at least two parts, determining if at least a portion of at least one of the parts matches (or does not match) the first string representation, or determining if at least a portion of at least one of the parts is within (or is not within) a similarity threshold of the first string representation (e.g., includes a predetermined amount of matching characters and/or character sequences).

In some embodiments, comparing the at least two parts with the first string representation may be aided by additional operations. For example, at least one memory may store (e.g., based on operations of at least one processor) the at least two parts of the at least one runtime parameter in a matrix having multiple cells. A matrix may include a table, a chart, a list, a graph, a visualization, or any multidimensional data structure. For example, a matrix may include one or more cells, which may be data containers, data fields, a data unit, or any portion of a data structure capable of holding data. In some embodiments, a cell may be defined by an intersection of a row and a column of a matrix. Storing the at least two parts of the at least one runtime parameter in a matrix having multiple cells may include accessing a matrix, retrieving a matrix (e.g., from a storage medium), requesting a matrix, generating a matrix, placing the at least two parts into a portion of a matrix, or associating the at least two parts with a matrix. For example, the at least two parts may be placed into separate cells of a matrix. For instance, three parts of a runtime parameter may be placed into three cells of a matrix. In some embodiments, a matrix may include parts from multiple runtime parameters, which may be part of the same or different execution environments. In some embodiments, comparing the at least two parts with the first string representation may include comparing the at least a portion of the first string representation with content of each cell in the matrix. Comparing the at least a portion of the first string representation with content of each cell in the matrix may include determining if at least a portion of content in a cell matches (or does not match) the first string representation and/or determining if at least a portion of content in a cell matches is within (or is not within) a similarity threshold of the first string representation (e.g., includes a predetermined amount of matching characters and/or character sequences).

Consistent with disclosed embodiments, at least one processor may identify at least one first portion of the first string representation that matches at least one second portion of the at least two parts. Identifying at least one first portion of the first string representation that matches at least one second portion of the at least two parts may include determining a portion of the first string representation that is the same as, or is within a similarity threshold of, a portion of one of the two parts. For example, the first string representation may include text of "page/x1a," and one of the two parts may include text of "x1a," which may be identified to match the corresponding portion of the first string representation. As another example, the first string representation may include text of "page/x1a," and one of the two parts may include text of "x1b," which may be identified to be within a similarity threshold of meeting a similarity threshold of "x1a," based on the commonality of "x1" within "x1a" and "x1b." In some embodiments, the identifying may be performed by comparing the at least two parts with the first string representation (e.g., as described above). For example, a first part of the two parts may be compared to the first string representation to determine if it matches the first string representation, and a second part of the two parts may be compared to the first string representation to determine if it matches the first string representation. At least one processor may determine that neither, one, or any number of parts of at least one runtime parameter match, or not to match, with a string representation.

Consistent with disclosed embodiments, at least one processor may parse the first string representation into a first Document Object Model (DOM) tree. A DOM tree may include one or more of a programming API, a data structure, an interface, a file, a module, a diagram, or any data representation of a document, such as a web document (e.g., an HTML document and/or HTML file). For example, a DOM tree may model code within an HTML document (which may be associated with a webpage). In some embodiments, a DOM tree may include one or more nodes and one or more connections between nodes. For example, a first node may represent a first HTML element, a second node may represent a second HTML element, and a connection may represent a relationship (e.g., hierarchical relationship, interdependent relationship, and/or dependent relationship) between the first HTML element and the second HTML element. Parsing the first string representation into a first DOM tree may include one or more of dividing the first string representation, identifying at least one portion of the first string representation, generating a DOM tree, accessing a DOM tree, requesting a DOM tree, or representing the first string representation as a DOM tree. For example, at least one processor may divide the first string representation into multiple portions associated with different HTML elements, and may determine relationships between the HTML elements based on syntax associated with the first string and/or modeling of code. Nodes may be generated to represent the different HTML elements, and connections between nodes may be generated, connecting the nodes, to represent relationships between the HTML elements. In some embodiments, parsing the first string representation into a first DOM tree may include using a native browser parser to reparse a string into a DOM tree. In some embodiments, the first string representation may be parsed into a first DOM tree upon the identifying of the at least one first portion of the first string representation to match the at least one second portion of the at least two parts. Parsing a string representation into a DOM tree upon identifying a match may include parsing the string representation into a DOM tree based on an identified match (e.g., such that the DOM tree includes information associated with the match, such as a matching portion of text), in response to an identified match, or after identifying a match.

Consistent with disclosed embodiments, at least one processor may replace the identified portion of the first string representation with a benign set of characters to form a second string representation. A benign set of characters may include one or more values, symbols, letters, digits, punctuations, strings, or any combination of text that is unassociated with a risk indicator. For example, a benign set of characters may include a string of text that is determined to not be present in a set of predefined characters, which may be associated with a degree of cybersecurity risk (e.g., a set of predefined characters as discussed above). Some embodiments may include generating, accessing, and/or storing the set of benign characters. In some embodiments, at least a portion of the benign set of characters (including, for example, a portion of a character itself) may be randomly or pseudo-randomly generated. Some embodiments may include confirming, after generating one or more benign characters, that the one more benign characters are not associated with a risk indicator (e.g., are determined to not be present in a set of predefined characters). Replacing the identified portion of the first string representation with a benign set of characters to form a second string representation may include removing the identified portion from the first string representation and placing the benign set of characters in the place from which the identified portion was removed. For example, at least one processor may determine that a character that is part of the first string representation matches part of a runtime parameter, may remove that character from a place within the first string representation (or a working copy of the first string representation), and may insert a benign set of characters (or a single benign character) into that place. In some embodiments, replacing the identified portion of the first string representation with a benign set of characters generating a new version of the first string representation with the benign set of characters appearing in place of the identified portion. Replacing the identified portion of the first string representation with a benign set of characters may form a second string representation, which may be different from the first string representation (e.g., a version of the first string representation with benign characters appearing in place of any identified matching portions). In some embodiments, such as those where multiple portions of the first string representation are identified to match a portion of a runtime parameter, the same benign character, or a different benign character, may be used to replace the identified portions (e.g., inserted into places from which the multiple portions were removed).

Consistent with disclosed embodiments, at least one processor may parse the second string representation into a second DOM tree. Parsing the second string representation into a second DOM tree may include any aspect discussed above with respect to the first string representation and the first DOM tree. For example, parsing the second string representation into a second DOM tree may include one or more of dividing the second string representation, identifying at least one portion of the second string representation, generating a DOM tree, accessing a DOM tree, requesting a DOM tree, or representing the second string representation as a DOM tree. As another example, HTML elements and relationships may be identified from the second string representation and used to generate the second DOM tree, as discussed above with respect to the first DOM tree.

Consistent with disclosed embodiments, at least one processor may determine an existence of a difference between the first DOM tree and the second DOM tree. A difference between the first DOM tree and the second DOM tree may include a difference in a number of nodes between the first and second DOM trees, a difference in a placement of nodes between the first and second DOM trees, a difference in the content of nodes with the same or similar placement between the first and second DOM trees, a difference in relationships between nodes within the first and second DOM trees, or any configuration of nodes and/or node relationships within the first DOM tree that does not match a configuration of nodes and/or node relationships within the second DOM tree. For example, one DOM tree may have a missing node, an extra, a missing attribute, or an extra attribute, relative to another DOM tree. For example, a first DOM tree may have one node placed at a first level and five nodes placed at a second level, with the second-level nodes all being only related to (e.g., connected to, within the DOM tree) the first-level node, and a second DOM tree may have the same one node placed at a first level, and five notes placed at the second level, but with one of the second-level nodes being only related to (e.g., connected to, within the DOM tree) another second-level, rather than the first-level node, constituting a difference. As another example, a first and second DOM tree may have identical placements of nodes and node connections, but the first DOM tree may have a node that represents (e.g., includes or points to) a URL address of https://safesite.us and the second DOM tree may have a node in a corresponding placement within the second DOM tree that represents (e.g., includes or points to) a URL address of http://unsafesite.org, which may constitute a difference in content between the nodes. Determining an existence of a difference between the first DOM tree and the second DOM tree may include providing the first DOM tree and second DOM tree to an analysis entity (e.g., a local agent or a remote agent), comparing portions of the first DOM tree to portions of the second DOM tree to identify matches or differences (as discussed above) between the portions, or performing any operation to identify a difference (as discussed above) between the first DOM tree and the second DOM tree. In some embodiments, determining an existence of a difference between the first DOM tree and the second DOM tree may include ignoring a difference in content between nodes appearing in the same position of the first DOM tree and the second DOM tree, such as nodes representing initial characters and nodes representing benign characters that replaced the initial characters (e.g., in a second string representation).

In some embodiments, at least one processor may make an additional determination based on the determined existence of a difference between the first DOM tree and the second DOM tree. For example, at least one processor may determine that code associated with the first DOM tree or second DOM tree (e.g., code that is part of or related to a runtime parameter or an origin of an API invocation, HTML code, browser code, and/or application code) is malicious, is anomalous, is unexpected, is associated with a cyberattack, or is associated with a type of cyberattack (e.g., a cross-site scripting attack, and/or an attack from a specific source or entity).

In exemplary FIG. 5-2 a DOM tree 5-2-02 is shown. In this example, DOM tree 5-2-02 shows certain DOM structural elements, including a head element (associated with lower nodes) and a body element (also associated with lower nodes).

By way of a non-limiting example, FIG. 5-3 illustrates exemplary DOM tree 5-3-10 and exemplary DOM tree 5-3-12, each of which include a number of nodes and connections between nodes, which may indicate a relationship between nodes, as discussed above. In some embodiments, exemplary DOM tree 5-3-10 and/or exemplary DOM tree 5-3-12 may have been parsed from a string representation, consistent with disclosed embodiments. For example, DOM tree 5-3-10 may have been parsed from a first string representation and DOM tree 5-3-12 may have been parsed from a second string representation, which may differ from the first string representation, as discussed above. For example, the second string representation may be the same as the first string representation, but with certain characters replaced with benign characters. In the example of FIG. 5-3, node 5-3-14 may represent or include an initial character, which may have been determined to match a part of a runtime parameter, consistent with disclosed embodiments. As shown in FIG. 5-3, node 5-3-14 may be related to other nodes, such as node 5-3-16 and node 5-3-18. For example, node 5-3-16 and node 5-3-18 may be parts of, or depend upon, node 5-3-14. DOM tree 5-3-12 may include a node 5-3-20, which may be in a same or similar position within DOM tree 5-3-12 as node 5-3-14 is within DOM tree 5-3-10. In some embodiments, node 5-3-20 may represent or include a benign character that replaced an initial character, and the initial character may be represented by, or included in, node 5-3-14. In this exemplary depiction, a difference may exist between DOM tree 5-3-10 and DOM tree 5-3-12, which may be determined in accordance with disclosed embodiments. For example, 5-3-14 may be related to node 5-3-16 and node 5-3-18, but node 5-3-20 is not related to similar nodes (e.g., similar in content or position). In some embodiments, at least one processor may implement an action based on such a difference, as discussed herein.

Consistent with disclosed embodiments, in response to the determined existence of a difference between the first DOM tree and the second DOM tree, the at least one processor may generate a notification, which may be for display in a user interface (e.g., configured to be displayed on a display within an interface, as discussed above regarding a user interface). A notification may include text, an icon, a window, a field, a list, a diagram, or any visual indication related to executable code. For example, a notification may include text within a pop-up window overlaid onto a web browser page. In some embodiments, a notification may indicate a potential untrusted code injection, which may include at least one of code added to an execution process, code added within an execution process, unexpected code, an unexpected functionality, a portion of code within an HTML document, code associated with a node of a DOM tree, or any code identified to have a potential to cause an unexpected or malicious effect on a device. Additionally or alternatively, a potential untrusted code injection may include code associated with a difference between DOM trees. For example, a potential untrusted code injection may include at least a portion of the first string representation that was parsed into the first DOM tree, which may be determined to correspond to the difference determined between the first and second DOM trees. In some embodiments, a notification may include any information associated with a potential untrusted code injection, such as an execution environment parameter, an identifier of an origin of an API invocation, or any other data to inform a user of a potential malicious effect implicated by a difference between DOM trees. Generating a notification may include writing code, running code, determining information to include in the notification, or causing the display of visual information at an interface. For example, generating a notification may include displaying a notification at a user device, which may be a device running or attempting to run code associated with the at least one runtime parameter and/or the API invocation. Additionally or alternatively, generating a notification may include displaying a notification at an administrative device separate from a user device. In some embodiments, at least one processor may generate a notification in response to the determined existence of a difference between the first DOM tree and the second DOM tree, which may include confirming or establishing the existence of a difference between the first DOM tree and the second DOM tree and based on its existence and/or based on the difference exceeding a threshold (e.g., a threshold difference between node configurations and/or content), generating the notification.

In some embodiments, other actions, either instead of or in addition to generating the notification, may be taken based on the determined existence of a difference between the first DOM tree and the second DOM tree. For example, at least one processor may designate the origin of the API invocation as a malicious origin, which may include labeling the API invocation as associated with a malicious origin, such as by placing an identifier of the API invocation (such as the API invocation itself) into a table or other data structure identifying malicious API invocations. Additionally or alternatively, at least one processor may block some or all invocations associated with the origin of the API invocation, such as those discussed above (e.g., received from the origin of the API invocation and/or including an identifier indicating the origin of the API invocation). Additionally or alternatively, at least one processor may suspend an execution associated with the at least one runtime parameter, which may be performed in response to the determined existence of a difference between the first DOM tree and the second DOM tree. Suspending an execution may include altering a stack, modifying an HTML document, pausing a process, blocking or closing a webpage, closing a browser, launching a sandbox in which to allow an execution to run, or preventing code associated with an execution environment from executing. For example, at least one process may prevent code associated with the origin of the API invocation from executing in relation to an HTML webpage.

By of non-limiting example, FIG. 5-4 illustrates an example of an execution environment 5-4-02 having alert API code 5-4-04, which triggers display of graphical element 5-4-08 (shown as an alert box), which may be displayed according to an underlying API and/or associated with input data. As shown in this exemplary figure, graphical element 5-4-08 is associated with a string representation of an origin of the API invocation 5-4-06 ("<script type="text/javascript"> alert("javascript inside script tag"); </script>"). In some embodiments, such as when API invocation 5-4-06 is associated with a malicious origin, functionality of the associated graphical element 5-4-08 may be altered and/or blocked. For example, graphical element 5-4-08 may be closed or may have functionality for receiving a user input disabled.

FIG. 5-5 depicts process 5-5-00, represented by process blocks 5-5-02 to 5-5-22. At block 5-5-02, a processing means (e.g., at least one processor 110 in FIG. 1) may obtain at least one runtime parameter associated with an execution environment (e.g., runtime parameter 5-1-12 in runtime environment 5-1-10 in FIG. 5-1), consistent with disclosed embodiments. For example, the processing means may retrieve at least one runtime parameter from memory 114. At block 5-5-04, the processing means may determine if input data associated with the at least one runtime parameter includes at least one character associated with a risk indicator, as discussed above. Consistent with disclosed embodiments, the processing means may compare input data with a reference parameter.

At block 5-5-06, the processing means may split the at least one runtime parameter into at least two parts based on the at least one character, consistent with disclosed embodiments. At block 5-5-08, the processing means may obtain a first string representation of an origin of an API invocation, which may, for example, be represented by or included in API invocation code 5-1-20. At block 5-5-10, the processing means may compare the at least two parts with the first string representation, consistent with disclosed embodiments. At block 5-5-12, the processing means may identify at least one first portion of the first string representation that matches at least one second portion of the at least two parts, such as by comparing the at least two parts with the first string representation, or in any manner consistent with disclosed embodiments. At block 5-5-14, the processing means may parse the first string representation into a first Document Object Model (DOM) tree, such as DOM tree 5-3-10, shown in FIG. 5-3. At block 5-5-16, the processing means may replace the identified portion of the first string representation with a benign set of characters to form a second string representation, consistent with disclosed embodiments. At block 5-5-18, the processing means may parse the second string representation into a second DOM tree, such as DOM tree 5-3-12, shown in FIG. 5-3. At block 5-5-20, the processing means may determine an existence of a difference between the first DOM tree and the second DOM tree, consistent with disclosed embodiments. For example, the processing means may determine a difference in a number, placement, relationships between, and/or content of nodes between the first DOM tree and the second DOM tree. At block 5-5-22, the processing means may generate a notification for display in a user interface indicating a potential untrusted code injection, consistent with disclosed embodiments. For example, the processing means may generate a notification for display in a user interface indicating a potential untrusted code injection in response to the determined existence of a difference between the first DOM tree and the second DOM tree.

User interfaces may be prone to manipulation, including by content redressing or click-jacking, in an attempt to trick users into perform unintended actions. For example, a webpage may be manipulated to include a concealed link or button, which may be, for instance, superimposed over a benign web element, such that performing a user input on the benign web element may launch a cyber threat by the concealed web element. For example, activating the concealed web element (e.g., by performing a click directed to the benign web element but received instead by the concealed web element) may trigger execution of a malicious code for stealing a credential, taking control of a computing device, logging keystrokes, or implementing other cyber threats, problems that arise in the realm of computers, including computer networks. Therefore, there is a need for unconventional innovations to protect against manipulated user interfaces to shield users, systems, devices, and information from cyber threats. Such unconventional approaches may enable detection of a manipulated user interface and prevent activation of a cyber threat.

The unconventional approaches, expressed in the disclosed embodiments, may involve analyzing a code for a webpage to detect a click-jacking attempt. For example, the nested web element may be obscured by a benign web element acting as a decoy. Such a nested web element can launch a cyber threat by deceiving a user to activate the nested element by presenting a trusted visual appear to the user in the form of the benign web element. Thus, disclosed embodiments may involve scanning, parsing, querying, and analyzing a code and/or a runtime version of a code, such as a DOM structure representing a code, to discern a nested web element and any display properties configured to obscure display of the nested web element or another element associated therewith. This unconventional approach may facilitate detecting manipulations to a user interface that may otherwise be undetected. Disclosed embodiments may further involve blocking a user input event intended for the benign web element but deceptively directed to the nested web element, thereby preventing activation of a cyber threat via the nested web element. Thus, various embodiments of the present disclosure describe at least a technological solution, to the technical challenge of protecting against user interface manipulations.

Figures 1, 7:
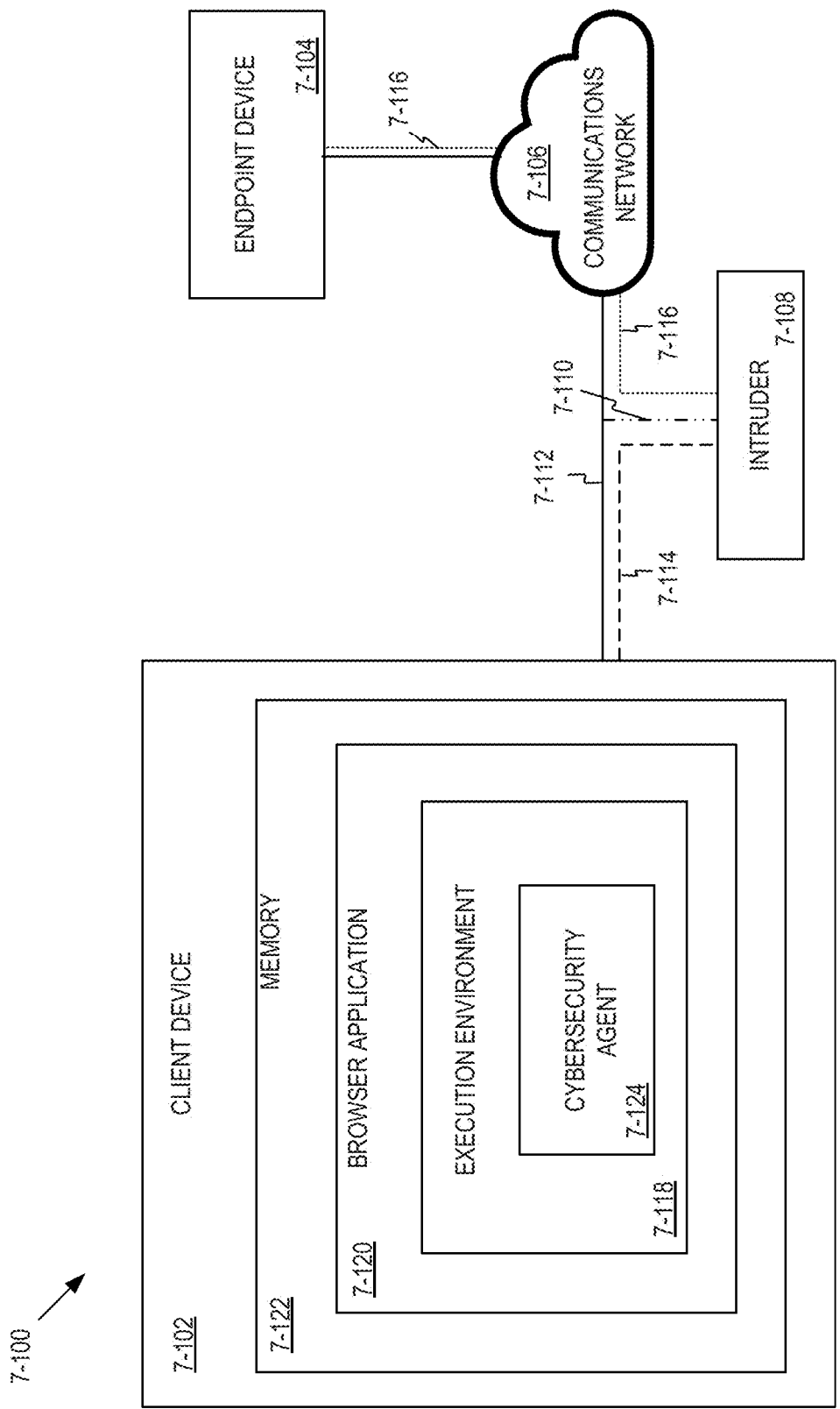
Figures 2, 7:
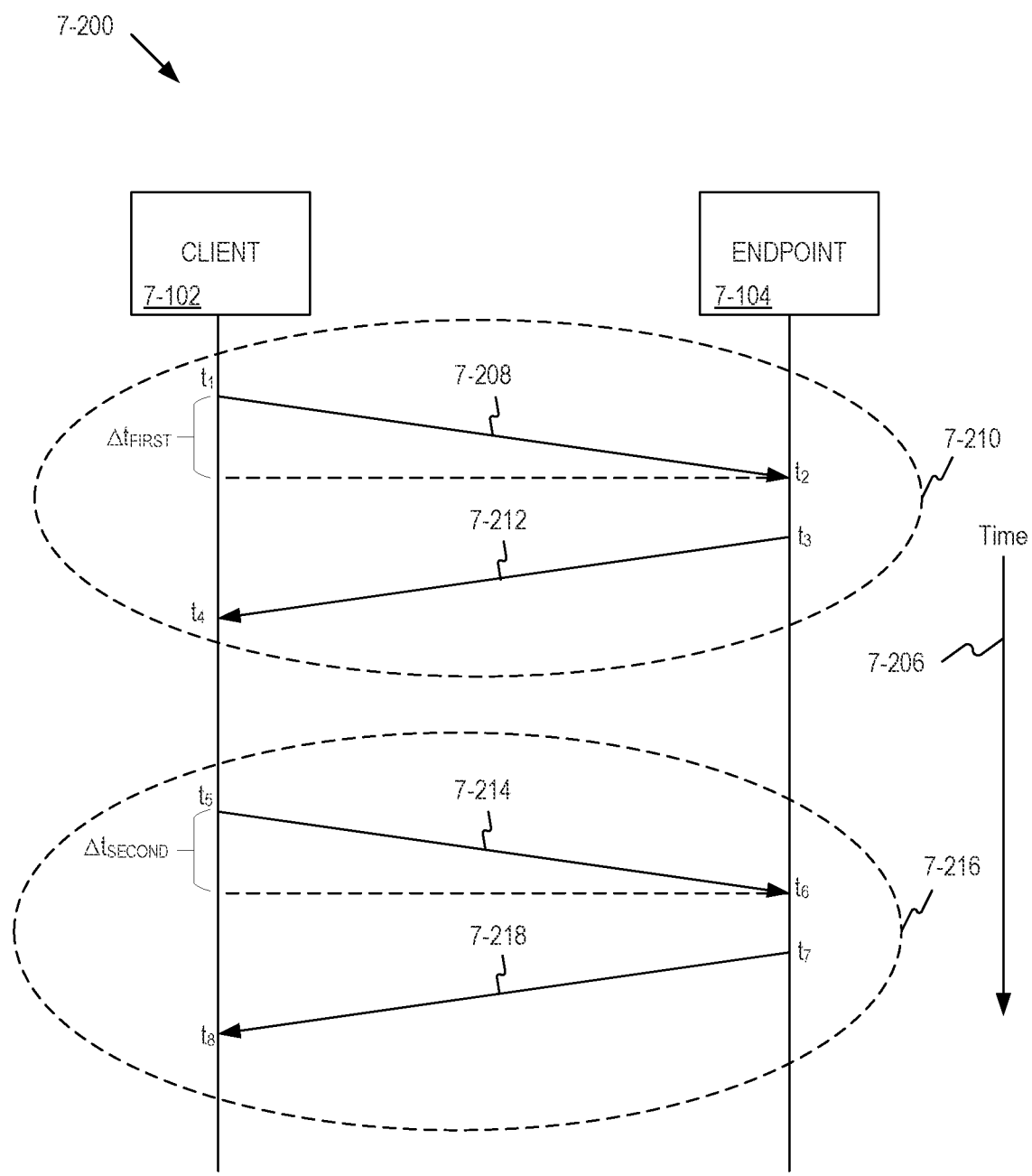
Figures 3, 7:
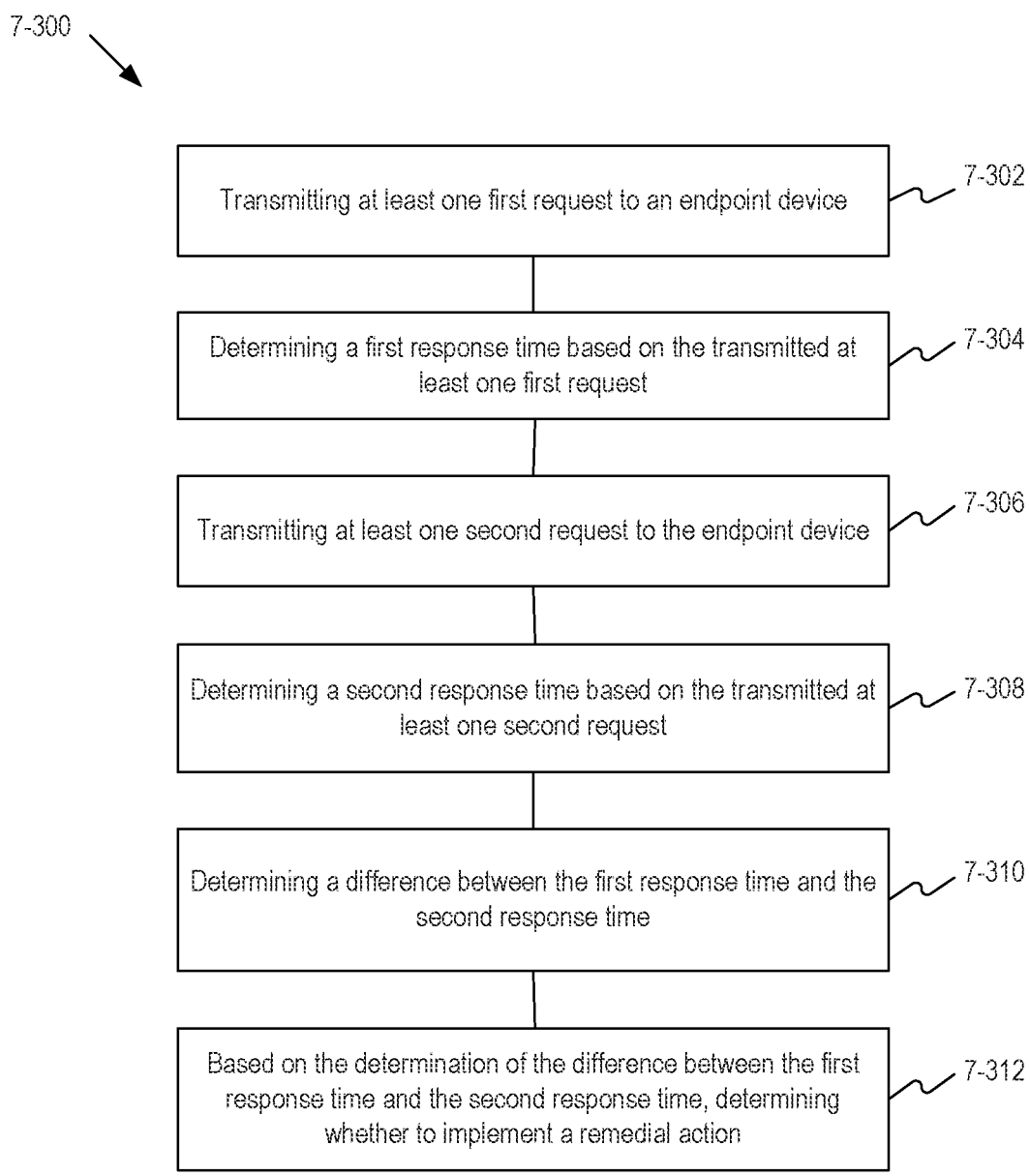

Disclosed embodiments may involve systems, methods, and computer-readable media for performing cybersecurity operations for protecting against a manipulated user interface. The systems and methods described herein may be implemented with the aid of at least one processor or non-transitory computer readable medium, such as a CPU, FPGA, ASIC, and/or any other processing structure(s) or storage medium, as described herein. For case of discussion, when a method is described below, it is to be understood that aspects of the method apply equally to systems, devices, and computer-readable media. For example, some aspects of such a method may occur electronically on a device and/or over a network that is wired, wireless, or both. The method is not limited to a particular physical and/or electronic instrumentality, but rather may be accomplished using one or more differing instrumentalities. In some instances, the description that follows may refer to FIGS. 6-1 to 6-7 which illustrate an exemplary implementation to protect against a manipulated user interface, consistent with some disclosed embodiments. FIGS. 6-1 to 6-7 are intended merely to facilitate the conceptualizing of one exemplary implementation for protecting against a manipulated user interface and does not limit the disclosure to any particular implementation.

Some embodiments involve a non-transitory computer readable medium containing instructions that when executed by at least one processor cause the at least one processor to perform cybersecurity operations. A non-transitory computer readable medium, may refer to physical memory for storing information or data readable by at least one processor, as described earlier. Instructions may refer to program code instructions executable by a computer processor, as described earlier. A processor may refer to a physical device or group of devices having electric circuitry that performs one or more logic operations on an input or inputs, as described earlier. Performing operations may involve executing one or more arithmetic, logical, or inference steps, for example by a computing processor, as described earlier. Cybersecurity operations may include to actions, processes, and/or procedures configured to protect or more computing resources. For example, a cybersecurity operation may protect against information leakage, data corruption, damage to computing resources (e.g., hardware, software, and electronic data), disruption of one or more services provided by a computer system, or any other type of harm inflicted or attempted on a computing resource.

Some embodiments involve receiving code for execution within a JavaScript runtime environment. A code for execution may include at least one instruction, script, module, program, command, function, or any other computing language information readable by at least one processor (e.g., after conversion to object code, machine code, or other readable code) when loaded into a memory of a computing device. Code for execution may also be usable by the at least one processor to perform an operation. Receiving code for execution may include obtaining, detecting, or otherwise gaining access to executable code in a way that is detectable by or understandable to a processor, as described earlier. Receiving code for execution may also include establishing a connection with another device, querying another device or memory, and/or requesting code for execution. For example, a device of the at least one processor may establish a connection with another device, and may receive code for execution from that device. Additionally or alternatively, at least one processor may receive code for execution from memory (e.g., local memory). A JavaScript runtime environment may refer to a subsystem within a computing device where a computer program (e.g., including program code instructions) may be executed and/or an execution environment (as discussed above) that involves live (e.g., runtime) JavaScript code. A JavaScript runtime environment may include a region in dynamic memory (e.g., cache memory and/or RAM) allocated for executing a JavaScript code. The region of dynamic memory for the JavaScript runtime environment may be included within a region of dynamic memory (e.g., a larger region) allocated for a executing a browser application, and may include a call stack (e.g., to schedule tasks for execution by a processing device), a heap memory (e.g., for storing data during execution of a JavaScript code), and an event loop (e.g., to handle communication for interactive content via an event listener and/or an event handler. A JavaScript runtime environment may include computing infrastructure (e.g., hardware and software resources) needed to execute one more program code instructions compatible with a JavaScript engine (e.g., configured with the JavaScript runtime environment), such as HTML, CSS and/or JavaScript instructions. For example, the JavaScript engine may be configured to parse, interpret, and convert one or more of the program code instructions to machine-readable code, perform validation checks, allocate memory, schedule processor (e.g., CPU) time, and link libraries to execute the machine-readable code. Examples of JavaScript runtime environments include a JavaScript compatible browser application and Node. Thus, a computing device configured with a JavaScript runtime environment, such as a JavaScript compatible browser application, may obtain a code for execution.

Some embodiments may involve the code including at least one portion relating to a nested web element. A portion (e.g., of code) may refer to section or part of a code (e.g., one or more instructions, declarations, definitions included in a code). For example, a portion of code may be subset of a larger portion of code, such as a function within a group of instructions. Additionally or alternatively, a portion of code may be a set of code that is distinct (e.g., runnable while separate from) another set of code. A portion of code may be associated with a particular functionality, use, context, or any other abstracted classification for a section of code. A portion of a code may correspond to one or more functions, procedures, methods, data definitions, declarations, metadata, comments, web elements, or any other section of computer language. A portion of code may include a single instruction (e.g., on a single line of code) or multiple instructions and may be included in a single file or document or distributed among multiple documents or files. A web element may refer to a distinct section of code (e.g., HTML, CSS, and/or JavaScript code) associated with a webpage (e.g., corresponding to a section of a webpage). A web element may be delineated inside a code with at least one tag (e.g., defining the portion of the code associated with the web element with angular brackets "<" and ">"). In some embodiments, a web element may be delineated using paired tags (e.g., container tags), such as an opening tag and a closing tag (e.g., each including a pair of angular brackets). In some embodiments, a web element may be delineated using a single tag (e.g., a single opening tag). In some embodiments, a web element may be delineated using a single opening tag and a self-closing tag (e.g., "/>"). The delineating tag or tags may indicate the type of web element. For example, a paragraph web element may be delineated between opening and closing paragraph tags (e.g., <p> and </p>) and a link element may be delineated between opening and closing link tags (e.g., <a> and </a>). Non-limiting examples of web elements may include links, paragraphs, headings, numbered and bulleted lists, tables, regions (e.g., of a webpage), images (e.g., including videos), form controls (e.g., including buttons, edit fields, check boxes, combo boxes, list boxes), scroll bars, sections, and any other content containable within a webpage (e.g., content delineated with at least one tag, such as by having an opening and closing angular bracket).

A code relating to a web element may include instructions and/or definitions associated with the functionality, behavior, and/or appearance of a web element. In some embodiments, for example, an identifier (e.g., a class type, a web element type, a unique identifier for a specific web element, or any other type of identifier) may be associated with a web element allowing to include code affiliated or affecting the web element in other sections of a webpage code, e.g., external to the opening and closing tags delineating the web element. For example, a code for a webpage may include different sections or files for HTML code, CSS code, JavaScript, and/or Python code, that together, form the code for the webpage. The HTML section may include web element definitions, e.g., delineated with at least an opening tag. In some embodiments, HTML code may be included between opening and closing container tags for a web element (e.g., after the closing angle bracket ">" of the opening tag, and before the opening bracket "<" of the closing or self-closing tag). In some embodiments, HTML code may be included inside an opening tag for a web element (e.g., between the angular brackets "<" and ">" of an opening tag). For example, a class type, unique identifier, format setting, or other inline code may be inserted inside a tag for a web element. The CSS section may include definitions for display attributes for one or more web elements, such as size, color, font style, centering, margins, background color. The JavaScript section may define the behavior and functionality for dynamic or interactive web elements, e.g., in response to a user input. For example, a button web element may include HTML code defining or declaring the button (e.g., delineated by <button> and </button> tags), CSS code defining display properties for the button (e.g., delineated by a ".button" tag and positioned between two parentheses: { }), and JavaScript code defining the interactive behavior of the button (e.g., as a procedure called in response to a click event defined for the button. In some embodiments, code related to a web element may include computer language following an opening tag for the web element (e.g., HTML code), as well as code separate (e.g., not following) the opening tag for the web element (e.g., CSS, JavaScript, Python, or any other browser-enabled code) linked (e.g., related) to the web element using an identifier included after the opening tag (e.g., HTML code) of the web element.

For example, an HTML section of a webpage code may define a header element using at least a first portion of an opening tag (e.g., <h1) and a unique identifier (e.g., "MainHeader") allowing to reference the header element from the other (e.g., CSS, Javascript,) code sections. For instance, the following HTML code may declare a header with the unique identifier "MainHeader":

<h1 id="MainHeader">Main Header Text</h1>

A CSS code section may define one or more display settings for the header web element by referencing the unique identifier "MainHeader" (e.g., defined in the HTML code), e.g.:

```
#MainHeader {
    text-align: center;
    Font-weight: bold;
}
```

A JavaScript code may also include one or more instructions for the header web element (e.g., to make the header interactive in response to a user click event) by referencing the unique identifier:

document.querySelector('#MainHeader').addEventListener('click' . . . ;

Thus, the code related to a web element may include HTML instructions following an opening HTML tag for the web element, as well as any CSS, JavaScript, and/or Python instructions referencing an identifier defined in the HTML section.

A nested web element may refer to a web element (e.g., a child web element) contained within, or referenced by, another web element (e.g., a parent web element). For example, a child web element may be defined within the opening and closing tags of a parent web element. As a more specific example, a list including multiple (e.g., nested) links may be defined in an HTML code section with an opening tag (e.g., <li>) for the list (e.g., parent) element, followed by multiple links (e.g., nested child elements), each delineated with a pair of opening and closing tags (e.g., <a> and </a>), and ending with a closing tag for the list element (e.g., </li>), such that the child link elements are included or contained (e.g., nested) within the opening and closing tags of the parent list element. The following exemplary code snippet:

```
<ul>
<li>first </li>
<li>second </li>
</ul>
``` defines two ordered list elements (e.g., first and second, each delineated with a pair of opening and closing ordered list tags, <li> and </li>), nested inside an unordered list element (e.g., delineated with a pair of opening and closing unordered list tags, <ul> and </ul>).

In some embodiments, the nested web element is a nested execution context element. An execution context may refer to a process, a program, an application, a frame, a file, a function, a container, a module, a call (e.g., an API call), one or more lines of code, a parameter, an argument, or any computerized information defining or influencing the computing environment in which a process runs. In some embodiments, an execution context may store information about the environment of code currently being executed (or code to be executed), such as a scope defining which variables, objects, parameters, and/or functions are accessible, regions of memory that have been allocated, or any other computerized parameter that may influence code execution. A nested execution context may refer to a second (e.g., local or child) execution context invoked by (e.g., within) a first (e.g., global or parent) execution context. In some embodiments, the scope of any computerized information defining or influencing the computing environment of the child execution context may be contained within the scope of the parent execution context. Also, computerized information defining or influencing the computing environment of the parent execution context (e.g., declared, defined, or invoked within the parent execution context) may be inherited by (e.g., available or applied to) the child execution context. For example, invoking a second function inside a first function associated with a first execution context may cause a second execution context to be created inside (e.g., nested within) the first execution context for executing the second function. A nested execution context element may refer to an element, as described earlier, defined, declared, referenced by, or otherwise associated with a nested execution context, such that information for the element may be included in the computerized information for an execution context contained inside another execution context. For example, a button element declared inside a second (e.g., nested) function may be allocated to memory associated with a second (e.g., nested) execution context (e.g., residing inside a first execution context).

In some embodiments, the nested web element may be an iframe. An inline frame, or iframe, may refer to an element (e.g., an HTML element) configured to serve as a container for web content. For example, an iframe may allow loading a second webpage (e.g., an HTML child webpage) within a first webpage (e.g., a parent webpage) by displaying the second webpage inside the iframe web element. As another example, an iframe may allow embedding a video or interactive content stored in a different document inside a parent webpage.

In some embodiments, the nested web element is a cross origin web element. An origin may refer to a website, domain, scheme, or port for storing a computing resource (e.g., a document, a file, a web element, a script, or a code). For example, an origin may be a specific computing device (e.g., server). A cross origin may refer to an origin other than an origin (e.g., a computing device) running a browser application loading a code for execution. A cross origin element may refer to an element (e.g., as described earlier) stored on a different origin (e.g., a different computing device) from which a code referencing the element is running. For example, an element stored on a second computer referenced by a code running on a first computer may be a cross origin element, requiring a browser application running on the first computer to fetch the element from the second computer.

A portion relating to a nested web element may include any instructions, definitions, and/or declarations included in a code associated with a web element that is nested within another web element. Such a portion may include HTML, CSS, JavaScript, and/or Python code affiliated with a web element (e.g., a child element) defined or declared after an opening tag of another (e.g., parent) web element. For example, in the code snippet:

```
<form method="get" action="https://www.MyWebSite.com/">
<button type="submit">Continue</button>
</form>
```

Code appearing after the first portion of the opening tag (e.g., "<button") and before the closing tag (e.g., "</button>") for the button element may relate to a button web element nested inside a form web element. CSS code defining display properties for the nested button element and/or JavaScript or Python code defining interactive behavior for the nested button element may also be included in the portion of code related to a nested web element.

By way of a non-limiting example, FIG. 6-1 illustrates an exemplary webpage code 6-100 for rendering a webpage (e.g., a webpage code), executable within a JavaScript runtime environment, consistent with some embodiments of the present disclosure. Webpage code 6-100 may include a declaration for an iframe web element 6-102 nested within another web element 6-104. Web element 6-104 may correspond to a web page manipulated to trick a user to interact with nested web element 6-102 and thereby unintentionally activate a malicious code. HTML code related to nested web element 6-102 may be delineated between opening and closing <iframe> and <iframe> tags, included within a pair of <div> and </div> tags delineating manipulated web element 6-104, which may be a webpage. For example, iframe web element 6-102 may cause a separate execution context to be created (e.g., nested) within the main execution context for webpage code 6-100. Button 6-202, declared inside nested web element 6-102 (e.g., an iframe web element) may be a nested execution context element.

The HTML code relating to nested web element 6-102 may include code for a vulnerable web page (e.g., accessible via a link 6-106 "https://vulnerable-website.com"), as well as a unique identifier (e.g., "Vulnerable_Page") for including in webpage code 6-100 additional code related to nested web element 6-102, external to the opening and closing <iframe> and <iframe> tags. The link "https://vulnerable-website.com" may include a cross origin web element, such that executing the code for nested web element 6-102 (e.g., an iframe web element) may cause a browser application (e.g., browser application 216 of FIG. 2) to fetch the cross origin web element from the vulnerable-website domain. For example, browser application 216 may run on computing device 102 (FIG. 6) and fetch a cross origin element from a webpage server (e.g., host server 106) via communications network 108.

CSS code portion 6-108 may define display settings for nested web element 6-102 using the unique identifier "Vulnerable_Page", and CSS code portion 6-110 may define display setting for web element 6-104 using the unique identifier "Decoy_Page." The display settings in CSS code portion 6-108 may obscure the display of nested web element 6-102 to trick a user into unintentionally interacting with the vulnerable web page when attempting to interact with the decoy web page. Thus, code portions of webpage code 6-100 related to nested web element 6-102 may include any HTML code portion delineated between the opening and closing tags for nested web element 6-102, as well as and CSS code portion 6-108 (e.g., referencing an identifier included between the opening and closing tags).

Some embodiments involve injecting a JavaScript agent into the at least one portion of the code. The term "JavaScript agent" may refer to a software agent configured to perform one or more cybersecurity operations to protect one or more computing resources, as described earlier, where the runtime environment is a JavaScript runtime environment. The operations performable by the JavaScript agent may include calculating, comparing, executing, or otherwise implementing one or more arithmetic, mathematic, logic, reasoning, or inference steps. The JavaScript agent may be configured to detect one or more vulnerabilities affecting a computing resource. For example, the JavaScript agent may perform one or diagnostic and/or analytical tests on a code to detect if the code includes a vulnerability. The vulnerability may relate to a location in memory (e.g., local and/or remote memory, static and/or dynamic memory), a processing device, a communications channel, and any other computing resource that may be affected by executing code. The JavaScript agent may be configured to determine the type of vulnerability, for example, by referencing a library (e.g., local and/or remote) of known vulnerabilities, and/or performing one or more tests (e.g., validation, authentication, authorization tests) to indicate a vulnerability. The JavaScript agent may be configured to determine one or more mitigating actions to thwart the vulnerability from harming a computing resource and/or take a mitigating action. For example, the JavaScript agent may backup data, prevent and/or suspend an execution of a code or access to data, and/or issue an alert. In some embodiments, the JavaScript agent may detect a vulnerability statically, e.g., by analyzing a code (e.g., a runtime version of a code, such as a DOM representation of a code) prior to a processor executing the code in the runtime environment. For example, the JavaScript agent may parse sections of the code (and/or query or search sections of a runtime version of a code, such as a DOM representation of a code) and compare one or more code sections to a library or database of known vulnerabilities. In some embodiments, the JavaScript agent may detect a vulnerability dynamically, e.g., by emulating or simulating an execution of one or more portions of the code in an insulated runtime environment (e.g., a sandbox) and monitoring one or more computing resources during the simulation. In some embodiments, detecting a vulnerability dynamically may involve observing execution of code within a live, non-insulated runtime environment. In some embodiments, the JavaScript agent may perform a cybersecurity operation by enlisting a machine learning and/or artificial intelligence algorithm. In some embodiments, the JavaScript agent may perform a cybersecurity operation by enlisting one or more resources provided by a remote server (e.g., a cybersecurity server), e.g., via a secure or dedicated communications link.

Injecting a JavaScript agent into the at least one portion of the code may include inserting or adding one or more instructions for performing one or more cybersecurity actions into the portion of the code (e.g., relating to the nested web element) such that when a processor executes the code, the processor may execute the inserted instructions (e.g., prior to, or instead of, portions of the code itself) and thereby implement the one or more cybersecurity actions of the JavaScript agent. For example, a webpage code may be stored in one or more editable documents (e.g., a separate editable text file for each of the HTML, CSS, and JavaScript code sections for a webpage). The webpage code may be modified by editing one or more of the documents (e.g., by inserting, deleting, and/or change one or more instructions stored therein) and saving the changes such that when the modified webpage code is loaded into memory, a processor may execute the code for the JavaScript agent inserted into the webpage code. In some embodiments, a cybersecurity application configured with a web browser may automatically edit a webpage code and insert (e.g., inject) instructions to implement the JavaScript agent. In some embodiments, code for the JavaScript agent may be inserted into a top portion of the code, e.g., to cause execution of the instructions implementing the JavaScript agent before other portions of the code are executed. In some embodiments, the JavaScript agent may be injected by invoking a procedure, e.g., stored on the same or different computing device, such as a remote cybersecurity sever. In some embodiments, code for implementing the JavaScript agent may be retrieved from a cybersecurity server and copied into a code portion related to the nested web element, e.g., between the opening and closing tags delineating the nested web element.

For example, in some embodiments, a JavaScript agent may be injected into multiple execution contexts (e.g., every execution context) created for a code (e.g., for every web page and/or iframe within a web page). In some embodiments, if multiple iframes share a same origin or if an iframe is blank, a top-most agent instance may patch nested iframe windows, e.g., to avoid creating a new agent instance. In some embodiments, if a JavaScript agent may be unable to access an iframe window (e.g., the iframe is a cross-origin iframe), a delivery vector may inject a JavaScript agent. In some embodiments, a JavaScript agent injected into a currently execution context may perform an initial check to detect an origin of the currently executing context and may communicate with a topmost JavaScript agent using telemetry. For example, code inside a cross-origin iframe may not escape the iframe, so an invisible iframe may not be detected from within an iframe. Similarly, code external to an iframe may not access an iframe context, so a click event inside an iframe may not be detected from the outside. However, instantiating a JavaScript agent in all execution contexts may allow a parent (e.g., topmost) JavaScript agent to detect an invisible iframe, and inform a JavaScript agent instantiated inside the iframe that the iframe may be hidden. The JavaScript agent instantiated inside the iframe may detect an input event (e.g., a key press or click) and determine a click-jacking attempt based on a user interaction with a hidden iframe. In response to the detection, the JavaScript agent may abort the input event and/or generate a suitable alert.

By way of a non-limiting example, reference is now made to FIG. 6-2, which illustrates an exemplary code for implementing a JavaScript agent 6-200 to protect against a manipulated user interface, consistent with some embodiments of the present disclosure. The code for JavaScript agent 6-200 may be inserted immediately after a <head> tag of web page code 6-100 (e.g., injected) and/or within web element 6-102 (which may be an iframe or iframe element), nested within web element 6-104. For example, a cybersecurity application residing within a JavaScript runtime environment executing webpage code 6-100 may insert the code for JavaScript agent 6-200 after the <head> tag of web page code 6-100 and/or within web element 6-102 (which may be an iframe or iframe element) by editing a text document storing webpage code 6-100.

Some embodiments involve identifying at least one parameter value associated with the nested web element. A parameter may refer to a variable property or attribute, that when set (e.g., defined) may affect the operation of a computer program. A parameter value may refer to a specific setting assigned to a variable (e.g., a definition), which may affect a specific aspect of the operation of a computer program. A parameter value may be a number, a binary value, a string value, an array of values, or an object (e.g., for storing multiple types of settings), a combination thereof, or any other data that may affect the operation of a computer program. A parameter value may be set as a declaration or definition in a code, by invoking a function, in response to an event, or any other technique for associating data (e.g., a value) with a variable (e.g., a placeholder for a value). A parameter value for a webpage code may be defined in CSS, HTML, and/or JavaScript code, and/or a runtime version of a webpage code (e.g., a DOM representation of a webpage code) for example to define a display property for a web element, an interactive behavior for a web element, a resource allocation for a web element, or any other aspect associated with the webpage code.

In some embodiments, the at least one parameter value relates to a display characteristic. A display characteristic may refer to an attribute or property affecting the appearance of content rendered visually on an electronic screen. For example, a parameter value relating to a display characteristic may define a position for displaying a web element on a webpage (e.g., relative or absolute), a size, a foreground color, a background color, a border/no border, a margin, an alignment, a font, an opacity level, a transparency level, a priority or index level (e.g., when multiple web elements are layered), or any other setting affecting the display of a web element. A parameter may be a configured to be assigned a value belonging to a set of preconfigured values, or data types. For example, the CSS background-color parameter may be assigned to a color defined within a color space of a display device (e.g., from a predefined list of colors), and a length parameter for a web element may be assigned a numerical (e.g., integer) value indicating a number of pixels used to display the web element lengthwise. In some embodiments, a display characteristic for a web element may be manipulated to conceal or obscure the web element.

By way of a non-limiting example, in FIG. 6-1, CSS code portions 6-108 and 6-110 may define display characteristics for web element 6-104 and nested web element 6-102.

In some embodiments, the display characteristic is an opacity property. An opacity property may refer to the degree to which content displayed behind a web element (e.g., in a layer beneath the layer for the web element) is concealed. An opacity property may be opposite to a transparency property indicating the degree to which content displayed behind a web element is visible. For example, an opacity property for a web element may be a value that defines an amount of transparency for the web element. By way of more specific example, an opacity value may be a value between 'zero' and 'one', where a value of 'one' may cause complete opacity (e.g., total blocking of content displayed behind the web element) and a value of 'zero' may cause complete transparency (e.g., total visibility of content displayed behind the web element).

By way of a non-limiting example, in FIG. 6-1, CSS code portion 6-108 may define an opacity level of 'zero' for the Vulnerable_Page nested web element 6-102 (e.g., in a DOM representation of webpage code 6-100), causing content associated with nested web element 6-102 to be hidden such that a user viewing a webpage associated with webpage code 6-100 may only see content associated with web element 6-104 (e.g., Decoy_Page).

In some embodiments, the display characteristic is associated with a size property. A size property may refer to a region of an electronic display device allocated for a web element. A size property may have an absolute value (e.g., defined in pixels) or a relative values (e.g., defined as a percent of a block or frame containing a web element). A size property may be defined for a height and/or width of a web element. A size property for a specific web element may be defined in a CSS code section for a webpage by referencing an identifier for the specific web element. Alternatively, a size property for a web element may be inherited from a parent element, set as an inline HTML instruction, or set inside a JavaScript procedure. For example, the size for a web element may be smaller than another, larger, web element such that superimposing the display of the smaller and larger web elements may cause the smaller element to be blocked by the larger web element.

By way of a non-limiting example, in FIG. 6-1, CSS code portion 6-108 (e.g., included in a DOM representation of webpage code 6-100), may define the size for nested web element 6-102 (e.g., Vulnerable_Page) as 100 by 100 pixels, and CSS code portion 6-110 may define the size for web element 6-104 (e.g., Decoy_Page) as 200 by 200 pixels, which is larger than Vulnerable_Page, such that the display of the Vulnerable_Page may be concealed by the Decoy_Page.

In some embodiments, the display characteristic is associated with a color property. A color property may refer to an amount of a hue, an amount of a tint, an amount of a saturation, an amount of lightness, an amount of chroma, a value (e.g., according to hue, saturation, value, or HSV), a pixel position (e.g., within a display area), or any combination thereof (e.g., HSV or hue, saturation, lightness, or HSL). For example, a color property may include a specific combination of red, green, and blue levels of light (e.g., defining a hue within a color gamut of an electronic display) emitted by a set of sub-pixels of a single display pixel of an electronic display. A color may additionally include black and/or white tones to affect the value (e.g., darkness or whiteness of a color displayed by a pixel). A tint of a color may refer to an amount of white light displayed by a pixel, a tone may refer to an amount of grey displayed by a pixel, and a shade may refer to an amount of black displayed by a pixel. Saturation of a color may refer to the brilliance or intensity of the color (e.g., an absence of white, grey or black displayed by a pixel). A color may be defined for a foreground or fill attribute for a web element (e.g., as the interior of a shape), a background (e.g., external to and surrounding the web element), a border framing a web element, text, or any other display aspect of a web element. A color may be specified using a predefined color name, or using numerical values for RGB (e.g., red, blue, and green levels), RGBA (e.g., red, blue, green, and alpha relating to opacity), a Hexadecimal digit, HSL (e.g., hue, saturation, and lightness values), or HSLA (e.g., hue, saturation, lightness, and opacity) values. A color property may be set in a CSS section of a code (e.g., by referencing an identifier for a web element defined in the HTML section), in an HTML section of a code (e.g., as an inline property), or in a JavaScript section (e.g., in response to a user input), and may be included in a runtime version of a code, such as a DOM representation for a code. A color property may be set to a value causing a web element to be highlighted or emphasized (e.g., by increasing a contrast between a foreground for the web element and a background surrounding the web element), or to conceal the web element (e.g., by matching the foreground of the web element to the background), or by setting a color property to "transparent".

In some embodiments, the at least one parameter value is an intersecting element. Intersecting may refer to at least partially overlapping, crossing, or superimposed. An intersecting element may refer to an element, as described earlier, configured to be displayed in a region of an electronic display that is simultaneously allocated for displaying at least a portion of another web element, such that the presentation of the two web elements least partially overlap. For example, a form may at least partially overlap (e.g., intersect) a table if at least part of the form and at least part of the table are configured to be displayed in the same region of a visual display.

By way of a non-limiting example, FIG. 6-3 illustrates an exemplary webpage 6-300 including a hidden presentation of a display element 6-302 (e.g., a button), consistent with some embodiments of the present disclosure. For example, webpage 6-300 (e.g., Decoy web page) may be associated with (e.g., may host or include) nested web element 6-104 (shown in FIG. 6-1), and a webpage 6-310 (e.g., Vulnerable web page) may be associated with (e.g., may host or include) web element 6-102. For instance, code associated with nested web element 6-102 may set a color property for a display element 6-302 to match a foreground color property for web element 6-304 (e.g., another button) and thereby prevent a user from discerning display element 6-302, e.g., causing display element 6-302 to be hidden. By way of a non-limiting example, in FIG. 6-3, web element 6-304 may intersect or overlap display element 6-302.

A parameter value associated with the nested web element may refer to a setting for a variable property or attribute (e.g., as described earlier) related to, or otherwise affecting the nested web element. For example, the parameter value may affect the display of the nested web element (e.g., position, color, size, alignment, transparency, opacity, background color, border), the behavior of the nested web element (e.g., event-driven actions invoked via the nested web element), the interaction of the nested web element with other web elements, webpages, and/or websites, resources allocated for the nested web element, and any other attribute associated with the nested web element. The parameter value may be defined for the nested web element statically (e.g., as a CSS or HTML declaration or definition referencing the nested web element, such as in a runtime version of DOM representation for a code), or dynamically (e.g., via JavaScript code configured to affect the nested web element during execution, for example in response to a user input). In some embodiments, a nested web element may inherit one or more properties from a parent object, such as a button element inheriting properties from a class defined for multiple buttons sharing one or more properties, and the parameter value for the nested web element may be defined via the parent object (e.g., such that a setting for the parent object is implemented on any child objects). In some embodiments, a nested web element may have a child object (e.g., inheriting from the nested web element) and the parameter value for the nested web element may be defined via the child object (e.g., extending a scope to the parent object). Identifying at least one parameter value associated with the nested web element may include recognizing, discerning, or otherwise detecting the at least one parameter value related to the nested web element. Identifying a parameter value associated with the nested web element may include one or more of scanning, querying, parsing, examining, or analyzing one or more sections of a webpage code or a runtime version of a code such as a DOM structure representing of a code (e.g., statically, as discussed above), and/or simulating or emulating one or more sections of the webpage code (e.g., dynamically, as discussed above). As an example of a static code analysis to identify the parameter value, the JavaScript agent may parse and/or query for one or more HTML statements located within the first pair of opening and closing tags (e.g., where the code for the JavaScript agent is injected) to discern an identifier for the nested web elements, e.g., based on an "id=" declaration for a unique identifier, a class name, an object name, or any other type of identifier. The JavaScript agent may use the identifier to search other code sections (e.g., CSS and/or JavaScript code) and/or a runtime version of a code, such as a DOM structure representing a code, referencing the nested web element for one or more parameter values for the nested web element. In some embodiments, the JavaScript agent may scan and/or query multiple files (e.g., each storing CSS code, HTML code, and JavaScript code, and/or a DOM structure representing a code) to identify any parameter values associated with the nested web element. As an example of a dynamic code analysis to identify the parameter value, the JavaScript agent may emulate a portion of the webpage code (e.g., inside an insulated sandbox environment) to test the effect of setting different parameter values. In some embodiments, the JavaScript agent may identify the parameter value based on a parameter value defined for a parent or child object of the nested web element. In some embodiments, the JavaScript agent may identify the parameter value based on a reference in a function or procedure, e.g., invoked in association with the nested web element. For example, a parameter value for a nested header element may be set by clicking a button causing invocation of a procedure to set the parameter value.

By way of a non-limiting example, in FIG. 6-2, JavaScript agent 6-200 may scan the HTML declaration for nested web element 6-102 in webpage code 6-100 (e.g., and/or a runtime version of webpage code 6-100, such as a DOM structure representing webpage code 6-100), for instance, between the <iframe> and </iframe> tags, for an identifier for nested web element 6-102, e.g., by parsing the 'id="Vulnerable_Page" statement to identify the unique identifier "Vulnerable_Page"). JavaScript agent 6-200 may search webpage code 6-100 (e.g., and/or a runtime version of webpage code 6-100, such as a DOM structure representing webpage code 6-100) for additional references to nested web element 6-102, e.g., by querying for the unique identifier "Vulnerable_Page". For example, JavaScript agent 6-200 may identify a CSS code portion 6-108 referencing the unique identifier "Vulnerable_Page" and including one or more parameter values associated with nested web element 6-102.

Some embodiments involve determining, based on the at least one parameter value, that the nested web element is configured to cause a hidden presentation of a display element within a user interface. A user interface may include technology implemented in hardware and/or software to enable interacting with a user (e.g., between a user and a machine), as described earlier with respect to FIG. 3. For example, a software-implemented user interface may be linked to a hardware user interface device via an event listener registered with a DOM for a webpage. As an example, a user interface may include a button and a form element (e.g., a software-defined user interface element) displayed via an electronic display (e.g., a hardware device such as a screen). The button may be configured to trigger an action in response to click event received via an electronic mouse (e.g., a hardware device), and the form element may be configured to upload data in response to an "Enter" keypress event received via a keyboard device (e.g., a hardware device). A display element within a user interface may refer to a portion of a software-implemented user interface configured for displaying to a user via an electronic display device. Examples of display elements include interactive web elements, such as a button, a checkbox, a form, a scrollbar, a field, a textbox, a search bar, a window, a frame, or any other visualization configured for interacting with a user, as well as frequently non-interactive web elements, such as a header, a footer, a title, a paragraph, a section, a margin, or any other frequently non-interactive visualization.

In some embodiments, the display element is a button (e.g., button element). A button element may refer to an interactive HTML element delineated in a code for a webpage by a pair of <button> and </button> opening and closing tags. A button may be defined in a DOM representation of a webpage and may be associated with an event listener configured to trigger a corresponding action upon detecting an event associated with the button (e.g., a click event). A button element may be configured to be activated by a user using an input device (e.g., a user interface device, discussed above), such as an electronic mouse, a keyboard device, a touch sensitive screen, a microphone configured with a speech recognition algorithm, a gesture detected by a camera, or using any other user interface technology. Activating a button element may cause the event listener to schedule one or more actions for execution by a processor. A button may be displayed on an electronic display as a closed geometric shape (e.g., a square, a rectangle, a circle, or an oval) and may include accompanying test (e.g., "Click Here"). Clicking a button may cause one or more display parameters of the button to change, e.g., to indicate to the user that the button is being clicked. Additionally or alternatively, one or more display parameters of the button may change after the button has been clicked.

By way of a non-limiting example, in FIG. 6-2, button 6-202 may be declared inside nested web element 6-102 and included in a DOM representation of webpage code 6-100. Executing webpage code 6-100 may cause button to be displayed, such as the display of button 326 (FIG. 3) in web elements 324.

In some embodiments, the display element is a text field. A text field may refer to an interactive HTML element defining an area on an electronic screen allowing a user to enter a text input (e.g., by clicking in the text field, thereby enabling the text field element to allow entering text input using a keyboard device). A text field may be delineated in a code for a webpage with a <input type="text"> label. One or more text fields may be included in a form element (e.g., delineated by opening and closing <form> and </form> tags), for instance in a DOM representation of a code.

By way of a non-limiting example, in FIG. 3, two exemplary text fields are shown inside web elements 324, e.g., text field 332 and the text field inside a form 330. For example, nested web element 6-102 (shown in FIG. 6-1) may include an instruction declaring text field 332.

A presentation may refer to a rendering of an element (e.g., a web element) via a user interface, including one or more visual, audible, or tactile user interface techniques. A hidden presentation of a display element may refer to a rendering of a display element in a manner to prevent a visible rendering of the display element or reduce visibility of the display element, e.g., to conceal or hide the display element, thereby preventing the display element from being seen by a user via an electronic display device. In some embodiments, a hidden presentation of a display element may refer to a rendering of a display element that is interactable (e.g., clickable) with user input (e.g., a mouse click), even if the display element is not rendered visibly. In some embodiments, a hidden presentation of a display element may refer to a rendering of a display element that is not frequently interactable, such as a header or footer (e.g., configured with a hover event to trigger an action). A hidden presentation for an element may be implemented by setting one or more display parameters for the element. For example, an element may be hidden in a web page having multiple layers by including the hidden web element in a lower level concealed by a higher layer (e.g., using the z-index display parameter). As another example, an element may be hidden by setting a display parameter to "none", by setting a visibility parameter to 'hidden', by setting a color parameter to match a background color for the webpage, by setting one or more color parameters to mimic at least one property of a visibly displayed element (e.g., have at least one of a similar or same color, position, text, or size), by setting an opacity level to very low (e.g., zero), by setting a size attribute to very small, or using any other technique to conceal a web element from visible detection by a user. The term "determining" may refer to making a measurement, a comparison, an estimation, or calculation to arrive at a conclusive outcome. Determining that the nested web element is configured to cause a hidden presentation of a display element within a user interface may include parsing and/or querying a code and/or a runtime version of a code such as a DOM structure or representation of a code (e.g., associated with the nested web element), comparing code and/or a runtime version of a code such as a DOM structure or representation of a code (e.g., code associated with the nested web element) to a threshold, reference value, or rule parameter, comparing the nested web element with another element previously determined to cause a hidden presentation, simulating code (e.g., code associated with the nested web element), or in any way analyzing code (e.g., code associated with the nested web element) to identify an associated display property. For example, determining that the nested web element is configured to cause a hidden presentation of a display element within a user interface may include extracting code (e.g., a color property of a first display element) from an HTML document and comparing that code to reference code (e.g., a color property of a second display element associated with the same HTML document).

In some embodiments, this determination may be based on the at least one parameter. For example, determining, based on the at least one parameter value, that the nested web element is configured to cause a hidden presentation of a display element within a user interface may include using the parameter value to perform one or more calculations, measurements and/or comparisons and concluding, based on the calculations, measurements and/or comparisons, that the parameter value may cause a display element to be hidden, concealed, or otherwise not visible by a user. For example, the nested web element may be associated with one or more CSS instructions setting the opacity for a display element to zero, ranking the z-index of a display element to a lower ranking than another overlapping display element, setting a color for a display element to match a background color, setting a color parameter to mimic at least one property of a visibly displayed element (e.g., to have at least one of a similar or same color, position, text, or size), setting a color to 'transparent' and a border to 'none', or any other technique for hiding a display element. In some embodiments, the display element and the nested web element may correspond to the same web element. In some embodiments, the nested web element may differ from, but may be associated with the display element. For example, the nested web element may include a declaration or definition for the display element, an invocation of a function referencing the display element, or any other association with the display element. As another example, the nested web element may be an iframe including a declaration for a button (e.g., a display element) inside the nested web element.

By way of a non-limiting example, in FIG. 6-2, JavaScript agent 6-200 may analyze a DOM structure or representation of code 6-100 to determine, based on parameter values defined in CSS code portion 6-108 (e.g. . . . , associated with nested web element 6-102 via the unique identifier "Vulnerable_Page") and CSS code portion 6-110 (e.g., associated with web element 6-104 via the unique identifier "Decoy_Page"), that nested web element 6-102 is configured to cause a hidden display of an vulnerable webpage (e.g., a display element). For example, JavaScript agent 6-200 may determine that the vulnerable webpage (e.g., defined in nested web element 6-102) and the decoy webpage (e.g., defined in web element 6-104) are configured to be displayed in the same region of an electronic display, e.g., based on the location of the respective declarations, and the size attributes (e.g., width, height, and position) defined in corresponding CSS code portions 6-108 and 6-110. JavaScript agent 6-200 may additionally determine based one or more display settings in CSS code portion 6-108, that nested web element 6-102 is configured to hide the display of the Vulnerable_Page webpage, for example, based on the opacity level of zero.

By way of another non-limiting example, in FIG. 6-3, a code associated with a nested web element (e.g., nested web element 6-102 of FIG. 6-1) may set a display parameter for display element 6-302 to "invisible" and thereby cause a hidden presentation of display element 6-302. Hidden display element 6-302 may be allocated to the same or similar region of a display as visibly presented web element 6-304 (e.g., displaying a text "Transfer Money"). However, a layer (e.g., set using a z-index display parameter) for hidden display element 6-302 may be higher (e.g., a z-index of 2) than a layer for visibly presented web element 6-304 (e.g., a z-index of 1). Consequently, a user attempting to click on visibly presented web element 6-304 may be tricked into clicking on hidden display element 6-302 instead, triggering one or more actions (e.g., malicious actions) associated with hidden display element 6-302.

In some embodiments, the display element is configured for non-visible presentation and in a manner at least partially overlapping, a second display element configured for visible presentation. A visible presentation may refer to a rendering of a display element in a manner to cause an observable rendition of the display element, e.g., to reveal, exhibit, or expose the display element visually, such that the display element can be seen by a user via an electronic display device. For example, a visible presentation for an element may be implemented by setting a z-index display parameter to cause the element to be displayed in a topmost layer, by setting a display parameter to a value other than "none", by setting a visibility parameter to 'visible', by setting a color parameter to contrast a background color for the webpage, by setting an opacity/transparency level to very high (e.g., close to '1'), by setting a size attribute large, or using any other technique to display a web element visually. A display element at least partially overlapping a second display element may refer to superimposing at least a portion of a display element with a second display element, such that at least some of the pixels allocated for displaying the display elements are also allocated for displaying the second the second display element (e.g., such that the two display elements share at least some pixels of an electronic display). Thus, the display element (e.g., associated with the nested web element) configured to be hidden from a user, may be allocated to a region of an electronic display (e.g., a set of pixels) at least partially allocated for displaying an element visibly. Consequently, a user intending to interact with the visible element (e.g., using a pointing device targeting the visible element) may inadvertently interact with the hidden element. For example, if the hidden element is associated with a higher layer than the visible element, an action by the pointing device (e.g., a click event) may be registered with the hidden element instead of the visible element.

By way of a non-limiting example, in FIG. 6-3, hidden display element 6-302 may at least partially overlap visually presented web element 6-304. Visually presented web element 6-304 may include a text "Transfer Money" using pixels that are also allocated for hidden display element 6-302. Hidden display element 6-302 may have a higher z-index than visually presented web element 6-304 such that when a user clicks on the text "Transfer Money" using electronic mouse 304 (FIG. 3), e.g., intending to click visually presented web element 6-304, the click event triggers an action associated with hidden display element 6-302 instead.

In some embodiments, the second display element is associated with an iframe external to the nested web element. External may refer to outside or beyond a defined boundary or scope. For example, a declaration for a resource that is not included inside a function may be external to (e.g., outside the scope of) the function, such that the function may be prevented from accessing the resource. An iframe may be understood as described earlier. Thus, the second display element (e.g., presented visually to a user) may be declared or defined inside an iframe (e.g., delineated by <iframe> and </iframe> tags) declared outside the scope of the nested web element (e.g., delineated by another set of opening and closing tags).

Some embodiments involve determining that the at least one code portion relating to the nested web element is associated with at least one input event. An input event may refer to an event, as described earlier, that is associated with an input device (e.g., one or more of the input devices shown in FIG. 3). Examples of an input event include events associated with an electronic mouse (e.g., a click or double click event, a mouse-up or mouse-down event, a wheel event, a scroll event, a hover event, or a pointer event), events associated with a keyboard device (e.g., a keypress or key-up event), a touch event (e.g., associated with an electronic pen or touch-sensitive screen), events associated with a joystick device, or any other input signal received via an input device. For example, a mouse click event may be registered with a specific button element of a webpage, e.g., to trigger a specific action when a user clicks on the button using an electronic mouse. As another example, a submit event may be registered with a specific form of a webpage to upload data when a user pressed "Enter" using a keyboard device.

In some embodiments, the at least one input event is a click event. A click event may include an interaction with a clickable displayed element and/or data indicating such an interaction. For example, a click event may include an action performed by a user using a hardware-implemented user interface device (e.g., a pointing device) targeting a software-implemented user interface (e.g., a web element of a web page), and a follow-up notification sent by an event listener to a browser application indicating the action. In some embodiments, a click event be implemented using a button of a pointing device, such as an electronic mouse, an electronic pen, a stylus, or any other type of pointing device. In some embodiments, a click event may include two events, such as a button press (e.g., mouse-down) event and button release (e.g., mouse-up) event. To perform a click input event, a user may use the pointing device to maneuver a cursor of an interactive display onto a web element and press and release a button of the pointing device while the cursor is positioned on the web element. An input event may be associated with both hardware and software elements of a user interface, e.g., via an event listener registered with a DOM representation of a webpage. The event listener may be configured to send a notification to a browser application (e.g., to take a specific action) when an input event is detected by the input device. In some embodiments, the event listener may associate a specific input event with a specific display element using a specific user input device.

Determining that the at least one code portion relating to the nested web element is associated with at least one input event may involve analyzing code (e.g., a runtime version of a code and/or a DOM structure representing a code) associated with the nested web element (e.g., including HTML code between the delineating tags for the nested web element, and any CSS and/or JavaScript code referencing an identifier included therein) to identify an input web element, parsing terms in the code portion and comparing the parsed terms to a list of terms indicating an input event (e.g., associated with an input web element), or examining the DOM for the webpage to identify an event listener registered with an input web element (e.g., associated with the nested web element). For example, the JavaScript agent may analyze a portion of webpage code and/or a DOM structure representing a webpage code associated with a nested iframe web element, and parse and/or query for one or more terms in the code portion to identify a declaration of a form (e.g., an input web element) inside the nested iframe associated with an "submit" input event. The JavaScript agent may identify a corresponding event listener registered in the DOM for the webpage, e.g., to handle a submit event for the form declared in the nested iframe. The JavaScript agent may conclude that the code portion associated with the nested iframe is associated with a submit input event. In some embodiments, the JavaScript agent may perform one or more operations to determine if the input event is suspect or potentially malicious, which may include, or be determined in addition to, determining that the at least one code portion relating to the nested web element is associated with at least one input event. For example, the JavaScript agent may simulate an occurrence of the input event, analyze an event handler (e.g., a procedure defined in advance for execution in response to an occurrence of the input event), for example by analyzing an origin for the event handler, analyzing the code of the event handler, or analyzing an execution of the event handler (e.g., in an isolated environment), compare the at least one code portion to known malicious code (e.g., malicious code related to a nested web element), or perform any other action for determining a cyber threat associated with the input event.

By way of a non-limiting example, in FIG. 6-2, JavaScript agent 6-200 may determine that webpage code 6-100 (e.g., associated with the nested Vulnerable Page web element) includes a definition for a button 6-202 and a corresponding click event (e.g., by parsing and/or querying for the button declaration in a DOM for webpage code 6-100 and identifying the 'click' event). JavaScript agent 6-200 may analyze the DOM of a webpage associated with webpage code 6-100 and identify an event listener (e.g., event listener 318 of FIG. 3) registered with button 6-202 for notifying browser application 216 (FIG. 2) when a user clicks button 6-202, e.g., using electronic mouse 304.

In some embodiments, the display element is associated with the at least one input event. Associating a display element with an input event may include registering an event listener with the display element to detect a signal from an input device when a cursor of an interactive display is positioned in a region of a display screen corresponding to the display element. For example, if the display element is hidden, an input event directed to other, visually presented content displayed in the same region as the hidden element, may inadvertently invoke an action associated with the hidden element.

In FIG. 6-3, hidden display element 6-302 (e.g., a hidden display element) may be associated with a click event intended for web element 6-304, displayed in a layer beneath hidden display element 6-302.

Some embodiments involve, in response to the determination that the at least one code portion relating to the nested web element is associated with the at least one input event, preventing an occurrence of the at least one input event. An occurrence may refer to a materialization, manifestation, or representation (e.g., through digital data), of an incident (e.g., an event) causing a change of state (e.g., in a runtime environment of a computing device). An occurrence of an input event may include receiving (e.g., by monitoring, polling, querying), detecting, sensing, or otherwise obtaining an impulse or signal indicating or generating data based on a user action (e.g., received via a user interface in response to a mouse click action). The impulse or signal may be emitted from a hardware-implemented user interface device (e.g., a pointing device), and/or emitted as a notification, for example, by an event listener monitoring a hardware-implemented user device in association with a software-implemented user interface (e.g., a button). In some embodiments, an occurrence of an input event may include execution of code (e.g., an event handler code) in response to a user action. For example, occurrence of an input event may include executing code to redirect a browser to a different webpage than one currently accessed, connect a device to a new (e.g., malicious) remote source, transmit data (e.g., user-specific data), divert computational resources, or perform any unintended or malicious action. An occurrence of an input event may be detected by an event listener associated with a user interface for a computing device (e.g., as shown in FIG. 3) and configured to invoke an action in response to the impulse or signal. Some examples of an input event may include clicking a button web element using an electronic mouse, submitting data in a form web element using a keyboard device, checking a checkbox web element by touching a touch-sensitive screen, or entering text into a field using a microphone configured with a speech recognition application. Preventing an occurrence of an input event may include disabling, barring, or blocking the receiving of data associated with a user input, e.g., thereby disabling, barring, or blocking a processor from executing an action (e.g., code) in response to the input event, and/or terminating, halting, or discontinuing an input event. For example, an occurrence of an input event may be prevented by inserting code and/or invoking a function to intercept the input event, discard data associate with the input event, disable an input device for receiving the input event, disable a web element (e.g., by setting an HTML or CSS disabled property to True) associated with the input event, disable an event listener interfacing between an input device and a web element (e.g., and invoke a preventDefault( ) method of an Event interface), overlay another web element on the element associated with the input event (e.g., as a mask diverting a user input to the overlaying web element), invoke a BlockInput function, or using any other technique to block or disable an input event. Upon identifying an input event associated with the nested web element, the JavaScript agent may take one or more actions to block or disable (e.g., prevent) an input event from being received, registered, and/or handled. As mentioned above, preventing malicious code from carrying out a malicious cyber act may be beneficial to the security of devices, systems, users, and/or networks.

By way of a non-limiting example, FIG. 6-4 illustrates an exemplary code snippet 6-400 for disabling an input event (e.g., of a web element), consistent with embodiments of the present disclosure. JavaScript agent 6-200 may invoke code snippet 400 to disable hidden display element 6-302 (FIG. 6-3), e.g., using a unique identifier for hidden display element 6-302. Disabling hidden display element 6-302 may prevent an input event associated with hidden display element 6-302, thereby preventing a cyber threat associated with hidden display element 6-302.

In some embodiments, the JavaScript agent is further configured to cause display, via the user interface, of a notification indicating a threat associated with the nested web element. A notification indicating a threat associated with the nested web element may refer to a message or warning of a possible danger (e.g., to a computing resource or data, such as processing capacity, user data, or a connection). The message may include one or more of a text (e.g., "WARNING"), a graphic image (e.g., of a hazard sign), a sound (e.g., a beep or ring), or a haptic signal (e.g., vibration). The message may be displayed using a distinguishing color (e.g., yellow or orange). The message may be displayed in a popup window, such as an alert box requiring a user to click an 'OK' button to proceed. For example, the JavaScript agent may include an instruction:

alert ("WARNING! YOUR COMPUTER IS AT RISK");
    to display a notification indicating a threat. A threat may include any action determined to have a risk or potential to compromise data (e.g., user-specific data, device data) or computer resources (e.g., processing capacity, bandwidth, a connection, a browser, an application). In some embodiments, a notification may include information specific to a threat, such as a type of threat (e.g., identification of a threat as a click-jacking threat, a computer virus threat, a ransomware threat, a computer resource takeover threat, a threat to user data), a source of the threat (e.g., a website or webpage identifier, such as a URL, an IP address, one or more parameters of a display element associated with the threat), and/or a timing of the threat (e.g., a timestamp generated in response to determining that the at least one code portion relating to the nested web element is associated with at least one input event).

By way of a non-limiting example, in FIG. 6-3, JavaScript agent 6-200 (FIG. 6-2) may display a notification 6-306 indicating a threat associated hidden display element 6-302 (e.g., associated with button 6-202 of nested web element 6-102).

In some embodiments, the JavaScript agent is further configured to block execution of the at least one portion of the code relating to the nested web element. Blocking execution of a portion of code may include preventing a process or task association with the code portion from being scheduled for execution, pausing or suspending one or more instructions, removing a process or task from a call stack (e.g., pending execution), deallocating resources (e.g., memory, processor time) required to execute the code portion, scheduling a different task or process for execution (e.g., ahead or instead of the code portion), intercepting or preventing an event from triggering execution of the code portion, or performing any other action to alter an execution flow for the code portion. For example, the JavaScript agent may discard data associated with an input event configured to trigger execution of the code portion related to the nested web element. Alternatively, the JavaScript agent may schedule a different task for execution at a higher priority than portion of code relating to the nested web element, such that the different task is executed instead.

By way of a non-limiting example, in FIG. 6-3, notification 6-306 displayed by JavaScript agent 6-200 may block execution of code associated with hidden display element 6-302 by requiring a user to click a button 6-308 (e.g., 'OK') inside notification 6-306 before execution of webpage code 6-100 may resume.

In some embodiments, the JavaScript agent is further configured to determine a source of the nested web element. A source (e.g., for a computing resource) may refer to an origin (e.g., webpage, website, domain, scheme, entity, IP address, or port), a computing device (e.g., server), a network, a database, or any other reservoir or storage of data for storing a code (e.g., for a nested web element). Determining a source of the nested web element may involve one or more parsing, querying, analyzing, comparing, emulating or simulating operations to identify an origin for the nested web element. For example, the JavaScript agent may parse any code included inside a nested web element to identify a string corresponding to an 'src' attribute (e.g., matching "src=") and/or the JavaScript agent may query a runtime version of a code, or DOM structure representing a code to determine a source of a nested web element. The JavaScript agent may associate text following the 'src=' string with a path to an external file or resource linked to the code into which the JavaScript agent is injected. For example, text following the 'src=' may correspond to a path to a remote server storing a malicious code. In some embodiments, the JavaScript agent may compare the path to a list of known resources (e.g., to classify the resource as malicious, benign, or unknown). In some embodiments, the JavaScript agent may navigate to the resource via the path and perform one or more operations (e.g., to simulate or test the behavior of the source).

By way of a non-limiting example, in FIG. 6-2, nested web element 6-102 may include a path (e.g., "https://vulnerable-website.com") immediately following a "src=" attribute, which may be included in a DOM structure representing the code. JavaScript agent 6-200 may determine that the nested web element may originate from a website named "vulnerable-website.com". JavaScript agent 6-200 may query a blacklist of websites and determine that nested web element 6-102 is associated with a cyber threat.

Some embodiments provide a system for performing cybersecurity operations for protecting against a manipulated user interface, the system including: at least one processor configured to: receive code for execution within a JavaScript runtime environment, the code including at least one portion relating to a nested web element; and inject a JavaScript agent into the at least one portion of the code, wherein the JavaScript agent is configured to: identify at least one parameter value associated with the nested web element, determine, based on the at least one parameter value, that the nested web element is configured to cause hidden presentation of a display element within a user interface, determine that the at least one code portion relating to the nested web element is associated with at least one input event, and in response to the determination that the at least one code portion relating to the nested web element is associated with at least one input event, prevent an occurrence of the at least one input event.

By way of a non-limiting example, in FIG. 6-2, at least one processor 110 (FIG. 1) may receive webpage code 6-100 for execution within JavaScript runtime environment (e.g., execution environment 220 of FIG. 2). Webpage code 6-100 may include a portion relating to a nested web element 6-102 (e.g., an iframe nested inside a page delineated between <div> and </div> tags). At least one processor 110 may inject JavaScript agent 6-200 into a code portion associated with nested web element 6-102. JavaScript agent 6-200 may be configured to identify at least one parameter value associated with nested web element 6-102. For example, JavaScript agent 6-200 may identify CSS parameter settings (e.g., associated with CSS code portion 6-108) based on a unique identifier (e.g., Vulnerable_Page) included in nested web element 6-102 and referenced in CSS code portion 6-108. JavaScript agent 6-200 may determine, based on the at least one parameter value (e.g., opacity of zero) that nested web element 6-102 is configured to cause hidden presentation of a display element (e.g., button 6-202) within a user interface (e.g., webpage 6-300 of FIG. 6-3). JavaScript agent 6-200 may determine that the code portion relating to the nested web element 6-102 is associated with a click input event (e.g., by parsing and/or querying a DOM representation of code 6-100 for button 6-202 and identifying an associated click event listener). In response to the determination that the code portion relating to nested web element 6-102 is associated with a click input event, JavaScript agent 6-200 may prevent an occurrence of the click input event, for example by displaying notification 6-306, requiring the user to click 'OK' before proceeding.

FIG. 6-5 illustrates a block diagram of example process 6-500 for protecting against a manipulated user interface, consistent with embodiments of the present disclosure. In some embodiments, process 6-500 may be performed by at least one processor (e.g., at least one processor 110 of computing device 102 shown in FIG. 1) to perform operations or functions described herein. In some embodiments, some aspects of process 6-500 may be implemented as software (e.g., program codes or instructions) that are stored in a memory (e.g., memory 114 of computing device 102) or a non-transitory computer readable medium. In some embodiments, some aspects of process 6-500 may be implemented as hardware (e.g., a specific-purpose circuit). In some embodiments, process 6-500 may be implemented as a combination of software and hardware. Process 6-500 may be represented by process blocks 6-502 to 6-512.

Block 6-502 may relate to receiving code for execution within a JavaScript runtime environment, the code including at least one portion relating to a nested web element. Block 6-504 may relate to injecting a JavaScript agent into the at least one portion of the code. Blocks 6-506 to 6-512 may be associated with operations performed by the JavaScript agent. Block 6-506 may relate to identifying at least one parameter value associated with the nested web element. Block 6-508 may relate to determining, based on the at least one parameter value, that the nested web element is configured to cause hidden presentation of a display element within a user interface. Block 6-510 may relate to determining that the at least one code portion relating to the nested web element is associated with at least one input event. Block 6-512 may relate to, in response to the determination that the at least one code portion relating to the nested web element is associated with the at least one input event, preventing an occurrence of the at least one input event.

In a computer network environment, it may be beneficial to protect users, systems, devices, and information from unauthorized intruders attempting to access confidential data. In a cyberattack commonly known as a "Man in the Middle Attack", an attacker may secretly insert themselves between two communicating parties, for example, by establishing a first connection between a client device and the attacker, and a second channel between the attacker and a server. The parties may believe they are communicating directly with each other, while the attacker instead relays communications between them, allowing the attacker to access and even alter the communications. Such attacks may pose serious threats to privacy, security, and confidentiality, potentially revealing sensitive data to the attacker, such as passwords and encryption keys, allowing the attacker to widen breach of confidential information and privacy. Techniques developed to thwart such attacks may be circumvented by increasingly sophisticated attackers. For example, secure communication protocols, such as HTTPS, may encrypt communication between two parties to prevent eavesdropping. However, an attacker may circumvent such a protocol by establishing two separate secure connections, e.g., a first secure connection with the first party and a second secure connection with the second party, giving the attacker access to the encryption keys associated with each connection. The parties may be misled into thinking they are communicating directly over a securely encrypted connection, when in fact the attacker may use the encryption keys to decrypt any outgoing communication (e.g., thereby accessing the communication) and re-encrypt the communication for relaying to the receiving party. Therefore, there is a need for unconventional innovations for helping to detect communication discrepancies due to unauthorized intruders, a problem frequently arising in computing environments (e.g., computer networks), to shield users, systems, devices, and information from cyber threats. Such unconventional approaches, rooted in computer technology, may enable detecting unauthorized intruders.

These approaches, expressed in the disclosed embodiments, may account for latencies introduced by computationally demanding calculations, such as encryption and decryption which may increase response times substantially. Aspects of disclosed embodiments may include transmitting multiple requests and comparing associated response times. Moreover, the disclosed embodiments may involve determining differences in response times for differing requests to detect a communication discrepancy, e.g., due to an intruder. By detecting communication discrepancies, users, systems, devices, and information may be protected.

Thus, the various embodiments the present disclosure describe at least a technological solution, based on improvement to operations of computer systems and platforms, to the technical challenge of protecting electronic devices from malicious actions.

Disclosed embodiments may involve systems, methods, and computer-readable media for sanitizing data within a native environment. The systems and methods described herein may be implemented with the aid of at least one processor or non-transitory computer readable medium, such as a CPU, FPGA, ASIC, and/or any other processing structure(s) or storage medium, as described herein. For case of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities. While many actions may be described with respect to a particular element as discussed below (e.g., a first/second request and/or a first/second response), it should be noted such labels may be arbitrary and interchangeable.

Some embodiments involve a non-transitory computer readable medium containing instructions that when executed by at least one processor cause the at least one processor to perform cybersecurity operations for detecting a communication discrepancy. A non-transitory computer readable medium, may refer to physical memory for storing information or data readable by at least one processor, as described earlier. Instructions may refer to program code instructions executable by a computer processor, as described earlier. A processor may refer to a physical component, device, or group of components or devices having electric circuitry that performs a logic operation on an input or inputs, as described earlier. Performing operations may involve executing one or more arithmetic, logical, or inference steps, for example by a computing processor, as described earlier. Cybersecurity operations may include to actions, processes, and/or procedures configured to protect or more computing resources. A communication may refer to a transferring of data from one computing device to another computing device over one or more connections (e.g., as described earlier), for example, according to one or more communications protocols. Examples of communications protocols include Transmission Control Protocol (TCP), HyperText Transfer Protocol (HTTP), HyperText Transfer Protocol Secure (HTTPS), File Transfer Protocol (FTP), Simple Mail Transfer Protocol (SMTP), Telnet, serial communication, or Simple Network Management Protocol (SNMP), or any other communications protocol. A discrepancy may include a disparity, dissimilarity, and/or deviation, e.g., with respect to a standard or an expected state or behavior. A communications discrepancy may refer to a disparity or deviation from an expected characteristic of a communication. Examples of communication discrepancies include an unexpected transmission latency or delay, an unexpected timing, a faster than expected communications time, an unexpected demand for channel bandwidth, a larger/smaller amount of transmitted data than expected (e.g., than an expected range), a communications protocol different than an expected communications protocol, a cipher suite different than an expected cipher suits, a DOM structure (e.g., or a signature derived therefrom) different than an expected DOM structure, or any other anomalous behavior associated with a communications channel. Detect (e.g., detecting) may include discovering, polling, monitoring, sampling, measuring, calculating, comparing, querying, searching, analyzing, and/or performing any other action to facilitate determination of information (e.g., on a connection linking multiple computing devices). Detecting a communications discrepancy may include establishing a connection with one or more computing devices, sending and/or receiving data (e.g., via an established connection), monitoring one or more connections, sampling and/or analyzing transmitted data, calculating one or more statistical metrics based on transmitted data, determining a response time for transmitted data, analyzing a cipher suite applied to transmitted data, analyzing a protocol used to transmit data, applying a deep learning and/or artificial intelligence algorithm to transmitted data, and/or performing any other action facilitating discovering one or more deviations associated with a connection between multiple computing devices.

Some embodiments involve transmitting at least one request. A request may refer to an instance of asking, inquiring, and/or querying for information (e.g., data) and/or asking to perform one or more actions. In some embodiments, a request may include one or more data packets, which may include one or more of a payload, control information (e.g., within a header), and user data. For example, a request may comply with a communications protocol (e.g., as described earlier). Examples of requests include a first device asking (e.g., by transmitting one or more data packets) a second device to perform a computation, obtain a timestamp (e.g., associated with receiving at least a portion of a request), transmit data (e.g., including a timestamp indicating a time for receiving a request), read and/or write data, query a database, communicate with a third device, navigate to a website using a URL (e.g., included in a request), and/or perform any other action for the first device. In some embodiments, a request may be associated with a cybersecurity application. For example, a request may include arbitrary and/or random data to test a response time based on a size of the request. In some embodiments, in response to a request, an endpoint device may check a parity bit and/or error/correction code of the request, a protocol associated with a connection for transmitting a request, a cipher suite associated with a request, a signature associated with an HTTP connection (e.g., as opposed to an HTTPS connection), and/or based on a DOM structure associated with a URL. Transmitting may include sending, delivering, and/or communicating data via one or more connections, or any other action facilitating conveying electronic information between computing devices. Transmitting at least one request may include formatting a request in compliance with one or more communications protocols, encrypting a request, establishing a connection with one or more computing devices, selecting a one or more connections, delivering a credential (e.g., to authorize a request), analyzing a credential, accepting a credential, delivering a request over one or more connections, transmitting an acknowledgement and/or any other action facilitating sending a request to a computing device.

Some embodiments involve transmitting at least one request to an endpoint device. An endpoint device may refer to a computing device configured to communicate with one or more other computing devices via a communications network (e.g., using one or more communications protocols). Examples of endpoint devices include a mobile phone (e.g., a smart phone), a laptop computer, a desktop computer, a client device, a server device, a controller, a device associate with the Internet of Things (IoT), a server (e.g., associated with a database), and/or any other computing device connected to a communications network. In some embodiments, an endpoint device may be associated with a cybersecurity application, e.g., installed on a client device. For example, an endpoint device may be a cybersecurity server associated with a cybersecurity application configured with a client device to instantiate a cybersecurity agent on the client device. Once instantiated on the client device, the cybersecurity agent may transmit one or more requests to the cybersecurity server to perform one or more actions related to cybersecurity. Additionally or alternatively, an endpoint device may be an intended destination of a communication transmitted by a computing device. Transmitting at least one request to an endpoint device may include one or more of locating an endpoint device, determining an identifier associated with the endpoint device (e.g., an IP address), establishing a connection with an endpoint device over a communications network, selecting a communications protocol for communicating with an endpoint device, exchanging a credential with an endpoint device, receiving authorization from an endpoint device, formatting a request to comply with a communications protocol, encrypting a request for an endpoint device, sending a request to an endpoint device, and receiving a response from an endpoint device in reply to a request.

In some embodiments, the transmission of at least one request is caused by a cybersecurity web agent. A cybersecurity web agent may refer to a software agent, as described earlier, configured to perform one or more cybersecurity operations. Causing (e.g., caused) may include bringing about, or inducing, e.g., to produce an effect. For example, a cybersecurity web agent may be injected into an execution environment of a client device (e.g., by a cybersecurity application associated with a cybersecurity server). The cybersecurity web agent may include one or more executable instructions, that when executed by a processor, may induce (e.g., cause) the processor to perform one or more actions to resulting in at least one request to be transmitted. For instance, the cybersecurity web agent may induce the processor to establish a connection with an endpoint device (e.g., according to a communications protocol), construct at least one request, format at least one request according to a communications protocol, store at least one request in a transmit buffer, and/or receive an acknowledgement indicating successful transmission of at least one request.

In some embodiments, the endpoint device may be an intended destination of an electronic communication. An electronic communication may refer to encoded information (e.g., encoded digital information) that may be broadcast, transmitted, stored, and/or received using an electronic media device (e.g., a computing device, a telephone, a radio, and/or a facsimile machine). Examples of electronic communication include an Internet Protocol (IP) packet, a notification (e.g., associated with a communications protocol), a request, a web page code, a message (e.g., an instant message such as a Short Message Service, or SMS), a video message, a message configured with a social media application, an e-mail, a voice call, a facsimile (e.g., fax), streamed data, and/or any other transmission of encoded information over a connection. A destination may refer to an endpoint, terminal, device, network, domain, workgroup, and/or a station (e.g., a final station) of a path in a communications network. An intended destination may refer to a desired, selected, planned, targeted, and/or predetermined end point or terminal station. An intended destination of an electronic communication may refer to a specific computing resource or device targeted, selected, and/or designated for receiving encoded information over a communications network. In some embodiments, an intended destination of an electronic communication may be associated with an identifier (e.g., a unique IP address, a unique MAC address or a unique web address, such as a unique Uniform Resource Locator, e.g., URL). The identifier may be included in an electronic communication (e.g., transmitted by a client device) to allow a router of a communications network to locate the intended destination for the electronic communication (e.g., by querying a routing table using the identifier). In such a case, an intended destination of an electronic communication may be determined based on an identifier included the electronic communication. An intended destination may be differentiated from an unintended destination, the latter may include an unauthorized computing device (e.g., an intruder) attempting to intercept, eavesdrop, record, and/or steal an electronic communication (e.g., a credential), and/or receive a lost communication (e.g., due to a routing error). For instance, an intruder (e.g., an unintended destination) for an electronic communication may have a different IP address or URL than an IP address or URL included in an electronic communication targeted for an intended destination of the electronic communication. In some embodiments, the electronic communication may be sent by a client device associated with transmitting the at least one request. In some embodiments, an intended destination may be associated with a web page or website accessed by a client device. A client device may refer to a computing device that may have access to data stored on another computing device (e.g., a server) over a communications network. In some embodiments, a client device may include a computing device attempting to establish, or having established, a communication connection with an endpoint device. Examples of client devices include a laptop, a tablet, a telephone, a mobile phone, a desktop computer, a controller, a device associated with the IoT, and/or any other computing device configured to receive data. Associated may refer to the existence of an affiliation, relationship, correspondence, link (e.g., data linkage, such as established through a data structure) or any other type of connection or correlation (e.g., within a computing environment). Sent may refer to transmitted, transferred and/or delivered, e.g., over a connection. A client device associated with transmitting at least one request may refer to a computing device from which at least one request may originate, or another computing device (e.g., a proxy device) acting on behalf of a computing device from which the at least one request may originate.

For example, a cybersecurity agent instantiated on a client device may transmit one or more electronic communications to establish a connection with a cybersecurity server (e.g., an endpoint device), e.g., to perform one or more actions related to cybersecurity. To prepare the request for transmission, the cybersecurity agent may include the request inside one or more payloads of one or more packets (e.g., according to a communications protocol, such as IP or TCP/IP). Each packet may include a header storing an IP address for the cybersecurity server (e.g., the intended destination of the electronic communication), allowing one or more routers to deliver the one or more packets to the cybersecurity server. If a different computing device (e.g., an intruder with a different IP address) intercepts one or more of the packets, the different computing device may be an unintended destination of the electronic communication.

By way of a non-limiting example, reference is made to FIG. 7-1 which illustrates a block diagram of an exemplary implementation of a system 7-100 for performing cybersecurity operations, consistent with disclosed embodiments. System 7-100 may include a client device 7-102 (e.g., corresponding to computing device 102 of FIG. 1) and an endpoint device 7-104 (e.g., corresponding to cybersecurity server 104). Client device 7-102 may establish a connection with endpoint device 7-104 over a communications network 7-106 (e.g., corresponding to communications network 108) for the purpose of delivering an electronic communication. For instance, the electronic communication may relate to establishing a connection according to a communications protocol (e.g., HTTPS), and/or to coordinate and/or synchronize a test for a cybersecurity threat. In some embodiments, the test may involve transmitting at least one request to the endpoint device. Client device 7-102 may transmit the electronic communication to endpoint device 7-104 device as one or more packets, each packet including an IP address for endpoint device 7-104, allowing one or more routers of communications network 7-106 to identify endpoint device 7-104 as the intended destination for the electronic communication. Additionally, or alternatively, client device 7-102 may include a URL to identify the intended destination of endpoint device 7-104, allowing a Domain Name Server (DNS) of communications network 7-106 to convert a domain name included in the URL into an IP address for endpoint device 7-104.

An intruder 7-108 (e.g., an intruder device) may intercept the at least one request via a tap 7-110 (dashed and dotted line) on a channel 7-112 associated with client device 7-102. Intruder 7-108 may have a different IP address than endpoint device 7-104, and may be an unintended (e.g., unauthorized) destination for the at least one request from client device 7-102. For instance, intruder 7-108 may intervene in the connection between client device 7-102 and endpoint device 7-104 by establishing a first connection 7-114 (dashed line) between intruder 7-108 and client device 7-102 and a second connection 7-116 (dotted line) between intruder 7-108 and endpoint device 7-104 (e.g., inserting themselves as a "man-in-the-middle"). In some embodiments, connections 7-114 and 7-116 may comply with an HTTP or HTTPS protocol. Connection 7-114 may be associated with a first cipher and/or a first key for encrypting and decrypting payloads of packets transmitted via connection 7-114 and connection 7-116 may be associated with a second cipher and/or a second key for encrypting and decrypting payloads of packets transmitted via connection 7-116, allowing intruder 7-108 to access the payload data by decrypting the payload data received from client device 7-102 using the first cipher and/or the first key and re-encrypting the payload data for transmitting to endpoint device 7-104 using the second cipher and/or the second key.

Some embodiments involve determining a response time based on the transmitted at least one request (e.g., at least one first request, at least one second request). A response time (e.g., for a request) may include at least an amount of time lapsed from when a request is sent until at least a portion of the request is received, and/or until feedback communication to the request (e.g., a response) is received. Based on may refer to established or founded upon, influenced by, caused by, or otherwise derived from. A response time based on a transmitted request may include one or more of a duration (e.g., an amount of time) for establishing a connection from a requesting device to an intended destination device, a duration for delivering a request (e.g., an encrypted request) from a requesting device to an intended destination device, a duration to process (e.g., receive, encode/decode, encrypt/decrypt) at least a portion of a request (e.g., by a receiving device), one or more latencies or delays associated with the communications network, one or more latencies or delays cause by one or more intervening devices (e.g., an intruder) positioned between a requesting device and an endpoint device (e.g., intended destination), and/or any other time lapse associated with a request transmitted from a client device to an endpoint device. Examples of delays incurred by an intervening device include time to establish a first channel associated with a first cipher and/or first key and establish a second channel associated with a second cipher and/or second key, time to intercept a packet, time to extract a payload from a packet, time to decrypt an extracted payload of a packet using the first cipher and/or first key, time to re-encrypt a payload of a packet using the second cipher and/or second key, time to construct a packet including a re-encrypted payload and any other delay that may be incurred by an intervening device. Determining may refer to making a measurement, a comparison, an estimation, or calculation to arrive at a conclusive outcome. Determining a response time based on the transmitted at least one request may include recording at least one start timestamp associated with transmitting at least one request to an endpoint device, receiving from an endpoint device at least one response in reply to transmitting at least one request, using at least one response received from an endpoint device to determine at least one end timestamp associated with an endpoint device receiving at least a portion of at least one request, determining a difference between at least one start time stamp and at least one end time stamp, and/or performing any other computation facilitating determination of an amount of time taken to transmit at least a portion of a request to an endpoint device. In some embodiments, the at least one first timestamp and/or at least one end timestamp may correspond to a Universal Time Coordinated (UTC) time allowing to synchronize one or more states of or operations performed by multiple remote computing devices. For instance, a cybersecurity agent may transmit a request to an endpoint device and may record a start timestamp in memory, the start timestamp corresponding to a UTC time for when the request was transmitted. In reply to the request, the endpoint device (e.g., a cybersecurity server) may send a notification including an end timestamp indicating a time (e.g., a UTC time) when at least a portion of the request was received by the endpoint device. A processor (e.g., of the client device) may determine a response time based on the start timestamp for transmitting the request to the endpoint device and the end timestamp (e.g., included in the response to the request) associated with the endpoint device receiving at least a portion of the request, thereby determining a response time based on a transmitted request. For instance, the response time may be computed as a difference between the end timestamp and the start timestamp. In some embodiments, an endpoint device may not transmit an end timestamp, and a client device and/or cybersecurity agent may determine (e.g., using an internal clock) a time at which a communication from the endpoint device was received (e.g., an end timestamp).

By way of a non-limiting example, in FIG. 7-1, upon transmitting at least one request to endpoint device 7-104, client device 7-102 may record (e.g., in an execution environment 7-118 of a browser application 7-120 residing in a memory 7-122) at least one start timestamp indicating a UTC time for transmitting the at least one request. For instance, client device 7-102 may query a clock associated with client device 7-102 to determine UTC time. In response to receiving the at least one request, endpoint device 7-104 may obtain at least one end timestamp indicating a UTC time for receiving at least a portion of the at least one request, e.g., by querying a clock associated with endpoint device 7-104. Endpoint device 7-104 may send the at least one end timestamp to client device 7-102 as a response to the at least one request. Client device 7-102 may use the response to obtain the at least one end timestamp and may determine a response time as a difference between the at least one end timestamp and the at least one start timestamp, thereby determining the response time based on transmitting the at least one request.

By way of another non-limiting example, reference is made to FIG. 7-2 illustrating an exchange 7-200 of multiple electronic communications between client device 7-102 and endpoint device 7-104 along a time axis 7-206, consistent with some embodiments of the present disclosure. For instance, exchange 7-200 may be transmitted via communications network 7-106. Client device 7-102 may record in memory (e.g., memory 7-122) a timestamp t1 (e.g., a UTC timestamp) associated with transmitting at least one request 7-208 to endpoint device 7-104. Endpoint device 7-104 may receive request 7-208 at time t2 (e.g., a UTC time). For instance, the time lapse between t1 and t2 may account for transmission time and/or any latencies incurred over communications network 108, e.g., including a delay associated with intruder 7-108 intercepting the transmission of request 7-208. At time t3, endpoint device 7-104 may transmit a response 7-212 (e.g., a notification) including time t2, e.g., to inform client device 7-102 when endpoint device 7-104 received at least a portion of request 7-208. For example, time t2, may be sent inside a payload of a packet destined for client device 7-102. Client device 7-102 may receive response 7-212 (e.g., at time t4) and may compute a response time for request 7-208 as a difference between t2 and t1, e.g., indicated as $\Delta t FIRST$. In some embodiments, client device 7-102 and endpoint device 7-104 may share a confidential cipher and/or secret key in advance of exchange 7-200 (e.g., an unknown to intruder 7-108) allowing endpoint device 7-104 to encrypt UTC time t2 independent of one or more cipher associated with a connection between client device 7-102 and endpoint device 7-104, such as connections 7-114 and 7-116. This may prevent intruder 7-108 from gaining knowledge about response 7-212 that would allow intruder 7-108 to interfere with or sabotage one or more cybersecurity tests associated with response 7-212

In some embodiments, a response time may be a Time to First Byte (TTFB). A TTFP may refer to an amount of time lapsed from when a request is sent by a computing device until a first byte of a response to the request may be received (e.g., by an endpoint device). A first byte of a response may refer to a byte of the response arriving at the endpoint device prior to arrival of any other bytes of the response. A TTFB may include time taken to establish a connection, transmit at least a first byte of a request over a connection, receive a first byte of a request, access an input buffer storing a first byte of a request, perform one or more error correction/detection procedures on a first byte of a request, and/or any other time spent sending a first byte of a request to an endpoint device via a connection. A TTFB may additionally include one or more latencies and/or delays incurred during transmission, such as may be incurred by an unauthorized device intercepting the transmission of the request. In some embodiments, a TTFB may be insensitive to a size of a request but may be sensitive to one or more latencies or delays associated with a connection for transmitting the request. For instance, a processor (e.g., of a client device) may send a first request and a second request to an endpoint device, the second request being larger (e.g., including more bytes) than the first request. However, since a TTFB for a request (e.g., the first request or the second request) may only relate to the first byte of the request, and may ignore subsequent bytes of the request, time to receive subsequent bytes of the request (e.g., following the first byte of the request) may not be relevant to the TTFB. Consequently, the size (e.g., the number of bytes) of a request may not affect a TTFB for the request, or may not be expected to affect a TTFB for the request. Conversely, since a TTFB for a request may include time to establish a connection and any delays or latencies incurred while transmitting a request via the connection, a TTFB for a request may be affected by (e.g., sensitive to) delays or latencies associated with the connection, such as network traffic.

For example, in a first stage of a cybersecurity test, a processor (e.g., of a client device) may transmit to an endpoint device a first request including 100 bytes of data inside a payload of a packet. In some embodiments, the data may be arbitrary (e.g., not configured for a particular operation or application). The endpoint device may record a timestamp corresponding to receiving the first byte of the 100 bytes as the TTFB and may discard the remaining bytes of the first request. In a second stage of a cybersecurity test, the processor may transmit to the endpoint device a second request including 10 Kb of arbitrary data inside a payload of a packet. The endpoint device may record a timestamp corresponding to receiving the first byte of the 10 Kb as the TTFB and may discard the remaining bytes of the second request. Consequently, the TTFB for the first and second stage of the cybersecurity test may be uncorrelated to, or may be expected to be uncorrelated to, the payload size.

In some embodiments, the at least one first request is a plurality of requests (e.g., a first plurality of requests). Similarly, the at least one second request may also be a plurality of requests (e.g., a second plurality of requests). A plurality may refer to multiple, or more than one (e.g., requests). A plurality of requests may include a sequence, cluster, or group of multiple requests, e.g., transmitted in succession. A plurality of requests may include identical, similar, and/or different requests. For example, a plurality of requests may include requests transmitted from a same transmitting device, transmitted from a same transmitting network (e.g., range of IP addresses), transmitted from a same area (e.g., geographic), transmitted to a same endpoint (e.g., destination device, server, network, address, or domain). Each request of a plurality of requests may be associated with a response time and a response. For example, a response to a request may include the response time. Consequently, transmitting a plurality of requests to an endpoint device may cause an endpoint device to transmit a plurality of responses in return, each response including a response time. In some embodiments, the response time may be a metric of response times associated with the plurality of requests. For example, a first metric of response times may be associated with (e.g., may describe or represent) response times for a plurality of first requests. Similarly, a second metric of response times may be associated with (e.g., may describe or represent) response times for a plurality of second requests A metric may refer to a measurable characteristic or attribute related to a measurement system, which may be expressed as one or more of a value (e.g., a statistical value, such as an average or mean), a combination of values (e.g., a range, such as a range of one, two, or any number of standard deviations within an average or mean), or an expression (e.g., a mathematical expression). A metric of response times associated with a plurality of requests may include a measurable characteristic of multiple response times for multiple requests, such as one or more statistical metrics, e.g., an average response time, a median response time, a mode for a response time, a spread (e.g., one or more standard deviations), a skew, an outlier or anomalous response time, a minimum or maximum response time, and/or any other measurable characteristic of multiple response times. For instance, an average response time may be computed by computing a sum of a plurality of response times and dividing the sum by the number of response times. Additionally, or alternatively, an average response time may refer to a most probable response time of multiple response times, a mean response time of multiple response times, and/or a mode of multiple response times.

In some embodiments, the at least one transmitted request is at least one first request. Similarly, the response time (e.g., of the request) may be a first response time based on the transmitted at least first one request (e.g., a time between when the first request was transmitted until the first request was received, and/or until an associated response was received). At least one first request may refer to at least one request transmitted prior to (e.g., before) transmitting at least one second request (e.g., a discrete packet or number of packets). For example, the at least one first request may be associated with a first stage of multiple stages for a cybersecurity test. For instance, in a first stage of a cybersecurity test, a processor of a client device may transmit to an endpoint device at least one first request including multiple requests, each associated with a response time. The processor may determine the first response time by computing an average (e.g., a first metric) of the multiple response times. In some embodiments, the sizes of the requests included in the at least one first request may be the same (e.g., for first requests sent for different cybersecurity tests for the same or different devices). In some embodiments, the sizes of the requests included in the at least one first request may differ and may fall within a predetermined range.

By way of a non-limiting example, in FIGS. 7-1 and 7-2, client device 7-102 may include a cybersecurity agent 7-124 (e.g., corresponding to cybersecurity agent 226 of FIG. 2) instantiated inside exemplary execution environment 7-118. For example, cybersecurity agent 7-124 may transmit request 7-208 (e.g., at least one first request) to endpoint device 7-104. Request 7-208 may include an IP address in a header of a packet for request 7-208, indicating endpoint device 7-104 as an intended destination for request 7-208. Request 7-208 may be associated with a first stage 7-210 of a cybersecurity test (e.g., where first stage 7-210 may be performed prior to other stages of the cybersecurity test). In some embodiments, request 7-208 may be included in a group including multiple first requests associated with first stage 7-210. Cybersecurity agent 7-124 may determine a response time for request 7-208 (e.g., $\Delta tFIRST$) based on response 7-212 received from endpoint device 7-104 in reply to request 7-208. For instance, response 7-212 may include timestamp t2 indicating when endpoint device 7-104 received at least a portion (e.g., a first byte) of first request 7-208, allowing client device 7-102 to compute response time $\Delta tFIRST$ for request 7-208 as a difference between t1 and t2. In some embodiments, endpoint device 7-104 may encrypt timestamp t2 using a confidential cipher and/or secret key, which may be shared between endpoint device 7-104 and client device 7-102 in advance via a secure channel (e.g., and unknown to intruder 7-108), such that intruder 7-108 may not be able to decipher timestamp t2.

In some embodiments, the at least one transmitted request is at least one second request. Similarly, the response time (e.g., of the request) may be a second response time based on the transmitted at least second one request (e.g., a time between when the second request was transmitted until the second request was received, and/or until an associated response was received). At least one second request may refer to at least one request transmitted subsequent to, or following (e.g., after) transmitting at least one first request. For example, the at least one second request may be associated with a second stage of a test for determining a cybersecurity threat including multiple stages. For instance, in a second stage of a cybersecurity test, a processor of a client device may transmit to an endpoint device at least one second request including multiple requests, each associated with a response time. The processor may determine the second response time by computing an average (e.g., a second metric) of the multiple response times. In some embodiments, the sizes of the requests included in the at least one second request may be the same. In some embodiments, the sizes of the requests included in the at least one second request may differ and may fall within a predetermined range. At least one second request may also refer to at least one request whose transmission was initiated after transmission was initiated for another request (e.g., at least one first request).

In some embodiments, the number of requests (or amount of data, or number of packets) included in the at least first request may equal the number of requests (or amount of data, or number of packets) included in the at least one second request. In some embodiments, the at least first request and at least second request may include a different number of requests (or amount of data, or number of packets).

In some instances, the transmission of at least one first request is caused by a cybersecurity web agent. For example, a cybersecurity web agent may be injected into an execution environment of a client device such that instantiating the cybersecurity web agent may cause at least one first request to be transmitted (e.g., to an endpoint device). In some embodiments, the endpoint device may be an intended destination of an electronic communication sent by a client device associated with transmitting at least one of the at least one first request or the at least one second request. In some embodiments, the client device may be associated with transmitting the first request (as discussed above with respect to a client device being associated with transmitting at least one request). For instance, a cybersecurity web agent configured with a client device may transmit at least one first request to an endpoint device (e.g., a cybersecurity server) in a first stage of a cybersecurity test. The first request may include an identifier, such as an IP address or a URL for the endpoint device indicating the endpoint device as an intended destination of electronic communication sent by the client device. The cybersecurity web agent may determine a first response time based on the at least one first request, (e.g., using one or more timestamps) as described earlier. For example, the first response time may be a Time to First Byte (TTFB) described earlier. In some embodiments, the client device may be associated with transmitting the second request (as discussed above with respect to a client device being associated with transmitting at least one request). For instance, after transmitting at least one first request and determining a response time associated with the at least one first request, a cybersecurity web agent configured with a client device may transmit at least one second request to an endpoint device (e.g., a cybersecurity server) in a second stage of the cybersecurity test, following the first stage. The second request may include an identifier, such as an IP address or a URL for the endpoint device indicating the endpoint device as an intended destination of the request sent by the client device. The cybersecurity web agent may determine a second response time based on the at least one second request, e.g., using one or more timestamps included in a response to the second request, as described earlier. For example, the second response time may be a Time to First Byte (TTFB) as described earlier.

By way of a non-limiting example, in FIGS. 7-1 and 7-2 cybersecurity agent 7-124 may transmit a request 7-214 (e.g., at least one second request) following or subsequent to request 7-208 (e.g., at least one first request). Second request 7-214 may include an IP address in a header of a packet for request 7-214, indicating endpoint device 7-104 as an intended destination for request 7-214. Second request 7-214 may be associated with a second stage 7-216 of a cybersecurity test (e.g., where second stage 7-216 may be performed after first stage 7-210). In some embodiments, second request 7-214 may be included in a group of multiple second requests for second stage 7-216. Cybersecurity agent 7-124 may determine a response time for second request 7-214 (e.g., ΔtSECOND) based on a response 7-218, which may be transmitted by endpoint device 7-104 at time t7 in reply to second request 7-214, and may be received by client device 7-102 at time t8. For instance, second request 7-214 may include timestamp t6 (e.g., as a payload in a packet for response 7-218) indicating when endpoint device 7-104 received at least a portion (e.g., a first byte) of second request 7-214, allowing client device 7-102 to compute response time ΔtSECOND for request 7-214 as a difference between t5 and t6. In some embodiments, endpoint device 7-104 may encrypt timestamp t6 using a confidential cipher and/or secret key, which may be shared between endpoint device 7-104 and client device 7-102 in advance of exchange 7-200 via a secure channel (e.g., unknown to intruder 7-108), such that intruder 7-108 may not be able to decipher timestamp t6 and interfere and/or sabotage one or more security tests.

In some embodiments, the at least one first request includes a first payload and the at least one second request includes a second payload larger than the first payload. In some instances, an electronic file (e.g., a request) may be transmitted over a communications network as one or more packets, as described earlier. Each packet may contain at least a header and a payload. A header of a packet may contain routing information for an intended destination (e.g., an intended endpoint device), as described earlier. A payload of a packet may include (e.g., contain and/or store) electronic data, which may be part or all of a request, and which may be included in an electronic file. A payload may be distinct from, for example, header or formatting information included in a same packet or sequence of packets as the payload. An endpoint device (e.g., an intended destination and/or an unintended destination) receiving one or more packets of an electronic file may extract a payload of each received packet and assemble the one or more extracted payloads to reconstruct the electronic file. In some embodiments, a header of a packet may include a packet size and a header size (e.g., stored in a Total Length field and a Header Length field, respectively, in a header of an IP packet), allowing to determine a payload size for a packet by subtracting a value stored in the Header Length from a value stored in the Total Length field. Larger may refer to longer, or having a greater length (e.g., measured in bytes, bits, and/or text, such as lines of code). For instance, a payload containing one hundred bytes of data may be larger than a payload containing one byte of data. A processor of a client device may transmit at least one first request to an endpoint device as at least one first packet including a first payload and may transmit at least one second request to the endpoint device as at least one second packet including a second payload. Some embodiments may involve a first payload (e.g., representing and/or containing at least one first request) having a different size than a second payload (e.g., representing and/or containing in at least one second request). For instance, at least one second payload containing at least one second request may include more bytes (e.g., may be larger) than at least one first payload containing at least one first request. Alternatively, at least one second payload containing at least one second request may include fewer bytes (e.g., may be smaller) than at least one first payload containing at least one first request. In other words, the at least one first request may include a first payload and the at least one second request includes a second payload having a different size than the first payload. For example, a first request may include ten requests, each containing 100 bytes of arbitrary data (e.g., not configured for a particular operation or application). A client device may transmit the first request as ten different packets, each including a payload containing 100 bytes of arbitrary data. A second request may also include ten requests, each containing 1 Kb of arbitrary data. The client device may transmit the second request as ten different packets, each including a payload containing 1 Kb bytes of arbitrary data.

By way of a non-limiting example, in FIG. 7-2, a packet for request 7-208 may have a first payload including 10 bytes of data, and a packet for request 7-214 may have a second payload including 250 bytes of data, such that request 7-214 (e.g., at least one second request) may have a larger payload than request 7-208 (e.g., at least one first request).

Some embodiments involve determining a difference between the first response time and the second response time. A difference may refer to a measurable inequality, disparity, or discrepancy, such as a value determined by subtracting one value from another value. Determining a difference between a first response time and a second response time may include obtaining a first response time and a second response time (e.g., from memory), and performing a difference computation using a first response time and a second response time. A difference computation may include one or more of subtracting, dividing, computing one or more logarithms, computing a statistical distance, computing a geometric distance, comparing, or matching. For instance, a cybersecurity web agent may subtract a first response time from a second response time, divide a first response time by a second response time, compare a first response time to a second response time, and/or compute a statistical difference between multiple first response times and multiple second response times. For instance, a processor may determine a first response time of 2 s for transmitting at least one first request to an endpoint device, and a second response time of 20*s* for transmitting at least one second request to an endpoint device. The processor may determine a difference between the first response time and the second response time as 18*s* (e.g., 20 s minus 2 s). Alternatively, the processor may determine the difference between the first response time and the second response time as 10 (e.g., by dividing 10 s by 2 s). Of course, response times may be measured using smaller increments than seconds, such as milliseconds, microseconds, or any other increment of time measurable or determinable by a computing device.

By way of a non-limiting example, in FIGS. 7-1 and 7-2, cybersecurity agent 7-124 may subtract ΔtFIRST from ΔtSECOND to determine a difference between the first response time for request 7-208 and the second response time for request 7-214. In some embodiments, cybersecurity agent 7-124 may compute a difference between the first response time for request 7-208 and the second response time for request 7-214 as a ratio between the first response time and the second response time (e.g., ΔtFIRST divided by ΔtSECOND, or ΔtSECOND divided by ΔtFIRST).

Some embodiments involve determining whether to implement a remedial action. A remedial action may refer to a process, task, or operation configured to protect a computing resource or prevent future cyber attacks or vulnerabilities. For example, a remedial action may include an alert to a user of a potential cyber threat to prevent the user from transmitting and/or receiving data, halting an instance of data transmission and/or reception, terminating a communications session, logging data associated with a communication session (e.g., associated with a potential cyber attack), establishing a new (e.g., secure) connection (e.g., with a cybersecurity server), installing a code to circumvent an unauthorized eavesdropper or intruder, and/or invoking a code to circumvent an unauthorized eavesdropper or intruder. Implementing a remedial action may refer to performing or executing a process, task, function, program, script, or operation to protect a computing resource, such as by executing code to cause a resulting remedial action, described above. For example, implementing a remedial action may include executing code to generate and/or display an alert at a device associated with a user. As another example, implementing a remedial action may include terminating a communications session and/or invoking an application to circumvent an intruder.

In some instances, the remedial action may be implemented at a client device hosting the cybersecurity web agent. Hosting may refer to housing, serving, storing, operating, using, executing, and/or maintaining stable and secure storage, such as for one or more electronic files. A client device hosting a cybersecurity web agent may involve one or more of storing a cybersecurity application configured to inject a cybersecurity web agent into an execution environment of a browser application, injecting a cybersecurity web agent into an execution environment, instantiating a cybersecurity web agent inside an execution environment, executing an operation associated with a cybersecurity web agent, and performing one or more operations to implement a cybersecurity web agent. Operations to implement a cybersecurity web agent may include monitoring electronic communication transmitted by a client device over a communications network, transmitting a first and/or second request, determining a first and/or second response time for a first and/or second request, determining a difference between a first and/or second response time, and implementing a remedial action at the client device. For instance, the cybersecurity web agent may terminate a connection between a client device and an intruder, warn a user of the client device of an intruder, or initiate or implement any other remedial action.

Some embodiments involve determining whether to implement the remedial action based on the determination of the difference between the first response time and the second response time. In some instances, a difference between the first response time and the second response time may indicate the presence of an intruder. For example, an intruder intercepting a packet transmitted to an endpoint device (e.g., an intended destination) may attempt to access a payload of the packet by decrypting the payload according to a first cipher and/or first key associated with a first connection (e.g., between the intruder and a client device) and re-encrypting the payload according to a second cipher and/or second key associated with a second connection (e.g., between the intruder and an endpoint device). In some instances, decrypting and encrypting a piece of data may demand processing resources in proportion to a number of bytes (e.g., a size) included in the piece of data. Consequently, decrypting a payload and re-encrypting the payload may demand an amount of computing time proportional to a payload size, such that an amount of computing time to decrypt and re-encrypt a large payload may be measurably larger than an amount of computing time to decrypt and re-encrypt a small payload. For instance, the computing time to decrypt and re-encrypt may be proportional to a payload size. Consequently, it is appreciated that the time for an intruder to decrypt and re-encrypt a payload of at least one large response may be longer than the time to decrypt and re-encrypt a payload of a response smaller than the large response by an among proportional to the size difference between the large response and the small response. A measurable difference between a first response time and a second response time may therefore indicate presence of an intruder decrypting and re-encrypting a payload of at least one first response and a payload of at least one second response. In some embodiments, a computing device and/or cyber agent may determine to implement a particular remedial action when a difference between the first response time and the second response time exceeds a predetermined threshold (discussed further below). In some embodiments, multiple thresholds may be associated with different remedial actions, such that a computing device and/or cyber agent may implement more drastic actions (with terminating a connection being more drastic than prompting an alert, for example) for higher thresholds (e.g., difference values).

By way of a non-limiting example, in FIGS. 7-1 and 7-2, client device 7-102 may host cybersecurity agent 7-124 inside execution environment 7-118. Cybersecurity agent 7-124 may determine a communication discrepancy based on a difference between ΔtFIRST and ΔtSECOND. For example, the difference between may exceed a predetermined threshold of 10 seconds. Consequently, cybersecurity agent 7-124 may alert a user of client device 7-102, and may terminate connection 7-114, connecting client device 7-102 to intruder 7-108.

In some embodiments, a remedial action may be implemented when the difference between the first response time and the second response time exceeds a predetermined threshold. A threshold may include a baseline, limit, or other value, such as, a minimum, a maximum, and/or a range (e.g., between a minimum and a maximum). In some embodiments, a threshold may relate to resources (e.g., computing time, memory space, channel capacity) needed to perform one or more computations, such as a decryption procedure according to a first cipher and/or first key followed by a re-encryption procedure according to a second cipher and/or second key. In some embodiments, a threshold may be based on multiple thresholds (e.g., as an average or aggregate). In some instances, a threshold may relate to any of an absolute time difference between a first response time and a second response time (e.g., 1 s), a percent difference between a first response time and a second response time (e.g., 50%), a factor between a first response time and a second response time (e.g., a ten-fold increase), and/or any other measurable discrepancy between a first response time and a second response time. A predetermined threshold may include a threshold computed and/or established in advance of transmission or receipt of a communication (e.g., stored in memory). Exceeding (e.g., exceeds) may refer to surpassing, or extending beyond a limitation. By way of example, a time difference of 101 milliseconds exceeds a time difference threshold of 100 milliseconds. Exceeding a predetermined threshold may refer to surpassing a limit associated with a predetermined threshold, for instance outside of a tolerance range for the predetermined threshold. Determining if (e.g., when) a difference between a first response time and a second response time exceeds a predetermined threshold may include searching for a predetermined threshold, retrieving a predetermined threshold, determining a tolerance for a predetermined threshold, and/or making one or more comparisons to a predetermined threshold (e.g., while accounting for a tolerance).

For example, a predetermined threshold for discrepancies in TTFB response times for a communications network may be 10 seconds (e.g., to account for variations in network traffic). A processor of a client device may perform a cybersecurity test by transmitting to an endpoint device a first request including 1 Kb of data and a second request including 10 Kb of data. The processor may determine a difference of 1 minute between a response time for the first request and a response time for the second request. Since the difference may exceed the predetermined threshold, the processor may determine to alert a user of the client device of a communication discrepancy.

In some embodiments, the predetermined threshold is uncorrelated with a payload size. Uncorrelated may refer to lacking a relationship (e.g., a statistical relationship) or proportionality. For instance, a response time calculated based on TTFB (e.g., described earlier) may only account for receiving a first byte of a payload, thereby ignoring any remaining bytes of the payload. As another example, a predetermined threshold may be fixed, regardless of payload size, or may be variable, but may vary only based on parameters other than payload size. Consequently, an expected response time for a first byte of a payload may be unrelated (e.g., uncorrelated) to payload size, and a predetermined threshold for a difference in response times between two different payloads may be unrelated (e.g., uncorrelated) to payload size. For instance, a predetermined threshold for differences in response times may account for variations in network traffic affecting transmitting a single byte of data (e.g., only the first byte of a payload), and may ignore transmission times for the remaining bytes. The predetermined threshold may thus be uncorrelated with a payload size. As an example, expected variations in response times to transmit a single byte over a communications network may be five seconds (e.g., a predetermined threshold). A response time for a first byte of a large payload and a response time for a first byte of a small payload may be expected to be within five seconds of each other. If upon measuring the response times, the response time for the first byte of the large payload is determined to be substantially longer (e.g., exceeding a threshold) than five seconds than the response time for the first byte of the small payload (e.g., the difference is one minute), the difference in response times may indicate a delay due to something other than expected network traffic. For instance, a difference in response times proportional to a payload size may indicate performance of an operation demanding computing resources in proportion to payload size, such as decrypting and re-encrypting a payload (e.g., by a malicious intruder device). In this manner, differences in response times for differing payload sizes may indicate an intruder eavesdropping on encrypted electronic communication (e.g., transmitted via an HTTPS protocol).

For example, a predetermined threshold for discrepancies in TTFB response times for a communications network may be 10% (e.g., to account for variations in network traffic). By way of further example, a processor of a client device may perform a cybersecurity test by transmitting to an endpoint device a first request including 1 Kb of data and a second request including 10 Kb of data. The processor may determine a tenfold difference between a TTFB response time for the first request and a TTFB response time for the second request (e.g., indicating proportionality between the response times). Since the difference may exceed the predetermined threshold, the processor may determine to alert a user of the client device (or, additionally or alternatively, implement another remedial action).

In some instances, the payload size may be associated with at least one of the at least one first request or the at least one second request. For example, the at least one first request and/or the at least one second request may be transmitted to an endpoint device using one or more packets storing the at least one first request and/or the at least one second request inside a payload of each packet. Consequently, a predetermined threshold uncorrelated with a payload size may be uncorrelated to a size of the at least one first request and/or the at least one second request. Such a lack of correlation may allow testing a connection with an endpoint device by transmitting at least one first request having a first size and at least one second request having a second size, different than the first size. As another example, a payload size associated with at least one first request may be an average size or other statistical expression of a plurality of first requests. Similarly, a payload size associated with at least one second request may be an average size or other statistical expression of a plurality of second requests.

For example, a cybersecurity web agent implemented by a processor may construct a first request to include 1 Kb of arbitrary data and a second request to include 100 bytes of arbitrary data, such that the first request may be ten times larger than the second request. The cybersecurity web agent may create a first packet storing the first request in a first payload and a second packet storing the second request in a second payload. The cybersecurity web agent may determine an expected time variation due to network traffic for transmitting a single byte to an endpoint device to be five seconds. Consequently, a TTFB for the first payload (e.g., containing 1 Kb of data) and a TTFB for a second payload (e.g., containing 100 bytes of data) may be expected to be within approximately (e.g., within a tolerance of) five seconds (e.g., uncorrelated to payload size). However, if a measured TTFB for the first payload is, for example, ten times longer than a measured TTFB for the second payload (e.g., correlated to the respective payload sizes), thereby exceeding the predefined threshold, this may indicate an intruder decrypting and re-encrypting the first and second payloads.

By way of a non-limiting example, in FIGS. 7-1 and 7-2, cybersecurity agent 7-124 may construct first request 7-208 to include 1 Kb of arbitrary data and transmit first request 7-208 to endpoint device 7-104 via communications network 7-106 as a first payload of a first packet. Cybersecurity agent 7-124 may construct second request 7-214 to include 10 Kb of arbitrary data and may transmit second request 7-208 to endpoint device 7-104 via communications network 7-106 as a second payload of a second packet. Cybersecurity agent 7-124 may determine a predetermined threshold of 5 seconds as an expected time variation due to network traffic to transmit a single byte to endpoint device 7-104 over communications network 7-106. For instance, cybersecurity agent 7-124 may analyze a history of traffic over communications network 7-106 to determine an expected time variation for transmitting a single byte. Consequently, cybersecurity agent 7-124 may expect a difference between a TTFB for first request 7-208 (e.g., containing 1 Kb of data) and a TTFB for a second request 7-214 (e.g., containing 10 Kb of data) to be within 5 seconds (e.g., uncorrelated to payload size). If cybersecurity agent 7-124 determines that the TTFB response times for first request 7-208 and second request 7-214 are correlated to payload size (e.g., ten-fold), cybersecurity agent 7-124 may determine that something other than network traffic may be responsible for the difference in response times. For instance, cybersecurity agent 7-124 may determine that the difference may be due to intruder 7-108 intercepting first request 7-208 and second request 7-214, decrypting first and second requests 7-208 and 7-214 using a first cypher and/or key corresponding to connection 7-114 between client device 7-102 and intruder 7-108, and re-encrypting first and second requests 7-208 and 7-214 using a second cipher and/or key corresponding to connection 7-116 between intruder 7-108 and endpoint device 7-104.

In some instances, the remedial action includes issuing a prompt. A prompt may refer to a warning, alert, graphic, interface, or message, for example to convey information to a user. For instance, a prompt may display instructions and/or guidance (e.g., within a graphical user interface, or GUI, on a screen) to thwart or circumvent a cyber threat. In some embodiments, a prompt may be configured for active interaction with a user. Issuing a prompt may include transmitting a notification (e.g., to a display) recommending suspension of an execution of a current application, transmitting a notification with an interactable GUI element (e.g., which, when interacted with by a user, causes an operation to occur, such as suspension or termination of a process, connection, or application), suspending an execution of a current application, sending a notification (e.g., to an internal application, a peripheral device, and/or a cybersecurity server) that a prompt may be issued, determining a context for a prompt, selecting a message to include in a prompt (e.g., corresponding to a context), calculating a layout to display a prompt, displaying a prompt, receiving a user input (e.g., a confirmation) in response to a prompt, (e.g., as an acknowledgement). For instance, a prompt may suspend execution of an application by displaying a pop-up window showing a warning text and requiring a user to click a button to resume execution of the application. In some embodiments, the prompt may indicate that a connection associated with the at least one first request and the at least one second request is compromised. Compromised may refer to corrupted, unsecure (e.g., "hacked"), imperiled, put in jeopardy, or any other indication of risk of use for an unexpected or unintended purpose. For instance, a connection may be compromised by an attacker or an intruder device attempting to eavesdrop and/or manipulate information exchanged between two or more parties (e.g., other devices), and a prompt may include text, a graphic, or other visual indication that a connection is at risk or exhibiting unexpected behavior. A connection may refer to a physical channel, as described earlier. By way of a non-limiting example, in FIG. 7-1, in response to determining a communication discrepancy, cybersecurity agent 7-124 may display a warning on a display of client device 7-102.

In some embodiments, the remedial action may include logging digital information associated with an execution environment associated with a connection to the endpoint device. Logging digital information may include monitoring state data related to one or more computing resources, recording state data, sorting state data, and/or making state data accessible for analysis. An execution environment associated with a connection to an endpoint device may include one or more computing resources of an execution environment of a browser application allocated to facilitate communicating with an endpoint device, such as a transmit buffer configured to store data for transmission, a queue to schedule one or more tasks to cause transmission of data to an endpoint device, a stack to cause a processor to implement one or more tasks causing transmission of data to an endpoint device, a memory location storing an IP address and/or URL of an endpoint device, a port number for transmitting data to an endpoint device, a clock to synchronize transmitting data to an endpoint device, a protocol (e.g., HTTP, HTTPS, of a web socket API), cipher, and/or key associated with a connection to an endpoint device, any other computing resource facilitating communicating with an endpoint device via a connection, and any other characteristic of an execution environment, as discussed above. Logging digital information associated with an execution environment associated with a connection to the endpoint device may include monitoring, recording, storing, and/or presenting state data of an execution environment of a browser application establishing a connection with an endpoint device. For example, at least one processor (e.g., of a client device) may store time information (e.g., a timestamp), endpoint device information (e.g., a URL or IP address associated with an intended destination), web browser activity information, or any other information having potential to identify a cyber attacker and/or prevent vulnerabilities or future cyber attacks. By way of a non-limiting example, in FIG. 7-1, cybersecurity agent 7-124 may perform a remedial action by recording (e.g., logging) state data associated with execution environment 7-118 in an electronic file and sending the electronic file to endpoint device 7-104 (e.g., corresponding to cybersecurity server 104 of FIG. 1).

In some embodiments, the remedial action includes influencing an execution environment associated with a web browser. Influencing may include affecting, altering, and/or changing, e.g., an execution environment. A web browser may refer to a browser application, as described earlier. Influencing an execution environment associated with a web browser may include monitoring and/or terminating a connection connecting a web browser to an endpoint device via a communications network, transmitting and/or receiving data (e.g., test data) from a web browser to an endpoint device via a communications network, scheduling and/or removing a task for execution (e.g., to limit or end communication between a web browser and an endpoint device), establishing a connection (e.g., a new connection) between a web browser and an endpoint device, changing a protocol, changing a payload, closing a tab in a web browser, adding an identifier (e.g., domain, IP address, URL, URI) to a blacklist accessible to a web browser, changing a cipher and/or key for a connection between a web browser and an endpoint device, and/or performing any other action affecting an execution environment for a web browser. By way of a non-limiting example, in FIG. 7-1, cybersecurity agent 7-124 may perform a remedial action by terminating a connection between browser application 7-120 and intruder 7-108, thereby influencing execution environment 7-118.

Some embodiments involve a cybersecurity system for detecting a communication discrepancy between two communication parties, the system including at least one processor configured to: transmit at least one first request to an endpoint device; determine a first response time based on the transmitted at least one first request; transmit at least one second request to the endpoint device; determine a second response time based on the transmitted at least one second request; determine a difference between the first response time and the second response time; and based on the determination of the difference between the first response time and the second response time, determine whether to implement a remedial action.

By way of a non-limiting example, in FIGS. 7-1 and 7-2, system 7-100 may include client device 7-102 (e.g., including at least one processor 110 of FIG. 1) configured to transmit a first request 7-208 to endpoint device 7-104, determine a first response time ΔtFIRST based on transmitted first request 7-208 (e.g., using response 7-212), transmit second request 7-214 to endpoint device 7-204, determine second response time ΔtSECOND based on transmitted second request 7-214, and determine a difference between first response time ΔtFIRST and second response time ΔtSECOND (e.g., by performing one or more of subtracting, dividing, computing a logarithm, computing a hamming distance, and/or computing a statistical difference). Based on the determination of the difference between first response time ΔtFIRST and second response time ΔtSECOND, client device 7-102 may determine whether to implement a remedial action. In some embodiments, one or more of the preceding operations may be performed by cybersecurity agent 7-124.

FIG. 7-3 depicts process 7-3-00, represented by process blocks 7-302 to 7-312. At block 7-302, a processing means (e.g., processor 110 in FIG. 1) may transmit at least one first request to an endpoint device, consistent with disclosed embodiments. For example, the processing means may transmit a first request to cybersecurity server 104 via communications network 108. At block 7-304, the processing means may determine a first response time based on the transmitted at least one first request, consistent with disclosed embodiments. At block 7-306, the processing means may transmit at least one second request to the endpoint device, consistent with disclosed embodiments. At block 7-308, the processing means may determine a second response time based on the transmitted at least one second request, consistent with disclosed embodiments. At block 7-310, the processing means may determine a difference between the first response time and the second response time, consistent with disclosed embodiments. At block 7-312, the processing means may, based on the determination of the difference between the first response time and the second response time, determine whether to implement a remedial action, consistent with disclosed embodiments.

Phishing may refer to a social engineering attack, employing deceit and coercion to trick a user into revealing sensitive information or downloading malware. For example, an attacker, disguised as a legitimate individual or organization, may send a communication designed to lure a victim into taking an action, such as to download an attachment laced with malicious code or to navigate to a phony webpage designed to gather sensitive information. Some phishing attacks may insert into a communication (e.g., an email, an instant message, a notification via a social media application, a phone call, or any other type of communication) a link to a malicious landing page disguised as a trusted domain. For instance, the link may include an extra character, or may be shortened (e.g., using a URL shortening tool such as Bitly) to fool a victim into clicking on the link. Other phishing attacks may exploit an expired (e.g., "broken") link that is navigable to an abandoned landing page. An attacker may hijack the expired link and use the abandoned landing page to serve malicious code. Yet other phishing attempts may include content configured to circumvent one or more security rules (e.g., a security toolbar or phishing filter). For instance, a "browser in browser" phishing attack may display a fake login page in a popup window designed to circumvent a security scanner configured with one or more security rules. Another strategy for circumventing a security scanner may include inserting a link to a malicious webpage inside a password protected document sent as an attachment. As another example, a phishing attempt may manipulate a link to appear invalid thereby deceiving a security scanner into bypassing the link, while appearing valid to a browser application configured to send a victim to a phishing page if the victim clicks on the link. Such attacks can pose risks to users, such as theft of user data, tracking online activity, taking control of a computing device, logging keystrokes, or implementing other cyber threats, which are problems that arise in the realm of computers, including computer networks. Some proposed solutions to phishing attempts may execute a code (or portion thereof) in an isolated sandbox. However, a sandbox may be detected by the executing code, and the executing code may abort an execution of a malicious payload. Additionally, a sandbox may not emulate human behavior, such as solving captcha challenges. Therefore, there is a need for unconventional innovations to protect against phishing attempts to shield users, systems, devices, and information from cyber threats. Such unconventional approaches may enable detection of a phishing attempt and prevent activation of a cyber threat.

The unconventional approaches, expressed in the disclosed embodiments, may involve inserting an agent into an execution environment for executing a code to detect one or more runtime characteristics and consequences (e.g., effects of running the code). The agent may analyze an execution environment when preparing to render a code to display content (e.g., during a static or passive analysis stage) to identify one or more anomalies, such as a flawed link or non-compliance with one or more security rules. In addition, the agent may analyze an execution of the code (e.g., in a dynamic or active analysis stage) to determine if a functionality associated with the content is invalid. For example, the agent may investigate for DOM structure abnormalities, disabled events, or other invalid occurrences that may be missed in a static analysis. During the dynamic analysis stage, the agent may simulate an execution of the code or a portion thereof inside an isolated environment, such as an iframe, which may create a confined container within the runtime environment. Because simulating code inside an iframe may occur during runtime on a client device, there may be no need for a dedicated sandbox. Additionally, since the code simulation occurs inside an iframe, effects of the code simulation may be transparent to a user. If a functionality is deemed invalid, the agent may take a remedial action. Thus, the various embodiments the present disclosure describe at least a technological solution, based on improvement to operations of computer systems and platforms, to the technical challenge of detecting and intercepting a phishing attempt.

Disclosed embodiments may involve systems, methods, and computer-readable media for detecting a phishing attempt. The systems and methods described herein may be implemented with the aid of at least one processor or non-transitory computer readable medium, such as a CPU, FPGA, ASIC, and/or any other processing structure(s) or storage medium, as described herein. For ease of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities. While many actions may be described with respect to a particular element as discussed below, it should be noted that any and all actions described may be performed with respect to a copy of a particular element, which may be generated by an agent.

Some embodiments involve at least one processor configured to perform cybersecurity operations for detecting a phishing attempt. A processor may refer to a physical component, device, or group of components or devices having electric circuitry that performs one or more logic operation on an input or inputs, as described earlier. Performing operations may involve executing one or more arithmetic, logical, or inference steps, for example by a computing processor, as described earlier. Cybersecurity operations may include to actions, processes, and/or procedures configured to protect or more computing resources. For example, a cybersecurity operation may protect against information leakage, data corruption, damage to computing resources (e.g., hardware, software, and electronic data), disruption of one or more services provided by a computer system, or any other type of harm inflicted or attempted on a computing resource. A phishing attempt may refer to a cyber security threat (e.g., electronic digital data or communication) employing deceit or coercion to trick a user into comprising a computing resource, such as by revealing or sharing sensitive information (e.g., a credential such as a password or encryption key, personal identifying information, contact information, financial, business, or health related information, or any other type of classified information), or downloading a malicious code. A phishing attack may begin with a communication from an attacker impersonating a legitimate party. For example, the communication may be an email, an instant message (e.g., Short Message Service, or SMS), a notification via a chat application or social media application, a phone call, or any other information received via a communications medium. In some embodiments, the communication may request the recipient to take an action, such as to click on a fraudulent link, download a malicious attachment (e.g., included in the communication), or provide sensitive information (e.g., by replying to the communication), exposing the recipient to a cyber threat. For example, the fraudulent link may lead a user to a false web page, such as a fake login page (e.g., mimicking a bank login page) prompting the user to enter a credential, which the attacker may then steal. Similarly, downloading the attachment may cause malware to be installed on the victim's computing device. Operations for detecting a phishing attempt may involve analyzing a code for presenting content on the computing device (e.g., such as a code for a web page, an email application, a social media application, or any other software presenting content to a user), simulating and/or emulating one or more portions of a code, monitoring and analyzing information associated with an execution environment (e.g., while simulating or executing a code), interfacing with a remote computing device over a communications network (e.g., such as a cybersecurity server and/or a suspected computing device) and/or monitoring and analyzing data traffic transmitted over the communications network, or performing any other technique to protect a computing resource from a cyber threat, such as the operations discussed below. Analyzing a code to detect a phishing attempt may include querying and/or parsing a code (e.g., including a runtime version of a code, such as a DOM structure representing a code) to identify one or more tokens, comparing one or more tokens to a threshold, reference, or rule parameter, a token associated with a prior phishing attempt, or any other code analysis for identifying a phishing attempt. In some embodiments, a cybersecurity agent may be invoked on a computing device to detect a phishing attempt (e.g., by injecting code for the cybersecurity agent into a code scheduled for execution).

Some embodiments involve receiving a code for execution. A code for execution may include at least one instruction, script, module, program, command, function, or any other computing language information that may be readable by at least one processor (e.g., after conversion to object code, machine code, or other readable code) when loaded into a memory of a computing device and used by the at least one processor to perform an operation. Receiving code for execution may include obtaining, detecting, or otherwise gaining access to executable code in a way that is detectable by or understandable to a processor, as described earlier. Receiving code for execution may also include establishing a connection with another device, querying another device or memory, and/or requesting code for execution. For example, a computing device (e.g., including the at least one processor) may establish a connection with another computing device, and may receive code for execution from the other computing device over a communications network. Additionally, or alternatively, at least one processor may receive code for execution from memory (e.g., local memory).

By way of a non-limiting example, in FIG. 1, at least one processor 110 may receive a code from server 106 over communications network 108. At least one processor 110 may be configured to perform one or more cybersecurity operations to detect a phishing attempt via the code.

Some embodiments involve injecting, into an execution environment associated with the code, at least one agent. An execution environment may refer to a process, a program, an application, a frame, a file, a function, a container, a module, a call (e.g., an API call), one or more lines of code, a parameter, an argument, a script, a browser, a browsing session, a URL parameter, an IP address, an encryption type, an agent (such as an agent discussed herein), a connection, HTML code, an OS. a version of code, or any computerized information defining or influencing the computing context in which a process runs, as described earlier. An execution environment associated with the code may refer to information about the environment in which a code may be currently executed (or scheduled to be executed), such as a scope defining which variables, state data associated with one or more runtime resources (e.g., a stack, a queue, an event loop, a buffer, a register, or any other runtime resource), objects, parameters, functions, and/or APIs configured to be accessed during code execution, regions of memory allocated (e.g., in a heap and/or cache memory) to execute the code, or any other computerized parameter that may influence execution of the code. An agent (e.g., a software cybersecurity agent) may include or may refer to a code, that when executed within a runtime environment, performs one or more actions to protect a computer, as described earlier. Injecting an agent into an execution environment (e.g., a runtime environment) associated with the code may include inserting, adding, removing, installing, or otherwise introducing within computer code (e.g., an application) one or more program code instructions or a reference thereto, that when executed by at least one processor in the context of a specific runtime environment, perform the actions of the agent as described earlier. For example, injecting the agent into an execution environment for a code may expose the agent to one or more aspects, behaviors, developments, or effects associated with executing the code in the execution environment (e.g., with respect to one or more computing resources). This may allow the agent to identify one or more anomalies and/or cyber threats associated with executing the code.

In some embodiments, the code (e.g., the received code) is configured for execution by a JavaScript engine and the at least one agent includes a JavaScript agent. A JavaScript engine may refer to a software component of a JavaScript enabled browser application configured to interpret and/or employ just-in-time compilation to a code (e.g., including one or more JavaScript, Python, HTML, and/or CSS instructions) to generate an executable code for rendering a web page. A JavaScript engine may operate with a rendering engine via a DOM for the web page to transform the executable code (e.g., and any additional resources referenced by the code) into interactive web page content displayed on a computing device. For example, additional resources referenced by the code may include one or more images, video content, animations, icons, APIs, or executable code for displaying content inside a web page (e.g., in an iframe or picture-in-picture). In some embodiments, rendering the web page may include fetching (e.g., receiving) content from a remote computing device (e.g., a server) via a communications network. A JavaScript agent may refer to a software agent configured to perform one or more cybersecurity operations to protect one or more computing resources, as described earlier, where the runtime environment is a JavaScript runtime environment.

By way of a non-limiting example, in FIG. 2, cybersecurity agent 226 may be injected (e.g., by cybersecurity application 224) into execution environment 220 associated with webpage code 222. Webpage code 222 may be configured for execution by software engine 218. In some embodiments, software engine 218 may be JavaScript engine and cybersecurity agent 226 may be include a JavaScript agent.

Some embodiments involve the at least one agent configured to: collect execution data associated with rendering content based on the code. Content may include any information (e.g., digital information) included in, or referenced by a code (e.g., via a link, path, or address included in the code) and configured to be presented to a user (e.g., on an electronic display device). Content (e.g., digital content) may include one or more of a text, a graph, a chart, an image, a video, an animation, an audio recording, a haptic signal, a navigation link, one or more parameters settings for presenting, arranging and/or laying out information for display (e.g., according to a design or to produce a visual effect), as well as one or more interactive functionalities (e.g., user input driven interactions). A parameter setting for presenting content may include one or more of a position, a size, a style, a margin, a font, a color (e.g., foreground and/or background color), a graphic effect, a scope, a layer, a condition or state (e.g., based on a detected event) for altering a presentation of content, or any other attribute affecting a presentation of content. Rendering content may include calculating a geometry of a layout for one or more visible elements and painting each visible element (e.g., by setting hue, saturation, tint, and/or shade settings for one or more pixels designated for a visible element) on an electronic display. Rendering content based on a code may refer to the process of converting a code (e.g., HTML, CSS, Javascript, Python, and any other type of code for rendering content) into a presentation of information (e.g., digital content), which may be interactable by a user. For example, a browser engine may interpret HTML and CSS portions of the code, such as by parsing the code portion into tokens, creating a DOM structure for the code from the HTML tokens and a Cascading Style Sheets Object Model (CSSOM) structure from the CSS tokens, and building a render tree from the HTML and CSSOM structures. The browser engine may gather data and resources associated with the code (e.g., images, video, audio, libraries, supplementary code to display content in a frame or as a picture in picture, stored locally and/or remotely). The browser engine may additionally interpret and/or compile one or more code portions, register an event listener with the DOM, and/or link one or more libraries and/or APIs. The browser engine may then calculate the layout and paint one or more elements defined in the code using the rendering tree.

Execution data associated with rendering content based on a code may include global and/or local data constructs (e.g., objects, classes, data values, variables, allocated placeholders in memory for use during execution), state data (e.g., for one or more registers, queues, buffers, or stacks), a task schedule, or any other data usable for rendering content based on a code. For example, the execution data may include a lexical environment for the code, e.g., a stored set of digital data that may include any combination of variable declarations, function declarations, objects, argument mappings for function calls during code execution. Collecting execution data associated with rendering content based on the code may include one or more querying, searching, scanning, monitoring, tracking, recording, receiving, or aggregating operations (e.g., by a software agent) of one or more processes performed by a software engine rendering content based on the code. For example, the software agent may track one or more operations performed by a software engine, such as allocating memory, storing data (e.g., in a register, buffer, queue, stack, persistent and/or non-persistent memory), scheduling a task for execution, fetching a resource (e.g., from a local and/or remote origin), and may record those operations (e.g., write copies or representations of the operations to a log). In some embodiments, when collecting the execution data, the agent may audit an origin of a resource, for example based on a list (e.g., blacklist), and/or by communication with the origin to detect a cyber threat.

In some embodiments, the execution environment is associated with a web browser and the content includes web page content. A web browser (e.g., browser application or Internet browser) may be or may include application software for accessing digital content of a web page stored, for example, on a public or private server accessible using the World Wide Web, as described earlier. An execution environment associated with a web browser may involve the web browser implementing the execution environment, for example, via a software engine (e.g., a JavaScript engine) included in the web browser. The software engine may allocate resources for the execution environment, such as a call stack (e.g., to schedule tasks for execution), a heap memory (e.g., for storing data during execution), an event loop (e.g., to handle communication via an event listener), or any other resource needed to implement an execution environment. A web page may refer to a document that may be readable by a browser application and/or may include instructions in Hypertext Markup Language (e.g., HTML), Cascading style Sheets (e.g., CSS), JavaScript, Extended Markup Language (XML), WordPress, Content Management System (e.g., CMS) on the World Wide Web. In some instances, a web page may be generated dynamically by a code, for instance using Hypertext Preprocessor (PHP), Active Server Pages (e.g., ASP.Net), Java, Python, or any other programming language capable of creating a web page. In some embodiments, a web page may include code in other programming languages, such as CSS, JavaScript, Python, or any other programming language compatible with a browser application. A server may store and deliver a web page code over a communications network to a web browser running on a client computing device, e.g., in response to a 'fetch' request. The web browser may render the web page code to present the content included in or referenced therein (e.g., web page content), and thereby populate the web page. For example, the software engine of the web browser may parse HTML code to construct a DOM structure to create a render tree (e.g., containing style and content information included in the CSS portion of a web page code). The software engine may additionally register an event listener with the DOM structure to make the web page interactive (e.g., responsive to one or more user inputs).

By way of a non-limiting example, in FIG. 2, cybersecurity agent 226 may collect execution data while at least one processor 110 (FIG. 1) executes webpage code 222 to render content via I/O 112. The execution data may be stored within execution environment 220 where cybersecurity agent 226 may reside. In some embodiments, execution environment 220 may be associated with browser application 216 and the content may include webpage content.

Some embodiments involve the at least one agent being configured to analyze the execution data to detect at least one anomaly. An anomaly may refer to a deviation (e.g., a statistical standard deviation, an outlier, exception, novelty, or noise), an inconsistency, or a departure from an expected outcome or state (e.g., an observed baseline behavior, a baseline statistic, such as a mean or median). For example, an anomaly may include an operation with an execution frequency exceeding a historical mean by one or more standard deviations. As another example, an anomaly may include an operation executed in a place within an execution sequence that departs from an expected execution sequence. Detecting an anomaly may include identifying one or more uncommon or unexpected events, items, or observations which may raise suspicion due to a departure from a standard or expected behavior or pattern. For example, an anomaly may be detected by mining or analyzing a log file of runtime data tracing a control flow for an execution to identify one or more unexpected events, an abnormal delay, an unexpected request for a resource, an unexpected combination of multiple events, or an unexpected traffic pattern. Detecting an anomaly may involve performing one or more statistical calculations, such as a regression, convolution, or correlation, or applying a deep learning and/or artificial intelligence algorithm to the execution data. In some embodiments, detecting an anomaly may be determined through a static analysis stage of a code and/or a dynamic analysis stage of a code.

In some embodiments, the at least one anomaly may include a broken link. A link may refer to a path to a resource, such as a Uniform Resource Identifier (URI) or Uniform Resource Locator (URL) identifying a unique address (e.g., a web address on the World Wide Web) over a computer network (e.g., the Internet). A link may include multiple parts separated by one or more delimiters (e.g., "//" or "/"), such as a protocol or scheme (e.g., http://, https://, or ftp://) indicating how to retrieve a resource, a host or domain name (e.g., example.com) indicating where to retrieve the resource, a port name (e.g., port80 as a default), and optionally a path (e.g., pointing to a specific webpage or document in a domain). In some embodiments, a link may include one or more query or search terms and to target a specific resource in a dynamic web page. In some embodiments, a link may indicate a source of a digital resource (e.g., an entity associated with a domain name). In some embodiments, a link may refer to a fragment of a webpage. A broken link may refer to a link that may be unusable, inoperative, or impaired for retrieving a particular resource, which may be associated with the link or a valid version of the link. For example, a broken link may be invalid or malformed (e.g., missing or including one or more characters) causing the link to fail. For instance, a browser (e.g., on the client device) or a host device may fail to identify a protocol or a location (e.g., domain and/or path) for retrieving the resource. As another example, a broken link may point to a non-existent landing page (e.g., causing a 404 error).

In some embodiments, at least one anomaly may include a specific runtime/DOM structure that may match a known signature, for example a phishing page for Office 365® may use the same DOM structure, JavaScript file, and/or CSS style of the original Microsoft Office 365® page.

In some embodiments, the at least one broken link is an invalid link lacking an associated listener in a DOM structure associated with the content. An invalid link may include one or more of a link lacking an href attribute, a link including a misspelled or mistyped URL, a link including an expired URL (e.g., pointing to a non-existent of offline web page), or any other flaw preventing a browser application from navigating to a web page associated with a link. In some embodiments, at least one processor may identify the broken link by determining the link to be invalid and lacking an associated listener in a DOM structure (e.g., by validating a link path, attempting to lose the link, and/or parsing the DOM structure). A DOM (e.g., Document Object Model) or DOM structure may refer to an interface that models or represents a document including Extensible Markup Language (XML), HTML, CSS, JavaScript and/or Python instructions as a logical structure, as defined earlier. A DOM structure may function as an interface for HTML, XML, CSS, JavaScript, and/or Python instructions in a logical form, such as a hierarchical tree, allowing a browser to present content according to the logical form. A DOM structure associated with content may model content according to a logical flow of a web page code (e.g., incorporating a ranking, grouping, or classification of the content in the web page code), and maybe an output of a browser engine after parsing, interpreting, and/or compiling a code, and organizing one or more objects and elements referred to in the code to construct the hierarchical DOM structure representing the code, e.g., in preparation for displaying content included therein. For example, a link included in an email message for retrieving content may be represented as a node in a DOM representation for the email message. A listener (e.g., an event listener) may refer to program code instructions configured to be executed in response to an event, as described earlier. An event listener may facilitate making displayed content interactive (e.g., responsive to one or more input events). For instance, when preparing a code for execution, a browser may register an event listener with a node of the DOM structure to make the corresponding element responsive to a user input. During runtime, upon detecting an input event for the element, the event listener may notify the browser application to schedule a corresponding action (e.g., an event handler) for execution by a processor. For example, a link displayed in an email message may be represented in the DOM structure for the email message as a node associated with an event listener for a click event, such that when a user clicks the link, the event listener may notify the browser application to schedule a request to fetch content via the link. A link lacking an associated listener in a DOM structure associated with the content may refer to a link represented in the DOM representation for a code, however an event listener for the link may be missing or absent. For example, an event listener may not be registered with the DOM (e.g., in association with the link) or may be registered in association with a different web element other than the link, or the event listener may be non-functional. Consequently, a browser may fail to be notified of a click event for the link and may fail to schedule a fetch request in response. The software agent may inspect the DOM structure for a code to determine if a node in the DOM corresponding to a link is missing an event listener, indicating the link may not be navigable. In some embodiments, a broken link may refer to an invalid link that may lack an event listener (e.g., such that clicking on the link fails to cause a browser application to navigate to a webpage associated with the link).

In some embodiments, the at least one anomaly includes a property violating a security rule. A property may refer to an attribute or characteristic (e.g., associated with an execution environment during a static and/or dynamic stage for analyzing a webpage code). For example, a property of an anomaly may include a time delay (e.g., or lack thereof), a priority or order for execution or for accessing a resource, a use of a specific resource (e.g., a specific memory location or type), a use of an amount of computing resources (e.g., exceeding a limit), a request to access a resource (e.g., a protected resource or a nontrusted resource), a breach of a protocol (e.g., a security protocol), or any other machine-observable behavior of code. The property may be associated with a hardware and/or software-based resource, a local and/or remote resource. For example, the property may be associated with a source or origin for content, a landing page, an endpoint device, a network connection, an instruction, a timing or scheduling, a memory location, a data type, a credential or certificate, a context for performing an action, an address (e.g., on the World Wide Web and/or in local memory), an association with a backend device, a threshold (e.g., related to a score for a web page code), or any other runtime characteristic for validating a security rule. In some embodiments, each detected abnormality may increase the score for a code. For example, if a number of malfunctioning links in a webpage code (e.g., a property) exceeds a predefined threshold (e.g., violates a security rule), the agent may determine that the webpage code includes an anomaly corresponding to a phishing attempt. A security rule may include one or more conditions associated with one or more properties, whereby when the one or more properties violate the one or more conditions (e.g., a security rule), an action may be triggered to protect a computing resource. A condition may include a value, a threshold, a constraint, a range (e.g., tolerance), a list (e.g., of trusted resources), or a performance (or non-performance) of an action (e.g., to securely encode data prior, access only secure memory locations, communicate only with trusted parties), a combination and/or sequence of events or circumstances (e.g., relating to executing a code). Violating a security rule may include failing to meet one or more conditions or thresholds of the security rule, e.g., within a tolerance. For instance, one or more conditions of a security rule may be higher priority than other conditions, such that violating a higher priority condition may be subject to a lower tolerance than violating a lower priority condition. In some instances, violating a security rule may include failing to meet a threshold number of conditions. For example, a security rule may only permit navigating via links associated with a predefined list of trusted origins. Another security rule may prohibit responding to an input event targeting a malformed link. Another security rule may require two-way authentication to login to a sensitive account. As another example, the condition may be associated with a circumstance, context, or situation, e.g., associated with the execution environment, such as a particular sequence, or timing of events. A software agent may determine violation of a security rule by concluding that one or more properties of the anomaly do not satisfy (or do satisfy, depending on how the security rule is structured) one or more conditions of the security rule.

In some embodiments, the property may include a DOM structure associated with the content. A DOM structure associated with the content may refer to an output of a browser engine after performing one or more parsing, comparing, interpreting, and/or compiling operations for a webpage code in preparation for rendering content included in or referenced by the webpage code, as described earlier. The DOM structure may describe how the elements of the webpage code are to be presented on a screen, consistent with the hierarchy defined in the web page code. During runtime, the browser engine may reference the DOM to ensure that the presentation of the content accords with the hierarchy. A DOM structure may be associated with one or more security rules, for example, to ensure that the DOM structure is valid, and the web page code executes properly (e.g., as expected). In addition, a DOM structure may be used to alter a web page code (e.g., and thereby alter the content) to make the content interactive. For instance, a web page code may include instructions, that when executed, reference one or more elements via the DOM structure, and cause a processor to add, delete and/or change one or more elements. An attack vector (e.g., implemented by injecting a malicious code into the execution environment) may exploit this capability to modify a webpage code (e.g., before and/or during runtime) to launch a phishing attempt and bypass one or more security measures. For example, the phishing attempt may introduce one or more abnormalities (e.g., anomalies) affecting one or more elements, such as by adding or removing an element, changing a tag, or introducing multiple document type declarations. In some embodiments, the agent may detect a phishing attempt by determining that an anomaly of the DOM violates one or more security rules.

In some embodiments, a property may be associated with a root of a DOM structure associated with the content. A root (e.g., root element) of a DOM structure associated with the content may refer to a topmost element of a document containing a code for rendering the content (e.g., delineated <html> and </html> tags) and may be a global or parent element containing all other elements of the code. A property of the root element may thus be inherited by all other elements in a webpage code. If the agent determines that the root element contains one or more suspicious properties (e.g., properties violating one or more rule conditions), the agent may determine that a security rule has been violated. For example, the agent may determine that a root element contains a global function having a name and/or body that violates a rule condition (e.g., syntax, placement, and/or one or more characters) and may determine that a security rule has been violated.

In some embodiments, a property may include a network request property. A network request may refer to an electronic communication associated with provision of digital information over a network, such as a petition, appeal, or demand to a network resource, such as a server or host device. Types of network requests may include GET, POST, PUT, PATCH, DELETE, CONNECT, or any other HTTP or HTTPS request. In some embodiments, one or more network requests may be included inside a fetch API. A network request property may refer to a parameter for sending additional information to a server with the request, such as one or more queries, options, and parameters included in a path of a link associated with a network request. Alternatively, a network request property may refer to a characteristic or detail of the request (and/or a response to the request), such as a status, a version of a communications protocol, an encoding standard, a timestamp, an amount of data transferred, a type for a requested resource, an initiator of the request, a time for responding to the request, or any other attribute of the request. The agent may inspect a network request, for example, by querying a browser, and may determine violation of a security rule based on one or more request details received from the browser. For example, an agent may identify a timing discrepancy, an unexpected delay, a protocol discrepancy (e.g., HTTP was used instead of HTTPS), that received data differs from what was expected (e.g., an amount or type), an unexpected origin (e.g., unknown or unrecognized relative to a predetermined list of origins) for the data, or any other unexpected characteristic (e.g., unknown or unrecognized relative to a predetermined list of characteristics) of a network request (e.g., relative to a threshold defined by a rule).

Some embodiments involve determining, based on runtime events resulting from executing the code in at least one execution context associated with the execution environment, whether functionality associated with the content is valid. Functionality may refer to one or more capabilities, operations, or processes of one or more software and/or hardware components of a computing system capable of causing one or more outcomes, results, or outputs. A functionality may include one or more of a capability of a computing device to receive and process data to produce an output, communicate with another computing device, access digital information, display digital information, interact with a user via a user interface (e.g., by rendering a code to present content responsive to user inputs), perform one or more protective security measures to thwart a cyber threat, or any other capability of a computing device. Functionality associated with the content may refer to one or more capabilities, operations, and/or outcomes affected by, affecting, or otherwise related to the content. Such functionality may include a capability, process, or outcome related to displaying the content, interacting with a user via the content, modifying the content (e.g., in response to an input event), or any other capability related to the content. For example, functionality associated with the content may include how the content is displayed (or hidden), or how an input event is handled (or ignored), which memory locations are accessed, what tasks are scheduled for execution and in what order, what data is retrieved and from what origin, or how the display of content may change in response to an input event. For instance, functionality associated with an input field may cause inputted data to be encrypted before uploading to a remote database, functionality associated with a clickable link may cause a fetch request to be scheduled for execution, and functionality for a login form may encrypt a password using a one-way hash and send the hash code to a remote server for authentication. Valid functionality associated with content may refer to compliance of one or more capabilities, operations, or processes, outcomes, or outputs with one or more measures or rules designed to ensure proper use (e.g., intended processing represented by non-malicious code) of one or more computing resources (e.g., a hardware and/or software component, a runtime environment, data, a code, a link, a path, an object, a variable, or any other resource susceptible to error or compromise). For example, valid functionality of content may ensure that displaying the content to a user, and/or interacting with the user via the displayed content avoids accessing protected areas of memory, that a login credential may only be entered into a secure runtime environment (e.g., using two-factor authentication), or that a code is executed as expected, e.g., without errors, or introduction of a cyber threat. Determining may refer to making a measurement, a comparison, an estimation, or calculation to arrive at a conclusive outcome. Determining whether functionality associated with the content is valid may include performing one or more passive (e.g., prior to runtime) and/or active (e.g., during runtime) operations to a webpage code and/or a DOM structure of the code to identify if any capabilities (e.g., functionalities) materialized by executing the code introduce or potentially introduce one or more cyber threats. Examples of passive operations to determine valid functionality of content include analyzing the code and/or the DOM structure and comparing to a list of known vulnerabilities. Additionally, or alternatively, code and/or a DOM structure may be compared to a baseline execution pattern, which may be based on known valid execution. Examples of active operations to determine valid functionality of content include executing, simulating and/or emulating one or more portions of the webpage code, and analyzing resources used or accessed during the simulation, (e.g., based on an execution log).

In some embodiments, this determination may be based on runtime events resulting from executing the code in at least one execution context associated with the execution environment. A runtime event resulting from executing a code may include an outcome, an effect, or change of state (e.g., to one or more resources allocated for an execution environment) occurring during and/or because of a code execution. Runtime events may include one or more of reading/writing from memory, allocating/deallocating memory, scheduling a task for execution, receiving/sending data internal to a computing device (e.g., via a bus), or external to a computing device (e.g., from/to a peripheral device or a remote device via an external channel), or any other change of state caused by executing a code. In some embodiments, at least one processor may detect a runtime event by polling or querying one or more computing resources to detect a change of state. In some embodiments, one or more runtime events may exhibit a pattern, e.g., indicating valid (or invalid) functionality for a code, and detecting a runtime event may include identifying the pattern. In some embodiments, a processing device may be configured to store a record of runtime events in an execution log and detecting a runtime event may include analyzing the execution log. For instance, a processing device may compare one or more runtime events in the execution log to a history of runtime events stored in memory, where the history may include runtime events associated with valid functionality and/or invalid functionality. In some embodiments, the comparison may be facilitated using artificial intelligence and/or machine learning. In some embodiments, the determination based on runtime events may be included in a dynamic analysis stage of the code.

An execution context may refer to a process, a program, an application, a frame, a file, a function, a container, a module, a call (e.g., an API call), one or more lines of code, a parameter, an argument, or any computerized information defining or influencing the execution environment in which a process runs. For example, when a code invokes a function (e.g., an iframe), an execution context may be created to execute the function. Resources needed to properly execute the function (e.g., data values, memory resources such as registers, stack, a buffers, queues, cache memory, RAM, processor time, communications bandwidth, or any other computing resources) may be allocated as part of the execution context for the function. When the function terminates, the execution context may be removed and any resources allocated for the execution context may be deallocated, e.g., for utilization by other processes. In some embodiments, a code may include multiple functions (or iframes), such that executing the code, causes a different execution context to be created for each invoked function or iframe. In some embodiments, multiple functions may be invoked sequentially, causing multiple execution contexts to be created sequentially (e.g., such that resources allocated for the execution context of the previous function are deallocated before resources are allocated for the execution context for the next function). In some embodiments, a code may include multiple nested functions or iframes (e.g., functions called inside other functions), causing multiple nested execution contexts to be created (e.g., such that resources allocated for the execution context of the previous, or parent function are saved and not deallocated when resources are allocated for the execution context of the subsequent child, or nested function). At least one execution context associated with the execution environment may refer to one or more execution contexts created when executing a code inside an execution environment of a browser application, e.g., upon or in response to encountering one or more function calls or iframe declarations in the code. For example, a code may include a first iframe invoking a second (e.g., nested) iframe. When a processing device executes the code, upon (e.g., in response to) encountering an invocation for the first iframe, the processing device may create a first execution context. When the processing device encounters an invocation for the second iframe (e.g., nested within the first iframe invocation), the processing device may create a second execution context for the second iframe, e.g., before deallocating resources for the first execution context, such that the first and second execution context coexist.

Consistent with disclosed embodiments, monitoring runtime events caused by executing a code in an execution environment may involve analyzing multiple execution contexts, for example, if the code includes a nested function or iframe. In some embodiments, a processing device may invoke an agent for each execution context, such that multiple agents may coexist simultaneously for multiple simultaneous (e.g., nested) execution contexts. Each agent may be configured to observe or monitor runtime events as they occur in the execution context for the agent. In some embodiments, multiple agents (e.g., each created for a different execution context) may communicate with each other via telemetry, for example to send updates, warnings, or alerts. Thus, an agent for a parent execution context may receive information from an agent for a child execution context, and the reverse. In this manner, multiple agents may collectively monitor runtime events for an entire execution environment for a code execution, including multiple threads (e.g., nested execution contexts) created during runtime.

For example, a code may include a link deemed inconclusive (e.g., neither definitively broken nor valid) by a static analysis of the code. In some instances, the link may appear broken, however a function may fix the link and add functionality during code execution. A static analysis of the code may fail to detect one or more vulnerabilities associated with the link. However, invoking one or more agents to monitor events at runtime may allow a dynamic analysis of the code to test the link during runtime, e.g., with respect to a physical endpoint device. For example, one or more agents existing inside the execution environment may test runtime functionality of one or more links, detect one or more abnormalities to the DOM structure (e.g., occurring during runtime), disabled events, or other potential vulnerabilities that may not be detected by a static analysis or emulation in a sandbox environment. By existing in the execution environment, the one or more agents may monitor how a page is constructed, how a link is constructed, if there is a valid target for a link, and/or if there is a valid listener for an event. For example, if a link has an invalid target but has a valid event listener, an agent may simulate navigating via the link inside an iframe, e.g., to create an isolated environment inside the execution environment.

Figures 1, 8:
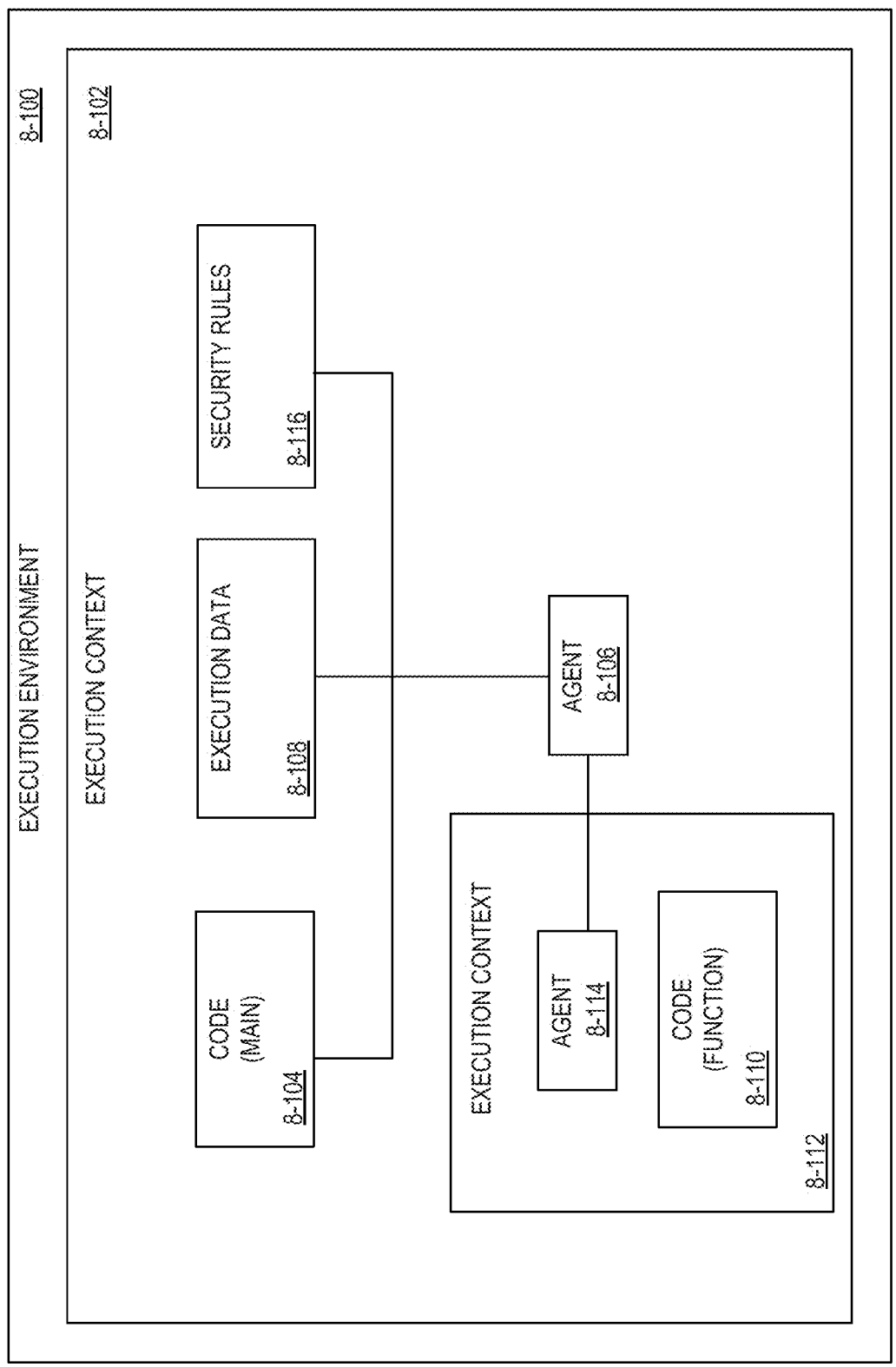
Figures 2, 8:
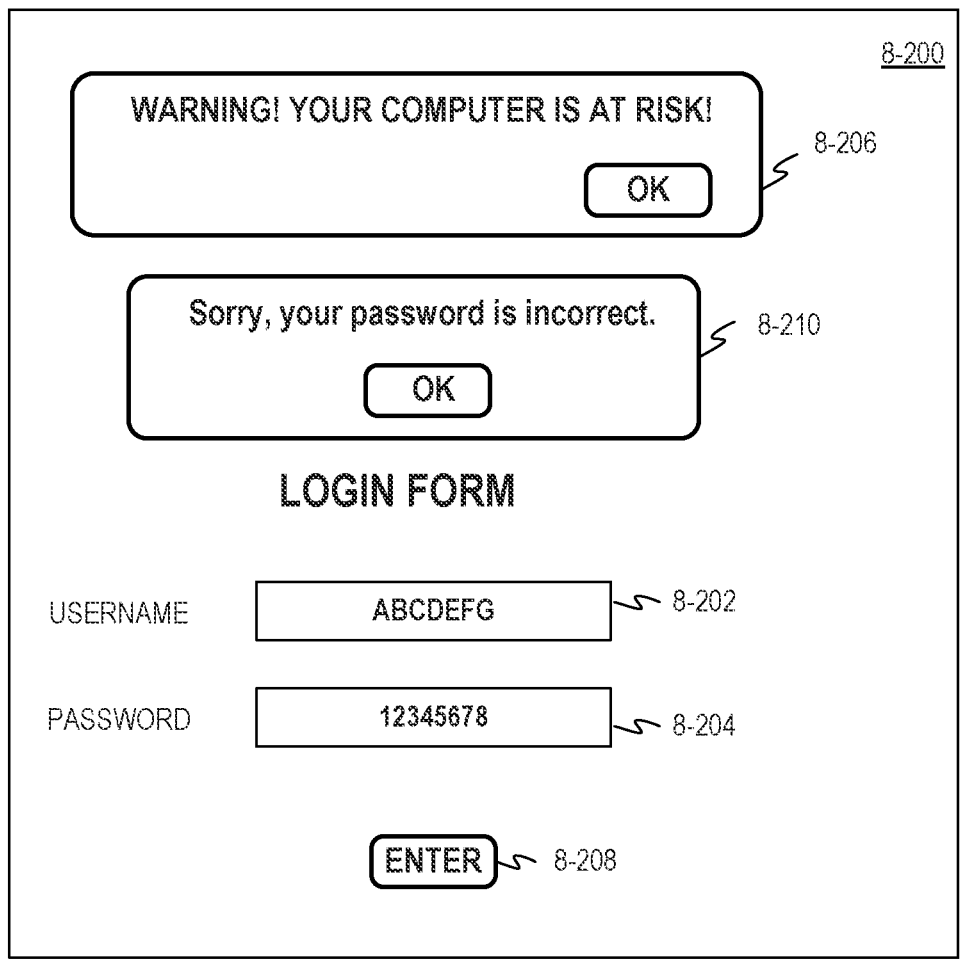
Figures 3, 8:
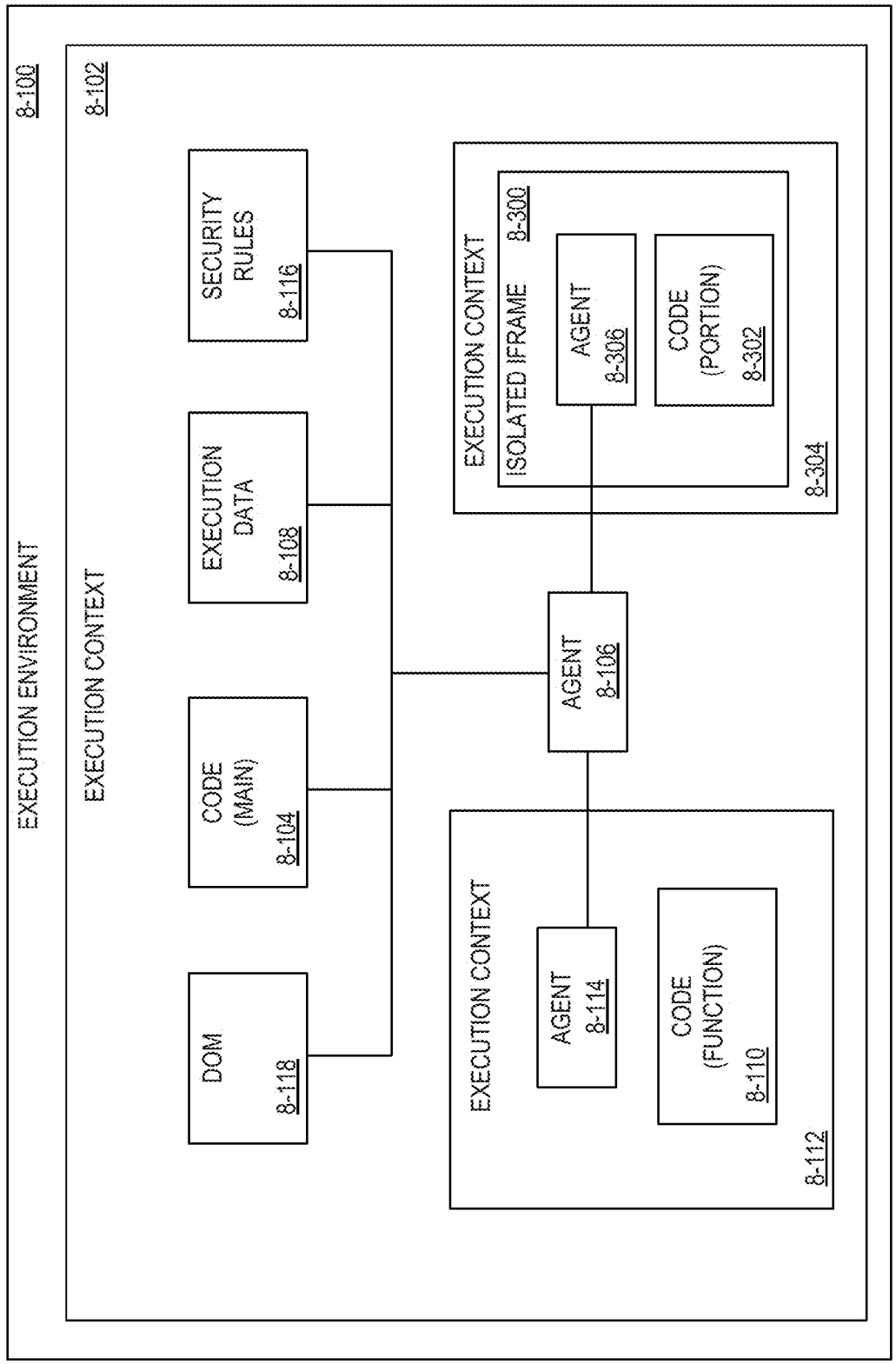
Figures 4, 8:
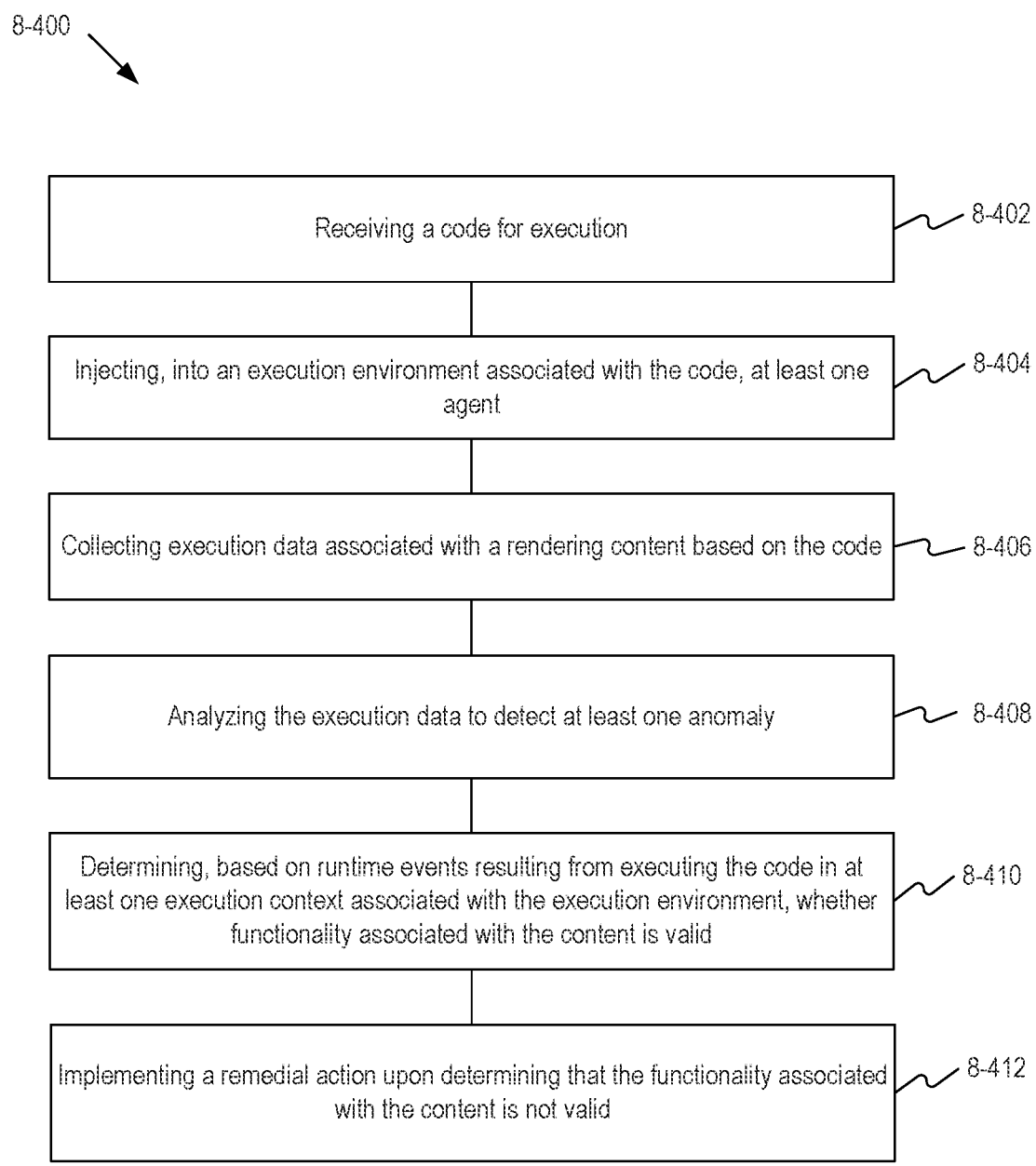

By way of a non-limiting example, reference is made to FIG. 8-1 which is a block diagram illustrating an exemplary implementation of an execution environment (which may be implemented on a system 100, for example) for detecting a phishing attempt, consistent with some embodiments of the present disclosure. Execution environment 8-100 containing an execution context 8-102 for executing a code 8-104. For example, execution environment 8-100 may correspond to execution environment 220 of FIG. 2. A software engine (e.g., software engine 218) may create execution context 8-102 upon detecting a pending execution of code 8-104 by a processing device (e.g., processor 110 of FIG. 1). A software agent 8-106 (e.g., corresponding to cybersecurity agent 226) may reside inside execution context 8-102. For example, software agent 8-106 may be implemented instructions injected into a top portion of code 8-104 (e.g., immediately after a <head> tag), such that executing code 8-104 invokes software agent 8-106 inside execution context 8-102 for code 8-104. Software agent 8-106 may monitor one or more runtime events occurring inside execution context 8-102 caused by the execution of code 8-104. For example, software agent 8-106 may examine execution data 8-108, which may be contained in an electronic file generated by software agent 8-106. Additionally, or alternatively, software agent 8-106 may inspect state data (e.g., by inspecting one or more registers, buffers, queues, stacks, or any other state data) inside execution context 8-102 to determine one or more runtime events caused by executing code 8-104 in execution context 8-102. Software agent 8-106 may analyze one or more of the runtime events to determine if a functionality associated with content included in or referenced by code 8-104 is valid, for example by referring to one or more security rules 8-116.

In some embodiments, webpage code 8-104 may include a code 8-110 (e.g., function code), which may cause the web browser to create a second execution context 8-112 (e.g., a nested execution context) inside execution context 8-102 to execute code 8-110. Software agent 206 (e.g., or cybersecurity application 224 of FIG. 2) may inject a second software agent 8-114 (e.g., a nested software agent) into second execution context 8-112, for example using a similar to the technique used to inject software agent 8-106 into execution context 8-102, e.g., by inserting code for the software agent into a top portion of code 8-110. Software agent 8-114 may monitor one or more runtime events occurring inside execution context 8-112 caused by the execution of code 8-110 (e.g., by examining execution data and/or state data pertaining to execution context 8-112). Software agent 8-114 may communicate with software agent 8-106 (e.g., via telemetry) such that software agents 8-106 and 8-114 may collectively monitor runtimes events in multiple execution context created during an execution of code 8-104 to determine if a functionality associated with content included in or referenced by code 8-104 (e.g., including code 8-110) is valid. In some embodiments, a software agent may be created for each execution context created by the browser engine while executing code 8-104. A software agent may access data stored in memory (e.g., local or remote memory) for performing analysis or other operations.

For instance, software agent 8-106 and/or software agent 8-114 may analyze execution data 8-108 to detect an invalid link, such as a link missing a slash (e.g., https:/example-.com), and/or a broken link, such as a link (e.g., an invalid link) lacking an associated event listener in a DOM representation for code 8-104. Additionally, or alternatively, software agent 8-106 and/or software agent 8-114 may analyze execution data 8-108 to detect a runtime property violating a security rule, (e.g., an attempt to breach a firewall, or existence of an overridable method), an invalid DOM structure (e.g., a runtime property that may be a root of the DOM for code 8-104), an invalid runtime parameter such as a network request, a DOM property indicating use of an API that may trigger a security rule, a redirect origin (e.g., where the user navigated from), one or more abnormal nested execution context parameters, a broken resource (e.g., a computing resource or network resource), an abnormal runtime error, and/or a runtime or DOM structure matching a known signature (e.g., associated with a vulnerability).

Thus, the capability of multiple agents, each operating in a separate execution context in an execution environment of a code (e.g., including multiple threads or nested functions) to monitor runtime events as they occur in each execution environment, and notify other agents (e.g., simultaneously operating in other execution environments) of runtime events may provide an unconventional approach to detecting a phishing attempt. This unconventional approach may provide technological benefits, e.g., over static detection techniques or other detection techniques having blind spots, such as a sandbox configured inside an operating system, while still providing timely intervention to prevent malicious activity. For example, an attacker may try to conceal a phishing attempt inside a nested iframe (e.g., as in a browser-in-browser phishing attack). Inserting an agent into each nested execution context and allowing the agents to communicate with each other such that each agent may monitor runtime events in other execution contexts, may facilitate in thwarting such an attack. For example, this approach may allow multiple agents to collectively identify a pattern (e.g., indicating a cyber threat) from runtimes events simultaneously occurring inside multiple execution contexts that may not be detected within each execution context in isolation.

In some embodiments, functionality associated with the content may be determined to be valid by executing the code in the at least one execution context in an isolated environment. An isolated environment may refer to a boundary or barrier imposed (e.g., using code) while executing a code to prevent a process associated with the code from accessing one or more system resources. For instance, a code may define a scope for resources internal and external to the isolated environment such that code executing inside the isolated environment may be denied access (e.g., by a browser application and/or an operating system) to resources residing outside the scope of the isolated environment and the reverse. For example, the barrier may prevent and/or control access to certain system resources (e.g., memory, devices, files, or any other computing resource, input/output ports), block execution of one or more processes, preventing a process from accessing a memory space allocated for another process, or perform any other operation to prevent a code from harming a computing resource. Executing the code in the at least one execution context in an isolated environment may involve creating an isolated environment and invoking an execution of the code (or a portion thereof) while the code is inside the isolated environment. For example, an agent (e.g., invoked inside an execution context) may create an iframe and schedule execution of the code (or portion thereof) within the iframe. Consequently, a processing device may create a second execution context for the iframe and may execute the code inside the second execution context, such that any resources accessed while executing the code may be limited to resources allocated for the second execution context, thereby avoiding access to other computing resourced, e.g., allocated for other processes external to the iframe.

By way of a non-limiting example, reference is made to FIG. 8-3 which is similar to FIG. 8-1 with the noted difference of an iframe 8-300, consistent with some embodiments of the present disclosure. Software agent 8-106 may create iframe 8-300 as an isolated environment inside execution context 8-102 to execute a portion 8-302 of code 8-104. For example, portion 8-302 may relate to an input event referenced in code 8-104. When a processor (e.g., at least one processor 110 of FIG. 1) is scheduled to create iframe 8-300, a software engine (e.g., software engine 218) may create a second execution context 8-304, nested inside execution context 8-102 to execute portion 8-302 of code 8-104. A third software agent 8-306 may be created inside execution context 8-304 (e.g., by software agent 8-106 and/or cybersecurity application 224 of FIG. 2). Software agent 8-306 may monitor runtime events inside execution context 8-304, for example by examining execution data generated by the software engine. Software agents 8-106, 8-114, and 8-306 may communicate with each other via telemetry to share information about runtime events associated with executing code 8-104 in execution contexts 8-102, 8-112, as well as execution context 8-304 inside isolated iframe 8-300.

In some embodiments, valid functionality may be determined by emulating at least one event in the isolated environment to identify a behavior of the code associated with the at least one event. Emulating may refer to reproducing a first execution environment within a second execution environment. Consequently, a code compatible with the first execution environment (e.g., but incompatible with the second execution environment) may be executable in a reproduction (e.g., emulation) of the first execution environment inside the second execution environment. For example, a software configured for execution in a first hardware configuration may not execute properly in a second hardware configuration. To execute the software in the second hardware configuration, the first hardware configuration may be emulated (e.g., reproduced virtually using a software layer) in the second hardware. An emulator may mimic both hardware and software features of a computing device, e.g., including software-related runtime behavior, and hardware characteristics, such as memory access, task scheduling, communication between components of a computing device (e.g., via a bus system), or any other hardware-related runtime behavior. Emulating at least one event in the isolated environment may include causing an occurrence of an event (e.g., by simulating the event) inside the isolated environment such that the hardware and software runtime behavior of a computing device processing the event (e.g., and a response to the event) may be substantially similar to the hardware and software runtime behavior of the computing device processing a non-emulated event (e.g., in response to a user input). For instance, access to specific memory locations, scheduling of a specific sequence of tasks for execution (e.g., according to a specific timing or synchronization), or access to a remote resource may correspond to a behavior expected for a user input event. A behavior of the code associated with the at least one event may include actions performed by one or more tasks scheduled for execution in response to a browser application receiving a notification of the event. For example, in response to receiving a credential (e.g., an input event), a code may transmit the credential in an encoded form to a remote device, and request to access a sensitive file. An identified behavior may refer to one or more actions that have materialized, observed and/or analyzed (e.g., by a software agent). For example, an agent may determine that the identified behavior diverges from an expected behavior, and consequently, determine that the functionality associated with the content is not valid. An expected behavior may refer to one or more actions whose performance or implementation may be anticipated or predicted, e.g., in response to a particular event. For example, a scroll event for a scrollbar may be expected to cause a browser to repainting content on a screen according to a layout reflecting a direction and degree of the scroll event. Diverges from the expected behavior may refer to one or more unanticipated or unpredicted actions performed in response to an event, e.g., deviating from a sequence or pattern of anticipated actions. For instance, if a scroll event that causes no change in the display of the content may diverge from the expected behavior.

For instance, in some embodiments, the agent may emulate an event in the isolated environment by simulating following a link included in the content. Simulating may include performing one or more actions to mimic an appearance, character, or behavior (e.g., of a code execution). Following a link to the content may include submitting a link to a web browser with a request to navigate to a resource identified by information included in the link. Simulating following a link may include mimicking a behavior of a web browser responding to a notification (e.g., a click event) to navigate to a resource identified by the link. To simulate following a link, the software agent may scan a code for the link (e.g., based on a pair of link tags <a> and </a>), create an isolated environment (e.g., by creating an iframe), simulate an event for the link (e.g., using a library, such as jQuery), and schedule a fetch request, causing a browser to navigate via the link inside the isolated environment. In addition, the software agent may monitor state data and/or an execution in the isolated environment and communicate with one or more software agents residing external to the isolated environment.

In some embodiments, the agent may monitor the DOM structure associated with the content. The DOM structure associated with the content may be understood as described earlier. Monitoring the DOM structure may include accessing, auditing, overseeing, or checking (e.g., polling or querying) the DOM structure, for example using a DOM traversal and manipulation library, such as jQuery. For instance, an interactive element may trigger a task to change the DOM structure of a web page. For example, clicking a button may cause the button to be displayed differently. In some embodiments, the software agent may determine that the identified behavior diverges from the expected behavior when the DOM structure remains unchanged after simulation of following the link. An identified behavior and an expected behavior may be understood as described earlier. To remain unchanged may refer to staying the same (e.g., steady or constant) over a period of time. The DOM structure remains unchanged may refer to the DOM structure retaining structural characteristics over time (e.g., before and after an input event). For instance, the DOM structure may retain the same hierarchical tree structure (e.g., the same number of branches connected to the same number of nodes), the same web elements, the same event listeners, or any other structural characteristic of the DOM structure. For example, in response to simulating following a link, a browser may be expected to fetch a new web page code and create a new DOM structure representing the elements in the new web page. Since the new web page code may be expected to differ from the current webpage code, the DOM structure may be expected to change (e.g., including different elements, different events with different event listeners, and/or a different layout). To determine that the identified behavior diverges from the expected behavior at least one processor (e.g., using the software agent) may record structural characteristics of the DOM structure prior to and subsequent to the simulation of following the link and compare the prior and subsequent structural characteristics to detect one or more discrepancies. For example, if the number of discrepancies is beneath a threshold (e.g., indicating a new webpage code), the software agent may conclude that the browser failed to retrieve the new webpage code, and that the link may therefore be broken.

By way of a non-limiting example, referring to FIG. 8-3, to determine if a functionality associated with code portion 8-302 is valid, software agent 8-306 may emulate an input event, for example, by creating and dispatching an input event (e.g., using a JavaScript instruction element.dispatchEvent(new Event('input', {test:true}));) inside execution context 8-304 or a separate execution context. In some embodiments, emulating an input event may include wrapping a dispatchEvent or click invocation (e.g., with setTimeout), running HTMLElement.click( ) (or other click( ) method), or otherwise executing code that triggers an action related to an input event. Software agent 8-306 may additionally monitor runtime events inside execution context 8-304 to identify a response of code portion 8-302 and notify software agent 8-106.

By way of another non-limiting example, referring to FIG. 8-2, clicking a button 8-208 may cause data entered into a username input field 8-202 and a password input field 8-204 to be submitted to a remote host (e.g., based on link associated with button 8-208). Software agent 8-306 may simulate a click event for button 8-208 inside iframe 8-300. Agent 8-306 (and/or agent 8-106) may analyze DOM 8-118 before and after simulating the click event to identify any discrepancies. For example, if DOM 8-118 remains substantially unchanged (e.g., a number of differences before and after the click event is beneath a threshold) before and after simulating the click event, agent 8-306 (and/or agent 8-106) may determine that the link associated with button 8-208 is broken and that the behavior of form 8-200 diverges from an expected behavior.

In some embodiments, the agent may be configured to submit at least one value using a form of the content. A form of the content may refer to a section of displayed content containing one or more interactive controls for submitting information. form web element. For example, a form may be delineated in a code with <form> and </form> tags, and may include one or more input fields (e.g., delineated with an <input> tag), buttons, check boxes, descriptive text, and any other content facilitating a user in submitting information via the content. A value may refer to data content for filling a container or placeholder for storing information, such as a variable, array, or object. A value may be a specific instance for a data container and may change during a code execution. For example, a value of "1" may be assigned to a variable for storing integers. Submit may refer to provide, or supply data to a computing device, e.g., via a user interface. Submitting at least one value using a form of the content may include generating an input value, locating an input element of the form configured to receive the input value (e.g., using the DOM structure for the code), and simulating an input event for the input element with the input value (e.g., using a library, such as jQuery). In addition, in some embodiments, the software agent may monitor an execution log generated by a browser engine in response to submitting the value. In some embodiments, the at least one value may be arbitrary (e.g., random, predetermined such as "12345" or "XXXXX", or otherwise lacking association with data relevant to a context of the form).

In some embodiments, the form may be a login form, and the at least one value may correspond to a login credential. A login credential may refer to an uncommon or unique sequence of characters that may be used to authenticate a party over a communications channel, which may be untrusted. A login credential may include one or more of a username, a password, a pass phrase, a personal identifying number (PIN), a biometric token, a one-time pad (OTP), or any other type of authenticating credential. A login form may include one or more input fields to receive one or more login credentials from a user, for example, to authenticate access to a secure webpage (e.g., presenting confidential content, such as personal, financial, or medical data). For instance, the software agent may submit a dummy value in place of a valid credential into a login form to determine how a webpage code may respond.

In some embodiments, the software agent may determine a response to submitting the at least one value, to thereby identify the behavior of the code. A response may refer to a subsequent reaction or feedback to a prior action (e.g., a reactive computing operation). For example, a response of a web page to an event (e.g., an input event) may refer to the behavior of a computing device executing the web page code to detecting the event. For example, a web browser may respond to a click event on a link by fetching content using the link. As another non-mutually exclusive example, a web browser may respond to a data entry event via a form by transmitting the entered data to a remote server for storage. A web page code that executes according to an expected execution flow may produce an expected (e.g., predicted) response, corresponding to an expected behavior, and the reverse. In some embodiments, the software agent may determine the response to the at least one value by analyzing execution data generated by the software engine, analyzing the DOM structure for the code (e.g., for any changes made in response to submitting the value), analyzing state data in the execution environment, or performing any other type of analysis to assess a reaction of the computing device to submitting the value.

In some embodiments, the content is associated with a first web page, the expected behavior corresponds to an invalid credential warning, and the identified behavior includes redirecting a web browser to a second web page. A web page may refer to a code (e.g., including HTML, CSS, JavaScript, and/or Python instructions), that when rendered by a software engine, may depict information included in and/or reference by the code graphically on an electronic display device. For instance, information included in a code may include information accessible by invoking one or more function calls, APIs in the code, or by following one or more links or paths in the code or using any other technique to include information in a code. Alternatively, a web page may refer to the graphical depiction of information included in and/or referenced by the code (e.g., the physical presentation of information on a screen as web elements, such as headers, titles, paragraphs, images, video and/or audio content, interactive elements such as button, links, and checkboxes). Content associated with a web page may refer to content based on a code, as described earlier, where rendering the code may cause the content to be presented in a browser window according to a layout and/or format defined in the code. A valid credential may be a data value that corresponds to a rare, or unique sequence of characters established in a prior communication over a secure channel and/or a data element (e.g., value, string) associated with providing access to restricted information (e.g., alone or in combination with other data elements). An invalid credential may refer to data that differs from a valid credential (e.g., is not configured to permit access to an intended destination or to desired information). In some embodiments, an invalid credential is any data that is not exactly identical to the valid credential (e.g., established with a party in advance over a trusted channel). For example, a host computer may store a cryptographic hash of a valid credential in memory, e.g., based on a prior, trusted communication. A browser running on a client computing device may compute a hash for an input value received via a login form and may send the hash to the host computer for authentication. The valid host computer may compare the hash received from the browser to the hash stored in memory to detect a discrepancy. Since the comparison may be based on hash codes of the valid credential and the input value, any discrepancy may be easily discernable. An invalid credential warning may refer to a message or alert (e.g., in a visual popup window displayed on a screen) informing a user that a data value entered via an input form (e.g., in a login web page). Thus, when an input value is entered into a login form that differs from the valid credential, the expected behavior may correspond to an invalid credential warning.

A software agent may deliberately submit an incorrect input value (e.g., arbitrary value) into an input form of a login web page to identify the behavior of the web page code in response, (e.g., if an invalid credential warning is displayed or not). For example, if the software agent detects an invalid credential warning in response to an incorrect credential (e.g., the software agent observes an expected behavior), the software agent may conclude that the login form is valid. However, the software agent may conclude that the behavior diverges from the expected behavior and the functionality of the form is not valid if, in response to an incorrect input value, no invalid credential warning is displayed.

Directing a web browser to a web page may refer to causing a browser to fetch content based on a path, such as a URL, URI (e.g., identifying a remote host) or a path for a local file directory (e.g., client-side fetching). For example, a browser may request content (e.g., HTML content) stored remotely in response to receiving a URL entered into an address bar of a browser window, or by receiving a URL in response to a click event on a web element. Redirecting may refer to channeling, switching, or diverting a flow (e.g., of data) from one path or course to another. Redirecting a web browser may include switching or changing a URL (e.g., a first URL) to a new URL, such that the web browser fetches content from a host identified by the new URL instead of the first URL. A browser may be redirecting, for example, by executing a code to replace the first URL with the new URL. For example, upon authenticating a valid credential, a trusted host may be expected grant a browser access to a confidential document (e.g., a new web page code. Thus, an expected behavior to a valid credential may cause a web browser to fetch the new web page code. However, if in response to an invalid input value, the browser is redirected to a new web page, the software agent may determine that the login form is invalid, e.g., since the identified behavior of the browser diverges from the expected behavior.

By way of a non-limiting example, in FIG. 8-2, a software agent (e.g., software agent 8-106) may submit arbitrary values (e.g., ABCDEFG and 12345678) into username input field 8-202 and password input field 8-204 of form 8-200 and may simulate a click event for button 8-208. Software agent may monitor a response to the input event for the arbitrary values to determine if the behavior of form 8-200 is valid. For example, if the browser displays alert 8-210 (e.g., "Sorry, your password is incorrect.") in response to the arbitrary values, informing a user of an incorrect password, the software agent may determine that form 8-200 is valid. However, if the browser fetches new content (e.g., mimicking content received from a trusted source), the software agent may determine that form 8-200 is invalid and may display alert 8-206 (e.g., "WARNING! YOUR COMPUTER IS AT RISK!").

Some embodiments involve implementing a remedial action upon determining that the functionality associated with the content is not valid. A remedial action may refer to a process, task, or operation configured to protect a computing resource, e.g., by intervening an execution flow of a code posing a cyber threat. For example, a remedial action may include an alert to a user of a potential cyber threat to prevent the user from downloading a malicious code, halting execution of a malicious code, interception execution of a malicious code, suspension of execution of a malicious code, or disabled functionality (e.g., an input field to prevent a user from entering sensitive data into compromised user interface). Implementing a remedial action may refer to performing or executing a process, task, or operation to protect a computing resource, such as by executing code to cause a resulting remedial action, described above. For example, implementing a remedial action may include executing code to generate and/or display an alert at a device associated with a user. As another example implementing a remedial action may include removing malicious code from a queue or stack for execution. Determining that the functionality associated with the content is not valid may include performing one or more active and/or passive operations to a code, as described earlier, and concluding (e.g., based on comparison to a known risk threshold or known threat information) that one or more capabilities caused by executing the code may harm or potentially harm one or more computing resources. For example, upon concluding that a functionality of a link (e.g., the link is broken), a software agent may disable the link and display an alert.

Configuring the agent to reside inside the runtime environment of a browser application may allow the agent to intervene on an as-needed basis (e.g., "just-in-time" intervention during runtime after a code is received) to surgically remove cyber threats as they are revealed, while allowing non-compromised portions of the code to continue executing. For instance, the agent may be dormant, allowing the user to browse a webpage unhindered, until a user attempts to enter data into a compromised input field wherein the agent may become active and intercept only the input. Such a non-conventional approach may facilitate in avoiding falsely flagging content.

By way of a non-limiting example, reference is made to FIG. 8-2 illustrating an exemplary form 8-200 (which may be part of a webpage) associated with rendering a code, consistent with some embodiments of the present disclosure. For example, form 8-200 may be a presentation of content included in and/or referenced by code 8-104 of FIG. 8-1. Form 8-200 may present a login form to a user, prompting the user to enter authenticating credentials into a username input field 8-202 and password input field 8-204. A software agent (e.g., agent 8-106) may determine that a functionality associated with username input field 8-202 and password input field 8-204 is not valid. For example, the software agent may detect a code for stealing text entered into username input field 8-202 and password input field 8-204, thereby stealing the authenticating credentials. In response, the software agent may disable input fields and display an alert 8-206.

Some embodiments provide a system for performing cybersecurity operations for detecting a phishing attempt, the system comprising: at least one processor configured to: receive a code for execution; inject, into an execution environment associated with the code, at least one agent configured to: collect execution data associated with rendering content based on the code; analyze the execution data to detect at least one anomaly; determine, based on runtime events resulting from executing the code in at least one execution context associated with the execution environment, whether functionality associated with the content is valid; and implement a remedial action upon determining that the functionality associated with the content is not valid.

By way of a non-limiting example, FIGS. 1 and 2, as well as FIG. 8-1, illustrate an exemplary implementation for a system 100 for performing cybersecurity operations to detect a phishing attempt. Consistent with disclosed embodiments, processor 110 may receive code 8-104 for execution (e.g., from webpage server 106 over communications network 108). Processor 110 may inject, into execution environment 8-100 associated with code 8-104, at least one agent (e.g., agents 8-106 and 8-114) configured to: collect execution data 8-108 associated with rendering content based on code 8-104; analyze execution data 8-108 to detect at least one anomaly; determine, based on runtime events resulting from executing code 8-104 in at least one execution context 8-102 associated with execution environment 8-100, whether functionality associated with the content is valid; and implement a remedial action upon determining that the functionality associated with the content is not valid.

FIG. 8-4 illustrates a block diagram of example process 8-400 for detecting a phishing attempt, consistent with embodiments of the present disclosure. In some embodiments, process 8-400 may be performed by at least one processor (e.g., at least one processor 110 of computing device 102 shown in FIG. 1) to perform operations or functions described herein. In some embodiments, some aspects of process 8-400 may be implemented as software (e.g., program codes or instructions) that are stored in a memory (e.g., memory 114 of computing device 102) or a non-transitory computer readable medium. In some embodiments, some aspects of process 8-400 may be implemented as hardware (e.g., a specific-purpose circuit). In some embodiments, process 8-400 may be implemented as a combination of software and hardware. Process 8-400 may be represented by process blocks 8-402 to 8-412.

At block 8-402, a processing device (e.g., processor 110 in FIG. 1) may receive a code for execution. At block 8-404, the processing device may inject, into an execution environment associated with the code, at least one agent, consistent with disclosed embodiments. For example, the code may be configured for execution by a JavaScript engine and the at least one agent may include a JavaScript agent. At block 8-406, the processing device may collect execution data associated with a rendering content based on the code, consistent with disclosed embodiments. For example, the execution environment may be associated with a web browser and the content may include web page content. At block 8-408, the processing device may analyze the execution data to detect at least one anomaly, consistent with disclosed embodiments. At block 8-410, the processing device may determine, based on runtime events resulting from executing the code in at least one execution context associated with the execution environment, whether functionality associated with the content is valid, consistent with disclosed embodiments. For example, the processing device may execute the code in the at least one execution context in an isolated environment, emulate at least one event in the isolated environment to identify a behavior of the code associated with the at least one event, and determine whether functionality associated with the content is not valid by determining that the identified behavior diverges from an expected behavior. At block 8-412, the processing device may implement a remedial action upon determining that the functionality associated with the content is not valid, consistent with disclosed embodiments.

Rendering content may cause sensitive data to be displayed on an electronic screen, introducing risk of information leakage. However, the sensitive data may be important for proper execution of a code. For example, a code including a credit card number (e.g., sensitive data) may provide the credit card number to an authorized party (e.g., a financial clearing house), upon request, allowing an owner of the credit card to implement transfer of funds. One possible solution may be to mask a display version of a code, to prevent leakage of sensitive data included in the code. However, in some instances, a display version of a code may be automatically synchronized with the electronic file storing the code (e.g., by a browser application and/or operating system). Consequently, a mask applied to a display version of sensitive data may be implemented in the code, causing sensitive data to be lost, leaving authorized requests for the sensitive data unanswerable, and hampering functionality of the code. Therefore, it may be beneficial to mask sensitive content for display without affecting functionality of the underlying code. For example, a user may access a web page displaying credit card information in order to update a phone number. Without a mask, the credit card number may be displayed, which may cause information leakage, risking privacy, confidentiality, financial, business, and/or personal loss. However, if a display version of the credit card number is masked (e.g., to prevent information leakage), a masked version of the credit card number may be automatically saved in the code (e.g., by a browser application and/or operating system). Consequently, subsequent requests for the credit card (e.g., the unmasked version) may receive the mask instead, severely hampering functionality of the code and preventing a user from using their credit card. For instance, a request by a bank to access the credit card number may be denied. Therefore, there is a need for unconventional innovations to protect against leakage of sensitive data, a problem frequently arising in computing environments (e.g., computer networks) to shield users, systems, devices, and information from cyber threats, while maintaining functionality of a code containing sensitive data. Such unconventional approaches, rooted in computer technology, may enable masking sensitive data for display, while maintaining integrity of sensitive data in a code to maintain functionality.

The unconventional approaches, expressed in the disclosed embodiments, may involve imposing a virtual barrier between a display interface (DOM) for a code and the underlying code. Disclosed embodiments may include masking sensitive data for display in a DOM for a code, while preventing changes to sensitive data in the underlying code. Disclosed embodiments may further involve intercepting a request to access a code including sensitive data, emulating the sensitive data, and delivering an emulated copy of the sensitive data in response to the request (e.g., if the request is authorized). Such an unconventional approach may impose a virtual barrier that may maintain functionality of a code, allowing the code to interface with authorized applications and device and share sensitive data when necessary to maintain functionality, while simultaneously protecting sensitive data from unauthorized exposure. Thus, the various embodiments the present disclosure describe a technological solution, based on improvement to operations of computer systems and platforms, to the technical challenge of protecting against information leakage caused by displaying sensitive data while maintaining functionality of a code including sensitive data.

Disclosed embodiments may involve systems, methods, and computer-readable media for masking sensitive data. The systems and methods described herein may be implemented with the aid of at least one processor or non-transitory computer readable medium, such as a CPU, FPGA, ASIC, and/or any other processing structure(s) or storage medium, as described herein. For ease of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities. While many actions may be described with respect to a particular element as discussed below (e.g., sensitive data, an indicator, a DOM tree, and/or a mask,), it should be noted that any and all actions described may be performed with respect to a copy of a particular element, which may be generated by an agent.

Some embodiments involve a non-transitory computer readable medium containing instructions that when executed by at least one processor cause the at least one processor to perform cyber security operations for masking sensitive data. A non-transitory computer readable medium, may refer to physical memory for storing information or data readable by at least one processor, as described earlier. Instructions may refer to program code instructions executable by a computer processor, as described earlier. A processor may refer to a physical component, device, or group of components or devices having electric circuitry that performs a logic operation on an input or inputs, as described earlier. Performing operations may involve executing one or more arithmetic, logical, or inference steps, for example by a computing processor, as described earlier. Cybersecurity operations may include to actions, processes, and/or procedures configured to protect or more computing resources. For example, a cybersecurity operation may protect against information (e.g., digital information) leakage, data corruption, damage to computing resources (e.g., hardware, software, and electronic data), disruption of one or more services provided by a computer system, or any other type of harm inflicted or attempted on a computing resource, consistent with disclosed embodiments. Masking may refer to at least partially covering, concealing, obfuscating, or obscuring. Sensitive data may refer to information (digital data), that if disclosed (e.g., to a non-authorized party), may result in a disadvantage, such as loss, harm, or privacy breach to an owner of the data, as described in greater detail herein below. Masking sensitive data may include modifying sensitive data to obfuscate information contained in the data and prevent such information from being revealed (e.g., to a non-authorized party). Operations for masking sensitive data may include substituting, deleting, adding and/or shuffling one or more characters, encoding one or more characters (e.g., via encryption), introducing uncertainty (e.g., by applying a variance to numerical data), any of the actions discussed below, or any other technique for obscuring information.

Some embodiments involve receiving for execution, code associated with displaying sensitive data. Code may refer to at least one instruction, script, module, program, command, function, or any other computing language information that may be readable by at least one processor (e.g., after conversion to object code, machine code, or other readable code) when loaded into a memory of a computing device and used by the at least one processor to perform an operation. Receiving (code) for execution may include obtaining, detecting, or otherwise gaining access to code in a way that is detectable by or understandable to a processor, as described earlier. Receiving code for execution may also include establishing a connection with another device, querying another device or memory, and/or requesting code for execution. For example, a device of the at least one processor may establish a connection with another device and may receive code for execution from that device. Additionally, or alternatively, at least one processor may receive code for execution from memory (e.g., local memory). Sensitive data may refer to information (e.g., digitally encoded information stored in an electronic file on a memory device) that may be classified as at least partially private, confidential, and/or secret, and may include information that, if revealed to an unauthorized party, may cause loss, harm, or a disadvantage, for instance, to an authorized party of the information. Sensitive data may include any combination of text, digits (e.g., in a spreadsheet), charts, graphs, images, audio, video, a file, or any other digitally encoded information. In some embodiments, sensitive data may include one or more credentials configured for granting access (e.g., by one computing device to another computing device) to other sensitive information, such as a user name, personal identifier, IP address, password, passphrase, biometric token, encryption key, or any other type of data used for establishing access to restricted and/or confidential information. Displaying data may refer to presenting digitally encoded information visually on an electronic display device. Displaying data may include one or more of determining a layout for presenting the data, allocating one or more pixels of an electronic display device based on the layout, and activating the one or more pixels to present an image communicating or conveying information encoded in the data. For instance, a browser engine of a browser application may display data included in a web page code as a web page on an electronic display. Code associated with displaying sensitive data may refer to a function, a value, an argument, an API call, a command, an electronic file, any other digital operation configured to achieve display of sensitive data, or any combination thereof. For example, code associated with displaying sensitive data may include an electronic file (e.g., an HTML file) storing one or more instructions, that when executed by at least one processor, cause sensitive data to be displayed on an electronic display device. For instance, executing the code may include accessing sensitive data stored in an electronic file, calculating a layout for the sensitive data, selecting pixels of an electronic display according to the calculated layout, activating the selected pixels to visually present information encoded in the sensitive data, and/or any other operation configured to facilitate displaying sensitive data on an electronic display. In some embodiments, the sensitive data may be stored in an electronic file containing a code (e.g., a browser may fetch an electronic file storing a web page code including sensitive data) such that the sensitive data may be accessed directly by reading the electronic file, e.g., without executing the code. In some embodiments, sensitive data may be stored external to an electronic file containing a code but may be accessed by executing the code (e.g., using a path, a URL, a URI, an API, a function, and/or library invocation in the code). In some embodiments, the sensitive data may be generated by at least one processor executing the code (e.g., at runtime).

By way of a non-limiting example, referring to FIGS. 1-3, at least one processor 110 of computing device 102 may receive web page code 222 from server 106 over communications network 108. Code 222 may be associated with sensitive data, such that when at least one processor 110 executes code 222, sensitive data may be displayed on electronic display 308. For instance, code 222 may include sensitive data when retrieved from server 106, and/or may include one or more instructions to fetch sensitive data (e.g., from server 106), causing processor 110 to fetch sensitive data when executing code 222, and/or code 222 may include one or more instructions for computing sensitive data, causing processor 110 to compute sensitive data while executing code 222.

In some embodiments, the code may be configured for execution by an application and the agent may be configured to operate without changing application code associated with the application. An application may refer to a software application, such as a browser application configured to display content by executing one or more instructions included in a code. A code configured for execution by an application may refer to a code written using one or more programming language that may be compatible with a software application. For example, a code including instructions in HTML, CSS, JavaScript, and/or Python may be configured for execution by a browser application. Application code associated with the application may refer to one or more portions (e.g., including one or more instructions, declarations, comments, metadata, parameter settings, function and/or API invocations, links, references, or any other code portion) of a code configured to be executed by a software application (e.g., an engine of a browser application). An agent may include a software or cybersecurity agent, as discussed above. Operating (e.g., operate) may include executing, reading, writing, modifying, applying a mask, querying, searching, scanning, calculating, computing, intercepting, blocking, halting, alerting, displaying, sending, delivering, responding, and/or performing any other task with respect to a computing resource. Without changing may include preserving and/or maintaining a prior state (e.g., within a predefined tolerance, threshold, or baseline), and/or preventing a modification or alteration. Without changing application code associated with the application may include abstaining from implementing a change to a code configured for execution by an application. For instance, an agent may prevent or block one or more changes implemented on data stored in a DOM from being implemented in a code corresponding to the DOM. Consequently, the next time a browser executes the code, the sensitive data (e.g., an unmasked version of the sensitive data) may be stored inside the code and the sensitive data, thereby preventing the sensitive data from being lost. Additionally, or alternatively, an agent may perform one or more operations (e.g., to mask sensitive data, as discussed herein) in a manner that does not change application code (e.g., its content or arrangement). In some embodiments, a software agent may mask sensitive data in a DOM in a manner that a user may only be able to access, display, or view a masked version of the sensitive data, while ensuring that a read operation attempting to access the sensitive data from the application code may access the unmasked sensitive data, and/or causing a write operation attempting to insert the sensitive data into the application code to insert the unmasked sensitive data.

Examples of sensitive data may include at least one of financial information, personal information, or business information. Examples of financial information include banking details, such as one or more of digital investment information, digital loan information, digital debt information, digital credit line information, a credit card number, a credit rating, a balance statement, an income statement, a cash flow statement, a shareholder equity statement, an account balance, a debit amount, a credit amount, a source of payment, a recipient of payment, or any other digital information indicating a parameter related to a monetary resource. Examples of personal information include identifying information (e.g., name, age, sex, gender, signature, address, phone number, email address, date of birth, place of birth, passport number, social security number, government identification document number, photograph, biometric information, or an IP address), family status, information about family members, or religious and/or political affiliation. Examples of business information include trade secrets, acquisition plans, financial data, supplier information, a contract, an invoice, customer information, or any other information that may pose a risk if revealed to an unauthorized party (e.g., a competitor). In some instances, the sensitive data may include classified information, such as military or defense secrets (e.g., weapons, strategy, deployment, or agreements), police investigations (e.g., evidence, witness names, suspect names, and/or biometric data), or diplomatic relations (e.g., negotiations, and/or treaties). In some instances, the sensitive data may include health information, such as lab results, surgical reports, medical diagnoses, or genetic information. Additionally, or alternatively, the sensitive information may include educational information, such as a test score, a course grade, academic transcripts, schedules, academic status, disciplinary records, or attendance records.

Some embodiments involve injecting, into an execution environment associated with the code, an agent. An execution environment may An execution environment (e.g., a runtime environment) may refer to a process, a program, an application, a frame, a file, a function, a container, a module, a call (e.g., an API call), one or more lines of code, a parameter, an argument, a script, a browser, a browsing session, a URL parameter, an IP address, an encryption type, an agent (such as an agent discussed herein), a connection, HTML code, an OS. a version of code, or any computerized information defining or influencing the computing context in which a process runs, as described earlier. Associated with may refer to the existence of an affiliation, relationship, correspondence, link (e.g., data linkage) or any other type of connection or correlation (e.g., within a computing environment). An execution environment associated with the code may refer to information about the execution environment (e.g., regarding computing resources allocated for and included in the environment) in which a code may be currently executed (or scheduled to be executed), such as information associated with one or more runtime resources (e.g., a stack, a queue, an event loop, a task schedule, a buffer, a register, a heap and/or cache memory, and/or any other runtime resource), information about one or more data containers allocated for an execution environment (e.g., objects, classes, variables, elements, parameters, functions, and/or APIs configured to be accessed during code execution), and/or any other information that may influence execution of a code in an execution environment. An agent (e.g., a software cybersecurity agent) may include or may refer to a code, that when executed within an execution environment, performs one or more actions to protect a computer, as described earlier. Injecting an agent into an execution environment associated with a code may include inserting or adding one or more instructions for performing one or more cybersecurity actions into the execution environment for the code. For example, instructions for implementing the agent may be inserted into a code such that when a processor executes the code, the processor may execute instructions, thereby performing one or more actions (e.g., cybersecurity actions) of the agent. For example, a code may be stored in one or more editable electronic files which may be edited (e.g., by reading, writing, changing, and/or saving) to include one or more instructions for implementing an agent, such that when the code is loaded into memory, a processor may execute instructions to thereby implement the agent. In some embodiments, a cybersecurity application may automatically edit a code and insert (e.g., inject) instructions to implement the agent. In some embodiments, the agent is injected into a top portion of the code, e.g., causing at least one processor to execute instructions for implementing the agent before executing other portions of the code. A top portion may be considered a portion in code (e.g., an HTML file) prior to a particular line, string, tag, or portion of code associated with a particular level of a corresponding DOM. For instance, code for the agent may be injected immediately after (or within a threshold distance of) the <head> tag (or other distinct tag) in an HTML code for a web page (e.g., as the first executable code in an electronic file storing the web page code). In some embodiments, the agent may be injected by invoking a procedure, e.g., stored on a computing device configured to display sensitive data, and/or on a different computing device, such as a cybersecurity server.

By way of a non-limiting example, in FIG. 2, cybersecurity application 224 (e.g., retrieved from cybersecurity server 104 of FIG. 1) may inject cybersecurity agent 226 into web page code. 222. For instance, cybersecurity agent 226 may be injected into a top portion of web page code 222 such that when a processor (e.g., at least one processor 110 of FIG. 1) executes web page code 222, cybersecurity agent 226 may be activated before other instructions of web page code 222 may be executed.

Some embodiments involve identifying the sensitive data based on an indicator. An indicator may refer to a value, text string, sign, clue, guide, or symbol suggesting, or implying, an existence, state or condition (e.g., of a computing resource). For example, an indicator (e.g., included in a code) may suggest or imply one or more characteristics of data included in, referenced by, or created by the code, such as a type, value, structure, format, use, context, scope, classification, or any other characteristic of data. An indicator (e.g., in a code) may include a single or multiple characters (e.g., arranged or organized in a specific manner or format) that may suggest or imply a context, a scope, or a type for a portion of code (e.g., an instruction, a comment, a declaration, a data value, an object, an element, a variable, a function call, an API invocation, a descriptor, a header, metadata, or any other classification for a portion of code). For instance, an indicator may include one or more tags (e.g., identified by triangular brackets "<" and ">") in a Hypertext Markup Language (HTML) portion of a web page code may indicate an element (e.g., a web element), such as a pair of "<script> and </script> tags indicating a JavaScript portion in a web page code, and/or a pair of <div> and </div> tags delineating a division for a code. Additionally, or alternatively, an indicator may include a particular placement or timing of code (e.g., placement within an HTML document, such as relative to other HTML elements, position in an execution sequence). For instance, an indicator may include a specific arrangement and/or a specific data type, such as a specific number of digits grouped in a particular manner indicating, for instance, a phone number (e.g., a sequence of 10 digits grouped into groups of 3, 3, and 4), or a social security number (e.g., a sequence of 9 digits). Identifying may refer to recognizing, perceiving, or otherwise determining or establishing an existence or association with something based on known information (e.g., digital information). For example, identifying may include performing one or more of parsing code, accessing data, extracting data, deriving data, making a comparison (e.g., between pieces of code), making an inference, making an interpolation, making an extrapolation, determining a correlation, performing a convolution, and/or any other logical and/or arithmetic operation facilitating establishment of an association (e.g., between two or more pieces of digital information). Based on may refer to established or founded upon, caused by, or otherwise derived from. Identifying sensitive data based on an indicator may include one or more scanning, parsing, tokenizing, organizing, sorting, querying, searching, comparing, inspecting, analyzing, testing, simulating, and/or classifying operations to identify an existence of sensitive data, a potential existence of sensitive data (e.g., if the sensitive data may only be accessed subsequent by executing a code), and/or at least a portion of the sensitive data itself (e.g., data content). In some embodiments, an agent may identify sensitive data using a prior analysis of one or more codes (e.g., a history of codes) known to be associated with displaying sensitive data (e.g., different types, formats, uses, scopes, and/or contexts for sensitive data). For example, identifying sensitive data may include identifying, within an HTML document or DOM, a character associated (e.g., through a data structure) with known indicators of sensitive data, and determining that the character, or information near the character (e.g., at a particular placement relative to the character, within a threshold distance of the character) is sensitive data. In some embodiments, an agent may enlist one or more artificial intelligence and/or deep learning techniques to analyze a history of codes to identify an indicator associating a code with a display of sensitive data. In some embodiments, identifying the sensitive data in the code may include discovering sensitive data stored in an electronic file containing a code (e.g., as a data value stored statically), discovering a reference in a code configured to access sensitive data (e.g., at runtime), such as a path, a URL, a URI, an API, a function, and/or library invocation, discovering one or more instructions and/or function invocations configured to cause sensitive data to be generated or calculated by executing the code (e.g., during runtime), discovering one or more instructions configured to present sensitive data on an electronic display, and/or discovering any other portion of an executable code configured to cause sensitive data to be displayed. In some embodiments, an agent may detect and/or receive a write request (e.g., a request to write data, such as to a DOM) and determine it to be associated with (e.g., includes) sensitive data. In response to determining that the write operation is associated with sensitive data, at least one processor (e.g., implementing a cybersecurity agent) may write a masked version of the sensitive data to a DOM and may store (e.g., separately from the DOM) an unmasked version of the sensitive data in memory. Additionally, or alternatively, identifying the sensitive data in the code may include accessing data associated with a DOM (e.g., contained in a DOM, pointed to by a DOM, or indicated by a DOM), which may be built at runtime for a webpage.

In some embodiments, identifying the sensitive data in the code may include scanning the code to detect the indicator. Scanning may include searching, querying, checking, or examining (e.g., an electronic file) to locate or determine one or more sequences of bits or bytes, e.g., associated with one or more known patterns (e.g., combinations of one or more tokens, characters, values, placements, and/or terms). Detect (e.g., detecting) may include discovering, noticing, or ascertaining, e.g., by observing or otherwise establishing a pattern in data stored in an electronic file, for example based on a scanning operation. For instance, an agent may scan an electronic file containing a code to detect one or more indicators suggesting that (e.g., based on known data or patterns, which may be based on machine-learned information associated with sensitive data) executing the code may cause sensitive data to be displayed. Examples of such an indicator include to a position and/or format (e.g., of data stored in an electronic file), an assignment of a data value (e.g., to store sensitive data in a variable, an object, a class, an element, an array or any other type of container of data), an execution flow of a code stored in an electronic file, an instruction (e.g., to display data), a source (e.g., a path or URL for accessing sensitive data), or any other part of a code suggesting that executing the code may involve displaying sensitive data.

In some embodiments, the indicator may include a contextual character sequence associated with the sensitive data. A character sequence may refer to multiple characters (e.g., bytes), discussed above, arranged in a specific order, e.g., to correspond to a pattern associated with a word or predetermined term in a digital file. A contextual character sequence (e.g., in a code) may refer to a character sequence associated with a particular meaning, purpose, and/or use in the code, e.g., when the character sequence appears under a specific set of circumstances and/or conditions (e.g., in association with other character sequences in the code). For instance, a contextual character sequence (e.g., in a code) may indicate a declaration for a container to store data, an assignment of one or more data values (e.g., to a data container), an instruction (e.g., to access, process, and/or display data), a declaration or invocation of a function, API, and/or library, a comment, metadata, or any purpose, meaning, and/or use of text (e.g., a character sequence) in a code. As an example, the character sequences "<div>" followed by "</div>" in a code may provide context to one or more instructions located there between (e.g., as belonging to a specific division or section of a code, contained within the tags), the character sequence "let" may indicate that characters immediately following may be associated with a variable name and an assignment of a data value to a data container associated with the variable name. Similarly, a character sequence "PASSWORD" configured for displaying adjacent to an input field may indicate that data subsequently entered into the input field may be used as a credential (e.g., sensitive) for accessing other sensitive data. A character sequence associated with the sensitive data may refer to one or more words or terms appearing and/or expected to appear (e.g., in a code) in relation to sensitive data, for example based on a predetermined pattern and/or history of one or more codes as described earlier (e.g., as a declaration, an assignment, a format, an invocation of a function, API, and/or library, a comment, a descriptive text such as using "alt", a title, a path or URL, or any other string of characters associated with sensitive data).

For instance, an agent (e.g., a cybersecurity agent) may perform (or invoke a performance of) one or more operations, such as scanning a code, parsing a code (e.g., into tokens), analyzing and/or comparing one or more code portions or tokens (e.g., to a set of predefined tokens), applying an interpreter to a code, applying a compiler to a code, or applying one or more rules (e.g., semantic, syntactic, ontological, or contextual rules), for example using an artificial intelligence or a deep learning algorithm, to determine a context and/or meaning that may link one or more code portions or tokens of a code to an existence and/or potential existence of sensitive data, to thereby determine that the code may be associated with displaying sensitive data. In some embodiments, an agent may trace an execution flow of a code to determine an association with sensitive data during runtime, e.g., following and/or preceding a contextual character sequence in the code. For example, a contextual character sequence may correspond to a function, a library, and/or an API invocation configured to cause sensitive data to be generated, processed, retrieved, and/or displayed.

In some embodiments, the existence or potential existence of sensitive data may be identified by determining that the contextual character sequence satisfies a predefined rule. A predefined rule (e.g., a rule specified or established in advance) may include one or more of a condition, a threshold, a baseline, a tolerance (e.g., a range), e.g., for applying to a piece of data to ensure a proper use and/or application in a computing environment. For example, a rule may relate to how data may be stored (e.g., how much memory and/or what type of memory), how data may be processed or used (e.g., the types of operations that may be performed on the data), how data may be transmitted, or any other condition that may be applied to data to ensure proper use in a computing environment. As another example, a predefined rule may include one or more conditions denoting a syntax, placement, character, combination of characters, or any other parameter associated with a sequence of characters, as discussed further below. Satisfying a predefined rule may refer to complying with one or more conditions and/or meeting one or more constraints of a predefined rule. In some embodiments, one or more predefined rules may be stored in a memory of a computing device. An agent may access the one or more predefined rules from memory and may perform one or more parsing, tokenizing, sorting, querying, analyzing, inspecting, comparing, testing, and/or simulating operations to determine if a contextual character sequence in a code satisfies one or more of the predefined rules. Based on this determination, the agent may establish that a code containing the contextual character sequence may be associated with displaying sensitive data (e.g., identify sensitive data in the code). In some embodiments, the existence or potential existence of sensitive data may be identified by determining that the contextual character sequence satisfies multiple predefined rules (e.g., a format rule and a length rule, discussed below).

In some embodiments, at least one of the predefined rules may be a format rule. A format may refer to an arrangement, structure, or configuration, for instance to produce a recognizable pattern for associating data with one or more of a type, a context, a classification, a scope, a use, a meaning, a priority, a protocol (e.g., an encoding, authenticating, validation, authorization, and/or security protocol), or in association with other data (e.g., sensitive data). A format may relate to one or more of a data type (e.g., char, short, int, long), a length, a protocol, a grouping, an arrangement, a proximity and/or association to other contextual character sequences, and/or a use. A format rule may refer to a rule to ensure that a character sequence complies with a predefined format, e.g., such that the character sequence may be used in a code in a manner associated with the format. For example, a format rule for a credit card number may require sixteen sequential digits (e.g., characters) arranged into four groups of four digits (e.g., 1234 1234 1234 1234), a format rule for a URL may require a character sequence to begin with "https://", and a format rule for an email address may require a prefix of at least one alphanumeric character followed by an "@" symbol and a domain name (e.g., example@mail.com). In some embodiments, an agent may access one or more rules from memory to determine if a contextual character sequence (e.g., identified as described earlier) satisfies one or more predefined format rules. For instance, the agent may parse a contextual character sequence into tokens and may determine that an order and/or type of the tokens correspond to an order and/or type specified in the format rule.

In some embodiments, at least one of the predefined rules may be a length rule. A length (e.g., for a character sequence) may refer to a number of characters included in a sequence, and/or a number of bits or bytes required to store a character sequence. For example, an integer (e.g., for performing arithmetic operations) may require 4 bytes of memory, and a length for a sequence of four integers may be four digits, or alternatively sixteen bytes (e.g., to store four digits). In some embodiments, a contextual character sequence may include data of different types (e.g., primitives such as strings, numbers, booleans, undefined, null, and/or combinations thereof), and a length may relate to a number of separate data items in the sequence and/or a number of bytes needed to store the sequence. A length rule may include one or more thresholds or baselines setting a size (e.g., an exact size, or upper and/or lower limits for a size) for a character sequence. For example, a length rule for a social security number may require nine alphanumeric characters ranging from "0" to "9", a length rule for an email address may restrict a length of an email address to at most 320 characters, and a length rule for a password may require at least 8 and no more than 12 alphanumeric characters. In some embodiments, an agent may access one or more rules from memory to determine if a contextual character sequence satisfies one or more predefined length rules. For instance, the agent may use a length property (e.g., string.length) to determine a length for a contextual character sequence and compare the determined length to one or more conditions specific in the predefine length rule.

In some embodiments, the contextual character sequence may be configured to be displayed when the content is displayed. For instance, the contextual character sequence may be included inside a displayable web element (e.g., within an HTML document or file), such as a paragraph, text box, field, header, title, or any other displayable element. A browser rendering the code may obtain the contextual character sequence (e.g., from a DOM associated with the code, as described herein below) and present the contextual data visually on an electronic display.

In some embodiments, the contextual character sequence may be configured to be withheld when the content is displayed. Withheld may include being hidden, prevented, suppressed, held back, suspended and/or blocked. For instance, the contextual character sequence may be included inside a non-displayable portion of a code, such as metadata, a comment, an alternative text (e.g., alt="sensitive data"), a name of a function and/or a container for data, or any other portion of a code configured to be suppressed from display. Additionally, or alternatively, the contextual character sequence may be subjected to one or more formatting rules causing display to be hidden (e.g., using a hidden, color, size, position, z-index, and/or any other property capable of suppressing display of a contextual character sequence).

Figures 1, 9:
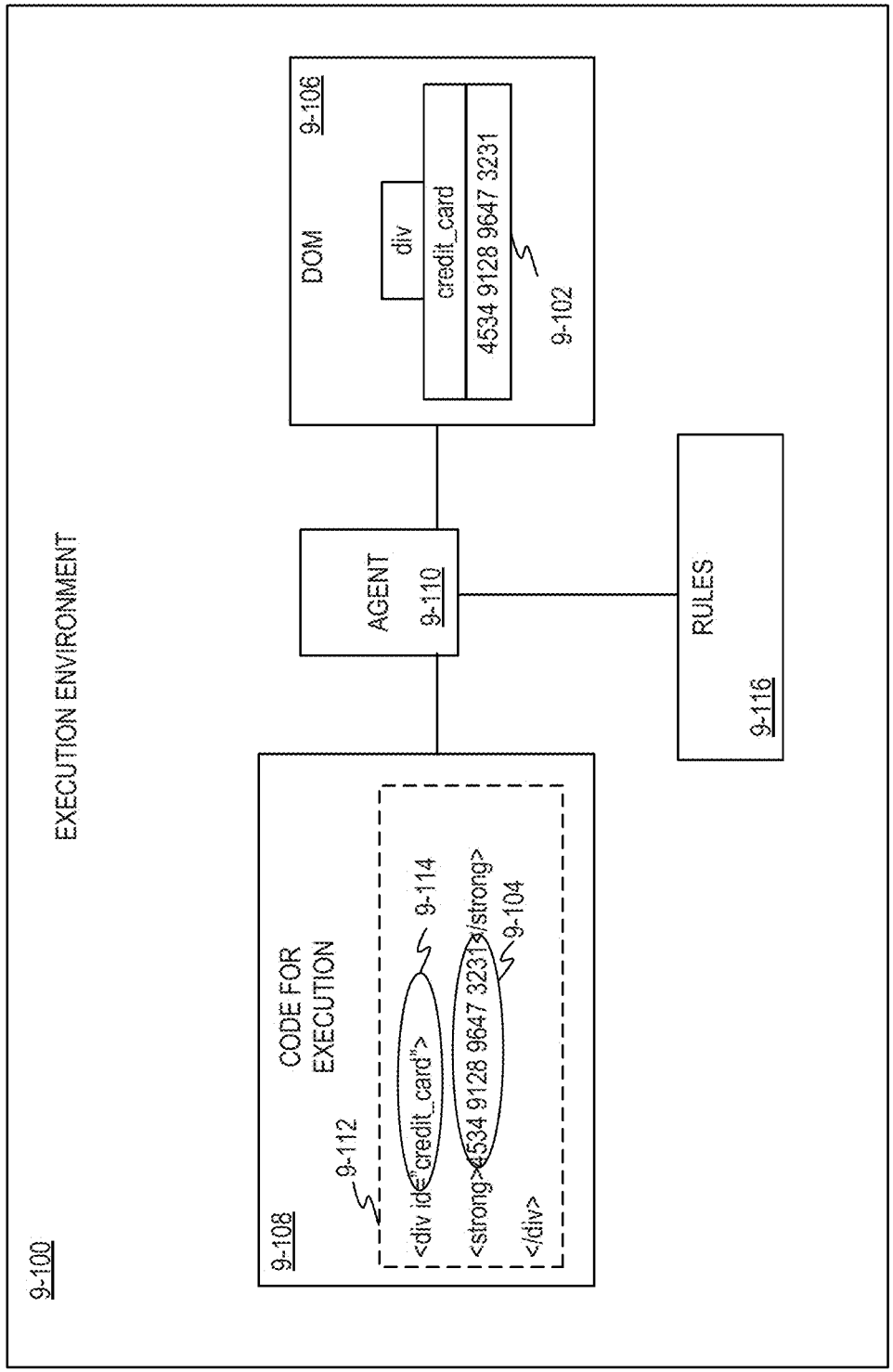
Figures 2, 9:
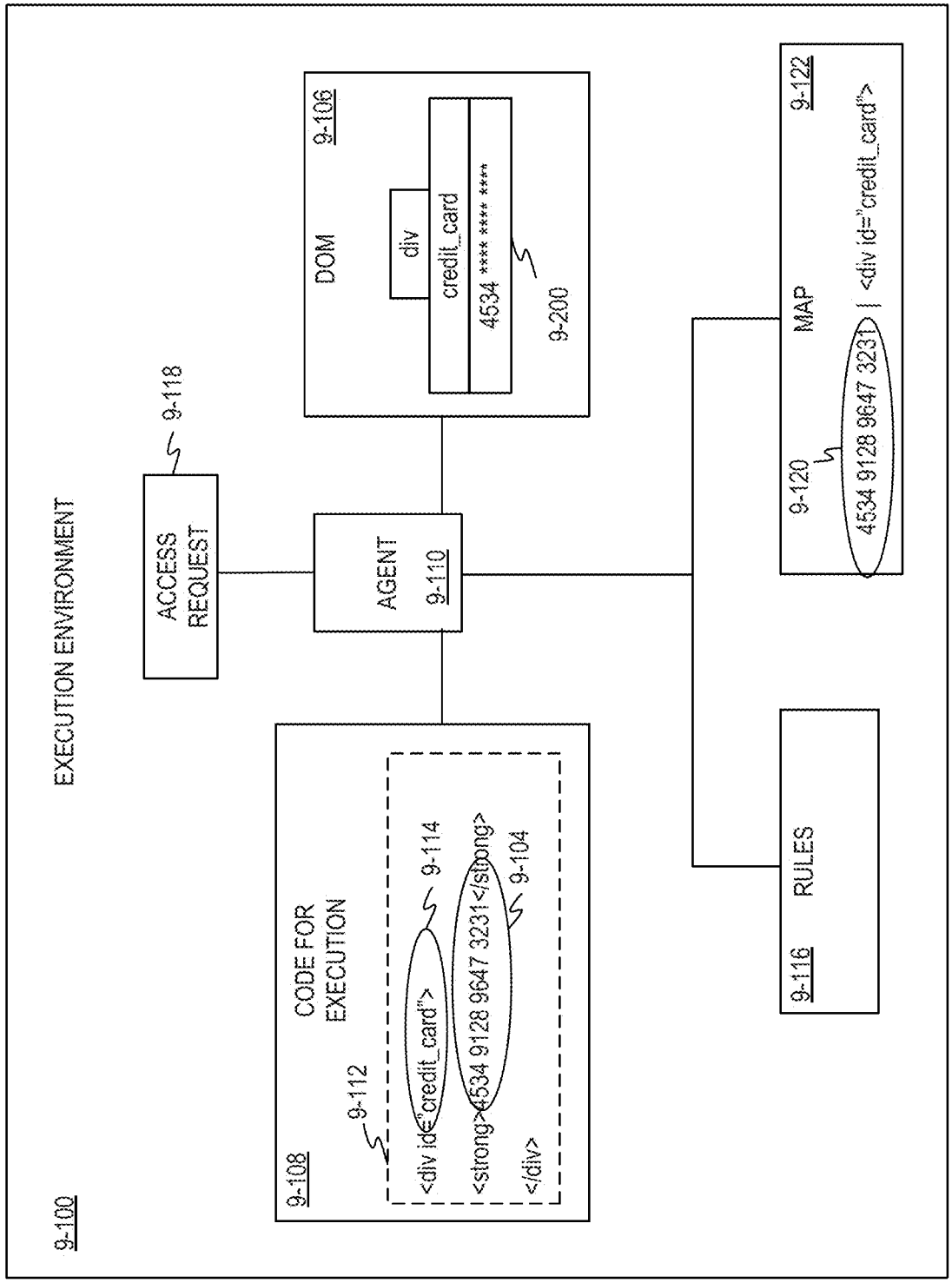
Figures 4, 9:
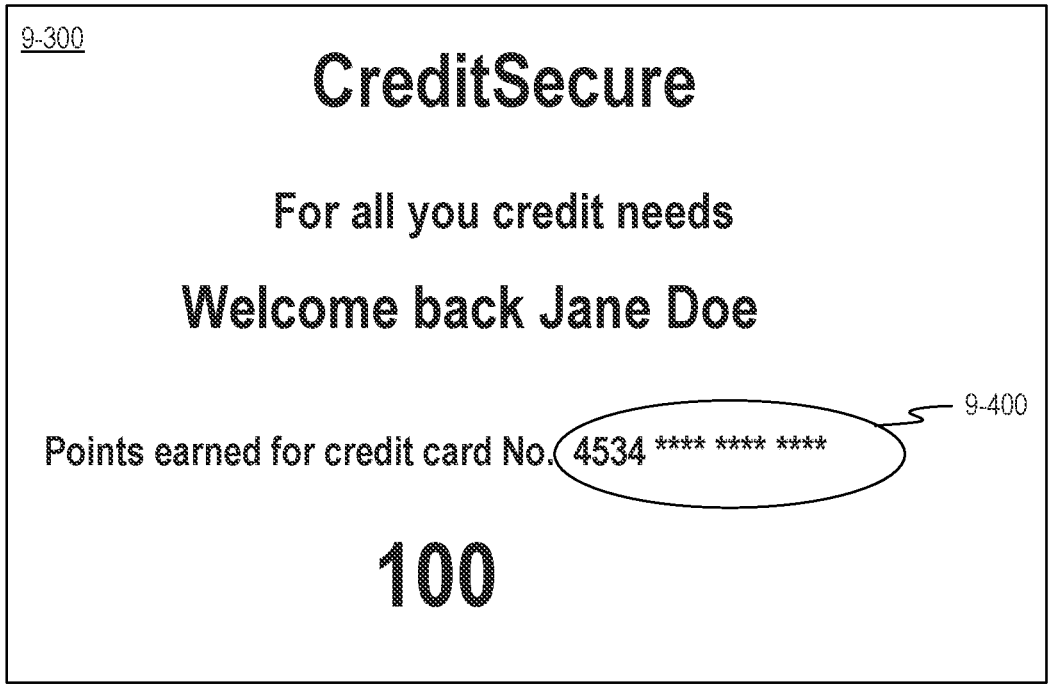
Figures 5, 9:
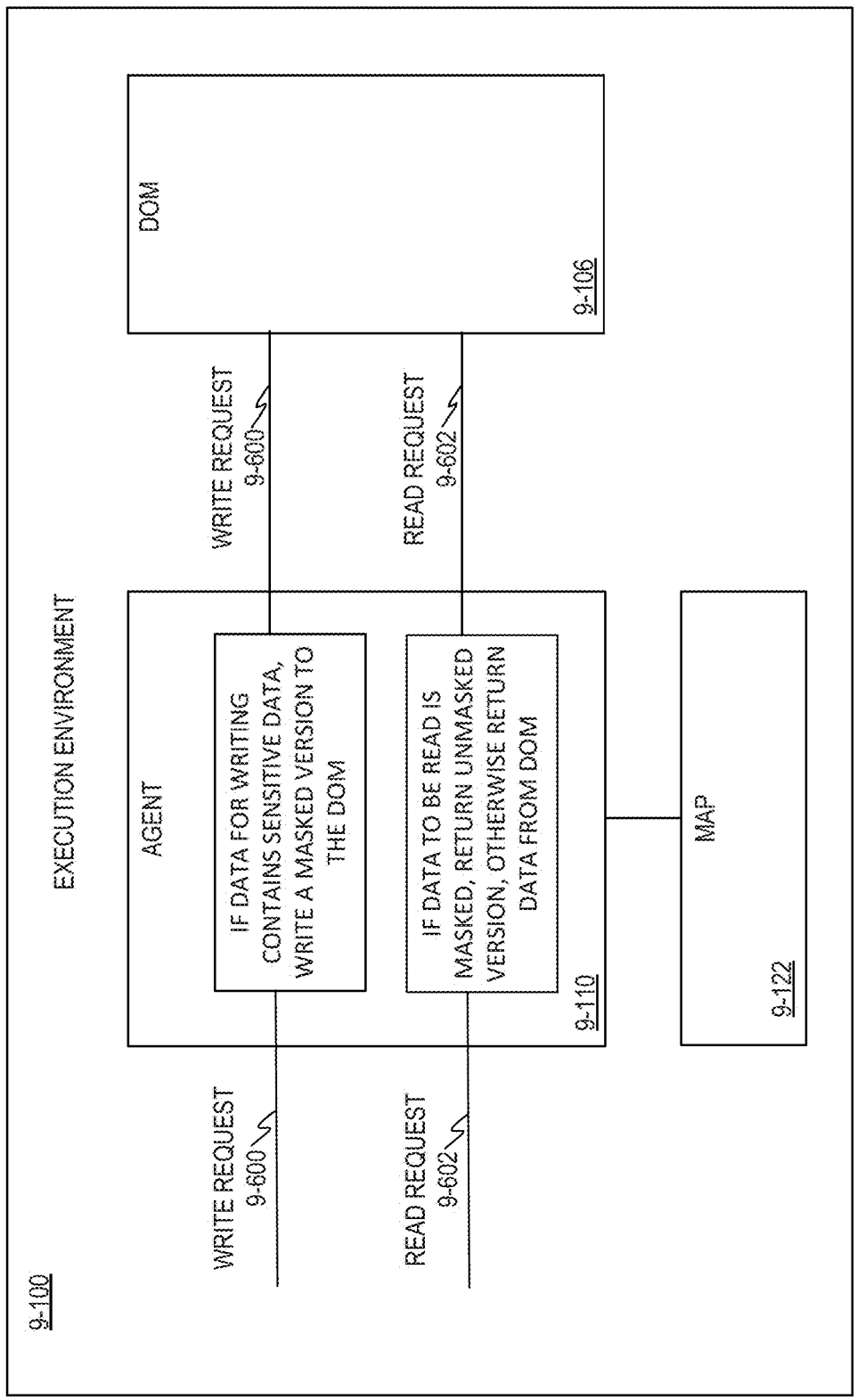
Figures 6, 9:
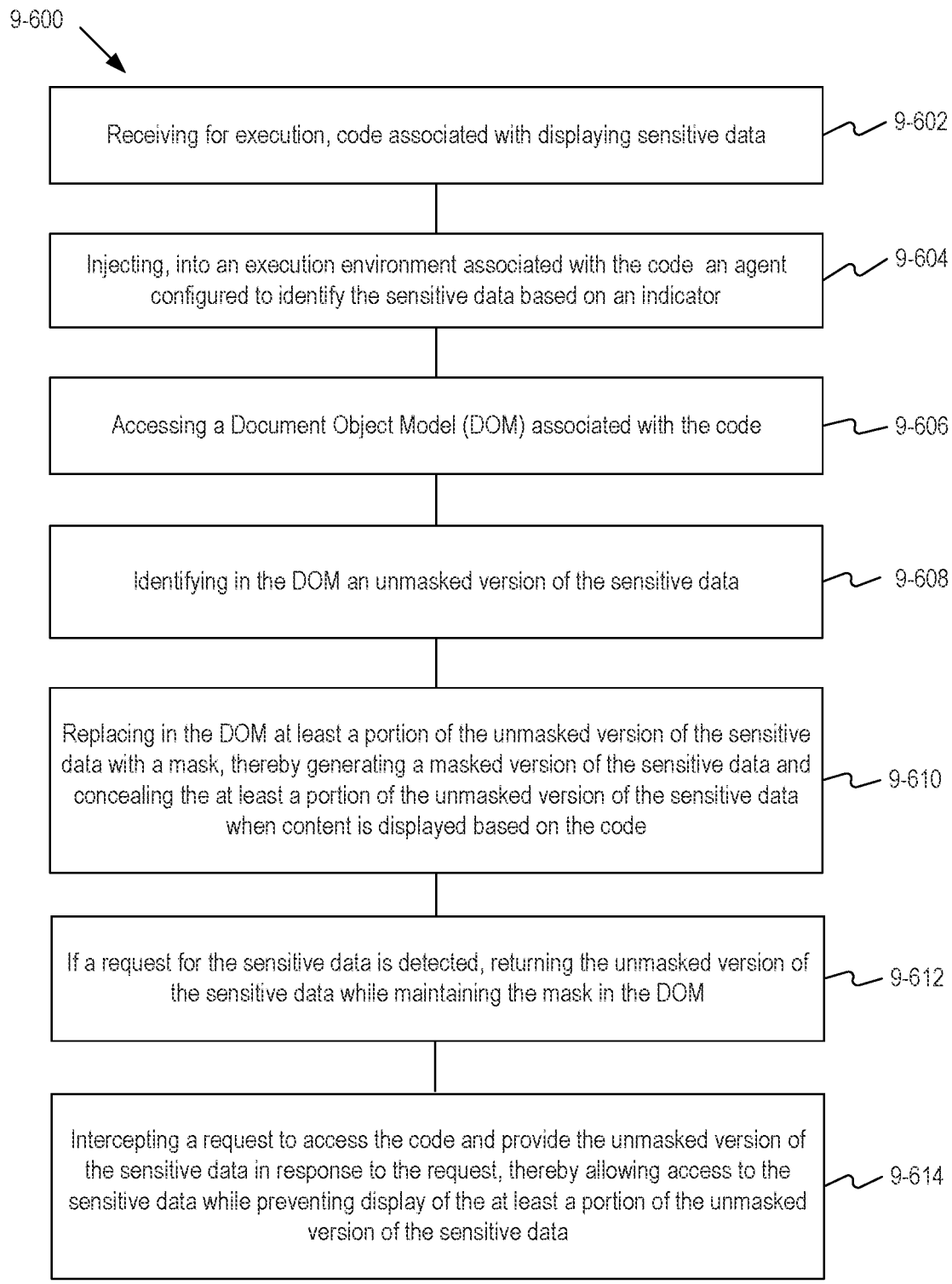

By way of a non-limiting example, FIG. 9-1 illustrates a block diagram of an exemplary execution environment 9-100 including an unmasked version 9-102 of sensitive data 9-104 in a DOM 9-106 for an executable code 9-108, consistent with some embodiments of the present disclosure. For example, execution environment 9-100 may correspond to execution environment 220 of FIG. 2, and code 9-108 may be executable by at least one processor 110 of FIG. 1. An agent 9-110 (e.g., corresponding to cybersecurity agent 226) may provide a virtual barrier between code 9-108 and DOM 9-106, preventing a display of sensitive data 9-104 included in code 9-108 without affecting integrity (e.g., maintaining integrity) of sensitive data 9-104 in code 9-108. Agent 9-110 may identify sensitive data 9-104 in code 9-108, for instance, by scanning code 9-108 (e.g., and/or a runtime version of code 9-108, such as DOM 9-106) to detect one or more contextual character sequences, such as a declaration for an HTML div element 9-112, including an identifier 9-114 (e.g., "credit card") and sensitive data 9-104. Agent 9-110 may determine that data 9-104 may be sensitive data based on one or more indicators. For instance, agent 9-110 may analyze the one or more contextual character sequences to determine that sensitive data 9-104 may be a credit card number and is therefore sensitive data. For example, sensitive data 9-104 (e.g., a first contextual character sequence) may comply with one or more predefined rules 9-116 (e.g., stored in a memory), such as a length rule requiring a credit card number to be 16 digits long, and/or a format rule requiring that the 16 digits of a credit card number be organized into four groups of four digits. Additionally, or alternatively, agent 9-110 may determine that sensitive data 9-104 may be sensitive based on one or more other contextual character sequences, such as an identifier 9-114 (e.g., "credit_card") for a div element 9-112 containing sensitive data 9-104. For instance, agent 9-110 may compare identifier 9-114 to a dictionary of terms associated with sensitive data.

Some embodiments involve accessing a Document Object Model (DOM) associated with the code. A DOM may refer to an interface that models or represents a document including Extensible Markup Language (XML), HTML, CSS, JavaScript and/or Python instructions as a logical structure, as discussed above. A DOM associated with a code may store a copy of content included in a code according to a structure useable by a browser engine to display the content on an electronic display. For instance, each element in a code may be represented in a DOM for the code as node in a hierarchical tree. A browser engine may generate a DOM when preparing to render a code, store the DOM in a browser memory (e.g., in browser application 216 inside memory 114 of FIG. 2), and interact with the DOM during runtime (e.g., to update DOM in response to a user input, thereby updating a display of content). For instance, a DOM for a code may store a copy of one or more data values included in a code (e.g., text, numbers, images, audio and/or video content, icons, charts, graphs, and/or any other type of data), and parameters and/or settings relating to a layout (e.g., where on the screen to display content), a format (e.g., size, color, font, style for the content), a functionality (e.g., to enable user interaction), or any other information relating to displaying content in a code. For example, a DOM for a code to display a character sequence (e.g., "Hello World") may store a copy of the character sequence (e.g., in a location of browser memory allocated for the DOM). In some embodiments, a DOM may be associated with code associated with displaying sensitive data, discussed above. At runtime, to display the character sequence, a browser engine may read the copy of the character sequence from the DOM. When a browser navigates to a new web page (e.g., from a prior web page), the browser may generate a new DOM for the new web page code replacing the DOM for the prior web page and may interact with the new DOM to display content for the new web page. Accessing (e.g., a memory) may include communicating via a channel to perform operations such as reading, writing, deleting, querying, searching, or any other interaction with a memory device (whether local or remote). Accessing a DOM associated with a code may include interacting with an area of a browser memory storing a DOM for a code and performing one or more memory access methods. In some embodiments, a DOM for a code may be accessed using one or more APIs, such as QuerySelector, and/or GetElement (e.g., by tag name, class name, or identifier). For instance, an agent may invoke one or more APIs to access a DOM for a web page code, e.g., to locate or more elements displayed on the web page, and/or modify one or more elements to thereby change the display of the web page.

By way of a non-limiting example, in FIG. 9-1, a browser application (e.g., browser application 216 of FIG. 2) may create a DOM 9-106 by parsing, interpreting, and/or compiling code 9-108. For example, DOM 9-106 may be stored inside a section of memory 114 allocated for browser application 216, and agent 9-110 may access DOM 9-106 using an API invocation, e.g., GetElementbyID ("credit_card").

Some embodiments involve identifying, in the DOM, an unmasked version of the sensitive data. Unmasked may refer to a state (e.g., of data) of being sufficiently exposed or revealed to allow accessing information in the data (by a machine and/or human). An unmasked version of sensitive data may refer to a representation of sensitive data (e.g., a manner in which sensitive data is included in a document, file, or browsing session) that may expose or reveal information included in the sensitive data, such that exposing the unmasked version of sensitive data may allow an unauthorized party to use the information (e.g., and consequently cause loss, harm, or a disadvantage, for instance, to an authorized party of the sensitive data). Identifying in the DOM an unmasked version of the sensitive data may include accessing the DOM (e.g., using one or more APIs to access the DOM in the browser memory), and performing one or more querying, searching, analyzing, inspecting, testing, simulating, and/or comparing operations to detect in the DOM a copy of sensitive data included in a code, e.g., based on an indicator. For example, identifying in the DOM an unmasked version of the sensitive data may include accessing the DOM and determining that at least one character within the DOM matches a character known to be an indicator of sensitive data, and identifying an unmasked version of sensitive data adjacent or near (e.g., within a threshold distance of) the indicator.

In some embodiments, the sensitive data is associated with at least one element associated with the code. An element associated with a code (e.g., a web element) may refer to a distinct section of code (e.g., HTML, CSS, and/or JavaScript code) associated with a webpage (e.g., corresponding to a section of a webpage). For instance, the at least one element may include a hypertext markup language (HTML) element. An HTML element may a portion of an HTML code delineated with at least one tag (e.g., "<" and ">"). Non-limiting examples of elements include links, paragraphs, headings, numbered and bulleted lists, tables, regions (e.g., of a webpage), images (e.g., including videos), form controls (e.g., including buttons, edit fields, check boxes, combo boxes, list boxes), scroll bars, sections, and any other content containable within a webpage (e.g., content delineated with at least one tag, such as by having an opening and closing angular bracket). In some embodiments, the at least one HTML element may include a <div> HTML element. A <div> element in a code may be a container (e.g., delineated with <div> and </div> tags) for additional code, such as additional elements, which may be referenced by other portions of the code, for example, for styling using CSS code, or manipulating using JavaScript code. Sensitive data associated with at least one element may refer to sensitive data that is configured at least in part by the at least one element (e.g., as an assignment of sensitive data to a data container, a setting to format sensitive data, and/or an invocation to access sensitive data), sensitive data for which the at least one element (e.g., in a code) is configured to enable the display of, or sensitive data that is influenced by the at least one element. For instance, an element in a code may include an assignment of sensitive data to a data container, a reference to sensitive data, an instruction to retrieve sensitive data (e.g., from local memory and/or a remote source), an instruction and/or an invocation for a function or API to generate sensitive data (e.g., at runtime), an instruction and/or an invocation for a function or API to display sensitive data, and/or any other code portion that may indicate an association between sensitive data an element of the code. Example of elements associated with sensitive data may include a text field or paragraph storing sensitive data, an input field configured to receive sensitive data (e.g., from a user), a clickable button to invoke a function configured to generate sensitive data (e.g., at runtime), a link to fetch sensitive data, or any other element in a code facilitating a display of sensitive data. In some embodiments, the unmasked version of the sensitive data may be identified in the DOM by identifying the at least one element (e.g., associated with sensitive data) in the DOM. An element may be identified in a DOM by accessing a DOM (e.g., in a browser memory) and performing one or more scanning, searching, querying, or reading operations with respect to the DOM. For instance, an agent may read an element in a DOM using an API, such as getElementsByTagName, getElementsByClassName, or getElementById (e.g., to access an element using a name, class, or identifier, respectively, for example, declared inside a div element), based on a CSS selector (e.g., using a querySelector API), using an HTML object collection for an element, or any other technique for accessing an element in a DOM for a code.

In some embodiments, identifying the at least one element in the DOM may include determining that the at least one element is associated with the sensitive data. For instance, a code may include a password stored inside a div element with an identifier (e.g., id="password"). A DOM for the code may store a copy of the password (e.g., an unmasked version of sensitive data) in a node associated with the identifier, causing a browser engine to display the password when executing the code. An agent may identify the password in the code based on the identifier (e.g., a contextual character sequence indicating sensitive data). The agent may identify the unmasked version of the password in the DOM based on the div element associated with the identifier, e.g., using an API invocation getElementById(password).

By way of a non-limiting example, in FIG. 9-1, agent 9-110 may identify unmasked version 9-102 of sensitive data 9-104 in DOM 9-106, e.g., based on identifier 9-114 for div element 9-112 (e.g., an HTML element). For example, agent 9-110 may identify unmasked version 9-102 using an API invocation getElementbyID (credit_card).

Some embodiments involve replacing in the DOM at least a portion of the unmasked version of the sensitive data with a mask. A portion may refer to a part, a share, or a fraction (e.g., of a whole). A portion of the unmasked version of the sensitive data may refer to at least one character of the sensitive data, the entire sequence of sensitive data, or at least one byte of a sequence of bytes storing sensitive data in memory, such as in a DOM for a code stored in a browser memory. For example, if a piece of data occupies 20 bytes, a portion may include the first 10 bytes. A mask (e.g., for data) may refer to a modification to data configured to obfuscate or conceal information encoded in the data, e.g., to prevent knowledge and/or use of the information. For instance, a mask may be implemented by substituting one or more characters (e.g., replacing a character with "*" or "#"), shuffling one or more characters (e.g., converting "string" to "gisrnt"), nullifying or deleting one or more characters, encrypting data, blurring and/or pixelating (e.g., image and/or video data), muting and/or garbling (e.g., audio data), redacting data, or implementing any other type of encoding to obfuscate and/or conceal information. Replacing may refer to substituting or removing an item and inserting a different item in its place. Replacing in the DOM at least a portion of the unmasked version of the sensitive data with a mask may involve accessing a DOM for a code in a memory allocated for a browser application, locating a copy of sensitive data in the DOM (e.g., based on an indicator), writing a different value (e.g., corresponding to a mask) and/or deleting at least one byte of the unmasked version of the sensitive data in the DOM (e.g., using an API invocation), shuffling at least two bytes of an unmasked version of sensitive data in the DOM, and/or performing any other operation facilitating obfuscation or hiding a display of at least one byte of an unmasked version of sensitive data. For example, at least one processor may delete at least one character or byte of the unmasked version of sensitive data from the DOM (e.g., at a particular place) and may write a different character or byte to the DOM (e.g., at the same particular place).

Such a replacement may generate a masked version of the sensitive data (e.g., in a DOM). Generating (e.g., generate) may include producing or creating, such as by executing a function, program, or application (e.g., implemented by an agent). A masked version of sensitive data may refer to representation of sensitive data obfuscating and/or hiding enough information contained in the sensitive data, such that exposing the masked version of sensitive data to an unauthorized party may prevent the unauthorized party from using the information (e.g., thereby avoiding causing loss, harm, or a disadvantage, for instance, to an authorized party of the sensitive data). For example, sufficient bytes of the sensitive data may be overwritten and/or deleted via a mask such that any information leaked by the masked version of the sensitive data may not be useful to an unauthorized party.

For instance, the masked version of the sensitive data may conceal the at least a portion of the unmasked version of the sensitive data when content is displayed based on the code. Concealing may refer to hiding, obscuring, e.g., to prevent exposure or leakage of information, for instance by encoding, encrypting, scrambling, or deleting information, and/or by substituting one or more bytes of information with a different byte (e.g., null). Conceal at least a portion of the unmasked version of the sensitive data may include concealing at least one byte of the sensitive data, e.g., such that at least one byte of the sensitive data is obfuscated and/or hidden by the mask. Display (e.g., data) may refer to selecting and/or activating one or more pixels on an electronic display to cause a visual presentation of information (e.g., as text, an image, a chart, a graph, or any other presentation of digital information). Display content based on a code may including calculating a geometry of a layout for one or more elements in a code (e.g., by referencing a DOM based on the code), and painting one or more elements (e.g., by selecting and activating one or more pixels, as described earlier). For instance, replacing sensitive data in a DOM for a code with a masked version of the sensitive data may cause a browser engine to retrieve and display a masked version of the sensitive data from the DOM instead of an unmasked version. Returning to the password example, an agent may replace the copy of the password stored in the DOM using an API invocation. For instance, an agent may invoke a native innerHTML API to change the DOM content (e.g., innerHTML="*****";). If a code (e.g., included in the web page code or a different code) accesses the PATCHED innerHTML API to read the DOM content, a software agent may intercept the request and return an unmasked version of the sensitive data, instead of the masked version of the sensitive data in the DOM. Consequently, when executing code associated with the DOM, a browser may retrieve and display the masked password from the DOM (e.g., "*****"), instead of displaying the password.

By way of a non-limiting example, reference is made to FIG. 9-2 which illustrates a block diagram of execution environment 9-100 including a masked version 9-200 of sensitive data in DOM 9-106 for executable code 9-108, consistent with some embodiments of the present disclosure. Agent 9-110 may replace in DOM 9-106 the last twelve digits (e.g., out of sixteen digits) of unmasked version 9-102 (FIG. 9-1) of sensitive data 9-104 with a mask (e.g., "*") to thereby generate masked version 9-200 of sensitive data 9-104 in DOM 9-106. Consequently, when displaying content based on code 9-108, a browser (e.g., browser application 216 of FIG. 2) may display masked version 9-200 (e.g., instead of unmasked version 9-102), thereby concealing the last twelve digits of unmasked version 9-102.

By way of another non-limiting example, reference is made to FIGS. 9-3 and 9-4 illustrating a web page 9-300 displaying content based on code 9-108, consistent with some embodiments of the present disclosure. In FIG. 9-3, a browser engine (e.g., software engine 218 of FIG. 2) may visually present web page 9-300 including an unmasked version 9-302 of sensitive data 9-104 (e.g., based on unmasked version 9-102 of sensitive data 9-404 stored in DOM 9-106). In FIG. 9-4, upon agent 9-110 modifying DOM 9-106 (e.g., by replacing unmasked version 9-102 of sensitive data 9-104 with masked version 9-200), a browser engine may visually present (e.g., to a display) web page 9-300 using a masked version 9-400 of sensitive data 9-104 (e.g., based on masked version 9-200 of sensitive data 9-404 stored in DOM 9-106), where masked version 9-400 may conceal the last twelve of the sixteen-digit of sensitive data 9-104.

Some embodiments involve returning the unmasked version of the sensitive data while maintaining the mask in the DOM, such as if a request for the sensitive data is detected. A request (e.g., for data) may include a communication, command, operation (e.g., a read or write operation), API call, petition, or query, e.g., by a software application and/or computing device. A request for data may be local (e.g., within a computing environment, local are network, and/or computing device), or remote, such as over a wide-area communications network. In some embodiments, a request may be required to comply with a protocol in order to receive a response. For instance, a request for data may be submitted using an API invocation. Detecting a request for sensitive data may include parsing and/or interpreting one or more instructions (e.g., including an API invocation for requesting sensitive data), identifying a task scheduled for execution to access sensitive data (e.g., by reading sensitive data locally, fetching sensitive data over a network, and/or generating sensitive data by at least one processor), monitoring a memory location storing sensitive data (e.g., for attempts to read and/or write data), comparing request information to known information associated with (e.g., within a data structure or library) requests for sensitive data, and/or any other operation facilitating discovering an attempt to access sensitive data on a computing device. In some embodiments, a request for sensitive data may include a read request (e.g., a request to read data, such as from a DOM), which may be received and/or detected by an agent to be directed to an element that is masked in a DOM. In response to detecting a read request for sensitive data, at least one processor (e.g., implementing a cybersecurity agent) may return the unmasked version of the sensitive data. In some embodiments, a request for sensitive data may include a write request (e.g., a request to write sensitive data such as to a DOM), which may be received and/or detected by an agent as directed to sensitive data. In response to detecting a write request for sensitive data, at least one processor (e.g., implementing a cybersecurity agent) may write a masked version of the sensitive data to the DOM, and store an unmasked version of the sensitive data in memory (e.g., to use upon intercepting a request to access the sensitive data). Returning (e.g., return) may include delivering, transmitting, sending, or providing (e.g., in response to a request). Maintaining may include preserving, continuing a current state, and/or preventing a change. Returning the unmasked version of the sensitive data may include storing a copy (e.g., an emulated copy) of an unmasked version of sensitive data in memory (e.g., in advance), identifying a party associated with a request to access a code including sensitive data, authorizing and/or authenticating the party and/or the request, querying, searching, and/or locating an emulated copy of unmasked sensitive data in memory, reading an unmasked copy of unmasked sensitive data from memory, communicating with a party associated with the request (e.g., via a local channel and/or a communications network), delivering a path (e.g., a local path, and/or a URI or URL) configured to allow retrieving unmasked sensitive data from memory, encoding an emulated copy of unmasked sensitive data (e.g., via encryption), transmitting the unmasked sensitive data or an emulated copy of unmasked sensitive data (e.g., in an encrypted format) to an authorized party associated with the request, and/or performing any other operation configured to facilitate access to unmasked sensitive data in response to a request. Returning the unmasked version of the sensitive data while maintaining the mask in the DOM may include continuing to store a masked version of sensitive data in a DOM for a code (e.g., simultaneously with allowing access to unmasked sensitive data in response to a request), preventing a change to a masked version of sensitive data stored in a DOM, preventing a display of unmasked sensitive data on an electronic display, preventing a change to sensitive data included in a code corresponding to the DOM, and/or performing any other action to facilitate preventing a display of unmasked sensitive data. In some embodiments, maintaining a mask for sensitive data in the DOM while returning unmasked sensitive data (e.g., in response to a request) may impose a virtual barrier between the DOM and the code, to thereby maintain an unmasked version of the sensitive data in the code, and preserve data integrity of the code. For instance, the virtual barrier may prevent a browser application and/or an operating system from automatically updating the code to correspond to the DOM for the code, thereby maintaining the sensitive data in the code, while masking the sensitive data in the DOM for the code. Such a virtual barrier may allow to subsequently load the code in a future session, while preventing loss of access to the sensitive data and may thereby provide an unconventional technological solution to a technological problem of information leakage and data integrity.

By way of a non-limiting example, in FIG. 9-2, agent 9-110 may intercept a request 9-118 to access sensitive data 9-104. For instance, agent 9-110 may detect a task associated with request 9-118 in a call stack of execution environment 9-100 and may remove (e.g., pop) the task from the call stack. For example, request 9-118 may be implemented as an API invocation originating from another software application. In response to detecting request 9-118, agent 9-110 may authenticate request 9-118 and/or a party associated with request 9-118, locate a copy 9-120 of an unmasked version of sensitive data 9-104 in memory, deliver a copy 9-120 of an unmasked version of sensitive data 9-104 to the authenticated party (e.g., using an encrypted channel over communications network 106 of FIG. 1), while simultaneously maintaining storage of masked version 9-200 of sensitive data 9-104 in DOM 9-106. Consequently, leakage of information included in sensitive data 9-104 via a display device may be prevented, while allowing an authorized party to access sensitive data 9-104.

By way of another non-limiting example, reference is made to FIG. 9-5 which is a block diagram illustrating agent 9-110 returning an unmasked version of sensitive data while maintaining a masked version of the sensitive data in DOM 9-106, consistent with some embodiments of the present disclosure. Agent 9-110 may receive at least one write request 9-600 (e.g., a request to perform a write operation) and/or at least one read request 9-602 with respect to DOM 9-106 (e.g., a request to perform a read operation). In some embodiments, agent 9-110 may intercept any read and/or write request with respect to DOM 9-106, thereby implementing a virtual barrier for DOM 9-106. Upon receiving (e.g., and/or intercepting) a write request 9-600 (e.g., a request to write data to DOM 9-106), agent 9-110 may analyze write request 9-600 to determine if write request 9-600 includes sensitive data (e.g., based on an indicator). If request write 9-600 includes sensitive data, agent 9-110 may store a copy of the sensitive data in map 9-122, produce a masked version of the sensitive data, and write the masked version of the sensitive data to DOM 9-106, thereby preventing a display of the sensitive data while retaining a copy of the sensitive data. If write request 9-600 lacks sensitive data, agent 9-110 may write the data included in write request 9-600 to DOM 9-106. Upon receiving (e.g., and/or intercepting) a read request 9-602 (e.g., a request to read data from DOM 9-106), agent 9-110 may analyze read request 9-602 to determine if read request 9-602 is for masked sensitive data (e.g., based on an indicator). If read request 9-602 is for masked sensitive data, agent 9-110 may retrieve an unmasked version of the sensitive data from map 9-122 and may deliver the unmasked version of the sensitive data to a party issuing the request. If read request 9-602 is for unmasked data (e.g., request 9-602 is not associated with sensitive data), agent 9-110 may retrieve the unmasked data from DOM 9-106 and deliver the unmasked data to the party issuing the request.

For instance, in some embodiments, the agent may be further configured to intercept a request to access the code and provide the unmasked version of the sensitive data in response to the request. A request to access a code may include a request (e.g., as described above) to read, write, and/or edit an electronic file storing a code. In some embodiments, a request to access a code may be submitted by invoking an API. Intercepting may include interrupting, intervening, preventing (e.g., a message from reaching a destination), and/or any other characteristic of intercepting described above. Intercepting a request to access a code may include removing or deleting a task scheduled to access a code (e.g., from a call stack), suspending and/or halting execution of an attempt to access a code, and/or replacing a task to access a code with a different task. For example, the agent may monitor a call stack for a particular code execution. Providing (e.g., provide) may include permitting access to, delivering, sending, or transmitting. Providing the unmasked version of the sensitive data may include locating and/or retrieving a copy of an unmasked version of sensitive data from memory (e.g., from a local and/or remote memory device), delivering a copy of the unmasked version of the sensitive data, delivering a location and/or path (e.g., to a computing device) where a copy of the unmasked version of sensitive data may be stored, and/or any other operation facilitating access to an unmasked version of the sensitive data. In embodiment, the unmasked version of the sensitive data may be delivered according to a protocol associated with the request. For instance, an agent may send a copy of the unmasked version of the sensitive data using an API and/or an HTTP command (e.g., a POST and/or PUT HTTP request).

In some embodiments, providing the unmasked version may thereby allow access to the unmasked version of the sensitive data while preventing display of the at least a portion of the unmasked version of the sensitive data. Allowing access (e.g., to data) may include permitting or granting a capability to read, write, edit, modify, use, process, send, and/or make any other use of information encoded in data. Allowing access to the unmasked version of the sensitive data may include permitting a device, system, or IP address (e.g., a device associated with an authorized party issuing an authorized request) to obtain information encoded in sensitive data. For example, allowing access to the unmasked version of the sensitive data may include transmitting the unmasked version of the sensitive data to an endpoint associated with a browsing session (e.g., a live web browsing session or connection). Preventing display of data may include blocking, barring, or impeding a display of data, for instance by replacing one or more characters in a piece of data stored in a DOM with different characters (e.g., using a mask), deleting data (e.g., from a code and/or a DOM for a code), changing one or more display parameters for data (e.g., using a hidden, color, size, location, z-index, and/or any other property configured to affect display of data), unselecting and/or deactivating one or more pixels configured to display sensitive data, and/or performing any other operation configured to block a visual representation of data. Preventing display of the at least a portion of the unmasked version of the sensitive data may include blocking, barring, and/or impeding a display of the at least one character or byte of the sensitive data covered by the mask. For example, if sensitive data may be 100 bytes in length and an agent applies a mask to the first 80 bytes of the 100 bytes, the portion of the unmasked version (e.g., covered by the mask) may correspond to the first (e.g., unmasked) 80 bytes of sensitive data, and the agent may prevent display of the first 80 bytes of sensitive data, and may optionally permit display of the last 20 bytes of sensitive data.

By way of a non-limiting example, in FIG. 9-2, code 9-108 may be configured for execution by browser application 216 of FIG. 2. Agent 9-110 may intercept request 9-118 to access code 9-108 (e.g., including a request to access sensitive data 9-104), for instance by monitoring a call stack in execution environment 9-100. Upon authorizing request 9-118, agent 9-110 may provide a copy 9-120 of sensitive data 9-104 (e.g., stored in a map 9-122 described in greater detail herein below) to a party (e.g., device, system, IP address) associated with request 9-118, thereby allowing authorized access to unmasked version 9-102 of sensitive data 9-104 (e.g., a credit card number) while preventing display of the one or more bytes of unmasked version 9-102 of sensitive data 9-104 (e.g., preventing display of the last 12 out of 16 digits of the credit card number). In some embodiments, agent 9-110 may operate (e.g., including applying a mask to, preventing display of at least a part of sensitive data 9-104, and/or providing authorized access to an unmasked version of sensitive data 9-104) without causing a corresponding change to code 9-108 (e.g., by agent 9-110 and/or browser application 216). Consequently, a subsequent loading of code 9-108 into a browser memory may include loading sensitive data 9-104.

In some embodiments, the agent is further configured to store a value-object pair associated with the sensitive data and the at least one element. A value-object pair may refer to an association between a data container (e.g., an object) and a value contained in the data container. For instance, an address for a memory location storing an identifier for a text field object may be stored in association with an address for a memory location storing a value contained in the text field object. In some embodiments, one or more value-object pairs may be stored in a table, a map, an array, a matrix, a linked list, a database, an object, or any other data structure configured to store an association between multiple pieces of data. For instance, an object foo assigned a value of 1 may be represented as a value-object pair foo: 1. A value-object pair associated with the sensitive data and the at least one element may refer to an association between sensitive data (e.g., an unmasked version of sensitive data) and an element storing (e.g., containing) the sensitive data, e.g., such that the unmasked version of sensitive data may be recovered if a different value (e.g., a masked version of the sensitive data) is stored in the element instead. Storing (e.g., store) may include allocating memory and writing one or more values to the allocated memory. Storing (e.g., store) a value-object pair associated with the sensitive data and the at least one element may include allocating memory (e.g., in a browser memory of a computing device), constructing a data structure to store one or more value-object pairs in memory, writing to a data structure at least one sensitive data value (e.g., and/or an address for the at least one sensitive data value) in association with an element configured to store the at least one sensitive data value (e.g., and/or an address for the element), and/or performing any other operation to allow recovering sensitive data based on an element. For example, an agent may store a value of sensitive data in association with an identifier for an element storing the sensitive data, allowing to access the sensitive data based on an identifier.

In some embodiments, returning the unmasked version of the sensitive data may include accessing the value-object pair. Accessing the value-object pair may include one or more of analyzing, parsing, reading, searching, querying, and/or comparing operations (e.g., with respect to a request for the sensitive data and/or a data structure storing one or more object-value pairs associated with the sensitive data). For example, upon intercepting a request for sensitive data, an agent may analyze and parse the request to determine an element associated with the requested sensitive data. For example, the request may be formulated as an API invocation referencing an element associated with sensitive data. Based on the determined element, the agent may determine a corresponding identifier for the element and may use the identifier to query a data structure storing one or more value-object pairs in memory (e.g., the browser memory). For instance, the object of each value-object pair may correspond to an identifier of an element associated with sensitive data, and the value may correspond to the sensitive data (e.g., or a pointer to a memory location storing the sensitive data). The agent may locate in the data structure the value-object pair for the element by matching the identifier to the object of the value-object pair, and may retrieve the sensitive data using the corresponding value.

By way of a non-limiting example, in FIG. 9-2, agent 9-110 may allocate memory (e.g., inside memory for browser application 216 of FIG. 2) for a map 9-122. Agent 9-110 may store copy 9-120 of sensitive data 9-104 in map 9-122 in association with an identifier (e.g., "credit_card") for div element 9-112. Consequently, in response to detecting an authorized request to access code 9-108 (e.g., to access sensitive data 9-104 stored in div element 9-112 in code 9-108), agent may look up the identifier for div element 9-112 in map 9-122, and may return copy 9-120 of sensitive data 9-104, in response to request 9-118.

Some embodiments involve a system for performing cybersecurity operations for masking sensitive data, the system comprising at least one processor configured to: receive for execution, code associated with displaying sensitive data; and inject, into an execution environment associated with the code, an agent configured to: identify the sensitive data based on an indicator; access a Document Object Model (DOM) associated with the code; identify in the DOM an unmasked version of the sensitive data; replace in the DOM at least a portion of the unmasked version of the sensitive data with a mask, thereby generating a masked version of the sensitive data and concealing the at least a portion of the unmasked version of the sensitive data when content is displayed based on the code; and if a request for the sensitive data is detected, return the unmasked version of the sensitive data while maintaining the mask in the DOM.

By way of a non-limiting example, system 100 may be provided for performing cybersecurity operations for masking sensitive data, consistent with disclosed embodiments. System 100 may include at least one processor 110 configured to receive for execution (e.g., from webpage server 106 via communications network 108), code 9-108 associated with displaying sensitive data 9-104. At least one processor 110 may inject an agent 9-110 (e.g., implemented as one or more executable instructions) into execution environment 9-100 associated with code 9-108. Agent 9-110 (e.g., activated by at least one processor 110 executing the instructions for agent 9-110) may identify sensitive data 9-104 based on an indicator (e.g., a format and/or length for sensitive data 9-104 and/or based on an identifier for div element 9-112), access DOM 9-106 associated with code 9-108, identify in DOM 9-106 an unmasked version 9-102 of sensitive data 9-104, replace in DOM 9-106 at least a portion of unmasked version 9-102 of the sensitive data 9-104 with a mask (e.g., "*"), thereby generating masked version 9-200 of sensitive data 9-104. Agent 9-110 may thereby conceal the at least portion of unmasked version 9-102 of the sensitive data 9-104 when content (e.g., web page 9-300 of FIG. 9-4) is displayed based on code 9-108 (e.g., by displaying a copy 9-400 of masked version 9-200 instead of sensitive data 9-104). If agent 9-110 detects a request 9-118 for sensitive data 9-104 (e.g., based on a request to access code 9-108), agent 9-110 may return copy 9-120 of unmasked version 9-102 of sensitive data 9-104 while maintaining mask 9-200 in DOM 9-106.

FIG. 9-6 depicts process 9-600, represented by process blocks 9-602 to 9-614. At block 9-602, a processing means (e.g., processor 110 in FIG. 1) may receive for execution, code associated with displaying sensitive data, consistent with disclosed embodiments. For example, the processing means may receive the code from webpage server 106 via communications network 108. At block 9-604, the processing means may inject, into an execution environment associated with the code (e.g., execution environment 220 of FIG. 2), an agent (e.g., cybersecurity agent 226) configured to identify the sensitive data based on an indicator, consistent with disclosed embodiments. At block 9-606, the processing means may access a Document Object Model (DOM) associated with the code, consistent with disclosed embodiments. At block 9-608, the processing means may identify in the DOM an unmasked version of the sensitive data, consistent with disclosed embodiments. At block 9-610, the processing means may replace in the DOM at least a portion of the unmasked version of the sensitive data with a mask, thereby generating a masked version of the sensitive data and concealing the at least a portion of the unmasked version of the sensitive data when content is displayed based on the code, consistent with disclosed embodiments. At block 9-612, the processing means may if a request for the sensitive data is detected, return the unmasked version of the sensitive data while maintaining the mask in the DOM, consistent with disclosed embodiments.

At block 9-614, the processing means may intercept a request to access the code and provide the unmasked version of the sensitive data in response to the request, thereby allowing access to the sensitive data while preventing display of the at least a portion of the unmasked version of the sensitive data, consistent with some disclosed embodiments.

Disclosed embodiments may involve systems, methods, and computer-readable media for using a runtime proxy object to emulate functionality (e.g., functionality of a web page). The systems and methods described herein may be implemented with the aid of at least one processor or non-transitory computer readable medium, such as a CPU, FPGA, ASIC, and/or any other processing structure(s) or storage medium, as described herein. For case of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities. A proxy object may refer to a substitute object, or an intermediary object, e.g., between a client and a target object. A proxy object may monitor a lifespan of a target object and/or may forward calls to the targeted object (e.g., if the targeted object has not yet been destroyed).

Existing ad-blocking (e.g., advertising blocking) programs use filtering rules to block or hide contents on a web page. One of the problems with this approach is that in many cases, blocking of an ad or other content may result in blockage of useful content linked to the blocked content. Another problem is that a website may detect the use of this type of ad-blocking program and may block the user from viewing an entire page, unless the user turns off the ad-blocking program.

Accordingly, in some embodiments, the present disclosure provides for a proxy object that imitates (e.g., mimics or simulates) an ad object (e.g., a data container associated with an advertisement) within a web page, and may cause the website to determine that the ad object is being shown to the user. Some embodiments may involve downloadable (e.g., retrievable from a remote host) content, which may be or include a file, HTML data, a visualization, text, a datagram, or any other digital information that may be associated with or displayable with a webpage, consistent with disclosed embodiments. In some embodiments, downloadable content may be requested for download from a webpage. Specified content to be blocked within downloadable content may include all or a portion of downloadable content associated with an instruction to prevent use or display of the specified content (e.g., according to user input to ad-blocking software).

A proxy object in JavaScript may be a special kind of object which allows for interception of fundamental operations for a target object. A Proxy may be created with two parameters:
 a) Target: May be considered to be the original object to be proxied.
 b) Handler: May be considered to be an object that defines which operations will be intercepted and how to redefine intercepted operations.

The proxy object handler has multiple functions that are sometimes called traps, because they trap calls to the target object. Traps are invoked based on several fundamental operations, for example:

a) const target={message1: "hello", message2: "everyone" };
 b) const handler2={get: function(target, prop, receiver) {return "world";} };
 c) const proxy2=new Proxy(target, handler2);
This will result in all "get" operations to return "world":
 a) console.log(proxy2.message1);//world
 b) console.log(proxy2.message2);//world The JavaScript proxy object may be powerful but may not be able to intercept the "typeof" operation (which returns the type of the supplied parameters), which means that the "typeof" operation will return the type of the original target object of the proxy object.

In some embodiments, the present disclosure provides for a proxy object which uses the JavaScript proxy object API in a unique way, where:
 a) The "has" trap may always return true, and
 b) each one of the created objects may hold its own fixed-size stack object, which will store the latest operations on the object. For example, if the present disclosure generates a proxy for a given object, and some other code tried to invoke "proxiedObj.hasOwnProperty("test")", the stack object will now contain the following:
  Get trap for property-hasOwnProperty
  Apply trap for property-hasOwnProperty with argument "test"

The "get" trap may search for "Symbol.toPrimitive" access and return a custom function that will be invoked when an object needs to be converted to a corresponding primitive value, as well as look for "toString" or "toJson" for direct calls.

Any other traps may be used to determine the expected return value of a specific operation. For example:
 a) window.proxiedObj.someprop instanceOf Array The "instanceOf" operator may result in the invocation of the "getPrototypeOf" trap, but also of a "Symbol.hasInstance" patch. This may allow the present proxy object to determine that the property "someprop" should be at least an object, and to return another proxied object in its stead.

In another example:
 a) window.proxiedObj.addListener("error",somecallback)

In this case the "get" trap may be invoked first with the property "addListener", and then the "apply" trap will be invoked with all of the invocation arguments-"error", somecallback, this Value. Thus, the present disclosure may conclude that the above invocation relates to an event registration, because the "error" string is present in the arguments, and the "addListener" is part of the property name. Thus, the present proxy object can actually call "error", "load", or listeners at will. Each invocation to the registered listeners will observe the function length and will pass the present proxy object to every expected argument.

In an exemplary use case, consider the common content blocking technologies used in the context of internet browsing, for example, browser extensions such as AdBlock and the like. These content blocking technologies works by blocking advertisement, user tracking, and/or malicious content. However, in many cases, blocking of an ad library or other content can result in page breakage or even detection of the technology used. Thus, content blocking provides must manually detect and repair these instances. For example, the Google Ads library code, known as "google GPT," is used to interact with the Google Ads API and for displaying ads. When the library code is loaded into a page, a new property on the global window object will be created (window.googletag), which in turn will be used for further interaction with the library code.

A given page can rely on specific APIs on the windows-.googletag object, so when a content blocker attempts to block this library URL, the windows.googletag object will not be created in the first place, and the web page code may not function properly.

Conversely, when using the present proxy object, the same ads library URL can be blocked, while the windows.googletag object is created within three page, so any other code that will interact with the object will work as intended, and any value that the interacting code expects to get from different operations will be accurately determine at runtime by the present proxy object.

In some cases the present agent may emulate specific events like the "load" event for blocked resources, for example if a script tag with a known "bad" domain will get blocked by the present agent, the present disclosure may also emulate the "load" event so any other code that listen for the load event will think the script tag was actually loaded successfully.

In some cases the present agent may block specific network requests and emulate the response object with the above proxy object.

In some cases the present agent may initiate the node eradication module which may first hide all nodes (e.g., contained in or represented by a DOM) that are considered "bad" while the page is still loading and in the next cycle after the page has loaded and all major events queue has done executing the module will remove all of the hidden nodes from the DOM so that on the next GC pulse, they will most likely be collected. the 2 cycles approach exists because while the page is loading some code on the page may depend on the "bad" nodes so removing them can cause unexpected behavior that's why on the first cycle the nodes will only get hidden so the browser won't "paint" them at all (saves execution time) and later on when the page is loaded and it may be determined that it is safe to remove them.

Disclosed embodiments may involve systems, methods, and computer-readable media for detecting injected alien content (e.g., injected into an execution environment, such as into an HTML document). The systems and methods described herein may be implemented with the aid of at least one processor or non-transitory computer readable medium, such as a CPU, FPGA, ASIC, and/or any other processing structure(s) or storage medium, as described herein. For ease of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities.

A computer system may access a webpage that may include API invocations planted by a malicious actor, which, when executed, may cause a breach of the system and give unauthorized access to user data.

In some embodiments, the present disclosure may provide for injecting a JavaScript agent into the webpage code, which may attempt to identify the sources of API invocations and block API invocations associated with unidentified sources.

Disclosed embodiments may involve systems, methods, and computer-readable media for detecting a connection interceptor, also known as a "man in the middle." Aspects of these embodiments may be used in combination with aspects of other embodiments disclosed herein, such as the description above regarding cybersecurity operations for detecting a communication discrepancy. For example, instead of, or in addition to, relying on a difference in response time, a difference in signatures (discussed below) may be used to determine a connection is at risk and/or implement a remedial action (discussed above). The systems and methods described herein may be implemented with the aid of at least one processor or non-transitory computer readable medium, such as a CPU, FPGA, ASIC, and/or any other processing structure(s) or storage medium, as described herein. For case of discussion, certain operations are described below, with the understanding at least one processor may execute the various operations, and that aspects of the operations apply equally to methods, systems, devices, and computer-readable media. The discussed operations are not limited to a particular physical and/or electronic instrumentality, but rather may be accomplished using one or more differing instrumentalities.

A man in the middle (MITM) attack occurs when a perpetrator secretly relays the communications between two parties who believe that they are communicating directly (or communicating through a reliable channel) with each other.

In some embodiments, the present disclosure provides for detecting a man-in-the-middle attack by identifying a discrepancy between a first signature relating to the execution environment of the user device, and a second signature relating to a communications connection. When such a discrepancy is identified, the present disclosure determines that the communication is compromised.

In some embodiments, the present disclosure provides for injecting a JavaScript agent to perform MITM attack detection. Thus, when a user begins to interact with a web page that is considered as sensitive by the JavaScript agent (for example, a page which contains a login form or is associated with other sensitive data, consistent with disclosed embodiments) the JavaScript agent may invoke its MITM detection module.

In some embodiments, phase of the detection, the JavaScript agent may generate a signature for the current execution environment. If the execution environment is a web browser, then this signature can contain browser version, available plugins, available APIs, protocol (http/s), DOM structure, and the like). This signature may be sent over to a remote server for processing. The remote server will receive the first signature and will begin constructing its own signature for the execution environment, based on the connection metadata from the client.

In some embodiments, the remote server may then check for discrepancies between the two constructed signatures, for example:

a) The connection between the server and the client may use TLSv1.2 protocol, but the browser may be chrome v92, which means that the browser supports TLSv1.3. Thus it may be concluded that the connection is being downgraded, potentially by an active MITM attack.

b) The connection between the server and the client uses A,B,C cipher suite but the browser signature is determined to support D,E,F cipher suite, indicating that a third party may be manipulating the connection.

c) If the signature received from the client indicates that the protocol is "http" (not a secured session), the remote server will initiate a request to the relevant domain using "https" and if it will succeed in establishing a secure session, it may be concluded that a third party is "stripping" a Secure Sockets Layer (SSL) from the client connection.

d) The remote server may initiate a request to the same URL as the client, and may parse the retrieved HTML. The parsed retrieved HTML may be used to detect differences between the current parsed HTML and the DOM structure from the signature received from the client. When a structure anomaly has been detected, it may be assumed that a third party has injected content along the way.

Disclosed embodiments may involve systems, methods, and computer-readable media for detecting unexpected or undesirable JavaScript code behavior. The systems and methods described herein may be implemented with the aid of at least one processor or non-transitory computer readable medium, such as a CPU, FPGA, ASIC, and/or any other processing structure(s) or storage medium, as described herein. For ease of discussion, certain operations are described below, with the understanding at least one processor may execute the various operations, and that aspects of the operations apply equally to methods, systems, devices, and computer-readable media. The discussed operations are not limited to a particular physical and/or electronic instrumentality, but rather may be accomplished using one or more differing instrumentalities.

JavaScript code needs to be tested before it is published or pushed to users.

In some embodiments, there is provided a JavaScript-Fuzzer which enables detection of a bug in JavaScript code, by introducing mutations in the JavaScript code and identifying any non-normative behavior of the JavaScript code during mutated mode execution. A mutation may include generating, altering, or deleting code in a present code set (e.g., JavaScript code), to introduce a different effect from execution of the code prior to the mutation. In some embodiments, a mutation may include a telemetry mutation. After inflicting the mutation (e.g., applying the mutation to code), at least one processor may identify non-normative behavior in the JavaScript code during mutated mode execution. Non-normative behavior may include any characteristic (e.g., operation, functionality, or lack thereof) not expected based on a reference behavior, which may be based on historical code operation and/or machine-learning behavior. In some embodiments, behavior of pre-mutation code may be recorded (e.g., recording specification actions, statistics, or a DOM tree) and compared to the exhibited non-normative behavior. In some embodiments, in response to identifying the non-normative behavior, a remedial action may be taken, consistent with disclosed embodiments.

Disclosed embodiments may involve systems, methods, and computer-readable media for constructing an execution map (e.g., during runtime). The systems and methods described herein may be implemented with the aid of at least one processor or non-transitory computer readable medium, such as a CPU, FPGA, ASIC, and/or any other processing structure(s) or storage medium, as described herein. For ease of discussion, certain operations are described below, with the understanding at least one processor may execute the various operations, and that aspects of the operations apply equally to methods, systems, devices, and computer-readable media. The discussed operations are not limited to a particular physical and/or electronic instrumentality, but rather may be accomplished using one or more differing instrumentalities.

Construction of an execution map of all API invocations in a code may enable a system to identify vulnerabilities and alien content injected by a perpetrator.

In some embodiments, the present disclosure provides a program code which records characteristics of all API invocations within an execution environment (e.g., JavaScript environment) upon their execution (e.g., during runtime), and constructs an execution map using the recorded characteristics. In some embodiments, an execution map may include one or more of a plurality of symbols, relationships between the symbols (e.g., influences, effects, or timings), or an execution sequence (e.g., of operations, functions, or lines of code). In some embodiments, an execution map may be constructed by a cybersecurity agent, consistent with disclosed embodiments. In some embodiments, for an invocation, (or for each of a plurality of invocations), at least one processor may serialize (e.g., consistent with disclosed embodiments) recorded characteristics (e.g., operations, statistics, or behaviors) for the invocation. In some embodiments, a characteristic may include at least one of an argument, a return value, a context (e.g., an execution context), an origin (e.g., an invocation origin, or any other detectable aspect of an execution environment related to an API invocation. Additionally, at least one processor may construction at least one map (e.g., an execution map) that stores the serialized characteristics. In some embodiments, a hash value may be computed (e.g., by applying a hash function to the at least one map) for the at least one map to allow for unique identification.

Disclosed embodiments may involve systems, methods, and computer-readable media for reconstructing a cybercrime scene (e.g., synthesizing and analyzing execution environment parameters related to a cybercrime). The systems and methods described herein may be implemented with the aid of at least one processor or non-transitory computer readable medium, such as a CPU, FPGA, ASIC, and/or any other processing structure(s) or storage medium, as described herein. For case of discussion, certain operations are described below, with the understanding at least one processor may execute the various operations, and that aspects of the operations apply equally to methods, systems, devices, and computer-readable media. The discussed operations are not limited to a particular physical and/or electronic instrumentality, but rather may be accomplished using one or more differing instrumentalities.

Reconstructing a cybercrime scene helps to identify scene patterns and prevent similar instances in the future.

In some embodiments, the present disclosure provides for recording a series of events and saving the events as an encrypted data packet. In some embodiments, the recording may occur during runtime and/or may be performed by a cybersecurity agent, consistent with disclosed embodiments. A series of events may include return values (e.g., resulting from executing API invocations) and/or input interactions. An input interaction may include an action a user takes with an input device and/or webpage (e.g., a mouse click or key press), or any data evidencing such action, consistent with disclosed embodiments.

A user can then retrieve the data packet, reconstruct the recorded events (e.g., both return values and input interactions), and replay them in sequence.

Disclosed embodiments may involve systems, methods, and computer-readable media for using side-channel randomization to protect against potential code exploits. The systems and methods described herein may be implemented with the aid of at least one processor or non-transitory computer readable medium, such as a CPU, FPGA, ASIC, and/or any other processing structure(s) or storage medium, as described herein. For case of discussion, certain operations are described below, with the understanding at least one processor may execute the various operations, and that aspects of the operations apply equally to methods, systems, devices, and computer-readable media. The discussed operations are not limited to a particular physical and/or electronic instrumentality, but rather may be accomplished using one or more differing instrumentalities.

In some embodiments, the present disclosure provides for detecting a common API invoked multiple times with a common shape argument (e.g., having one or more of a same size, same length, a same primitive, a same property key, or other same execution parameter). In some embodiments, the present disclosure randomizes (or averages) the return values of time stamps associated with each of the invocations. By randomizing the time stamps in this manner, the API invocations become unpredictable, thereby preventing exploits.

Several APIs may be used to perform timing measurements, for example "performance.now( )". Timing Side-Channel attacks involve accurate measurements of specific operations which can be used to construct and acquire sensitive information (see, e.g., https://en.wikipedia.org/wiki/Side-channel_attack).

Because the present disclosure intercepts most API invocations, and manipulate them in an unpredictable manner, the effect on each invocation results in an unpredictable timing difference.

In some embodiments, the present disclosure may also monitor all API invocations that take place between two sequential timing measurement APIs (such as performance.now( )), for example:

```
a)   var time_start = [ ],time_end = [ ];
b)   For(let I = 0;i<1000;i++){
c)   time_start.push(performance.now( ));
d)   some_ vulnerable _api(obj,obj);
e)   time_end.push(performance.now( ));
f)   }
```

In the above example, the present disclosure performs timing measurements using "performance.now( )", then invoking some vulnerable API, and then again calling "performance.now( )." This may happen as part of a loop that will execute for 1000 iterations, so a computing device may obtain two arrays which can be used to evaluate the exact change between each invocation and possibly leaking sensitive info from the "some_vulnerable_api" invocation.

In some embodiments, the present agent may monitor multiple API invocations and detect when multiple timing measurement APIs are invoked repeatedly (e.g., a number of invocations exceeds an invocation threshold, a number of invocations per a unit of time exceeds a threshold for a number of invocations per a unit of time). When detecting that the APIs being invoked between those timing measurements contain arguments with the same shape (size/length/primitive), the present disclosure may provide for randomizing the return values for each timing measurement, so any exploit that relies on a specific difference between invocations will fail.

Disclosed embodiments may involve systems, methods, and computer-readable media for protecting the leakage of credential information (e.g., user and/or device credentials, such as passwords, user names, personal identifying information, biometric tokens, keys, cryptographic hashes). The systems and methods described herein may be implemented with the aid of at least one processor or non-transitory computer readable medium, such as a CPU, FPGA, ASIC, and/or any other processing structure(s) or storage medium, as described herein. For ease of discussion, certain operations are described below, with the understanding at least one processor may execute the various operations, and that aspects of the operations apply equally to methods, systems, devices, and computer-readable media. The discussed operations are not limited to a particular physical and/or electronic instrumentality, but rather may be accomplished using one or more differing instrumentalities.

The present disclosure provides for credential leak prevention. Some embodiments may include connecting with a digital data directory (e.g., an Active-Directory), which may be stored on a database or other storage medium, and may include digital data associated with one or more individuals (e.g., personal data, passwords, personal identification numbers, etc.), such as sensitive data (discussed above). Some embodiments may include synchronizing user identifiers (e.g., usernames or other unique user or device identifiers) with respective hashed passwords, where synchronizing may include updating data (e.g., uploading recorded password information from a user device, removing password information marked for deletion by a request user device).

Deployment Option 1: Synchronize with the organization Active-Directory (or any other users infrastructure mechanism) and synchronize user hashed passwords. Each user hashed password may be transmitted securely to the user endpoint JavaScript Agent (e.g., a cybersecurity agent, as disclosed herein).

Deployment Option 2: This scenario contains 2 phases:
a) Phase 1: The JavaScript Agent may observe and identify when the JavaScript agent (or code the JavaScript agent is monitoring) is executing on a trusted organization domain, for example "login.microsoftonline.com", if the agent detects an input that is considered a password sink (e.g., a field or other data element associated with receiving a password) the agent may extract and hash the password (since its an organization domain the relevant password is the user organization password) and store it (hashed with sha512, for example) locally.
b) Phase 2: if phase 1 has failed to acquire the user password (like if the user has a stored valid session so no login is necessary) the agent may then transition to engage with the organization domain page to force the login flow, by searching for a "log out" link which may be automatically "clicked" in the background, and, for example if no "log out" link can be found, the agent may identify and remove any session cookie.

After the above phase has successfully executed the login flow will now be observed by the agent which may allow it to acquire the user password.

When a user device (e.g., according to a user input) inputs a password in any input source on any page that may not be a trusted domain, the input password may be hashed and compared with the hashed password extracted from the previous step. If there is a match, at least one processor may block input of the password and/or report to a computing device (e.g., associated with a user or operator) that an organization credentials has been used on a third-party domain.

This module will synchronize with the organization Active-Directory (or any other users infrastructure mechanism) and extract all users hashed passwords. Each user hashed password may be transmitted securely to the user endpoint JavaScript Agent.

Unless otherwise defined, all technical and scientific terms used herein have the same meaning as commonly understood by one of ordinary skill in the art. The materials, methods, and examples provided herein are illustrative only and not intended to be limiting.

Implementation of the method(s) and system(s) of the present disclosure may involve performing or completing certain selected tasks or steps manually, automatically, or a combination thereof. Moreover, according to actual instrumentation and equipment of preferred embodiments of the method(s) and system(s) of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to devices such as a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting, adding, or duplicating steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations.

The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

receiving, by an application capable of JavaScript execution, an executable code including an API invocation;
    intercepting, by a virtual barrier, the API invocation;
    determining that the API invocation is an invocation for a native API configured for subsequent execution in response to a trigger event;
    based on the determination that the API invocation is an invocation for a native API configured for subsequent execution, recording an invocation source identifier; and
    upon occurrence of the trigger event:
    retrieving the invocation source identifier;
    influencing execution of the native API based on the invocation source identifier;
    wherein determining that the API invocation is an invocation for a native API configured for subsequent execution in response to a trigger event includes inspecting at least one argument of the API invocation, and identifying the at least one argument as a callback function;

prior to detecting the trigger event, generating a wrapped API and replacing the invocation for the native API with the wrapped API;

wherein influencing execution of the native API includes executing the wrapped API in place of the native API;

wherein replacing the invocation for the native API with the wrapped API imposes the virtual barrier between the executable code and the native API;

wherein recording the invocation source identifier includes storing an association between the wrapped API, the native API, and the invocation source identifier;

wherein the association is stored in a map accessible by the wrapped API and the native API;

wherein influencing execution of the native API based on the invocation source identifier includes modifying the execution when the invocation source identifier is determined to violate a security rule;

wherein modifying the execution includes suspending the execution;

wherein modifying the execution includes: detecting an object having a size exceeding a predetermined threshold and in response to detecting an object having a size exceeding a predetermined threshold, decreasing the size of the object.

wherein decreasing the size includes restoring an original size of the object;

inspecting at least one return value of the influenced execution of the native API;

wherein the trigger event is a network request;

wherein the trigger event is a Document Object Model (DOM) event;

wherein the trigger event is a user input;

wherein the user input is at least one of: a computer mouse gesture, a gesture on a touch screen, a cursor movement, or a key press;

wherein the source identifier is a Uniform Resource Locator (URL);

recording an invocation sequence of invocations of the native API in the executable code and determining an asynchronous loop when the invocation sequence satisfies at least one invocation sequence pattern parameter;

obtaining at least one runtime parameter associated with an execution environment;

determining if input data associated with the at least one runtime parameter includes at least one character associated with a risk indicator;

splitting the at least one runtime parameter into at least two parts based on the at least one character;

obtaining a first string representation of an origin of an API invocation;

comparing the at least two parts with the first string representation;

identifying at least one first portion of the first string representation that matches at least one second portion of the at least two parts by comparing the at least two parts with the first string representation;

upon the identifying, parsing the first string representation into a first Document Object Model (DOM) tree;

replacing the identified portion of the first string representation with a benign set of characters to form a second string representation;

parsing the second string representation into a second DOM tree;

determining an existence of a difference between the first DOM tree and the second DOM tree;

in response to the determined existence of a difference between the first DOM tree and the second DOM tree, generating a notification for display in a user interface indicating a potential untrusted code injection;

wherein the at least one runtime parameter includes at least one of: a Uniform Resource Locator (URL), a URL parameter, an Application Programming Interface (API) invocation, a referral link, a local storage value, a network storage value, a cookie, or a hash value;

wherein the at least one character includes at least one of: a tag opening, a tag closing, or a double comma;

determining that the at least one runtime parameter is encoded;

decoding the at least one encoded runtime parameter;

replacing the at least one encoded runtime parameter with the decoded at least one runtime parameter;

storing the at least two parts of the at least one runtime parameter in a matrix having multiple cells, wherein comparing the at least two parts with the first string representation includes comparing the at least a portion of the first string representation with content of each cell in the matrix;

wherein the at least one runtime parameter includes a Hypertext Markup Language (HTML) string;

wherein determining if the input data associated with the at least one runtime parameter includes at least one character associated with the risk indicator includes performing at least one of: accessing a set of predefined characters and determining that the at least one character is included in the set of predefined characters; determining if an input value associated with the at least one runtime parameter is encoded; or determining if input data associated with the at least one runtime parameter has a length exceeding a length threshold;

determining that the at least one runtime parameter is associated with cross-site scripting;

wherein the at least one runtime parameter is obtained based on the determination that the at least one runtime parameter is associated with cross-site scripting;

wherein determining that the at least one runtime parameter is associated with cross-site scripting includes determining that the at least one runtime parameter is associated with a reflected cross-site scripting attack;

wherein determining that the at least one runtime parameter is associated with cross-site scripting includes determining that the at least one runtime parameter is associated with a Document Object Module (DOM)-based cross-site scripting attack;

suspending, in response to the determined existence of a difference between the first DOM tree and the second DOM tree, an execution associated with the at least one runtime parameter;

receiving code for execution within a JavaScript runtime environment, the code including at least one portion relating to a nested web element;

injecting a JavaScript agent into the at least one portion of the code, wherein the JavaScript agent is configured to: identify at least one parameter value associated with the nested web element; determine, based on the at least one parameter value, that the nested web element is configured to cause a hidden presentation of a display element within a user interface; determine that the at least one code portion relating to the nested web element is associated with at least one input event; and in response to the determination that the at least one code portion relating to the nested web element is associated with at least one input event, prevent an occurrence of the at least one input event;

wherein the nested web element is a nested execution context element;

wherein the nested web element is a cross origin web element;

wherein the nested web element is an iframe;

wherein the display element is associated with the at least one input event;

wherein the display element is configured for non-visible presentation and in a manner at least partially overlapping, a second display element configured for visible presentation;

wherein the second display element is associated with an iframe external to the nested web element;

wherein the display element is a button;

wherein the display element is a text field;

wherein the at least one input event is a click event;

wherein the at least one parameter value relates to a display characteristic;

wherein the display characteristic is an opacity property;

wherein the display characteristic is associated with a size property;

wherein the display characteristic is associated with a color property;

wherein the at least one parameter value is an intersecting element;

wherein the JavaScript agent is further configured to cause display, via the user interface, of a notification indicating a threat associated with the nested web element;

wherein the JavaScript agent is further configured to block execution of the at least one portion of the code relating to the nested web element;

wherein the JavaScript agent is further configured to determine a source of the nested web element;

transmitting at least one first request to an endpoint device;

determining a first response time based on the transmitted at least one first request;

transmitting at least one second request to the endpoint device;

determining a second response time based on the transmitted at least one second request;

determining a difference between the first response time and the second response time;

based on the determination of the difference between the first response time and the second response time, determining whether to implement a remedial action;

wherein the endpoint device is an intended destination of an electronic communication sent by a client device associated with transmitting at least one of the at least one first request or the at least one second request;

wherein at least one of the first response time or the second response time is a Time to First Byte (TTFB);

wherein the at least one first request is a plurality of first requests;

wherein the at least one second request is a plurality of second requests;

wherein the first response time is a first metric of response times associated with the plurality of first requests;

wherein the second response time is a second metric of response times associated with the plurality of second requests;

wherein the first metric is an average of the response times associated with the plurality of first requests, and the second metric is an average of the response times associated with the plurality of second requests;

wherein the at least one first request includes a first payload and the at least one second request includes a second payload larger than the first payload;

wherein determining whether to implement a remedial action includes determining to implement a remedial action when the difference between the first response time and the second response time exceeds a predetermined threshold;

wherein the predetermined threshold is uncorrelated with a payload size associated with at least one of the at least one first request or the at least one second request;

wherein the transmission of at least one of the at least one first request or the at least one second request is caused by a cybersecurity web agent;

wherein the remedial action is implemented at a client device hosting the cybersecurity web agent;

wherein the remedial action includes issuing a prompt indicating that a connection associated with the at least one first request and the at least one second request is compromised;

wherein the remedial action includes logging digital information associated with an execution environment associated with a connection to the endpoint device;

wherein the remedial action includes influencing an execution environment associated with a web browser;

receiving a code for execution;

injecting, into an execution environment associated with the code, at least one agent configured to: collect execution data associated with rendering content based on the code; analyze the execution data to detect at least one anomaly; determine, based on runtime events resulting from executing the code in at least one execution context associated with the execution environment, whether functionality associated with the content is valid; and/or implement a remedial action upon determining that the functionality associated with the content is not valid;

wherein the execution environment is associated with a web browser and the content includes web page content.

wherein the code is configured for execution by a JavaScript engine and the at least one agent includes a JavaScript agent.

wherein determining whether functionality associated with the content is valid includes: executing the code in the at least one execution context in an isolated environment, and emulating at least one event in the isolated environment to identify a behavior of the code associated with the at least one event;

wherein determining that the functionality associated with the content is not valid includes determining that the identified behavior diverges from an expected behavior;

wherein emulating at least one event in the isolated environment includes simulating following a link included in the content, monitoring a Document Object Model (DOM) structure associated with the content, and determining that the identified behavior diverges from the expected behavior when the DOM structure remains unchanged after simulation of following the link;

wherein emulating at least one event in the isolated environment includes submitting at least one value using a form of the content;
wherein identifying the behavior of the code includes determining a response to submitting the at least one value;
wherein the at least one value is arbitrary;
wherein the form is a login form, and wherein the at least one value corresponds to a login credential;
wherein the content is associated with a first web page, the expected behavior corresponds to an invalid credential warning, and the identified behavior includes redirecting a web browser to a second web page;
wherein the at least one anomaly includes a broken link;
wherein the broken link is an invalid link lacking an associated listener in a DOM structure associated with the content;
wherein the at least one anomaly includes a property violating a security rule;
wherein the property is associated with a root of a DOM structure associated with the content;
wherein the property includes a network request property;
wherein the property includes a DOM structure associated with the content;
receiving for execution, code associated with displaying sensitive data;
injecting, into an execution environment associated with the code, an agent configured to: identify the sensitive data based on an indicator; access a Document Object Model (DOM) associated with the code; identify, in the DOM, an unmasked version of the sensitive data; replace in the DOM at least a portion of the unmasked version of the sensitive data with a mask, thereby generating a masked version of the sensitive data and concealing the at least a portion of the unmasked version of the sensitive data when content is displayed based on the code; and/or if a request for the sensitive data is detected, return the unmasked version of the sensitive data while maintaining the mask in the DOM;
wherein the agent is further configured to intercept a request to access the code and provide the unmasked version of the sensitive data in response to the request, thereby allowing access to the unmasked version of the sensitive data while preventing display of the at least a portion of the unmasked version of the sensitive data;
wherein the code is configured for execution by an application and the agent is configured to operate without changing application code associated with the application;
wherein the sensitive data is associated with at least one element associated with the code, and wherein identifying in the DOM the unmasked version of the sensitive data includes identifying the at least one element in the DOM;
wherein the at least one element includes a hypertext markup language (HTML) element;
wherein the at least one HTML element includes a <div> HTML element;
wherein the agent is further configured to store a value-object pair associated with the sensitive data and the at least one element, wherein returning the unmasked version of the sensitive data includes accessing the value-object pair;
wherein the sensitive data includes at least one of financial information, personal information, or business information;
wherein the sensitive data includes classified information;
wherein the sensitive data includes health information;
wherein the sensitive data includes educational information;
wherein the agent is injected into a top portion of the code;
wherein identifying the sensitive data in the code includes scanning the code to detect the indicator;
wherein the indicator includes a contextual character sequence associated with the sensitive data;
wherein identifying the sensitive data in the code includes determining that the contextual character sequence satisfies a predefined format rule;
wherein identifying sensitive data in the code includes determining that the contextual character sequence satisfies a predefined length rule;
wherein the contextual character sequence is configured to be displayed when the content is displayed;
wherein the contextual character sequence is configured to be withheld when the content is displayed;
detecting, at a user device, specified content to be blocked within downloadable content received in response to a request, wherein the specified content includes a code configured to generate a target object at a target location within a rendering or a presentation of the downloadable content;
generating a proxy object configured to emulate loss of functionality resulting from the specified content to be blocked, wherein the proxy object is configured to return, to the code, expected values associated with the specified content to be blocked;
inserting the generated proxy object in the target location;
wherein the expected values are based on a prediction made by an internal stack containing property access strings;
running a JavaScript engine configured to implement APIs;
receiving code for execution by the JavaScript engine, the code including a particular call invocation for calling a particular API, and wherein the particular call invocation includes a plurality of portions;
inspecting the particular call invocation to attempt to identify an invocation source;
when, upon inspection, an invocation source is identified, tagging the plurality of portions with an origin identifier;
when, upon inspection, no source is identified, implementing a remedial action;
determining whether the particular call invocation originates from a non-malicious source and to invoke the particular API in response to the non-malicious source determination;
wherein the remedial action includes abandoning the call invocation;
wherein the remedial action includes tagging the plurality of portions with an indication that the source is unknown;
wherein the portions include at least one of arguments, parameters, or functions;
receiving, at an endpoint, a request to establish a connection with an execution environment containing an agent configured to collect a plurality of execution environment parameters;
in response to the request, establishing the connection;
receiving, via the connection, an environmental signature from the execution environment, the environmental signature being based on the execution environment parameters;

during a communications session between the execution environment and the endpoint, generating a new signature for the established connection, the new signatures being based on parameters of the connection;
upon identifying at least one discrepancy between the new signature and the environmental signature, implementing a remedial action;
wherein the remedial action includes sending an encrypted message from the endpoint to the execution environment.
receiving from the execution environment a unique encrypted public key, decrypting the encrypted public key, using the decrypted public key to generate the encrypted message, and sending the encrypted message to the agent in the execution environment;
establishing a first connection with an execution environment of a first endpoint device in communication with a second endpoint device via a second connection, wherein the execution environment is associated with a monitoring agent configured to collect a first plurality of parameters;
receiving, via the first connection, a first signature based on the first plurality of parameters;
collecting a second plurality of parameters;
generating a second signature from the second plurality of parameters;
comparing the first signature with the second signature;
implementing a remedial action upon identifying at least one discrepancy between the first signature and the second signature;
wherein the first plurality of parameters for generating the first signature is associated with the execution environment, and the second plurality of parameters is associated with the first connection;
wherein the remedial action includes issuing a prompt indicating that the second connection is compromised;
wherein the execution environment is communicably connected with the second endpoint device via the second connection;
wherein the first connection is established in response to a request by the first endpoint device;
wherein the execution environment is associated with a web browser;
wherein the first plurality of parameters includes at least one of: a browser version, an available plugin, an available Application Programming Interface (API), a communications protocol, or a document object model (DOM) structure;
wherein the first signature is based on a first communication protocol and the second signature is based on a second communication protocol different from the first communication protocol, the at least one discrepancy being based on the difference between a first communication protocol and a second communication protocol;
wherein one of the first communication protocol and the second communication protocol is a non-secured session protocol and another of the first communication protocol and the second communication protocol is a secured session protocol;
wherein the first signature is associated with a first cipher suite, and the second signature is associated with a second cipher suite different from the first cipher suite;
wherein the remedial action includes sending an encrypted message from an endpoint to the execution environment;
receiving from the execution environment a uniquely encrypted public key, decrypting the encrypted public key, using the stored private key to generate the encrypted message, and sending the encrypted message to the monitoring agent;
the monitoring agent is further configured to: establish a third connection, different than the first connection and second connection; and transmit data via the third connection;
measuring a communications latency associated with reception of the transmitted data from the monitoring agent via the third connection;
wherein transmitting data via the third connection includes transmitting a first data set and a second data set larger than the first data set;
wherein measuring the communications latency includes measuring a first communications latency for the first data set and measuring a second communications latency for the second data set; and
implementing an additional remedial action when a deviation between the first communications latency and the second communications latency exceeds a predetermined threshold;
wherein the at least one discrepancy is based on at least one encryption procedure performed on the first data set and the second data set and at least one decryption procedure performed on the first data set and the second data set;
wherein the at least one encryption procedure and the at least one decryption procedure are performed by an intervening agent, distinct from the first endpoint device and the second endpoint device;
receiving JavaScript code for execution, the code including instructions for invoking a plurality of APIs;
performing mutations on at least one of an argument, a return value, or an execution state of at least one of the API invocations in the JavaScript code;
following the mutation infliction, identifying non-normative behavior in the JavaScript code during mutated mode execution;
upon identification of non-normative behavior, instituting a remedial action;
wherein the remedial measure includes reporting the non-normative behavior;
running the JavaScript code in a non-mutated mode prior to the performing of the mutations, to determine normative behavior, and determining the non-normative behavior by comparing execution during the non-mutated mode with execution during the mutated mode;
wherein the mutations are telemetry mutations;
receiving JavaScript code for execution, the code including instructions for invoking a plurality of APIs;
for each of the plurality of invocations, recording associated characteristics, the associated characteristics including at least one of an argument, a return value, a context, or an origin;
for each of the plurality of invocations, serializing the recorded characteristics;
constructing at least one map storing the serialized characteristics;
generating a unique hash for the at least one map, transmitting the unique hash to a remote server;
receiving from the remote server an indication of whether the at least one map exists on the remote server;
wherein if the at least one map does not exist on the remote server, transmitting the at least one map to the remote server;

wherein the at least one map indicates corresponding states of invocations;
wherein the states include at least one of synchronous and asynchronous origins for associated invocations;
receiving code for execution by the JavaScript engine, the code including call invocations for calling a plurality of APIs;
running the JavaScript engine to execute the code;
recording return values from the plurality of API invocations as a result of the execution;
recording input interactions with a webpage;
in response to a request, re-executing the received code to simulate the recorded return values and the recorded input interactions;
transmitting, in response to a request, the recorded values to a remote computing device;
encrypting the recorded values before transmitting the recorded values;
transmitting, in response to a request, the received code to a remote computing device;
wherein the request is received from a remote computing device;
monitoring multiple APIs;
detecting, among the monitored APIs, that multiple timing measurement APIs are invoked repeatedly;
determining that APIs invoked between the timing measurement APIs contain arguments with a same shape;
based on the determination, randomizing at least one return value for the timing measurement APIs;
connecting to a digital data directory;
synchronizing user identifiers with respective hashed passwords;
transmitting at least one of the hashed passwords to an endpoint device associated with a user associated with one of the user identifiers.
wherein transmitting at least one of the hashed passwords to an endpoint device includes transmitting the at least one hashed password to a cybersecurity agent implemented by the endpoint device;
identifying a connection with a first domain;
detecting a first input including a first password;
extracting the first password from the first input and hash the first password;
storing the hashed password;
detecting a second input associated with second domain, the second input including a second password;
hashing the second password;
comparing the hashed first password to the hashed second password;
determining, based on the comparing, that the hashed first password and the hashed second password match;
based on the determined match, performing at least one of: blocking transmission of the second password; or issuing a prompt indicating possible leakage of the second password;
determining lack of access to the first password;
in response to determining lack of access to the first password, attempting to force the first input including the first password by performing at least one of: automatically clicking a log-out link; or removing a session cookie.

Systems and methods disclosed herein involve unconventional improvements over conventional approaches. The foregoing description has been presented for purposes of illustration. Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone. Additionally, the disclosed embodiments are not limited to the examples discussed herein.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A non-transitory computer readable medium containing instructions that when executed by at least one processor cause the at least one processor to perform operations, comprising:
    obtaining at least one runtime parameter associated with an execution environment;
    determining if input data associated with the at least one runtime parameter includes at least one character associated with a risk indicator;
    splitting the at least one runtime parameter into at least two parts based on the at least one character;
    obtaining a first string representation of an origin of an API invocation;
    comparing the at least two parts with the first string representation;
    identifying at least one first portion of the first string representation that matches at least one second portion of the at least two parts by comparing the at least two parts with the first string representation;
    upon the identifying, parsing the first string representation into a first Document Object Model (DOM) tree;
    replacing the identified portion of the first string representation with a benign set of characters to form a second string representation;
    parsing the second string representation into a second DOM tree;
    determining an existence of a difference between the first DOM tree and the second DOM tree; and
    in response to the determined existence of a difference between the first DOM tree and the second DOM tree, generating a notification for display in a user interface indicating a potential untrusted code injection.

2. The non-transitory computer readable medium of claim 1, wherein the at least one runtime parameter includes at least one of: a Uniform Resource Locator (URL), a URL parameter, an Application Programming Interface (API) invocation, a referral link, a local storage value, a network storage value, a cookie, or a hash value.

3. The non-transitory computer readable medium of claim 1, wherein the at least one character includes at least one of: a tag opening, a tag closing, or a double comma.

4. The non-transitory computer readable medium of claim 1, wherein the instructions are further executable by the at least one processor to cause the at least one processor to perform additional operations, comprising:
    determining that the at least one runtime parameter is encoded;
    decoding the at least one encoded runtime parameter; and
    replacing the at least one encoded runtime parameter with the decoded at least one runtime parameter.

5. The non-transitory computer readable medium of claim 1, wherein the instructions are further executable by the at least one processor to cause the at least one processor to store the at least two parts of the at least one runtime parameter in a matrix having multiple cells, wherein comparing the at least two parts with the first string representation includes comparing the at least a portion of the first string representation with content of each cell in the matrix.

6. The non-transitory computer readable medium of claim 1, wherein the at least one runtime parameter includes a Hypertext Markup Language (HTML) string.

7. The non-transitory computer readable medium of claim 1, wherein determining if the input data associated with the at least one runtime parameter includes at least one character associated with the risk indicator includes performing at least one of:
    accessing a set of predefined characters and determining that the at least one character is included in the set of predefined characters;
    determining if an input value associated with the at least one runtime parameter is encoded; or
    determining if input data associated with the at least one runtime parameter has a length exceeding a length threshold.

8. The non-transitory computer readable medium of claim 1, wherein the instructions are further executable by the at least one processor to determine that the at least one runtime parameter is associated with cross-site scripting, wherein the at least one runtime parameter is obtained based on the determination that the at least one runtime parameter is associated with cross-site scripting.

9. The non-transitory computer readable medium of claim 8, wherein determining that the at least one runtime parameter is associated with cross-site scripting includes determining that the at least one runtime parameter is associated with a reflected cross-site scripting attack.

10. The non-transitory computer readable medium of claim 8, wherein determining that the at least one runtime parameter is associated with cross-site scripting includes determining that the at least one runtime parameter is associated with a Document Object Module (DOM)-based cross-site scripting attack.

11. The non-transitory computer readable medium of claim 1, wherein instructions are further executable by the at least one processor to suspend, in response to the determined existence of a difference between the first DOM tree and the second DOM tree, an execution associated with the at least one runtime parameter.

12. A method for sanitizing data within a native environment, the method comprising:
    obtaining at least one runtime parameter associated with an execution environment;
    determining if input data associated with the at least one runtime parameter includes at least one character associated with a risk indicator;
    splitting the at least one runtime parameter into at least two parts based on the at least one character;
    obtaining a first string representation of an origin of an API invocation;

comparing the at least two parts with the first string representation;

identifying at least one first portion of the first string representation that matches at least one second portion of the at least two parts by comparing the at least two parts with the first string representation;

upon the identifying, parsing the first string representation into a first Document Object Model (DOM) tree;

replacing the identified portion of the first string representation with a benign set of characters to form a second string representation;

parsing the second string representation into a second DOM tree;

determining an existence of a difference between the first DOM tree and the second DOM tree; and in response to the determined existence of a difference between the first DOM tree and the second DOM tree, generating a notification for display in a user interface indicating a potential untrusted code injection.

13. The method of claim 12, wherein the at least one runtime parameter includes at least one of: a Uniform Resource Locator (URL), a URL parameter, an Application Programming Interface (API) invocation, a referral link, a local storage value, a network storage value, a cookie, or a hash value.

14. The method of claim 12, wherein the at least one character includes at least one of: a tag opening, a tag closing, or a double comma.

15. The method of claim 12, further comprising:
determining that the at least one runtime parameter is encoded;
decoding the at least one encoded runtime parameter; and
replacing the at least one encoded runtime parameter with the decoded at least one runtime parameter.

16. The method of claim 12, further comprising storing the at least two parts of the at least one runtime parameter in a matrix having multiple cells, wherein comparing the at least two parts with the first string representation includes comparing the at least a portion of the first string representation with content of each cell in the matrix.

17. The method of claim 12, wherein determining if the input data associated with the at least one runtime parameter includes at least one character associated with the risk indicator includes performing at least one of:
accessing a set of predefined characters and accessing a set of predefined characters and determining that the at least one character is included in the set of predefined characters;
determining if an input value associated with the at least one runtime parameter is encoded;
or
determining if input data associated with the at least one runtime parameter has a length exceeding a threshold.

18. The method of claim 12, further comprising determining that the at least one runtime parameter is associated with cross-site scripting, wherein the at least one runtime parameter is obtained based on the determination that the at least one runtime parameter is associated with cross-site scripting.

19. The method of claim 18, further comprising suspending, in response to the determined existence of a difference between the first DOM tree and the second DOM tree, an execution associated with the at least one runtime parameter.

20. A system for sanitizing data within a native environment, the system comprising at least one processor configured to:
obtain at least one runtime parameter associated with an execution environment;
determining if input data associated with the at least one runtime parameter includes at least one character associated with a risk indicator;
split the at least one runtime parameter into at least two parts based on the at least one character;
obtain a first string representation of an origin of an API invocation;
compare the at least two parts with the first string representation;
identify at least one first portion of the first string representation that matches at least one second portion of the at least two parts by comparing the at least two parts with the string representation;
upon the identifying, parse the first string representation into a first Document Object Model (DOM) tree;
replace the identified portion of the first string representation with a benign set of characters to form a second string representation;
parse the second string representation into a second DOM tree;
determine an existence of a difference between the first DOM tree and the second DOM tree; and
in response to the determined existence of a difference between the first DOM tree and the second DOM tree, generate a notification for display in a user interface indicating a potential untrusted code injection.

* * * * *